United States Patent [19]

Krause et al.

[11] Patent Number: 5,038,268

[45] Date of Patent: Aug. 6, 1991

[54] IRRIGATION SYSTEM CONTROLLER APPARATUS

[75] Inventors: Dean R. Krause; Peter L. Floersch, both of San Diego, Calif.

[73] Assignee: Aquametrics, Inc., San Diego, Calif.

[21] Appl. No.: 351,839

[22] Filed: May 12, 1989

[51] Int. Cl.$^5$ .................. G05B 11/01; G06F 15/46
[52] U.S. Cl. ..................... 364/145; 364/143; 364/144; 364/146; 364/420; 239/69; 239/70; 137/624.2
[58] Field of Search ............. 364/145, 140, 141, 143, 364/144, 146, 187–188, 420, 510; 239/68–73, 63, 65; 137/624.11, 624.18, 624.2

[56] References Cited

U.S. PATENT DOCUMENTS

| | | | |
|---|---|---|---|
| 4,176,395 | 11/1979 | Evelyn-Veere et al. | 364/420 |
| 4,209,131 | 6/1980 | Barash et al. | 239/68 |
| 4,569,020 | 2/1986 | Snoddy et al. | 364/420 |
| 4,646,224 | 2/1987 | Ransburg et al. | 364/143 |
| 4,922,433 | 5/1990 | Mark | 364/510 |
| 4,937,732 | 6/1990 | Brundisini | 364/145 |

*Primary Examiner*—Jerry Smith
*Assistant Examiner*—Paul Gordon
*Attorney, Agent, or Firm*—Ellsworth R. Roston; Charles H. Schwartz

[57] ABSTRACT

A computer-based controller controls and displays, on a real-time basis, the operation of a large number of watering stations. The controller provides functional statistics, assessment of the system flow characteristics and monitoring of station and system malfunctions. Control and modification of each station is turn-on time during each watering, the time between each station's watering and the accumulated watering time interval are also provided. Soil moisture sensors and a flow meter provide reliable irrigation of large lawns while optimizing water conservation. Prompt response to malfunctions at the system and station level prevents costly catastrophes plaguing prior art irrigation control systems. A scanning irrigation controller permits multiple applications of small amounts of water during the irrigation cycle, resulting in reduced runoff loss and reduced leaching and puddling from oversaturation. A microprocessor-based architecture in the controller interfaces a key pad having a plurality of keys and corresponding key lights, at least one such key and light being provided for each watering associated station. The lights indicate the on/off status of each key in real time without requiring any sequencing operations to be performed for assessing the system status. The key pad also provides clock function keys to input time variables for the system and the stations. A display provides a variety of alpha-numeric messages including time values and errors or malfunctions. A plurality of valves may be operated by the system in a number of automatic modes or may be enabled for manual operation within preselected flow volume constraints.

86 Claims, 10 Drawing Sheets

IRRIGATION SYSTEM CONTROLLER APPARATUS

BACKGROUND OF THE INVENTION

1. Field of the Invention

The present invention relates generally to irrigation controllers and more specifically to a computer-based irrigation system controller apparatus for controlling the timing and sequence for applying irrigation watering in a system of the type having a plurality of watering stations connected in parallel to a common source of water. The controller of the present invention is especially designed to be used with moisture sensors and permits numerous applications of relatively small amounts of water during an irrigation cycle thereby resulting in less loss due to runoff and reduced leaching and puddling caused by oversaturation.

2. Prior Art

Controllers for irrigation systems are not new. Their principal purpose is to obviate the requirement for manual control of watering systems such as sprinkler heads so that watering can be accomplished on a regular basis at times most suitable for minimally stressing the plants being watered and without requiring the presence of personnel to oversee the irrigation process. However, such prior art irrigation controller systems or timer-based systems water periodically irrespective of the need for watering and are not responsive to the moisture condition of the soil. Subsequent irrigation controllers were provided with soil moisture sensors to make the controllers responsive to the actual conditions of the soil. Such sensors indicate which watering station should be turned on or off and in which order to optimize the apparent efficiency of the irrigation system.

Unfortunately, systems that rely entirely on either timers or sensors are only as reliable as the timers and/or sensors to which they are connected. Consequently, if a timer or a sensor malfunctions, it is not unusual for a controller to permit either underwatering or overwatering which can destroy the plants by allowing them to be burned by the sun or by flooding them. Both of these conditions can, of course, be extremely costly. Furthermore, if a sprinkler head or other such water outlet becomes stuck in an open condition, then irrespective of the reliability of timers or sensors, the system will overwater and flood, thereby damaging plants and result in large costs for replacement of plants and for water waste.

There has therefore been a long felt need for an irrigation control system which reliably irrigates while conserving water and which effectively obviates any possibility for overwatering or underwatering irrespective of malfunctions in the system. There has also been a long felt need for an irrigation control apparatus which permits the monitoring of system watering statistics to permit personnel to keep track of irrigation performance during proper operation of the irrigation system as well as to assess system performance when malfunctions occur so that such malfunctions can be readily identified and corrected. There has furthermore been a long felt need for an irrigation control system where irrigation is provided by a large plurality of watering stations such as for use on golf courses, nurseries and the like and wherein such large numbers of watering stations can be controlled from a single control point providing a comprehensive display indicating the real time status for all such watering stations simultaneously. Furthermore, there has been a long felt need for a comprehensive irrigation control system wherein the irrigation parameters, such as the time that each watering station is turned on, the time between waterings at each station and the accumulated total watering time of each station, may be readily altered with a minimum of inconvenience to the user. A system controller that meets all of these needs would provide increased efficiency along with reliability and a significant degree of water conservation.

SUMMARY OF THE INVENTION

The aforementioned long felt needs are all met by the unique irrigation system control apparatus of the present invention. More specifically, the apparatus of the present invention permits computer-based control of a large number of watering stations while providing real time display of all such watering stations, simultaneously. The present invention also permits the monitoring of functional statistics of the watering system and assessment of the flow characteristics of the system, as well as monitoring of malfunctions at both the watering station level and the system level. The present invention also affords easy control and modification of the various times associated with watering such as the time each station is turned on during each watering, the time between waterings at each station and the total accumulated watering time interval. In addition, the present invention is designed to operate with soil moisture sensors and flow meters to provide highly reliable irrigation of plant systems such as large lawns and the like while optimizing water conservation. Most importantly, the present invention is designed to respond properly to malfunctions at either the system or station level to prevent costly catastrophes that have plagued prior art irrigation control systems.

The irrigation system controller apparatus of the present invention comprises a scanning irrigation controller which permits numerous applications of smaller amounts of water during the irrigation cycle resulting in less loss due to runoff and reduced leaching and puddling caused by oversaturation. The invention comprises a microprocessor-based control apparatus having a key pad with a plurality of keys and corresponding key lights, at least one such key and light for each of the watering stations associated with the irrigation system. The lights are provided so that the on/off status of each key is shown in real-time without requiring the user to perform any sequencing operations in order to assess the status of the system. The key pad also provides a plurality of clock function keys used to input time variables for both the system and the stations. A display is also provided which shows a variety of alpha-numeric messages including time values and error indications.

The controller of the present invention employs a microprocessor-based printed circuit board implementation utilizing CMOS logic electronics having serial data flow and serial-to-parallel data interfaces for control of keyboard lights and flow station valve solenoids. An RS 232/RS 422 interface is provided to permit the controller to be connected to a host/terminal as well as to one or more additional controllers for controlling irrigation utilizing a larger number of irrigation stations than can be handled by one controller. In a preferred embodiment, each such controller is designed to be operated with up to sixteen watering stations each of which may be optionally associated with a soil moisture sensor such as that disclosed in patent application Ser. No. 004,047 filed by Richard L. Bireley on Jan. 16, 1987, incorporated herein by reference and assigned to the assignee of the present invention and now issued as U.S. Pat. No. 4,850,386 issued July 25, 1989. The system, in its preferred embodiment, is also designed to operate in conjunction with a flow meter which provides a pulsed electrical signal each time a predefined quantity of water passes through the meter thus making pulse repetition rate proportional to flow rate.

Each of the sixteen irrigation stations with which the present invention may be used, without interface with additional controllers, is provided with three dedicated keys with the nomenclature ON, AUTO and OFF, respectively. The "ON" key allows manual operation of the selected station when it is desired to bypass the automatic feature of the present invention such as immediately after the application of fertilizer to dissolve the fertilizer before it has a chance to burn the lawn. The "AUTO" key for each station places that station under automatic control of the controller apparatus of the present invention for automatic irrigation in accordance with time and moisture sensor control as will be described hereinafter in greater detail. The various operating parameters of the invention may be readily altered and controlled by a terminal/host computer to which the system is adapted for connection using an RS 232 or an RS 422 port. Such a terminal/host computer may be selectively connected to the controller apparatus for modification or status evaluation of the system's performance or may be relatively permanently connected to the system for everyday reprogramming and monitoring of the system's performance.

OBJECTS OF THE INVENTION

It is therefore a principal object of the present invention to provide an irrigation system controller apparatus having improved water conservation and reliability features for use with a large plurality of irrigation stations.

It is an additional object of the present invention to provide an irrigation system controller apparatus having a microprocessor-based logic system for control of automatic irrigation parameters such as the watering interval time and off or soak time for each of a plurality of stations.

It is still an additional object of the present invention to provide an irrigation system controller apparatus which displays an assessment of the flow characteristics of the system, as well as of system and station malfunctions which might otherwise result in catastrophic damage to the lawn or other plant life.

It is still an additional object of the present invention to provide an automatic controller for irrigation systems designed to operate in conjunction with moisture sensors to automatically control irrigation sequences in accordance with a predefined schedule and the needs for moisture in a large plurality of distributed irrigation stations.

It is still an additional object of the present invention to provide an automatic irrigation system controller for use with a large plurality of watering stations and having a real-time display of the watering status of all such stations without requiring any form of sequencing of switches or the like to provide such information.

It is still an additional object of the present invention to provide an improved irrigation system controller apparatus for use in conjunction with a plurality of watering stations, moisture sensors and at least one flow meter for detecting the occurrence of malfunctions in the system as a whole or in individual watering stations and providing means responsive to such malfunctions to shut down either the system or those individual watering stations.

It is still an additional object of the present invention to provide an improved irrigation system controller apparatus for controlling a predetermined number of irrigation stations and having the capability for interfacing one or more additional such controllers as slave units for controlling an even larger number of individual irrigation stations.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which:

FIG. 3 which comprises

FIG. 6, which comprises

DETAILED DESCRIPTION OF A PREFERRED EMBODIMENT

Architecture and Interfaces

Figure 1:
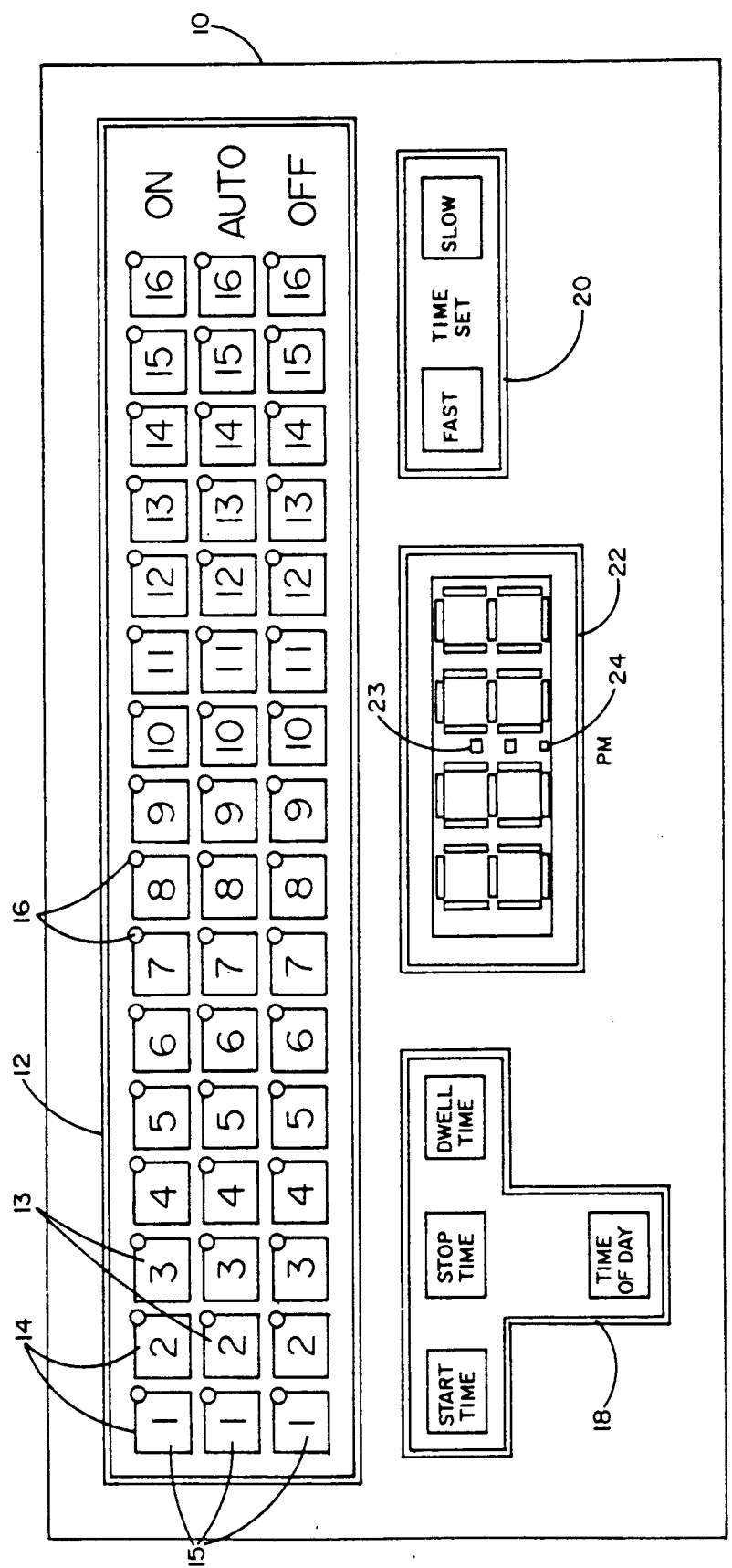
FIG. 1 is a plan view of the front panel of the present invention.

Referring first to FIG. 1, it will be seen that the control panel 10 of the present invention comprises a station key pad matrix 12 comprising a plurality of station keys 13 arranged in columns 14 and rows 15. Furthermore, it will be seen that each such station key 13 has associated with it, a light 16, which in the preferred embodiment of the invention shown herein comprises a light emitting diode LED. Each light 16 is located in the upper right corner of the corresponding key to indicate the ON/OFF status of that key. The station keys 13 are arranged in three rows 15 identified from top to bottom as ON, AUTO and OFF, respectively. In addition, each column 14 of station keys is labeled numerically, 1–16 from left to right with one such column 14 being associated with each watering station or irrigation zone.

Panel 10 also provides a number of clock function keys which are used by personnel to selectively input time control parameters such as time of day, start time, stop time, dwell time and the like. These clock function keys are provided in two groups, namely group 18 and group 20 on panel 10. Time function keys in group 18 include the start time, stop time, dwell time and time of day keys and the time function keys in group 20 include the fast and slow key. Pressing and holding any one of the four keys in group 18 while simultaneously pressing the fast or slow keys in group 20 advances the value of the input variable selected at either a fast or slow rate so that the user may rapidly and efficiently alter the setting of such times.

Figure 9:
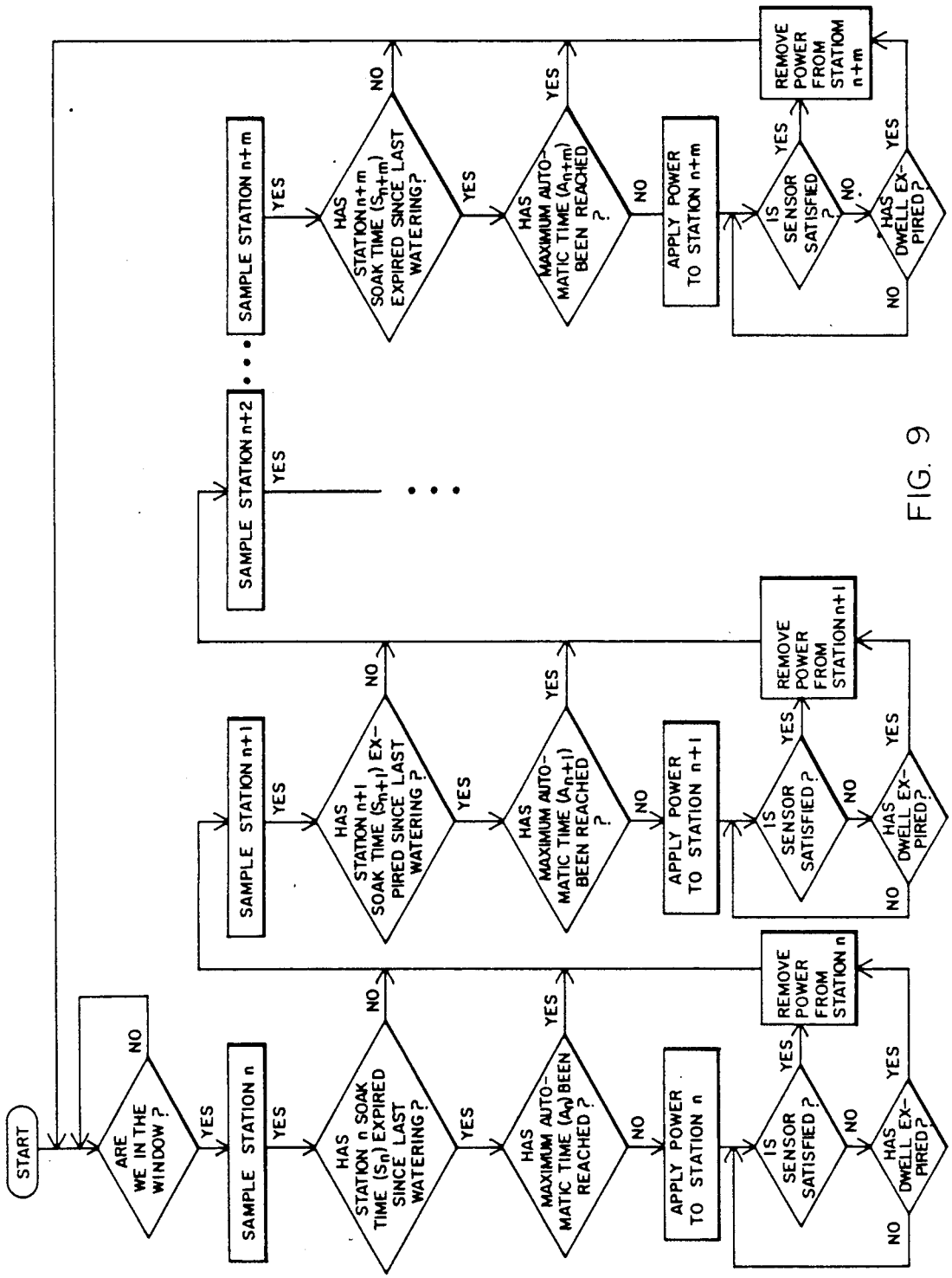
FIG. 9 is a flowchart representation of the station irrigation scanning feature of the present invention.

Panel 10 also provides a liquid crystal display 22 which is used to show a variety of alpha-numeric messages such as time values and error messages. The display 22 is comprised of four seven-segment standard display characters, two on each side of a colon 23 as well as a dot display 24 beneath the colon which designates AM or PM during time function displays. The start time key of group 18 on panel 10 controls the start time for an automatic irrigation cycle. Similarly, the stop time allows the user to set the finishing or completion time for the automatic irrigation cycle. The dwell time corresponds to the dwell time for each station, that is, the station irrigation time in minutes allowed each time the apparatus scans a particular station. The start time, stop time and dwell time dictate the irrigation parameters for the automatic mode of operation. In the automatic mode, the input variables are considered along with the real-time moisture level data from sensors for determining the timing of and amounts of water to be applied at each station. Stations are placed into the automatic mode when the user presses AUTO station keys, that is the middle row 15 of keypad 12. Specifically, any one or more of the sixteen irrigation stations corresponding to the keys 13 on the front panel 10 may be placed into the automatic mode by pressing the corresponding number in the middle row of keypad 12. During the period of time between the start time and the stop time, which is referred to herein as the watering window or the automatic irrigation cycle, the apparatus of the present invention scans the stations searching for one which has not been watered for a preselected period of time. That preselected period of non-watering time is called soak time. When such a station is found, it is watered for its dwell time or until the moisture sensor indicates that the sensed level of moisture has reached a preselected level. On subsequent scans, the station is watered in dwell time increments until either a maximum amount of automatic watering time has been accumulated at each station or until the watering window ends for all stations, assuming that the sensor for any particular station or stations has not been previously satisfied. The automatic scanning mode of operation of the present invention may be understood best by reference to FIG. 9 which is a flowchart illustrating the manner in which stations are scanned by the apparatus herein disclosed.

The present invention also provides a second automatic mode which is called automatic system override mode or ASO. During this mode, the system of the present invention scans the stations as it does in the automatic mode, but the input from the sensors is ignored. Water is applied subject to the programmed limits independent of the sensors. This may be desireable for example, after the application of fertilizer. To enter the automatic system override mode, the user presses and holds the slow button and then the desired station numbers. The present invention also permits the application of watering manually, at any time, irrespective of whether the actual time is in or outside the watering window, by simply pressing "ON" station keys. Up to four stations can be manually operated at the same time in the ON mode. Irrigation occurs for a preselected maximum period of time, called the maximum override time, after which the system for those stations returns to the "AUTO" mode. Thus the top row of keys 13 of keypad 12 denoted by the nomenclature "ON" allows the user to manually turn on any of the irrigation stations, up to a maximum of four simultaneously. The bottom row of keys 13 designated by the nomenclature "OFF" allows the user to simply press a station key in order to deactivate that watering station. The station will stay off until a positive action is taken to activate it again, such as pressing the corresponding "ON" key, "AUTO" key or pressing SLOW and a station's ON or AUTO key in order to enter the automatic system override mode for that station as previously described. The LED lights associated with the respective keys not only indicate the on/off condition of each such key, but also provide a means for displaying error messages at the station level as will be described hereinafter in more detail.

Figure 2:
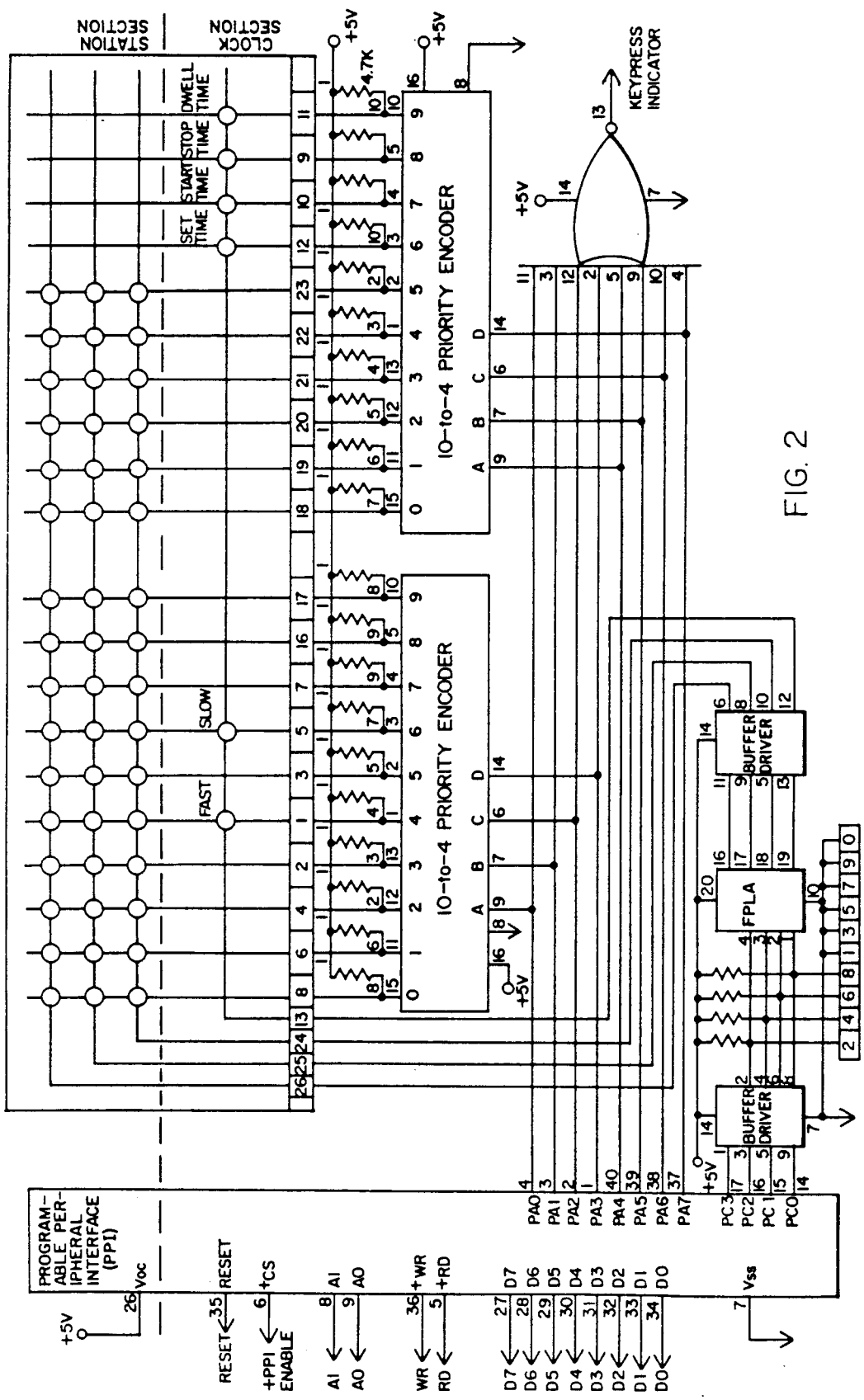
FIG. 2 is a schematic representation of the keyboard portion of the present invention.
Figures 3A, 3B:
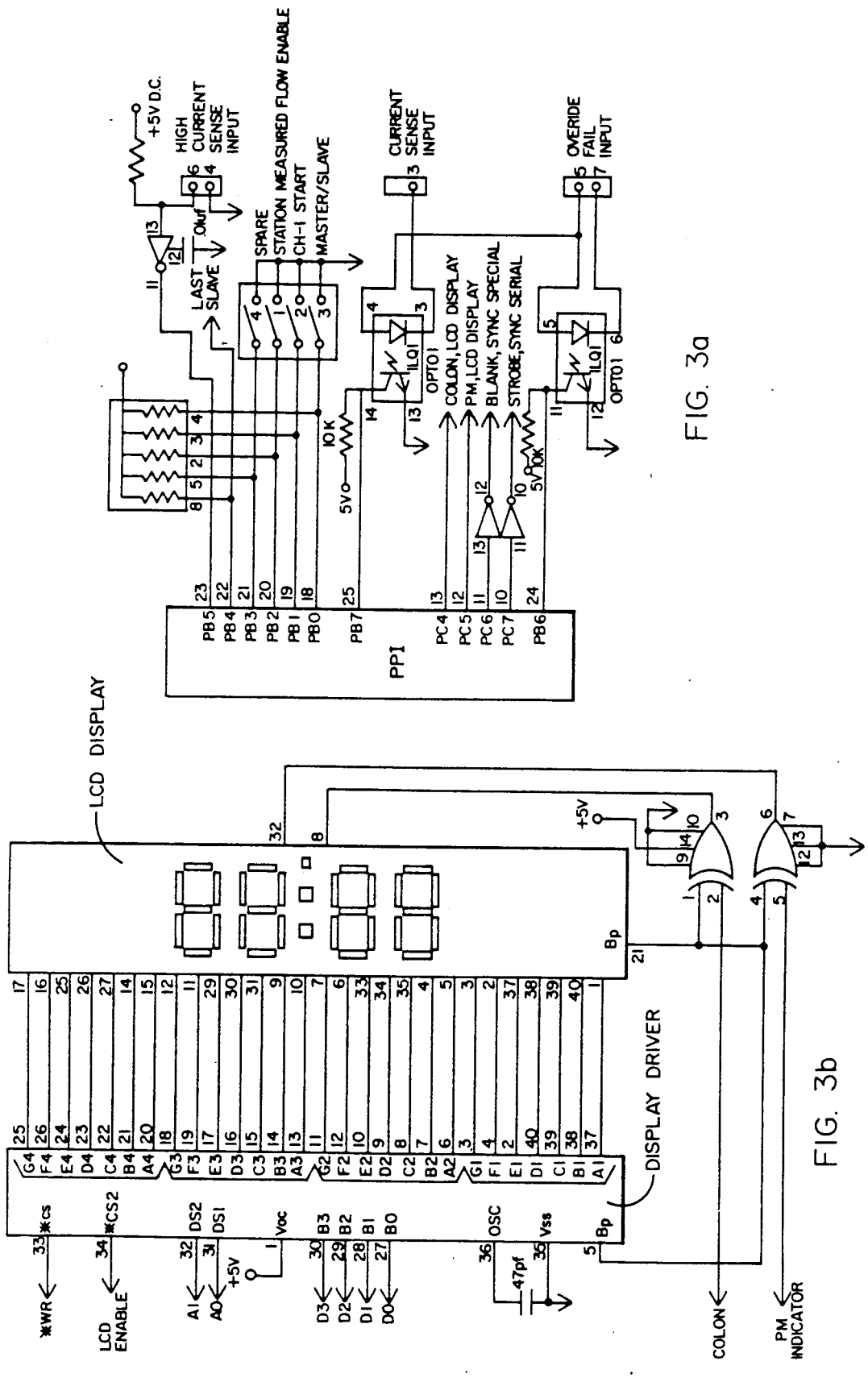
FIG. 3a and 3b is a schematic representation of the display portion of the present invention.

Referring now to FIG. 2, it will be seen that the keys of panel 10 of FIG. 1 are connected in a keyboard matrix pattern, the column lines of which are connected through pull-up resistors to a pair of 10-4 priority encoders such as a Model 40147 B, 10-line-to-4-line priority encoder. The encoded outputs appear on terminals A–D, respectively, of each encoder, and are connected to a programmable peripheral interface (PPI) such as a model 82C55. The row lines of the keyboard matrix are also connected to the programmable peripheral interface through a field programmable logic array such as a model 82S153 which provides a method for sequentially scanning the rows of the keyboard panel in order to differentiate among the various keys connected to each column line. A NOR gate is connected to the output of the 10-4 priority encoders to generate a signal indicating keypress whenever any of the keys is depressed. As seen in FIG. 3a, a portion of the programmable peripheral interface (PPI), namely the PB input lines are used to receive a number of special signals including high current sense input, station measured flow enable and current sense input, the function and purpose of which will be explained hereinafter. In addition, the programmable peripheral interface (PPI) is used to control certain features of the display including the colon and AM/PM dot on the LCD display. FIG. 3b illustrates the LCD display and display driver interface. The display driver may be an Intersil Model ICL 7211 AM LCD display driver, with a pair of EXCLUSIVE OR gates controlling the colon and PM indicator portions of the display in conjunction with the PC 4 and 5 outputs of the programmable peripheral interface of FIG. 3a.

Figure 4:
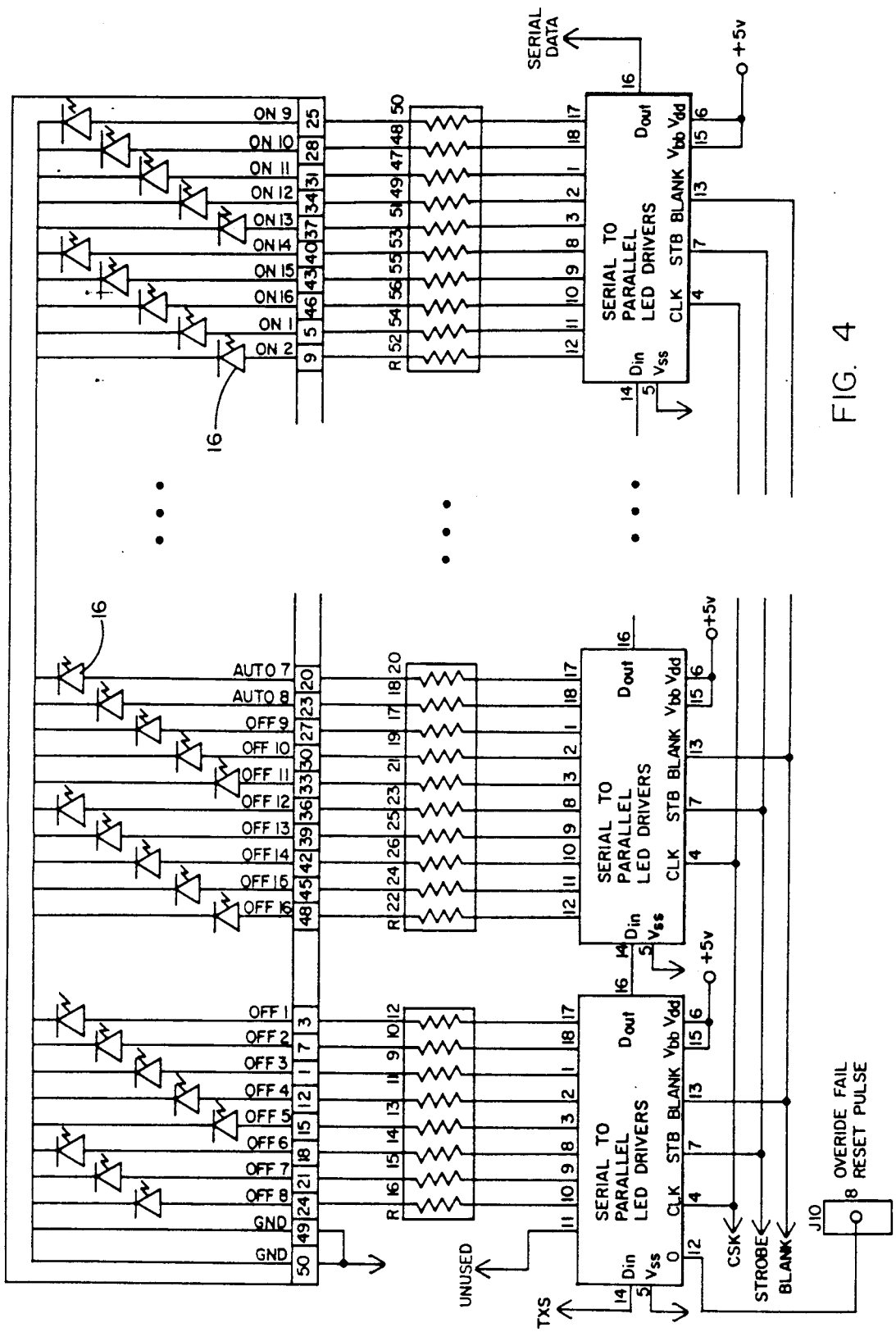
FIG. 4 is a schematic representation of the LED indicator portion of the present invention.

As seen in FIG. 4, LED's 16, of which there are 48 in number in the preferred embodiment of the invention shown in FIG. 1, are driven by a plurality of serial-to-parallel LED drivers and a corresponding plurality of resistor networks. Each of these LED drivers may for example, be a Model UCN-5810A latch driver. The serial data is applied to the LED drivers by a microprocessor at its serial data output terminal (TXS) seen in FIG. 6a. The CKS clock signal is also applied from the microprocessor while the Strobe and Blank signals are derived from the programmed peripheral interface at terminals PC 6 and PC 7 as shown in FIG. 3a. In the event that the present invention is used for irrigation control where there are more than sixteen stations as previously noted, up to two additional LED/keyboard control circuit boards may be serially connected to a controller of the present invention as extended keyboard control units. Consequently, the rightmost serial-to-parallel LED driver of FIG. 4 is shown with a serial data output line which may be used to connect to the additional serial-to-parallel LED drivers of the LED's of the panels of such additional extended keyboard control units. Such extended keyboard control units would also provide keyboard sequential scanning circuitry and connection of the columns to the main keyboard 10-4 priority encoders' inputs. The circuitry would replicate that of FIGS. 4 and 5, and a portion of that of FIG. 2.

Figure 5:
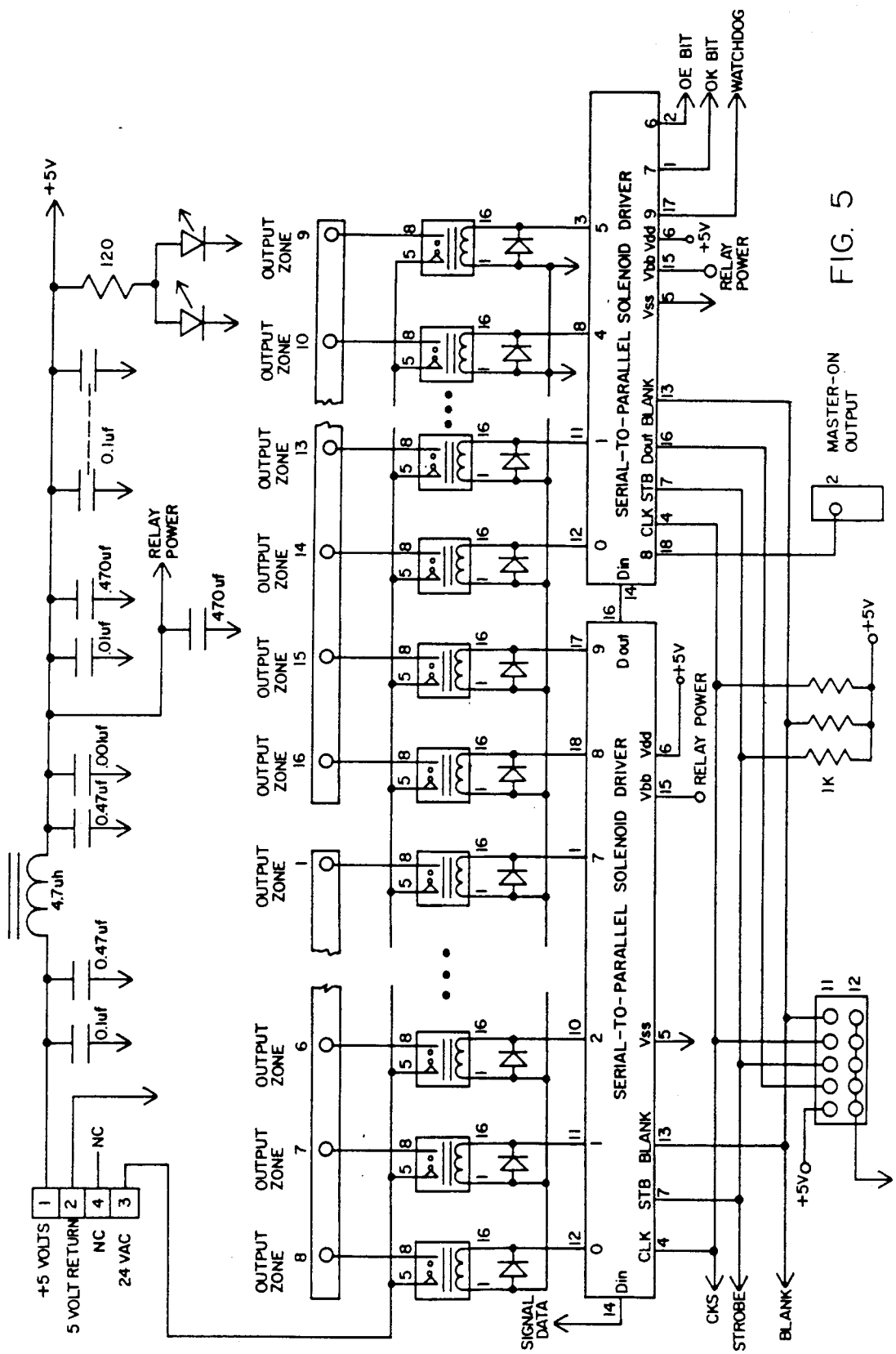
FIG. 5 is a schematic representation of the relay control portion of the present invention.

FIG. 5 illustrates the solenoid control portion of the present invention, that is, the portion of the controller of the invention which interfaces with a plurality of relays which, when activated, apply solenoid power to the respective irrigation station valve solenoids to control the flow of irrigation water at each such station. As seen in FIG. 5, the signal control to the relays is similar to the signal flow to the LED's of FIG. 4. More specifically, a pair of serial to parallel drivers, such as model UCN5810A drivers are used to convert serial data into parallel data to be applied to the relays in accordance with the Clock, Strobe and Blank signals. The logic level of the output signals of the serial-to-parallel drivers applied to the relays determines whether or not solenoid power, at 24 volts AC, is applied to the respective output zones or watering stations connected to the controller of the present invention. In addition, one of the parallel output lines of the rightmost serial-to-parallel drivers of FIG. 5 is used to control the solenoid for the valve controller for the main flow of water into the irrigation system to which the present invention is connected. This rightmost serial-to-parallel driver of FIG. 5 also provides a data output line which may be connected to slave controllers for operation of the present system in conjunction with a larger plurality of irrigation stations as described above in conjunction with the LED output signals.

Figure 6A:
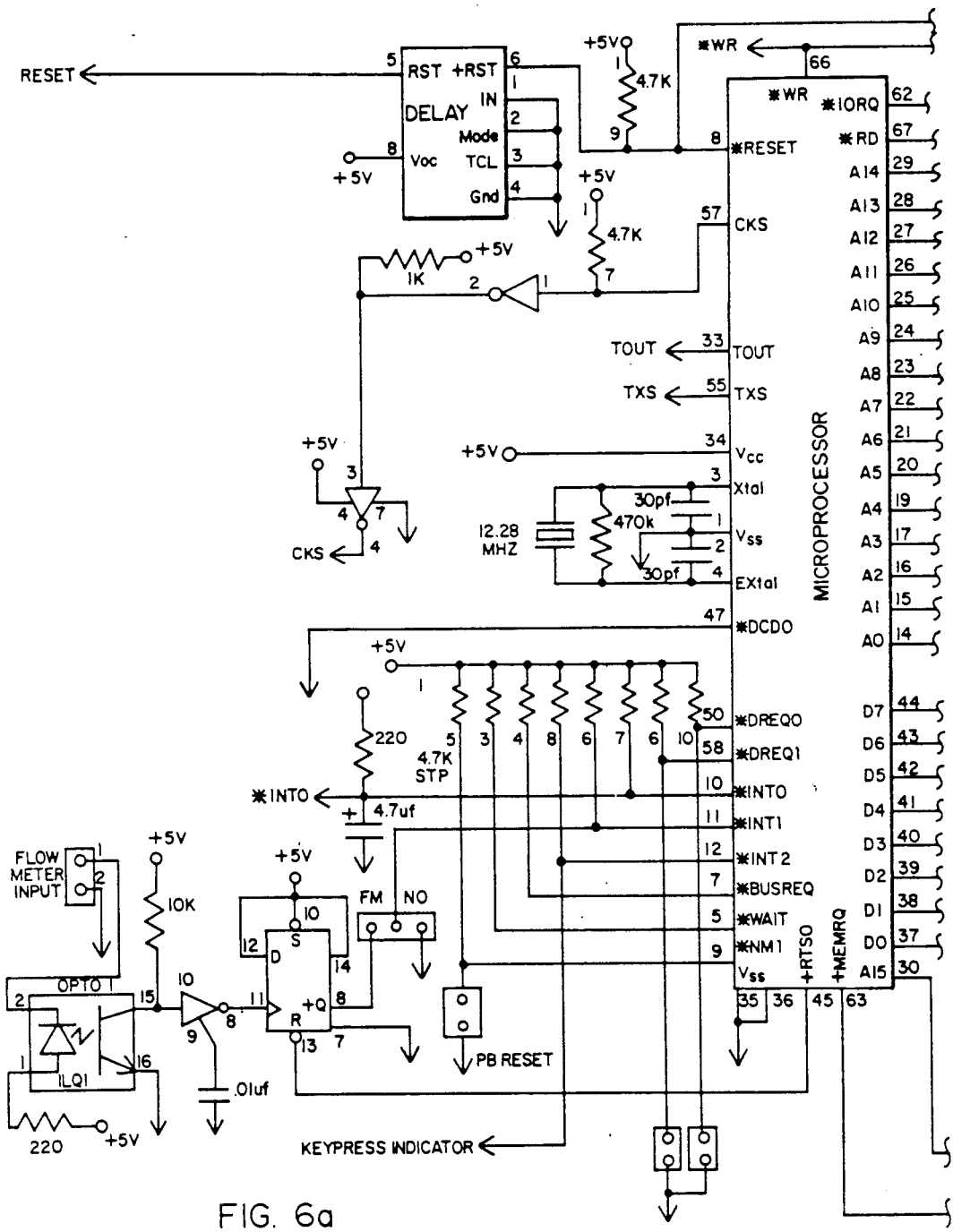
FIG. 6a and 6b, is a schematic representation of the microprocessor and memory portion of the present invention.
Figure 6B:
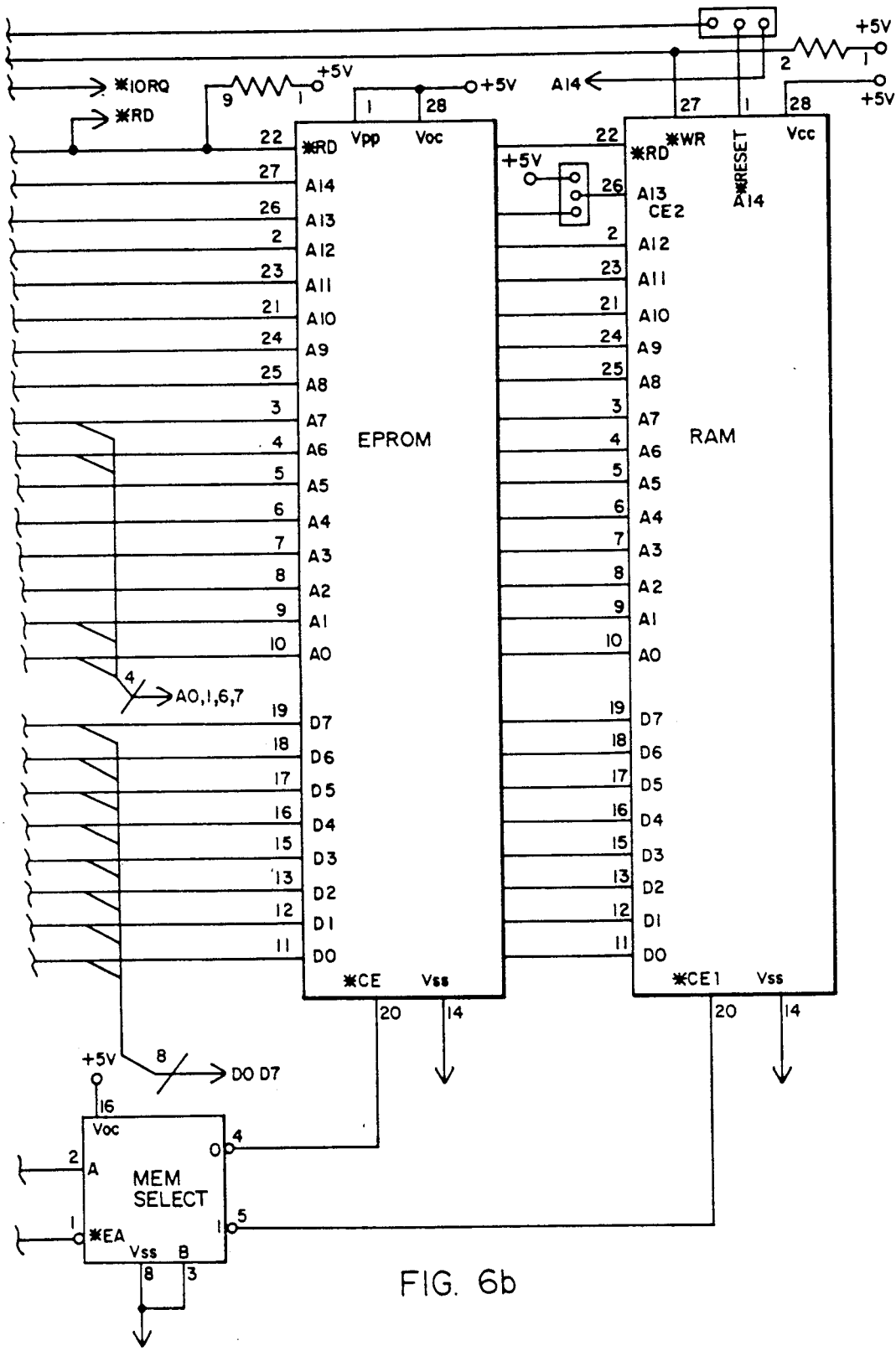

The microprocessor and memory devices of the present invention are shown in FIG. 6, comprising FIG. 6a and 6b. The microprocessor or CPU of the present invention may, by way of example, be a Hitachi model HD64B180ROCP 6 MHz. 8-bit CMOS CPU. The microprocessor of the present invention operates in conjunction with, for example, a Hitachi model HN27C256 256K 8-bit erasable and programmable ROM or read only memory device which is used to store the program or software which controls the operation of the present invention. The microprocessor of the present invention is also designed to operate in conjunction with a random access memory such as a Toshiba model PC5564PL-15 8k-by-8 CMOS static RAM. This random access memory is used to gather and save data used during the operation of the program of the present invention, including various bookkeeping data which may be used by the operating personnel to assess the status of the irrigation controller operation. This random access memory is provided with battery backup to retain program and statistical information during power outages by a circuit such as the Dallas Semiconductor DS1216C which also provides a Real Time Clock function with battery backup.

Figure 7:
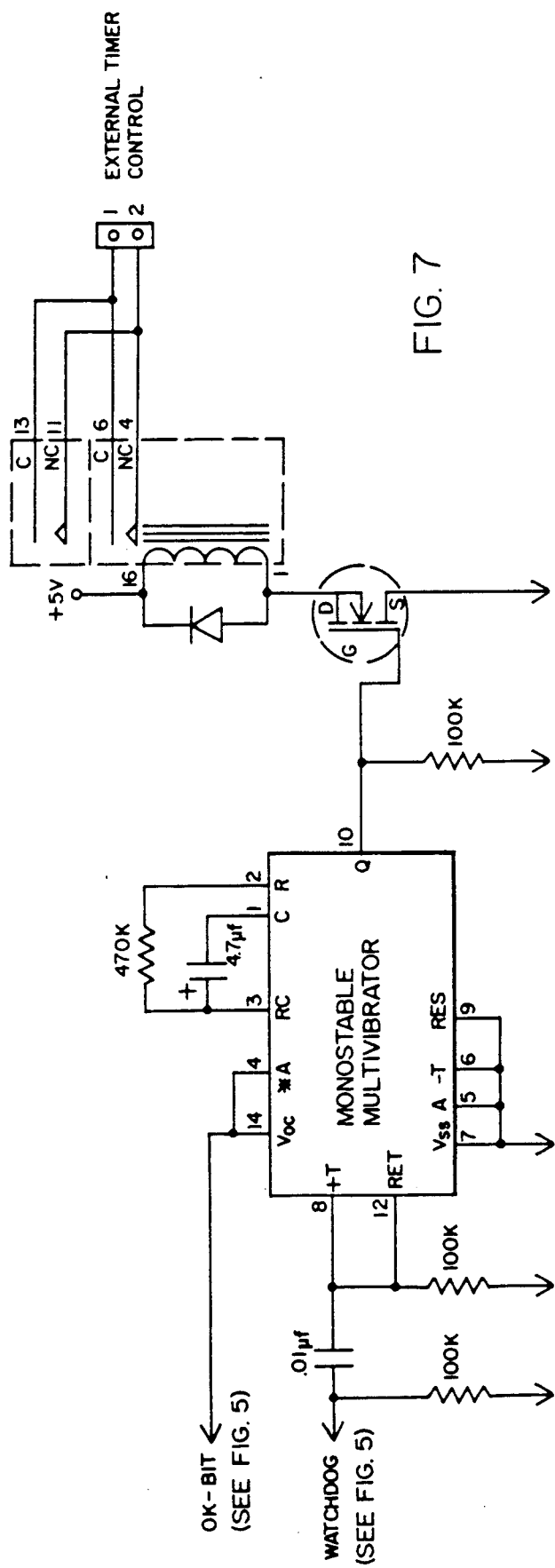
FIG. 7 is a schematic representation of a back-up system enable circuit of the present invention.

The present invention is designed to be used in conjunction with and not instead of existing timer controls previously in place in those irrigation systems to which the present invention is added where a prior timer control already exists. In this regard, FIG. 7 provides what is referred to as a "watch-dog" circuit which utilizes a monostable multivibrator, MOSFET and a relay connected to the external timer control. This circuit reacts to the colon signals by retriggering the monostable multivibrator and turning on the MOSFET which, in turn, operates the relay to open the contacts and deactivate the external timer. If two sequential colon signals are missed the monostable multivibrator deactivates and turns off the MOSFET which in turn allows the relay to relax and activates the external timer control for controlling the irrigation system in accordance with the previously installed timer control which thus acts as a back-up system to the controller of the present invention.

Figure 8:
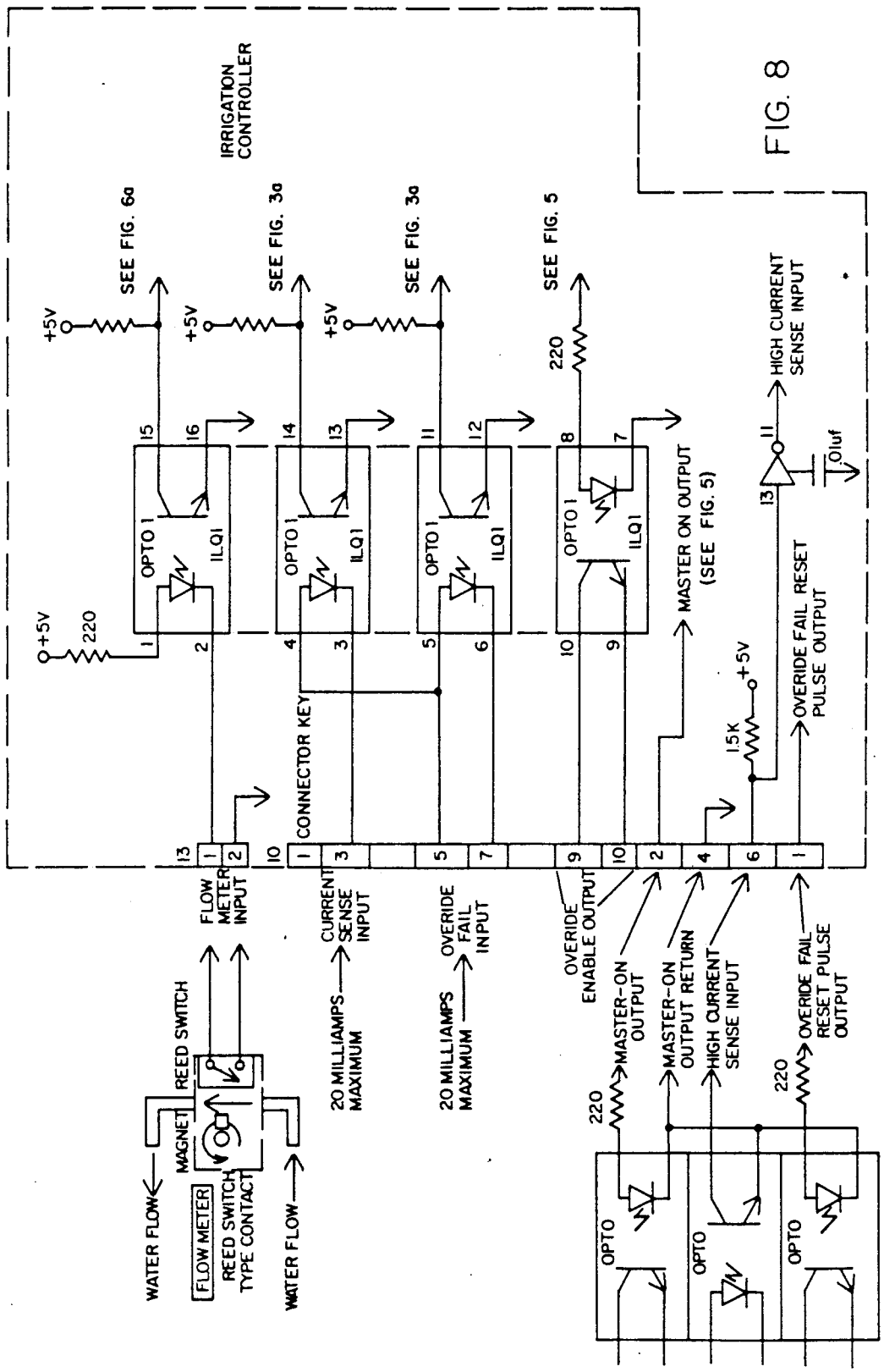
FIG. 8 is a schematic representation of an interface circuit of the present invention.

As seen in FIG. 8, the controller apparatus of the present invention utilizes a plurality of optical isolators for interface with external devices which the apparatus controls or to which it responds. By way of example, as shown in FIG. 8, such optical isolators are used for interface with a flow meter, current sensors and master valve control.

Operation

Because the controller apparatus of the present invention is a scanning controller, irrigation can occur numerous times per station within the automatic irrigation cycle. The station dwell time is the number of minutes of irrigation allowed each scan. As a general rule, more frequent applications of smaller volumes of water are desireable in order to prevent loss due to run-off. When power is first applied to the controller apparatus of the present invention, the LCD clock display flashes 88:88 until the time of day key is depressed. The display will next show the number of minutes that power has been off to the controller. This indication appears any time that the power has been interrupted for at least one minute. If the power has been off for more than sixteen hours and twenty-five minutes, the number of minutes off displayed will be 999. Pressing the time of day key will clear this and reset the counter to zero. In addition to the power outage indication, the LCD display may also indicate controller malfunctions or sensor malfunctions in the form of HE:LP or LL:LL messages, respectively.

The controller of the present invention is also programmed to display station errors which generally indicate conditions where field corrective action is required. In addition to an error message displayed in the LCD readout, station errors are indicated by flashing LED's on the appropriate station keys. One such station error display consists of the letters EP: and then the numbers of the station. This indicates that an excessive electrical current is being drawn on the numbered station, due for example, to a shorted solenoid or a current draw in excess of preset limits. Other error messages the present invention is capable of displaying include excessive system leakage, excessive water flow on a particular station, no water flow while active on a particular station. All of these error messages are assigned a preselected priority and the highest priority error code is indicated on the clock LCD display. If two stations have the same error priority, the lower numbered station is displayed. The System Excessive Flow Error is the highest priority error that can be displayed and is dependent upon detection of an error in the flow rate which is greater than the leakage rate when no stations are watering or when the sum of the station rates for stations that are watering has been exceeded. If the flow rate exceeds the maximum for four consecutive stations, the System Excess Flow Error is displayed, the master valve is turned off automatically and no watering is allowed until the error is reset.

If any station errors are present when the controller is first powered up, they can be cleared by pressing the "OFF" key for that particular station. Any stations having flashing indicator lights will have an error display which will show on the clock display when all higher priority errors are cleared.

The lights on the station row and column keypad 12, namely columns 14 and rows 15 of keypad 12 of FIG. 1, show the selections for the system. The "OFF", "AUTO" and "ON" keys and lights are direct real time indications of the stations status. Stations showing "ON" have power applied to their solenoid valves. Stations showing "AUTO" will be selected for watering during the next automatic cycle time or watering window. If only the "OFF" light is lighted, the station will not be selected for automatic watering. If "OFF" is lighted at the same time "AUTO" or "ON" is lighted for a particular station during the watering window, that station will be watered in the Automatic Sensor Override Mode, that is, with no reference to the moisture sensing system. This mode can be turned on or off by pressing and holding the slow key when pressing a column key for the desired station. Automatic Sensor Override can also be turned off by pressing the "OFF" key which turns off station power and prevents automatic operation of the station. Automatic watering start and stop times may be set up by personnel by pressing and holding the start time or stop time keys and simultaneously pressing the fast or slow keys. The times are displayed on the clock display. By pressing and holding the dwell key for each station, the minutes that particular station will be powered up for each automatic watering pass during the window can be set up. To choose another station, one merely presses a column key for the station while holding down the dwell key. Pressing a key in the "ON" row puts the station in "ON" or override mode. While in this mode, the moisture sensing circuitry is ignored and the valves connected to this station are energized. A maximum of four stations may be placed in the "ON" state at any one time. The time of turn-on is recorded and a minute count is started. When the number of minutes "ON" equals a preset value, the station is dropped from "ON" to the automatic state to prevent overwatering due to an operator forgetting to turn off a station.

There ar three modes of automatic watering available with the present invention, namely, automatic watering with sensors active, Automatic Sensor Override which sequences normally, but ignores the sensors for stations in this mode and Station Measured Flow processing which is available only in systems having a flow meter. When a station is energized in "AUTO", the "ON" light is turned on automatically during watering to indicate a station watering automatically. Only one station at a time is watered in the automatic mode. During the period of time between start time and stop time, which is referred to herein as the watering window or window, the system cycles through the stations in sequence, looking for a station that has not been watered for a preset soak time, which is a period of non-watering during the window and during which previously distributed water may be given the opportunity to soak in. When such a station is found in the Automatic mode or in the Automatic Sensor Override mode, the valve for that station is opened and allowed to water for its dwell time. The time of starting and stopping the station is recorded, the number of minutes the station is actively watering is added to the running total for that station and if a flow meter is used, the number of flow ticks accounts is added to the running total and the maximum observed flow rate is recorded. At the beginning of the window, a predefined number of minutes is loaded into the maximum allowed watering counter for each station. The station's count is decreased by one each minute that it is watering. If the count reaches zero, that station is not watered for the rest of the window.

The Automatic Sensor Override mode is indicated by the "OFF" light illuminated at the same time as the "ON" or "AUTO" light for a particular station or stations. That mode is activated by holding the slow time setting key and pressing a column key for the desired station. The mode is alternately activated and deactivated each time the combination is pressed. This mode may also be cleared by pressing the "OFF" key. At the end of the watering window, all stations in the automatic Sensor Override mode are cleared to the normal "AUTO" mode. When an Automatic Sensor Override station is watering automatically, all three lights "ON", "AUTO" and "OFF" are illuminated simultaneously.

If the present invention is used with a flow meter, system flow values are measured during the first pass of the window after the System Measured Flow mode is set. The process starts by energizing the master valve output and measuring the flow rate until it stabilizes. Once stable flow is achieved, one minute is allotted to measure and record the system leakage rate, then the following procedure is performed for each station: Each station's valve is energized with override active to ensure the valves will open; once flow stabilization is achieved, the time to stabilization is recorded, the leakage rate is subtracted from the rate of flow and the result is recorded as the maximum allowed flow; then the valve state for each station is turned "OFF" and the time to stabilization at the leakage rate is recorded as the turn "OFF" time; when all stations have been measured, the leakage rate is adjusted up by the error percentage and recorded as the maximum allowed leakage rate.

CPU Initialization

When the controller is initially activated, the contents of the top stack are saved for error processing in the event that the reset was due to an instruction opcode trap. Following the save, the stack pointer is initialized and the powerup counter is incremented and the time of "power on" is recorded. The CPU initialization routine is called in which the CPU internal I/O addresses are set to the block starting at 80$h$ and then the 82C55 Parallel Peripheral Interface (PPI) is initialized with the Serial String blanking bit set. Next, the interrupt and DMA registers are loaded and the ASCI stations are initialized. Then the trap flag is checked and interrupt vectors are initialized. A flow meter check then sets or resets the METER present flag. The CSI is initialized and the serial string is zeroed which puts all valves and LEDs in the OFF state. There is then a Cyclic Redundancy Check (CRC) calculation on the program EPROM. If the CRC passes, the two PRT stations are initialized followed by keyboard interrupt initialization. In the final stage of initialization, the read/write memory (RAM) check is performed followed by transferring the memory setting of valves and LEDs to the serial string, hence to those devices. Water sensing circuitry is then initialized and the clock reading is then displayed on the LCD display. Then the interrupt-driven communications are initialized.

Cyclic Redundancy Check

The first memory check is a CRC calculation of the EPROM. If this fails, "HELP" is printed on the LCD display and, if connected, the terminal will display:

CRC=XXXX–BAD

XXXX is the calculated CRC value. If the EPROM passes, "OK" is printed in place of "BAD", the IGNORE message is not sent to the terminal and the LCD display is left in its previous state. Entering the word "IGNORE" at the terminal will allow processing to continue if the CRC was bad.

The CRC algorithm uses the CRC-16 polynomial and compares the result with a value stored in EPROM locations 0060H and 0061H. The CRC value in the source file is that of an unprogrammed memory cell. This allows adding a record to the start of the hex file with the values displayed in the CRC test targeted for locations 0060H and 0061H. Similarly, those cells of a PROM can be reprogrammed allowing the reprogrammed device to become the master for use in a gang programmer. Note that the value displayed must be stored in Intel format, that is low byte at 0060H and high byte at 0061H.

Read/Write Memory Check

The second memory check consists of checking high memory for a bit pattern. If this test fails the LCD will display "88:88" flashing alternately with a blank display and the terminal will display:

RAM Check Bad

Enter IGNORE to continue

If the RAM check passes, no error message is sent to the terminal and the LCD displays the time as read from the clock.

If the RAM check fails, either setting the clock from the keyboard or entering the word IGNORE from the terminal will allow processing to continue. However, the two actions differ in that if the clock is set a first start up is assumed so memory is zeroed; counter, timers and output flags are loaded with their initial values taken from the default area of low memory and the clock is initialized. Entering IGNORE from the terminal will update the LCD with the current clock reading and initialize all but the clock and memory, allowing a technician to examine the memory of a system under test.

Clocked Serial I/O Port (CSI)

The CSI is a high speed synchronous serial I/O port. It operates in a half duplex mode only, but it has the capability of outputting a bit clock at the selected baud rate. This device is used to clock out data from a string in memory representing the keyboard LEDs and the solenoid drivers for the watering circuits to the UCN 5810A drivers which control those LEDs and solenoids. The software to load these bytes is interrupt driven by a transmit End Flag (EF). The CSI transmit output drives the serial data input of the first latch. The rest of the latches in the string are daisy chained serial out to serial in. The clock output drives the clock input on all the latches. When the last bit of the serial byte is output, the EF flag goes TRUE causing the interrupt to occur.

The interrupt service routine can output the strobe for the last bit of the last byte in the string in as little as 90 CPU clock cycles. The strobe lasts 16 clock cycles yielding a minimum total time from interrupt to latched data of 106 clock cycles. The rising edge of the CSI bit clock latches the current state of the data string into temporary holding. When the strobe occurs, the data is transferred into the output registers. Since the CSI bit clock rising edge occurs in the middle of the bit, the CSI clock rate must be higher than the CPU clock divided by 212. Accordingly, the CSI clock divide ratio bits (SS2, SS1, and SS0) of the CSI Control Register (CNTR) must be a value less than 4. The maximum baud rate of 307200 baud was selected because the latches can easily handle data at this rate and it improves system response.

The CSI start routine moves data from the LED and solenoid status bytes into an output string. At this time a check is made of the colon state and, if it is off, a further check is made to turn off all LEDs of stations in error status. Since there are more latch outputs than LEDs and solenoids, this string is shifted right two bits to align the data with the junction to the LEDs and solenoids. The first byte of this string is loaded into the transmitter. The transmitter and its interrupt are enabled which starts the output sequence. When the last bit of the string and strobe are sent, the transmitter and interrupt are disabled and the CSTERM byte is reset to allow other routines to detect CSI termination.

The shifting of the data string produces two outputs at the LED end of the string and four outputs at the solenoid end of the string available for additional functions. One of the tail outputs is used as the Override Enable output to the moisture sensing circuitry. Another of the outputs (OK-BIT) is used to enable the watchdog circuitry (See FIG. 7). A third output (WATCHDOG) is toggled once a second as an indicator to the watchdog circuitry that the system is apparently operating correctly. The fourth output (MASTER-ON) is used as a master valve enable output and is energized any time a valve is energized and/or for the duration of the window. One bit in the pre-LED byte is used as an override fail reset output.

Two additional routines are used. One such routine is used to initialize the string with data taken from the default area of the PROM and the other is used to disable all outputs by sending ten bytes of zeroes in a polled mode.

Asynchronous Serial Communication Interface

The ASCI is initially used in polled mode at 1200 baud. At the termination of the initialization routine, the ASCI is put in interrupt driven receive, polled transmit mode. Station 0 is used to communicate to the terminal/host or to a device of higher priority while station 1 is used to communicate to the next controller slave when connected. The initialization code loads values taken from the default area of the PROM. Routines are provided to initialize the port, return with input, return after output, input or output depending on the byte in register E, return input or output status, enable or disable RTS (Station 0 only), and return line status (CTS*). The CTS inputs operate such that the transmitter is disabled in hardware if CTS* is in the high (FALSE) state.

The routines can be most easily accessed by loading register E with data to be sent, if appropriate, and loading register C with a function number 0 through 17. Even numbers are directed to port 0 and odd numbers to port 1.

Programmable Reload Timer (PRT)

The initialization code stops both counters then sets a reload value for counter 0 that yields a 12.5 millisecond interrupt interval. PRT 1 is set to toggle the TOUT output at two kiloHertz for a beeper. PRT 1 is left in the stop mode while PRT 0 is started with its interrupt enabled.

Once every 12.5 milliseconds, the PRT 0 interrupt is serviced. The change seconds byte is zeroed after the service routine is called. If the change seconds byte is non zero on return the CSI start routine is called to toggle the OK-BIT, however, the LEDs, and solenoid drivers are updated at this time also.

The PRT 0 service routine first updates the beep counter and starts/stops the beeper depending on the nonzero/zero state of that counter. The beeper is started by a call to the beep routine which enables the PRT1 output to TOUT and starts the downcounter. Then the beep counter is loaded with the beep duration count. When the count reaches zero the counter is stopped and the TOUT broken.

Next the one byte down counters are decremented. When the down counters reach zero they are left undisturbed. The HIGH CURRENT sense input is tested and, if found active, its counter is allowed to count down. If the counter has reached zero the last station to be turned on is turned off and reported as having an EP, high current, error. If the station flagged as last on is not on, a search for any station on is commenced and the next station found is turned off. When a station is found a 1 second timeout is commenced to allow the turnoff current to settle before turing off another station. If no high current error is found or if a station was just turned off, the hi current is reloaded with its starting count.

Next a check is made for sensors offline status and, if found, the condition is reported as an LLLL error.

After the above error processing, the up counter is incremented and a check made for the passage of a 100 millisecond increment. If the test fails, the routine is exited. Otherwise the following actions take place.

A system clock is read and a check is made for a change of the seconds since the last reading. If the seconds have not changed, a check is made for auto water in process, offline status and current sense TRUE. If the conditions are met, control passes to the station processing routines, otherwise the routine is exited. If the seconds have changed, the change seconds byte is made non zero and the LCD colon is toggled on or off. If the colon is off, the error display is updated. The next "once a second" event is to decrement the flow meter seconds down counter if it is non-zero and no stations are active. The final "once a second" event is to update the flow rates, errors, maximum and minimum value storage locations, if the seconds are evenly divisible by the number of flow samples per second.

The "once a minute" events are then processed. The dwell counters are decremented as necessary, the display is updated if the no update flag is not set, and the current day and time is compared with the day of the week settings and window opening and closing times to determine the status of the window active flag.

Smart Watch Routines (SMTWAT)

A Dallas Semiconductor, Model DS1216 "Smart Watch", incorporating a real time clock and backup battery is used in the controller as a system clock. The clock must be accessed by shifting a 64-bit pattern into data bit 0 of any RAM location(s) within the appropriate block with no other intervening access to that block of memory. Following the pattern, eight one byte registers of the clock may be read or written into through bit 0.

The registers are accessed from low order bit to high order bit. The clock registers are in BCD format as follows:

0 = 0.1 sec.: 0.01 sec.
1 = 10 sec.: seconds
2 = 10 min.: minutes
3 = 12/24 0 A/P /10 HR: hours
4 = 0 0 osc reset: 0 wk day
5 = 0 0 10 date: date
6 = 0 0 0 10 month: month
7 = 10 year: year The hex values for the matching pattern are:

C5, 3A, A3, 5C, C5, 3A, A3, 5C

The SW routines presume a small system (i.e. one with only one RAM socketed in the Smart Watch) and as such the routines make no extraneous accesses to RAM, such as pushes and pops or calls and returns, once the clock read or write sequence has started.

The clock setting routine disables interrupts & DMA to prevent any interruptions, performs an access match up, and sends the values in the time setting bytes to the clock. Fractions of seconds are always written with 0.01.

The clock read routine disables interrupts & DMA, performs an access match up, reads clock registers, and updates the time keeping bytes. Fractions of seconds are discarded.

Liquid Crystal Display Routines (LCD)

The LCD is driven by an Intersil ICM7211AM display driver. Access is obtained via CPU port addresses 6Ch through 6Fh with one BCD nibble per port. The addresses correspond low to high address with left to right digit. Two primary routines are provided. One converts and displays 24 hour time in 12 hour format with an AM/PM indicator. The other displays the low nibble of four bytes sent to the routine.

Flow Meter Tick Routines (WATFLO)

The flow meter tick (FMT) is serviced by interrupt vector one. Its primary function is to record the number of times the flow meter ticks in storage dedicated to each station. The station storage is divided into three categories, total flow, override activity, and automatic activity. All ticks are counted in the total counter and in the rate sample counter (FLOREP). The total flow is subdivided into flow while stations are active either automatically or in override (ON), and flow while no stations are active. Flow in inactive mode is checked for time-out since the last station was turned off. If the timeout has finished, flow ticks are tallied in the inactive flow counter. The time-out allows valves with a slow response time to close before their ticks are recorded as an error. This value can be adjusted in the limit section of the program or with the "C" command.

The override is tested to determine if ticks should be tallied in automatic or override counters, then each station is tested for an ON state and the appropriate counter incremented. During times when the off line input is active, counts are also tallied in the offline counter.

The FMT input is latched on its rising edge. The RTSO output, when taken low, will reset the latch, and taking the RTSO output high will rearm the latch for the next tick.

A meter/no meter jumper is provided which is tested during CPU initialization by attempting a latch reset and checking for a flow tick change in the flow total counter. If the jumper is in the meter position, the reset will disable the interrupt until the reset line is released. If the jumper is in the no meter position, the reset pulse is tuned back to the interrupt input and a false flow tick will occur.

Keyboard Interrupt Routines (WATKEY)

The keyboard interrupt is serviced by interrupt vector 2. As previously explained in conjunction with FIG. 2, the keyboard is decoded by two 1-of-10 priority encoders. With all inputs high the output equals zero. With one or more inputs low, the output is the ones complement of the highest numbered line (0-9) at a low level on each encoder. Any key press while the keyboard and interrupt 2 are armed, causes an interrupt 2. On entry interrupt 2 is disabled and held in that state until exit from the service routine. This allows use of other interrupts, such as the PRT counter for keyboard debounce, and ensures that flow counting and clock service will be handled in a timely manner.

The keyboard routines divide the task into two sections depending on a clock row detect or a station row detect. All rows are disabled, then each row is successively enabled and the input checked. The clock row is decoded on a nibble basis to allow the FAST or SLOW keys to be pressed in combination with one of the clock setting keys such as START TIME. The station keys are decoded as to row 0-2 and the column is decoded to a one byte value in the range 0-15. Fifty milliseconds are allowed to decode the same key value on two successive scans of the keyboard. If a key is decoded, its value is placed in a memory register and the routine exits through the key release routine to either the clock setting routines or the station setting routines depending on the type of key scanned. If no key is decoded, a value of −1 is returned and loaded in the memory register. If an extended keyboard is present, the keyboard scanning routines test for the presence of the keyboards and scan extended keyboards as found.

Upon detecting a valid key, the beeper is activated as long as the operator continues to hold the key down. The exit routine waits for 25 milliseconds after first detecting key release before transferring control to the next step. Upon exit all rows of the keyboard are left in the active state, and the keyboard interrupt is reenabled.

Clock Setting Routines (CLOCK)

During clock setting, the LCD update is inhibited by the no update flag. The clock setting routines separate the key column into high and low nibble. The low nibble determines the function, START, STOP, DWELL, or TIME, while the high nibble determines fast or slow. The clock key scan routines are called once each loop through the clock routines. If the dwell key is being held, the station scan routines are called as well.

If only a function key is depressed, the current value for that function will be displayed. Pressing a FAST/SLOW key as well will continuously increment that function value until the speed key is released. Holding the FAST key updates the count every 25 milliseconds. The SLOW key update period is 350 milliseconds.

While holding the DWELL key, the left-hand two digits of the display indicate the station number. The right hand digits indicate the dwell time in minutes for that station. Pressing a station key in any row while holding the DWELL key will change the target dwell to that of the station number pressed. That DWELL station will be the target until a new one is set.

Upon releasing a clock function key, the value displayed is loaded into the appropriate memory location for subsequent use by the program.

A special case of the function keys is pressing the TIME OF DAY key while a detected system error is present. The routine will clear the error if it is presently being displayed on the LCD display. A 0.7 second timeout is commenced at this time to prevent inadvertently resetting more than one error.

A second special case is achieved by holding the SLOW key and pressing a station key. This combination toggles the ASO setting for that station. The 0.7 second timeout is activated to prevent rapidly toggling the ASO state on and off thus precipitating difficulty in reliably setting the ASO mode.

A third special case is the FAST and station ON combination which disables the override condition but enables the relay for that station if it is legal.

Station Key Decode Routines (WATVAL)

WATVAL checks the keying value for a station row and exits if the test fails. The input, if legal, is decoded for ON, AUTO or OFF and handled accordingly. If the input is in the ON row and a station is currently active in the automatic mode, the automatic station is turned off with the turn off time recorded in its data area. Next the target station is forced into override on, provided that turning the station on will not exceed the maximum number of stations allowed on at one time and the System Excess flow error does not exist and neither the High Current nor Excess Flow exists for that station. Finally, the maximum override counter for the target station is loaded with data from the limit area of memory and the maximum flow rate for the station is added to maximum system flow value. When the override counter reaches zero, the station is placed back in the automatic state. This guards against the operator activating a station and forgetting it.

OFF and AUTO selections put the station in the selected state. If the station was ON, in override, at the time of selection, the turn-off time is recorded in the the override data area for that station. If no other stations were in override at that time, the override is turned off. If a station is in ASO or error status at the time of being turned off, the ASO mode is cleared and/or the highest priority error for that station is cleared.

A lookup table (WATTBL) is used to update the keyboard and solenoid status bytes which are transferred to the serial string by a call to the CSI start routine to reflect the new controller state.

Timing and Statistical Routines (WATTIM)

WATTIM is entered once a second and first checks for a change in the minutes. If the minute has not changed, the routine is exited. Next is a check of the override to decide whether to do override or manual processing.

Override processing consists of incrementing the minute counter in the override data area of stations in the ON condition. Also, the maximum override counter is decremented and, if the counter reaches zero, the station is turned off and the stop time is recorded. Furthermore, the flow rate maximum and minimum are updated and a check for excessive flow is made. If excessive flow is detected, the condition is recorded and the station is turned off. If no flow is detected, that condition is recorded, but the station is left to allow for self-correction of the condition.

If the window is active, a check is made for meter present and System Measured Flow active. If the conditions are met and the measuring has not already been accomplished, the measuring routines take control. If measuring is not required and this is the first pass in this window, the maximum accumulated time counter for each station is loaded with data from the limit area. This value is used to limit the maximum accumulated time a station is allowed to water automatically during each window. When this counter reaches zero for a given station, that station is not allowed to water again in automatic during the same window.

A test is then made for a station activated in automatic mode and if none is active, a search for a station legal to start is executed. If AUTO is active, a further test is made for solenoid wait (SOLWAIT) in process. The SOLWAIT is two seconds to allow stabilization of long solenoid drive lines. In any event, SOLWAIT is reset and the line is checked for solenoid current (CURSNS). If CURSNS is active, the start time is recorded for this station. If SOLWAIT was not active, and a new minute is detected, the station automatic minute counter is incremented. If the sensing devices were off line at the time of recording a minute passed, then the override fail counter is also incremented at this time. The flow rate checks are performed as described in the override section above.

The auto station search algorithm checks for a station status of automatic, and an elapsed time since last stop greater than the SWEEP time stored in the limit data area. If the tests are passed, SOLWAIT is set. If ASO is set for a station, the SOLWAIT is skipped and the station is energized with override active. This forces watering for the full DWELL time.

When DWELL time runs out or CURRENT SENSE becomes false, the STOP TIME is recorded and a search for a new station is commenced.

On the first pass after the watering window changes from open to closed, the automatic routines turn off and record a minute passed as well as the turn off time in the automatic data area of any station in automatic active state. Furthermore, all ASO stations are reset to AUTO.

System Measured Flow (SMF) routines first turn on the master valve and wait for at least one minute of stable flow. The rate observed at this time is recorded as the system leakage rate. Next each of the stations is treated as follows: The valve is energized with override active and the time to achieve stable flow is recorded as the open time. Then the leakage rate is subtracted from the stabilized flow rate adjusted to 100 plus the value stored at PERCENT and recorded as the maximum flow for the target station. The valve is then turned off and the time to achieve stable flow is recorded as the shut time. After all stations have been measured, the leakage rate is adjusted by the percentage and recorded at the adjusted value.

System Defaults (WATDFL)

System defaults are contained in a file named WATDFL which is linked at the bottom of PROM space. The file contains four jump instructions to handle system start (location 0), restart 30h (location 30h) for testing of new code, restart 38h (location 38h) for switching between communications and monitor maskable interrupt (location 66h). The lookup table used by the keyboard routines is also located here. Reference may be made to the listing (TABLE I) for a detailed description of the defaults and their location.

TABLE I

```
                    ; keytst  Gets key pad input, displays string from lookup table.
0000'               keytst:
0000' 21 0000#              ld      hl,keymsg
0003' CD 0000#              call    pstrng
0006' ED 38 B4              in0     a,itc           ; get the interrupt control
0009' E6 FB                 and     255 - itc2      ; turn off keyboard interrupt
000B' ED 39 B4              out0    itc,a 000E' 21 0000#              ld      hl,offl         ; save the csi status
0011' 11 0000#              ld      de,csisav
0014' 01 0015               ld      bc,csitot
0017' ED B0                 ldir
0019'               keytel:
0019' CD 0000#              call    crlf            ; start a new line
001C'               keyt11:
001C' CD 0000#              call    int200          ; poll the keyboard
001F' ED 4B 0000#           ld      bc,(keyval)
0023' 78                    ld      a,b
0024' FE 0E                 cp      clkrow          ; check for a clock key
0026' CA 00C6'              jp      z,keyte3        ; z, display a clock key 0029' D2 0033'              jp      nc,keyt12       ; nc, no keyin 002C' FE 0B                 cp      kbsid           ; check for syringe or
002E' 38 3F                 jr      c,keyte2        ; c, display a channel key
```

TABLE I

```
0030' C3 0117'              jp      keytes          ; nc, display a syringe key
0033'           keyt12:
0033' CD 0000#              call    getrd6          ; check for console input
0036' B7                    or      a
0037' 28 E3                 jr      z,keyt11        ; z, no keyboard char continue 0039' E6 5F                 and     5fh             ; lower to upper
003B' FE 4D                 cp      'M'
003D' 20 0A                 jr      nz,chko         ; not master toggle 003F' 3A 0000#              ld      a,(solctr)
0042' EE 20                 xor     mstrmsk         ; toggle the master
0044' 32 0000#              ld      (solctr),a
0047' 18 D3                 jr      keyt11
0049'           chko:
0049' FE 4F                 cp      'O'
004B' 20 08                 jr      nz,chkcr        ; not overide toggle 004D' 3A 0000#              ld      a,(solctr)
0050' EE 80                 xor     ovridem         ; toggle the overide
0052' 32 0000#              ld      (solctr),a
0055'           chkcr:
0055' FE 0D                 cp      cr
0057' 20 C3                 jr      nz,keyt11       ; not cr, continue 0059' ED 38 B4              in0     a,itc           ; get the interrupt control
005C' F6 04                 or      ite2            ; turn on keyboard interrupt
005E' ED 39 B4              out0    itc,a 0061' 11 0000#              ld      de,offl         ; restore the csi status
0064' 21 0000#              ld      hl,csisav
0067' 01 0015               ld      bc,csitot
006A' ED B0                 ldir
006C' C3 0000#              jp      crlf            ; exit with a crlf
006F'           keyte2:
006F' 21 0000#              ld      hl,rowmsg       ; print the row first
0072' CD 0000#              call    pstrng
0075' C6 30                 add     a,30h           ; make row # ascii
0077' 3C                    inc     a               ; adjust for start at 1
0078' CD 0000#              call    putchar 007B' 23                    inc     hl              ; point to the column message
007C' CD 0000#              call    pstrng 007F' 69                    ld      l,c             ; get the column in l
0080' 2C                    inc     l               ; adjust for start at 1
0081' CD 0000#              call    lbcd
0084' 6F                    ld      l,a
0085' E6 F0                 and     0f0h            ; strip the low nibble
0087' 28 09                 jr      z,lownib        ; z, no high nibble 0089' 0F                    rrca                    ; move high to low
008A' 0F                    rrca
008B' 0F                    rrca
008C' 0F                    rrca
008D' C6 30                 add     a,30h           ; make the number ascii
008F' CD 0000#              call    putchar
0092'           lownib:
0092' 7D                    ld      a,l             ; print the low nibble
0093' E6 0F                 and     15
0095' C6 30                 add     a,30h
0097' CD 0000#              call    putchar
009A' 21 0000#              ld      hl,offl         ; point to the offl byte
009D' 16 00                 ld      d,0
009F' 58                    ld      e,b             ; get the row #
00A0' CB 23                 sla     e               ; times 2
00A2' ED 5A                 adc     hl,de           ; point to the proper byte
00A4' 79                    ld      a,c             ; get the column again
00A5' FE 08                 cp      8               ; check upper or lower byte
00A7' 38 04                 jr      c,lowport
```

TABLE I

```
00A9'  23                       inc     hl              ; point to upper byte
00AA'  D6 08                    sub     8               ; adjust for upper
00AC'  4F                       ld      c,a
00AD'              lowport:
00AD'  3E 80                    ld      a,80h           ; set the bit corresponding to key
00AF'  0C                       inc     c
00B0'              keycll:
00B0'  07                       rlca
00B1'  0D                       dec     c               ; count the key position
00B2'  20 FC                    jr      nz,keycll 00B4'  57                       ld      d,a             ; save the bit mask
00B5'  2F                       cpl                     ; find the complement
00B6'  5F                       ld      e,a             ; save it 00B7'  7E                       ld      a,(hl)          ; get the led status
00B8'  47                       ld      b,a             ; save it
00B9'  A3                       and     e               ; mask for the existing bits
00BA'  5F                       ld      e,a             ; save the mask 00BB'  78                       ld      a,b             ; get the port status
00BC'  2F                       cpl                     ; complement the stat
00BD'  A2                       and     d               ; mask the target bit
00BE'  B3                       or      e               ; add in the other bits
00BF'  77                       ld      (hl),a          ; send the new port status 00C0'  CD 0000#                 call    csistart
00C3'  C3 0019'                 jp      keyte1          ; go again 00C6'              keyte3:
00C6'  21 0000#                 ld      hl,rowmsg       ; point to row message
00C9'  CD 0000#                 call    pstrng          ; print the row message
00CC'  23                       inc     hl              ; point to the column message
00CD'  E5                       push    hl              ; save the pointer
00CE'  21 0000#                 ld      hl,clkmsg       ; print the clock row message
00D1'  CD 0000#                 call    pstrng
00D4'  E1                       pop     hl              ; get the column message
00D5'  CD 0000#                 call    pstrng          ; print it 00D8'  79                       ld      a,c             ; setup column for separate
00D9'  CD 0000#                 call    separate        ; separate the nibbles
00DC'  43                       ld      b,e             ; save the function nibble
00DD'  7A                       ld      a,d             ; get the speed nibble
00DE'  D6 04                    sub     4               ; adjust the low
00E0'  38 08                    jr      c,keyte4        ; c, value too small
00E2'  0F                       rrca
00E3'  FE 02                    cp      2               ; check for too big
00E5'  30 03                    jr      nc,keyte4       ; nc, too big 00E7'  CD 0100'                 call    keyte5
00EA'              keyte4:
00EA'  78                       ld      a,b             ; get the function nibble
00EB'  D6 50                    sub     50h             ; convert to offset
00ED'  DA 0019'                 jp      c,keyte1        ; c, is too small 00F0'  FE 50                    cp      50h
00F2'  D2 0019'                 jp      nc,keyte1       ; nc, is too big ; shift hi down to low
00F5'  0F                       rrca
00F6'  0F                       rrca
00F7'  0F                       rrca
00F8'  0F                       rrca
00F9'  3C                       inc     a               ; offset for fast & slow
00FA'  CD 0100'                 call    keyte5
00FD'  C3 0019'                 jp      keyte1

0100'              keyte5:
0100'  FE 06                    cp      6               ; check the range
0102'  D0                       ret     nc              ; nc is too big
0103'  E5                       push    hl
0104'  D5                       push    de
```

TABLE I

```
0105' 21 0000#              ld      hl,keytbl       ; point to the table of clock messages
0108' 87                    add     a,a             ; 2 bytes per entry
0109' 5F                    ld      e,a             ; offset with the byte
010A' 16 00                 ld      d,0
010C' 19                    add     hl,de
010D' 5E                    ld      e,(hl)          ; get the message address
010E' 23                    inc     hl
010F' 66                    ld      h,(hl)
0110' 6B                    ld      l,e
0111' CD 0000#              call    pstrng
0114' D1                    pop     de
0115' E1                    pop     hl
0116' C9                    ret 0117'               keytes:
0117' 21 0000#              ld      hl,rowmsg       ; point to row message
011A' CD 0000#              call    pstrng          ; print the row message
011D' 23                    inc     hl              ; point to the column message
011E' E5                    push    hl              ; save the pointer
011F' CD 0000#              call    ilprint         ; print the following message
0122' 53 59 52 49           db      'SYRINGE ',0
012C' E1                    pop     hl              ; get the column message
012D' CD 0000#              call    pstrng          ; print it
0130' C3 0019'              jp      keytel end
    0 Error(s) Detected.    307 Program Bytes.
  401 Symbols Detected.
                            .z80
                            .LIST global  prmpt, mcnexp, crcok, crcbad, crcmsg, lcdmsg, crtoex
                            global  keytbl, keymsg, afmsg, rowmsg, clkmsg, timmsg
                            global  msg30, msg38, ignmsg 0000' 0D 0A 20 20   msg30:  db      cr,lf,'  RST - 30    Registers',cr,lf,0,'$'
001C' 0D 0A 20 20   msg38:  db      cr,lf,'  RST - 38    Registers',cr,lf,0,'$'
0038'
0038'               keytbl:
0038' 0044' 004B'           defw    fast, slow, time, start, stop, dwell 0044' 46 41 53 54  fast:    db      'FAST ',0
004B' 53 4C 4F 57  slow:    db      'SLOW ',0
0052' 54 49 4D 45  time:    db      'TIME ',0
0059' 53 54 41 52  start:   db      'START ',0
0060' 53 54 4F 50  stop:    db      'STOP ',0
0067' 44 57 45 4C  dwell:   db      'DWELL ',0
006E'

006E' 20 54 6F 75  keymsg:  db      ' Touch KEYS to light LEDs', cr, lf
0089' 20 54 6F 20           db      ' To toggle MASTER or OVERRIDE', cr, lf
00A8' 20 20 20 20           db      '       Press M      or O', cr, lf, lf
00C1' 20 50 72 65  crtoex:  db      ' Press RETURN to exit !', cr, lf,0
00DB'
00DB' 20 52 6F 77  rowmsg:  db      ' Row - ',0,' Column - ',0
00EF' 20 43 4C 4F  clkmsg:  db      ' CLOCK ',0
00F7'
00F7' 0D 0A        lcdmsg:  db      cr,lf
00F9' 20 20 45 6E           db      '  Enter characters to display on the LCD'
0121' 0D 0A 2D 20           db      cr,lf,'- ',0

0126' 0D 0A        timmsg:  db      cr,lf
0128' 20 20 45 6E           db      '  Enter exactly 14 digits for the clock setting where ',cr,lf
0160' 20 20 59 72           db      '  Yr - year, Mo - month, Da - date, Wd - week day'
0191' 0D 0A 20 20           db      cr,lf,'  Hr - hour (24 Hr  00 - 23), Mi - minute,  Se - seconds.',c
01CE' 20 20 59 72           db      '  YrMoDaWdHrMiSe     Add leading 0''s where necessary!',cr,lf
0206' 2D 20 00              db      '- ',0

0209' 20 20 2D 20  crcok:   db      ' -- OK',0
0210' 20 20 2D 20  crcbad:  db      ' -- BAD',0
```

TABLE I

```
0218'
0218' 0D 0A 20 50        crcmsg: db cr,lf,' PROM CRC = ',0
0227' 0D 0A 20 45        ignmsg: defb cr,lf,' Enter IGNORE to continue !',cr,lf
0246' 20 20 20 20                defb '      - ',0

024E' 57 20 2A 20        prmpt:  db 'W * ',0
0253'
0253'                    afmsg:  ; register dispaly messages
0253' 20 41 46 20                db ' AF = ',0
025A' 20 42 43 20                db ' BC = ',0
0261' 20 44 45 20                db ' DE = ',0
0268' 20 48 4C 20                db ' HL = ',0
026F' 20 53 50 20                db ' SP = ',0
0276' 20 50 43 20                db ' PC = ',0
027D' 0D 0A 20 41        db cr, lf,' AF''= ',0
0286' 20 42 43 27                db ' BC''= ',0
028D' 20 44 45 27                db ' DE''= ',0
0294' 20 48 4C 27                db ' HL''= ',0
029B' 20 49 58 20                db ' IX = ',0
02A2' 20 49 59 20                db ' IY = ',0
02A9' 20 49 52 20                db ' IR = ',0

02B0'                    monexp: ; command menu
02B0' 0D 0A                      db cr,lf
02B2' 20 20 20 20                db '    CONTROLLER COMMANDS ARE AS FOLLOWS:   [OPTIONAL <PARAMETER>]', 02F5' 20 41 20 5B                db ' A [Stat.[Stat.]Func]- Alter Stat. 1-16 TO 0, OFF; 1, AUTO; 2, ON;
0338' 20 20 20 20                db '                                3, SCD; 4 ON W/WET SENS
0370' 20 42 20 5B                db ' B [Stat.[,Stat.]- - - Bookkeeping Display, Time, Flow Counts, etc
03C2' 20 43 20 5B                db ' C [M # CMD][#][#]- Defaults Display [M - Change Settings MENU]
0406' 20 20 20 20                db '    C may be followed w/ Station #(s) or C Menu command ',cr,lf,lf 0441' 20 45 20 5B                db ' E [F L E M][#]- - - - Error Display, Follow E with   F - FLOW
0485' 20 20 20 54                db '    T - TIME OFF  O - OFFLINE  P - POWER  N - NO FLOW ][Stat #] to 04CF' 20 54 20 2D                db ' T - - - - - - - - - - Time Display On Terminal',CR,LF
0500' 20 55 5B 59                db ' U[YrMnDaWdHrMiSc] - - Enter New Date/Time from Terminal Key Board
0544' 20 55 5B 53                db ' U[S P T Y C][PARM]- - Enter  S-Start, P-Stop, T-Time, Y-Syringe <
0580' 20 20 20 20                db '                       C-[####### #######] 1 - WATER, 0 - NO WAT
05D3' 20 3F 20 2D                db ' ? - - - - - - - - - - Display this List',cr,lf
05FD' 20 2F 20 2D                db ' / - - - - - - - - - - Display Debug Commands',CR,LF,LF 0620' 20 43 61 72                db ' Carriage Return (CR)= Single Repeat last Command',cr,lf
        0000          1                 if finished
                      1                 else
0660' 20 52 20 3D   1          db ' R = Repeat last F, D, M, F, T until KEY PRESS  illegal CMD clears
                                     endif
06A8' 20 20 20 43                db '  CTRL X = ABORT,  CTRL S  = Suspend Display,  CTRL Q  Restarts',

06EC'                    DEBEXP:
                         GLOBAL DEBEXP

06EC' 0D 0A                      db cr,lf
06EE' 20 20 20 20                db '    DEBUG COMMANDS ARE AS FOLLOWS:  [OPTIONAL <PARAMETER>]',cr,l

072D' 20 44 20 5B                db ' D [<ADDR>][,<ADDR>] - - DUMP MEMORY FROM ADDR TO ADDR',cr,lf

FFFF          1                 if not finished
0765' 20 46 20 3C   1          db ' F <ADDR>,<ADDR>,<ADDR>- FILL MEMORY START, END WITH DATA',cr,lf
07A0' 20 47 20 5B   1          db ' G [<ADDR>]- - - - - - - GO TO ADDR AND EXECUTE',cr,lf
07D1' 20 48 20 5B   1          db ' H [<OFFSET>]- - - - - - HEX FILE DOWNLOAD TO LOAD ADDRESS + OFFSE
                                     endif FFFF          1                 if sdelaychk
0816' 20 4A 20 5B   1          db ' J [#] - - - - - - - - - Set/Display Moisture Sense Delay [Tenths Se
                                     endif 0861' 20 4B 20 2D                db ' K - - - - - - - - - - KEYPAD INPUT & DISPLAY',cr,lf
0892' 20 4C 20 2D                db ' L - - - - - - - - - - LCD STRING DISPLAY',cr,lf
```

TABLE I

```
09D9' 20 2F 20 20      DB ' /- - - - - - - - - DISPLAY THIS LIST',CR,LF,LF

0A06' 20 43 41 52      db ' CARRIAGE RETURN (CR)= SINGLE REPEAT LAST COMMAND',cr,lf
          0000     1             if finished
                    1             else
0A39' 20 52 20 3D  1   db ' R = REPEAT LAST P, D, M, F, T UNTIL KEY PRESS  ILLEGAL CMD CLEARS
                                endif
0A84' 20 20 20 43      db '  CTRL X = ABORT,  CTRL S = SUSPEND DISPLAY,  CTRL Q  RESTARTS', 0AC5'                  cmenu:
                       global cmenu
                       ;.comment '
0AC5' 20 20 20 20      db '                              C Menu',cr,lf
0AE7' 54 6F 20 43      db 'To Change a value Follow C w/ a Letter, Station # (s),New Value (C
0B2E' 53 74 61 74      db 'Station D-Dwell  S-Soak  O-Open  H-Shut  A-Auto  V-Overide  Y-Syri
0B75' 20 20 20 20      db '         F-Max Flow Allowed  C-Clear Low & High Flow Rates',cr,lf
0BB0' 20 20 20 20      db '         P-Error Percent Added to SMF value  G-Group Maset Station'
0BF4' 53 79 73 74      db 'System  I-Max Inactive Flow  R-Max Active Flow  T-Clear Low & High
0C3C' 0D 0A            db cr,lf
0C3E' 20 20 20 20      db '        Z-Force a System Restart ',0
                       end
    0 Error(s) Detected.  3169 Program Bytes.
  394 Symbols Detected.

.z80
                       .list

0000'                  consol:

external hexasc, paschx, pascdc, savall, getmost, lbcd
                       external parptr, parmcnt, parml
                       external dspcnt, tabcnt, tabtbl
                       external inbcnt, inbptr, inbuf
                       external jmpasv, jmpvc6, bcdcmd
                       external cmdbuf, cmdptr, thiscmd, repcmd global consol
                       global buffin, buff00, bufchar, notab, noctrl, backsp
                       global backsl, baktab, addchr, suberr, ilprint
                       global monparse, monp01, monerr, monexec, shocmd, repeat
                       global parms, delim, deliml, delimd, hldshx, adshxs, adshx, tblsch
                       global pause, pstrng, crlf, putchar, getchar, getinst, getrd6

; buffin Buffered input from consol device
0000'                  buffin:
0000' E5                       push    hl
0001' 21 0000#                 ld      hl,inbuf
0004' 22 0000#                 ld      (inbptr),hl
0007' AF                       xor     a
0008' 32 0000#                 ld      (inbcnt),a        ; zero the input count
000B' 32 0000#                 ld      (inbuf),a         ; and show buffer empty
000E' 3E 20                    ld      a,monlnl          ; reset the display count
0010' 32 0000#                 ld      (dspcnt),a 0013'                  buff00:
0013' CD 0270'                 call    getchar           ; get character input
0016' FE 0D                    cp      cr                ; is it carriage return
0018' 28 05                    jr      z,buffex          ; z, yes exit 001A' CD 0026'                 call    bufchar           ; buffer the char
001D' 18 F4                    jr      buff00            ; loop for more characters 001F'                  buffex:
001F' 2A 0000#                 ld      hl,(inbptr)
0022' 36 00                    ld      (hl),0            ; terminate the buffer
0024' E1                       pop     hl
0025' C9                       ret
```

TABLE I

```
            0000       1               if finished
                       1               else
08BF' 20 4D 20 3C      1       db ' M <ADDR>,<ADDR>,<ADDR>- MOVE MEMORY START, END TO TARGET',cr,lf
08FA' 20 50 20 3C      1       db ' P <PORT>[,<BYTE>] - - - INPUT FROM PORT   OUTPUT BYTE TO PORT',c
093B' 20 53 20 5B      1       db ' S [<ADDR>]- - - - - - SUBSTITUTE MEMORY AT ADDR',cr,lf
                               endif 096F' 20 58 20 2D              db ' X - - - - - - - - - - EXHIBIT PROCESSOR REGISTERS ',cr,lf
09A6' 20 3F 20 2D              db ' ? - - - - - - - - - - DISPLAY MONITOR COMMANDS',cr,lf
                           ; bufchar adds a character in a to the dsiplay, expands tabs
                           ;    handles back spaces, and updates dspcnt
0025'                      bufchar:
0026' FE 08                       cp      bksp            ; back space ?
0028' 28 68                       jr      z,backsp        ; z, yep, go back space 002A' FE 7E                       cp      del             ; delete ?
002C' 28 64                       jr      z,backsp        ; z, yes so back space 002E' CD 0000#                    call    savall
0031' E3                          ex      (sp),hl         ; use modified getall return
0032' 21 0000#                    ld      hl,getmost
0035' E3                          ex      (sp),hl 0036' 47                          ld      b,a             ; save the char in b
0037' 3A 0000#                    ld      a,(dspcnt)      ; get the char counter
003A' 4F                          ld      c,a             ; put the display count in c
003B' B7                          or      a
003C' CA 0000'                    jp      z,suberr        ; z, no more space 003F' 78                          ld      a,b             ; get the character
0040' FE 09                       cp      htab            ; tab character ?
0042' 20 1F                       jr      nz,notab        ; nz, nope, test for others 0044' CD 00E4'                    call    addchr          ; put the tab in the buffer
0047' 3A 0000#                    ld      a,(tabcnt)
004A' 16 00                       ld      d,0
004C' 5F                          ld      e,a
004D' 3C                          inc     a               ; set up for next tab
004E' 32 0000#                    ld      (tabcnt),a
0051' 21 0000#                    ld      hl,tabtbl       ; point to the tab count table
0054' 19                          add     hl,de
0055' 06 00                       ld      b,0             ; set up expansion count 0057'                      tabloop:
0057' 04                          inc     b
0058' 0D                          dec     c
0059' 79                          ld      a,c
005A' E6 07                       and     7               ; mask the low 3 bits
005C' 20 F9                       jr      nz,tabloop      ; loop to the next tab stop 005E'                      tablx:
005E' 70                          ld      (hl),b          ; save the count for backspace
005F' 3E 20                       ld      a,space         ; load the expansion character
0061' 18 24                       jr      noctrl          ; show and fill 0063'                      notab:
0063' FE 61                       cp      'a'             ; check for upper case
0065' 38 09                       jr      c,notab1        ; c, it may be control 0067' FE 7B                       cp      'z'+1
0069' 30 17                       jr      nc,notab2       ; nc, still not lower 006B' E6 5F                       and     5fh             ; make it lower
006D' 47                          ld      b,a             ; ditto the buffered char
006E' 18 12                       jr      notab2
0070'                      notab1:
0070' FE 20                       cp      space           ; check for control character
0072' 30 0E                       jr      nc,notab2       ; not a control char 0074' 79                          ld      a,c             ; get the display count
```

TABLE I

```
0075' 3D                    dec     a               ; room for 2 chars ?
0076' CA 0268'              jp      z,suberr        ; z, no space ret 0079' 3E 5E                 ld      a,'^'           ; display a control char flag
007B' CD 0267'              call    putchar
007E' 0D                    dec     c               ; count the char
007F' 78                    ld      a,b             ; get the character
0080' C6 40                 add     a,40h           ; make a printable character
0082'              nctab2:
0082' CD 00E4'              call    addchr          ; add the char to the buffer
0085' 06 01                 ld      b,1             ; only process 1 character
0087'              noctrl:
0087' CD 0267'              call    putchar         ; display the character
008A' 0D                    dec     c               ; count the char
008B' 10 FA                 djnz    noctrl          ; show the proper # of chars
008D'              bufcex:
008D' 79                    ld      a,c
008E' 32 0000#              ld      (dspcnt),a      ; save the updated counter
0091' C9                    ret 0092'              backsp:
0092' 3A 0000#              ld      a,(inbcnt)      ; get the count
0095' B7                    or      a               ; check for empty line
0096' C8                    ret     z 0097' CD 0000#              call    savall          ; save the registers
009A' E3                    ex      (sp),hl         ; use modified getall return
009B' 21 0000#              ld      hl,getmost
009E' E3                    ex      (sp),hl 009F' 3D                    dec     a               ; subtract a char from the count
00A0' 32 0000#              ld      (inbcnt),a
00A3' 2A 0000#              ld      hl,(inbptr)     ; get the inbuffer pointer
00A6' 2B                    dec     hl              ; subtract a character position
00A7' 22 0000#              ld      (inbptr),hl
00AA' 7E                    ld      a,(hl)          ; what character is deleted
00AB' 21 0000#              ld      hl,dspcnt       ; point to the count
00AE' FE 09                 cp      htab            ; tab char ?
00B0' 28 1F                 jr      z,baktab        ; z, yes kill some spaces 00B2' FE 20                 cp      space           ; control char ?
00B4' 06 01                 ld      b,1             ; prepare for no
00B6' 30 02                 jr      nc,backs1       ; nc, nope regular char 00B8' 06 02                 ld      b,2             ; was a control kill the ^ too 00BA'              backs1:
00BA' 3E 08                 ld      a,bksp          ; back space
00BC' CD 0267'              call    putchar
00BF' 3E 20                 ld      a,space         ; kill the char
00C1' CD 0267'              call    putchar
00C4' 3E 08                 ld      a,bksp          ; and back space again
00C6' CD 0267'              call    putchar
00C9' 34                    inc     (hl)            ; remove char from the count
00CA' 7E                    ld      a,(hl)
00CB' FE 20                 cp      monlnl          ; check beginning of line
00CD' C8                    ret     z               ; z, yes quit 00CE' 10 EA                 djnz    backs1          ; loop for tabs or controls 00D0' C9                    ret 00D1'              baktab:
00D1' 3A 0000#              ld      a,(tabcnt)      ; get the tab count
00D4' 3D                    dec     a               ; move back to the previous tab
00D5' 32 0000#              ld      (tabcnt),a      ; save the new count
00D8' 16 00                 ld      d,0
00DA' 5F                    ld      e,a
00DB' E5                    push    hl              ; save the display count pointer
00DC' 21 0000#              ld      hl,tabtbl       ; point to the tab count table
```

TABLE I

```
00DF' 19                       add     hl,de           ; offset for this iteration
00E0' 46                       ld      b,(hl)          ; get the space count for last tab
00E1' E1                       pop     hl              ; restore the display count pointer
00E2' 18 06                    jr      backs1

; addchr puts the char in b in the input buffer
00E4'                  addchr:
00E4' E5                       push    hl
00E5' 2A 0000#                 ld      hl,(inbptr)     ; get the inbuffer pointer
00E8' 70                       ld      (hl),b          ; buffer the char
00E9' 23                       inc     hl              ; advance the pointer
00EA' 22 0000#                 ld      (inbptr),hl
00ED' 21 0000#                 ld      hl,inbcnt       ; and the count
00F0' 34                       inc     (hl)
00F1' E1                       pop     hl
00F2' C9                       ret ; monparse scans the command string in the input buffer and reexecutes
                       ;     the last command string if the new one is empty and the previou
                       ;     command was repeatable. Otherwise the input buffer is moved int
                       ;     the command buffer and that command string is scanned for synta
                       ;     parsed, and, if legal, executed.
00F3'                  monparse:
00F3' AF                       xor     a               ; zero the high byte
00F4' 47                       ld      b,a
00F5' 3A 0000#                 ld      a,(inbcnt)      ; get the input count
00F8' 4F                       ld      c,a
00F9' B7                       or      a               ; check for cr only
00FA' 20 05                    jr      nz,monp00       ; nz, nope move input into command 00FC' CD 017A'                 call    shocmd          ; reprint the last command string
00FF' 18 19                    jr      monp01          ; and reexecute it
0101'                  monp00:
0101' 3A 0000#                 ld      a,(inbuf)       ; check first character for repeater
0104' FE 52                    cp      'R'
0106' CA 015E'                 jp      z,repeat        ; z, enter repeat loop 0109' 2A 0000#                 ld      hl,(inbptr)     ; get the buffer pointer
010C' 36 00                    ld      (hl),0          ; terminate the buffer
010E' 0C                       inc     c               ; and count the terminator
010F' 21 0000#                 ld      hl,inbuf        ; hl -> start of input buffer
0112' 11 0000#                 ld      de,cmdbuf       ; de -> start of command buffer
0115' 22 0000#                 ld      (inbptr),hl     ; reset inbuffer pointer
0118' ED B0                    ldir                    ; move input into command buffer
011A'                  monp01:
011A' 21 0000#                 ld      hl,cmdbuf       ; cmdbuf start in hl
011D' CD 01E9'                 call    delim           ; eliminate leading spaces
0120' C8                       ret     z               ; z, empty buffer quit 0121' 23                       inc     hl              ; point to the next character
0122' 47                       ld      b,a             ; save command byte
0123' CD 01E9'                 call    delim           ; advance to next non delimiter
0126' 78                       ld      a,b
0127' 54                       ld      d,h             ; save command pointer
0128' 5D                       ld      e,l 0129' E5                       push    hl
012A' 21 0000#                 ld      hl,bcdcmd       ; check for hex or bcd parms
012D'                  monp10:
012D' 7E                       ld      a,(hl)
012E' B7                       or      a
012F' 28 0A                    jr      z,monp11        ; z, no match, use hex 0131' 23                       inc     hl
0132' B8                       cp      b
0133' 20 F8                    jr      nz,monp10       ; nz, no match, try again 0135' E1                       pop     hl
0136' CD 01AE'                 call    parmd           ; parse bcd parameters
0139' 18 07                    jr      monp12
```

TABLE I

```
0154' 22 0000#                 ld       (thiscmd),hl    ; save the current command for repeater
0157' 3A 0000#                 ld       a,(parmcnt)     ; load the parm count for the function
015A' D6 01                    sub      1               ; and set some flags
015C' E9             monjmp:   jp       (hl)            ; go to the routine
015D'                mondex:
015D' C9                       ret ; repeat reexecutes repeatable commands until operator presses a key 015E'                repeat:
015E' CD 017A'                 call     shocmd          ; check for repeating command
0161' 3E 07                    ld       a,bell
0163' DC 0267'                 call     c,putchar       ; z, nope complain
0166' D8                       ret      c               ; z, nope, quit 0167'                repe01:
0167' CD 027E'                 call     getrd6          ; check for key in
016A' B7                       or       a
016B' C0                       ret      nz              ; nz, keyin quit 016C' 2A 0000#                 ld       hl,(thiscmd)    ; get the command jump
016F' 3A 0000#                 ld       a,(parmcnt)

0172' D6 01                    sub      1
0174' CD 015C'                 call     monjmp          ; repeat the command
0177' D8                       ret      c               ; c, cancel the loop
0178' 18 ED                    jr       repe01

; put the previous command string in input buffer and print it.
017A'                shocmd:
017A' C5                       push     bc
017B' E5                       push     hl
017C' 21 0000#                 ld       hl,cmdbuf       ; point to the command buffer
017F' CD 01E9'                 call     delim           ; find the command
0182' 28 16                    jr       z,shoc02        ; z, empty buffer do nothing 0184' 47                       ld       b,a
0185' 21 0000#                 ld       hl,repcmd       ; point to the repeat command table
0188' CD 01A3'                 call     tblsch          ; search the table
018B' 38 0D                    jr       c,shoc02        ; c, no match 018D'                shoc01:
018D' 21 0000#                 ld       hl,cmdbuf       ; reprint the buffer
0190' 7E             shoc11:   ld       a,(hl)          ; get character
0191' B7                       or       a               ; last character ?
0192' 28 0C                    jr       z,shoc03        ; z, yes quit 0194' CD 0026'                 call     bufchar         ; print it etc.
0197' 23                       inc      hl              ; point to next character
0198' 18 F6                    jr       shoc11          ; process it
019A'                shoc02:
019A' 32 0000#                 ld       (cmdbuf),a      ; zero the cmd buffer
019D' 32 0000#                 ld       (inbuf),a       ; and the input buffer
01A0'                shoc03:
01A0' E1                       pop      hl
01A1' C1                       pop      bc
01A2' C9                       ret ; tblsch Searches table pointed to by hl looking for a match
                    ;       returns
                    ;               carry set for no match
                    ;               zero no carry for match
                    ;               hl = address of vector in table
01A3'                tblsch:
01A3' 7E                       ld       a,(hl)          ; check the character
01A4' B8                       cp       b               ; compare with the command
01A5' 23                       inc      hl              ; point to the routine address
01A6' C8                       ret      z               ; z, match, return no carry 01A7' B7                       or       a               ; check for table end
01A8' 37                       scf
01A9' C8                       ret      z               ; z, table end, return carry
```

TABLE I

```
0138'                   monpl1:
0138' E1                        pop     hl
013C' CD 01B3'                  call    parms           ; parse hex parameters
013F' 22 0000#                  ld      (cmdptr),hl     ; save the command position
0142'                   monpl2:
0142' 2A 0000#                  ld      hl,(parptr)     ; point to the table
0145' CD 01A3'                  call    tblsch          ; search the table for a match
0148' 30 06                     jr      nc,monexec      ; nc, found a match 014A'                   monerr:
014A' 3E 07                     ld      a,bell          ; unknown command, complain
014C' CD 0267'                  call    putchar
014F' C9                        ret
0150'                   monexec:
0150' 7E                        ld      a,(hl)          ; get the routine address
0151' 23                        inc     hl
0152' 66                        ld      h,(hl)
0153' 6F                        ld      l,a
01AA' 23                        inc     hl              ; move to the next command character
01AB' 23                        inc     hl
01AC' 18 F5                     jr      tblsch          ; nz, no, more to check ; parms parmd Using hl as string pointer parm discards delimiters
                        ;       until end of string is found or a non delimiter byte is found.
                        ;       It then converts the following string to a two byte hex value,
                        ;       returned at the address in de, until a non hex value is found.
                        ;       The string is checked for a valid delimiter and, if found, the
                        ;       process is repeated.
                        ; returns:
                        ;               parmcnt = # of parms converted
                        ;               parm1-4 = values of parms converted
                        ;               carry = terminated with non delimiter
                        ;       delimiters: space, comma, semicolon & zero (terminator)
                        ; parmd converts decimal to bcd, parms converts hex to binary
01AE'                   parmd:
                         global parmd
01AE' C5                        push    bc
01AF' 0E FF                     ld      c,255           ; flag decimal parms
01B1' 18 03                     jr      parms0
01B3'                   parms:
01B3' C5                        push    bc
01B4' 0E 00                     ld      c,0             ; flag hex parms
01B6'                   parms0:
01B6' D5                        push    de
01B7' 11 0000#                  ld      de,parm1        ; point to the first parm storage
01BA' 06 00                     ld      b,0             ; count parms in b
01BC'                   parms1:
01BC' CD 0159'                  call    delim           ; discard the delimiters
01BF' 28 18                     jr      z,parex         ; z, no parms quit 01C1' EB                        ex      de,hl           ; put the source in de, target in hl
01C2' CB 41                     bit     0,c             ; hex or decimal
01C4' 28 05                     jr      z,parms2        ; z, hex 01C6' CD 0000#                  call    pascdc          ; parse decimal parms
01C9' 18 03                     jr      parms3
01CB'                   parms2:
01CB' CD 0000#                  call    paschx          ; parse hex parms
01CE'                   parms3:
01CE' EB                        ex      de,hl           ; set the pointers back in place
01CF' 13                        inc     de              ; point to the next parm storage
01D0' 13                        inc     de
01D1' 28 06                     jr      z,parext        ; z, non hex value, terminate parsing 01D3' 04                        inc     b               ; count the parm
01D4' 78                        ld      a,b             ; check for additional space
01D5' FE 04                     cp      4
01D7' 38 E3                     jr      c,parms1        ; c, more to go
```

TABLE I

```
01D9'                   parext:
01D9' 78                        ld      a,b             ; get the count
01DA' 32 0000#                  ld      (parmcnt),a     ; save it
01DD' D1                        pop     de
01DE' C1                        pop     bc
01DF' C3 01E9'                  jp      delim           ; set the termination flag
                        ; delimd swaps de and hl for a call to delim
01E2'                   delimd:
01E2' EB                        ex      de,hl
01E3' CD 01E9'                  call    delim
01E6' EB                        ex      de,hl
01E7' C9                        ret ; delim scans a string (pointed to by hl) until a non delimiter
                        ;       is found.
                        ; returns       hl = address of the non delimiter
                        ;               a = character found
                        ;               zero = terminator found
                        ;               carry = valid delimiter or terminator found
01E8'                   delim0:
01E8' 23                        inc     hl 01E9'                   delim:
01E9' CD 01F0'                  call    delim1
01EC' C8                        ret     z               ; zero is the terminator 01ED' 30 F9                     jr      nc,delim0       ; no carry, delimiter try again 01EF' C9                        ret ; delim1 checks the character @ hl for terminator or delimiter
                        ;       delimiters are space, comma, or semicolon
                        ; return
                        ;               zero = terminator found
                        ;               carry = delimiter found
                        ;               no carry = other character found
01F0'                   delim1:
01F0' 7E                        ld      a,(hl)          ; check for terminator
01F1' B7                        or      a
01F2' C8                        ret     z               ; return on the terminator 01F3' FE 20                     cp      space
01F5' 28 0A                     jr      z,delim2

01F7' FE 2C                     cp      ','
01F9' 28 06                     jr      z,delim2

01FB' FE 3B                     cp      ';'
01FD' 28 02                     jr      z,delim2

01FF' 37                        scf                     ; carry for non delimiter
0200' C9                        ret 0201'                   delim2:
0201' B7                        or      a               ; clear the zero flag
0202' C9                        ret ;hldshx Print the value in hl as 4 ascii hex characters.
0203'                   hldshx:
0203' F5                        push    af
0204' 7C                        ld      a,h             ; display the high byte
0205' CD 0215'                  call    adshx
0208' 7D                        ld      a,l             ; and the low byte
0209' CD 0215'                  call    adshx
020C' F1                        pop     af
020D' C9                        ret ;adshxs Print the value in a as 2 ascii hex characters
                        ;       with a leading space.
020E'                   adshxs:
```

TABLE I

```
020E' F5                       push    af
020F' 3E 20                    ld      a,space
0211' CD 0267'                 call    putchar
0214' F1                       pop     af ;adshx  Print the value in hl as 2 ascii hex characters.
0215'                  adshx:
0215' F5                       push    af              ; save working registers
0216' E5                       push    hl
0217' CD 0000#                 call    hexasc          ; convert value to hex
021A' 7C                       ld      a,h             ; print the high byte
021B' CD 0267'                 call    putchar
021E' 7C                       ld      a,l             ; and the low byte
021F' CD 0267'                 call    putchar
0222' E1                       pop     hl              ; restore registers
0223' F1                       pop     af
0224' C9                       ret ; adsdc show a in decimal notation
0225'                  adsdc:
                          global adsdc
0225' E5                       push    hl              ; show the channel #
0226' 6F                       ld      l,a
0227' CD 0000#                 call    lbcd
022A' E1                       pop     hl
022B' 18 E8                    jr      adshx           ;

; pause Checks for consol input. Control S suspends execution
                       ;       until another character is entered. The exit character
                       ;       at the resumption of input will return a carry as will
                       ;       any key, on the first input, other than Control S.
022D'                  pause:
022D' CD 0275'                 call    getrd6
0230' B7                       or      a
0231' C8                       ret     z               ; z, no character ready 0232' FE 13                    cp      'S'-40h         ; control S ?
0234' 37                       scf                     ; prepare for no
0235' C0                       ret     nz              ; nz, nope 0236' CD 0270'                 call    getchar
0239' FE 18                    cp      exitchr         ; quit character
023B' 37                       scf                     ; flag a quit
023C' C8                       ret     z               ; z, exit with the flag 023D' B7                       or      a               ; normal return
023E' C9                       ret ; ILPRINT print the 0 terminated string directly following
                       ;       the call to ILPRINT
023F'                  ilprint:
023F' E3                       ex      (sp),hl         ; save hl
0240' CD 0246'                 call    pstrng          ; print the string
0243' 23                       inc     hl              ; point to the next character
0244' E3                       ex      (sp),hl         ; restore hl
0245' C9                       ret ; print the string pointed to by hl until encountering a 0
0246'                  pstrng:
            0000     1    if emulate
                          endif
0246' F5                       push    af 0247' 7E               pstrnl: ld      a,(hl)
0248' B7                       or      a
0249' 28 06                    jr      z,pstrnx 024B' CD 0267'                 call    putchar
024E' 23                       inc     hl
024F' 18 F6                    jr      pstrnl
```

TABLE I

```
0251'                   pstrnx:
0251' F1                        pop     af
0252' C9                        ret 0253'                   crlf:
0253' F5                        push    af
0254' 3E 0D                     ld      a,cr
0256' CD 0267'                  call    putchar
0259' 3E 0A                     ld      a,lf
025B' CD 0267'                  call    putchar
025E' F1                        pop     af
025F' C9                        ret 0260'                   suberr:
0260' 3E 07                     ld      a,bell
0262' CD 0267'                  call    putchar
0265' 37                        scf                     ; set carry for error flag
0266' C9                        ret 0267'                   putchar:
        0000        1           if emulate
                                endif
0267' F5                        push    af
0268' D5                        push    de
0269' 5F                        ld      e,a
026A' CD 0000#                  call    jmpvc6
026C' D1                        pop     de
026E' F1                        pop     af
026F' C9                        ret 0270'                   getchar:
        0000        1           if emulate
                                endif
0270' CD 027E'                  call    getrd6
0273' 28 FB                     jr      z,getchar 0275' C9                        ret 0276'                   getinst:
0276' C5                        push    bc
0277' 0E 08                     ld      c,8
0279' CD 0000#                  call    jmpasv
027C' C1                        pop     bc
027D' C9                        ret
027E'                   getrd6:
027E' D5                        push    de
027F' 1E FF                     ld      e,255
0281' CD 0000#                  call    jmpvc6
0284' B7                        or      a
0285' D1                        pop     de
0286' C9                        ret end
 0 Error(s) Detected.    647 Program Bytes.
453 Symbols Detected.

024D'                   cpcmd:
024D' DD 21 0000#               ld      ix,bflper       ; use the percent field
0251' 2E 01                     ld      l,1             ; one byte
0253' C3 02A4'                  jp      cdixld 0256'                   cgcmd:
0256' DD 21 0000#               ld      ix,bgrup        ; use the group field
025A' 2E 01                     ld      l,1
025C' C3 02A4'                  jp      cdixld 025F'                   cdcmd:
025F' DD 21 0000#               ld      ix,bdwel        ; use dwell field as base
0263' 2E 01                     ld      l,1             ; one byte
0265' C3 02A4'                  jp      cdixld
```

TABLE I

```
0268'                        cscmd:
0268' DD 21 0000#                    ld      ix,bsokv        ; use soak field as base
026C' 2E 01                          ld      l,1
026E' C3 02A4'                       jp      cdixld 0271'                        cocmd:
0271' DD 21 0000#                    ld      ix,bopen        ; use open field as base
0275' 2E 01                          ld      l,1
0277' C3 02A4'                       jp      cdixld 027A'                        chcmd:
027A' DD 21 0000#                    ld      ix,bshut        ; use shut field as base
027E' 2E 01                          ld      l,1
0280' C3 02A4'                       jp      cdixld 0283'                        cacmd:
0283' DD 21 0000#                    ld      ix,bfaiv        ; use faiv field as base
0287' 2E 01                          ld      l,1
0289' C3 02A4'                       jp      cdixld 028C'                        cvcmd:
028C' DD 21 0000#                    ld      ix,bovrv        ; use ovrv field as base
0290' 2E 01                          ld      l,1
0292' C3 02A4'                       jp      cdixld 0295'                        cycmd:
0295' DD 21 0000#                    ld      ix,bsyrv        ; use syrv field as base
0299' 2E 01                          ld      l,1
029B' C3 02A4'                       jp      cdixld 029E'                        cfcmd:
029E' DD 21 0000#                    ld      ix,bflov        ; use flov field as base
02A2' 2E 02                          ld      l,2             ; two bytes 02A4'                        cdixld: ; entry l = bytes to load, de = value,
                                     ; b = # channels, c = first channel, a = # of parms
02A4' FE 02                          cp      2               ; need chan & parm
02A6' DC 0000#                       call    c,monerr        ; c, not enough parms
02A9' DA 035E'                       jp      c,sdefsx        ; error exit 02AC' FE 03                          cp      3               ; check for range + value
02AE' 30 05                          jr      nc,cdix11       ; nc, range ok 02B0' 06 01                          ld      b,1             ; only one channel
02B2' FD 70 01                       ld      (iy+1),b 02B5'                        cdix11:
02B5' C5                             push    bc              ; save count & channel
02B6' DD E5                          push    ix
02B8' 06 25                          ld      b,booksz        ; use record size
02BA' ED 4C                          mlt     bc              ; to find record
02BC' DD 09                          add     ix,bc
02BE' DD 73 00                       ld      (ix+0),e        ; load the new value
02C1' 65                             ld      h,l
02C2' 25                             dec     h
02C3' 28 03                          jr      z,cdix12        ; z, one 02C5' DD 72 01                       ld      (ix+1),d
02C8'                        cdix12:
02C8' DD E1                          pop     ix
02CA' C1                             pop     bc              ; restore count & channel
02CB' 0C                             inc     c               ; next channel
02CC' 10 E7                          djnz    cdix11
02CE' C3 02F1'                       jp      shstat 02D1'                        ctcmd:
02D1' 21 0000#                       ld      hl,inahi        ; clear the rate records
02D4' 06 04                          ld      b,4
02D6'                        ctcmd1:
```

TABLE I

```
0206'  36 00              ld     (hl),e
0208'  23                 inc    hl
0209' 10 FB               djnz   ctcmd1

020B' C3 0340'            jp     sdefs2

;cxcmd:
                  ;       ld     hl,0
                  ;       ld     (pumins),hl    ; clear the power off timer
                  ;       jp     sdefs2

02DE'             crcmd:
02DE' 21 0000#            ld     hl,maxrat      ; new max rate value
02E1' 18 03               jr     cicmd1
02E3'             cicmd:
02E3' 21 0000#            ld     hl,inarat      ; new inactive rate value
02E6'             cicmd1:
02E6' FE 01               cp     1
02E8' C2 0340'            jp     nz,sdefs2      ; show the reading
02EB' 73                  ld     (hl),e         ; place the new value
02EC' 23                  inc    hl
02ED' 72                  ld     (hl),d
02EE' C3 0340'            jp     sdefs2
02F1'             shstat:                        ; show all default & rate values
                  global shstat
02F1' 21 0000#            ld     hl,bflohi      ; point to the base data
02F4' 11 2000             ld     de,maxchans*256 ; assume show all
02F7' 3A 0000#            ld     a,(parmcnt)    ; get the # of parms
02FA' B7                  or     a
02FB' 28 0C               jr     z,shistat      ; z, show all 02FD' FD 56 01            ld     d,(iy+1)
0300' FD 5E 00            ld     e,(iy)         ; get the start channel & count 0303' 4B                  ld     c,e            ; compute record position
0304' 06 25               ld     b,booksz
0306' ED 4C               mlt    bc
0308' 09                  add    hl,bc
0309'             shistat:
                  global shistat
0309' E5                  push   hl
030A' 21 0537'            ld     hl,cheader
030D' CD 0000#            call   pstrng
0310' E1                  pop    hl
0311' 1C                  inc    e              ; base the display from 1 not 0
0312'             sdefs1:
                  global sdefs1
0312' CD 0000#            call   crlf
0315' 7B                  ld     a,e            ; get the channel number
0316' CD 0000#            call   adsdc          ; show it in decimal 0319' 3E 2D               ld     a,'-'          ; separate with -
031B' CD 0000#            call   putchar 031E' 06 02               ld     b,2            ; 2 rates, 2 bytes
0320' CD 0494'            call   shodch 0323' 01 0100             ld     bc,100h        ; flow percent byte
0326' CD 048C'            call   shcdca 0329' 01 07FF             ld     bc,7ffh        ; 7 - 3 digit values
032C' CD 048C'            call   shcdca          ;

032F' 01 0100             ld     bc,100h        ; 1 group # 2 digits
0332' CD 048C'            call   shcdca          ;

0335' 06 01               ld     b,1            ; 1 - 2 byte group time
0337' CD 0493'            call   shcdch
```

TABLE I

```
033A'  CD 0020#              call    pause        ; check for ctrl s or x
033D'  38 1F                 jr      c,sdefsx     ; carry, quit 033F'  1C                    inc     e
0340'  01 0016               ld      bc,flohi     ; next record
0343'  09                    add     hl,bc 0344'  15                    dec     d            ; more to go ?
0345'  20 C8                 jr      nz,sdefs1    ; z, nope 0347'  3A 0000#              ld      a,(parmcnt)  ; showing channels only ?
034A'  B7                    or      a
034B'  20 11                 jr      nz,sdefsx    ; nz, yes
034D'             sdefs2:
034D'  CD 0000#              call    crlf         ; start a new line
0350'  21 0000#              ld      hl,inarat    ; show flow rate values
0353'  06 06                 ld      b,6          ; 6 rates to show
0355'  CD 049A'              call    shodch       ; 2 byte values 0358'  21 056D'              ld      hl,cfooter
035B'             sdefx1:
035B'  CD 0000#              call    pstrng
035E'             sdefsx:
035E'  FD E1                 pop     iy
0360'  FD E1                 pop     iy
0362'  C9                    ret
                  ; sho5hl  Show hl as 5 decimal digits
0363'             sho5hl:
                    global sho5hl
0363'  CD 0000#              call    hlbcd
0366'  E5                    push    hl
0367'  65                    ld      h,l
0368'  6F                    ld      l,a
0369'  F1                    pop     af
036A'  E6 0F                 and     15
036C'  C6 30                 add     a,30h
036E'  CD 0000#              call    putchar
0371'  C3 0000#              jp      hldshx ; books sends time, total flow/time data, and channel by
                  ;       channel data.
                  ;
                  ; unitem, strtdwn, unitno, book, dwnsize
                  ; blstr 3, blstp 3, bautc 2, bovrc 2, bsyrc 2, bautf 2, bovrf 2,
                  ; bfait 1, bovrt 1, bflohi 2, bflov 2, bflper 1,
                  ; bdwel 1, bsokv 1, bopen 1, bshut 1, bfaiv 1, bovrv 1, bsyrv 1,
                  ; bgrup 1, bgrupt 2, inarat 2, maxrat 2,
                  ; currat 2, avgrat, hprate 2, inahi 2, actlo 2, acthi 2,
                  ; altflo 4, ovrftot 4, offltot 4, floina 4, flototal 4, astop 3
                  ;
0374'             books:
                    global books
0374'  38 2F                 jr      c,books0     ; carry = 0 parms, zero = 1, nz = more 0376'  3A 0002#              ld      a,(parm1)    ; get the channel #
0379'  CD 0000#              call    bcdbin
037C'  3D                    dec     a            ; convert base 1 to 0
037D'  FE 20                 cp      maxchans     ; in range
037F'  D2 0000#              jp      nc,monerr    ; nc, out of range 0382'  5F                    ld      e,a          ; starting channel
0383'  16 01                 ld      d,1          ; show 1
0385'  3A 0000#              ld      a,(parmcnt)  ; check for parms
0388'  FE 01                 cp      1            ; only 1 ?
038A'  28 0D                 jr      z,book01     ; z, yes, show 1 channel 038C'  3A 0000#              ld      a,(parm2)    ; get the ending station
038F'  CD 0000#              call    bcdbin
0392'  93                    sub     e            ; compute the # of stations
0393'  FE 21                 cp      maxchans+1   ; check the range
```

TABLE I

```
0395' D2 0399'                   jp      nc,book01       ; nc, show one

0398' 57                         ld      d,a             ; show the proper count
0399'              book01:
0399' 4B                         ld      c,e             ; compute record position
039A' 06 25                      ld      b,booksz
039C' ED 4C                      mlt     bc
039E' 21 0000#                   ld      hl,book         ; from start of book
03A1' 09                         add     hl,bc
03A2' 1C                         inc     e
03A3' 18 0C                      jr      books1
03A5'              books0:
                  global books0
03A5' 1A                         ld      a,(de)          ; get the non delim
03A6' FE 53                      cp      'S'             ; is it an S ?
03A8' 28 59                      jr      z,books3        ; z, yes, show only system values 03AA' 16 20                      ld      d,maxchans      ; show maxchans records
03AC' 1E 01                      ld      e,1             ; starting with #1

03AE' 21 0000#                   ld      hl,book         ; point to the data
03B1'              books1:
                  global books1
03B1' CD 0000#                   call    crlf            ; start with a new line
03B4' 3A 0000#                   ld      a,(unitno)
03B7' CD 0000#                   call    adsdc
03BA' E5                         push    hl
03BB' 21 058F'                   ld      hl,bheader      ; print the explanations
03BE' CD 0000#                   call    pstrng
03C1' E1                         pop     hl
03C2'              books2:
03C2' CD 0000#                   call    pause           ; check for exit or wait
03C5' D8                         ret     c               ; carry exit 03C6' CD 0000#                   call    crlf            ; start a new line
03C9' 7B                         ld      a,e             ; get the channel #
03CA' CD 0000#                   call    adsdc           ; show it in decimal 03CD' 3E 2D                      ld      a,'-'           ; separate with -
03CF' CD 0000#                   call    putchar 03D2' 06 03                      ld      b,3             ; 3 byte start & stop,times
03D4' CD 046D'                   call    showasc
03D7' 0E 02                      ld      c,3-1           ; 3 more fields at 3 bytes
03D9' CD 0462'                   call    shocnt 03DC' 06 02                      ld      b,2             ; 2 for syringe seconds
03DE' CD 0468'                   call    showcma 03E1' 06 03                      ld      b,flsz          ; use field size for flow counts
03E3' CD 0468'                   call    showcma         ; 2 fields at this size
03E6' CD 0468'                   call    showcma 03E9' 01 02FF                    ld      bc,2ffh         ; 1 for accum & ovr timeouts
03EC' CD 04BC'                   call    shcdca          ; binary to bcd notation 03EF' 06 02                      ld      b,2             ; two flow values
03F1' CD 0493'                   call    shcdch          ; w/ leading comma 03F4' 15                         dec     d               ; more to go ?
03F5' 28 0C                      jr      z,books3        ; z, nope 03F7' 1C                         inc     e               ; next record #
03F8' 01 000B                    ld      bc,booksz-flper ; offset to next record
03FB' 09                         add     hl,bc
03FC' 18 C4                      jr      books2

03FE' 3A 0000#                   ld      a,(parmcnt)     ; don't show sys for
0401' B7                         or      a               ; station only
0402' C0                         ret     nz
0403'              books3:
```

TABLE I

```
0403' CD 0000#              call    pause           ; check for ^S or ^X
0406' D8                    ret     c               ; c, quit 0407' CD 0000#              call    crlf            ; start a new line
040A' CD 047E'              call    shodate         ; show the current date
040D' 06 02                 ld      b,2
040F' 21 0000#              ld      hl,tmins        ; and time
0412' CD 0468'              call    showcma
0415' 3E 2E                 ld      a,'.'
0417' CD 0000#              call    putchar
047B' E1                    pop     hl
047C' C1                    pop     bc
047D' C9                    ret 047E'           shodate:
047E' 21 0000#              ld      hl,tyear
0481' 7E                    ld      a,(hl)
0482' CD 0000#              call    adshx
0485' CD 0488'              call    shot
0488'           shot:
0488' 3E 2F                 ld      a,'/'
048A' CD 0000#              call    putchar
048D' 2B                    dec     hl
048E' 7E                    ld      a,(hl)
048F' CD 0000#              call    adshx
0492' C9                    ret 0493'           shcdch:                             ; show decimal with leading comma
                global shcdch
0493' F5                    push    af
0494' 3E 2C                 ld      a,','
0496' CD 0000#              call    putchar
0499' F1                    pop     af
049A'           shcdch:                             ; show hl as 4 decimal digits
                global shcdch
049A' F5                    push    af
049B' C5                    push    bc
049C' 4E                    ld      c,(hl)          ; get the binary value
049D' 23                    inc     hl
049E' 46                    ld      b,(hl)
049F' 23                    inc     hl
04A0' E5                    push    hl              ; save the pointer 04A1' 21 272F               ld      hl,9999         ; check the range
04A4' B7                    or      a
04A5' ED 42                 sbc     hl,bc
04A7' 21 270F               ld      hl,9999         ; assume overflow
04AA' 38 02                 jr      c,shdcyes       ; c, overflow 04AC' 60                    ld      h,b
04AD' 69                    ld      l,c
04AE'           shdcyes:
04AE' CD 0000#              call    hlbcd           ; convert binary to bcd
04B1' 65                    ld      h,l
04B2' 6F                    ld      l,a
04B3' CD 0000#              call    hldshx          ; the digits 04B6' E1                    pop     hl
04B7' C1                    pop     bc
04B8' F1                    pop     af
04B9' 10 D8                 djnz    shcdch 04BB' C9                    ret 04BC'           shcdca:
                global shcdca
04BC' F5                    push    af
04BD' 3E 2C                 ld      a,','
04BF' CD 0000#              call    putchar
04C2' F1                    pop     af
```

TABLE I

```
041A'  3A 0000#              ld      a,(tsecs)
041D'  CD 0000#              call    adshx 0420'  21 0000#              ld      hl,omins        ; show the open time
0423'  CD 0468'              call    showcma
0426'  21 0000#              ld      hl,cmins        ; and close time
0429'  CD 0468'              call    showcma
042C'  21 0000#              ld      hl,ymins        ; and close time
042F'  CD 0468'              call    showcma 0432'  21 0000#              ld      hl,pupmin       ; show the power out minutes
0435'  06 03                 ld      b,3             ; pupmin is 6 digits decimal
0437'  CD 0468'              call    showcma
043A'  21 0000#              ld      hl,pupcnt       ; show the power out count
043D'  06 02                 ld      b,2             ; pupcnt is 4 digits decimal
043F'  CD 0468'              call    showcma 0442'          books4:
0442'  21 0000#              ld      hl,inarat       ; flow rates are next
0445'  06 04                 ld      b,4             ; show 4 values
0447'  CD 0493'              call    shocch          ; with leading commas 044A'  CD 0000#              call    crlf            ; new line 044D'  21 0000#              ld      hl,inahi        ; skip to inactive rate
0450'  06 02                 ld      b,2             ; finish the rates
0452'  CD 049A'              call    shocch          ; w/ no leading comma 0455'  06 05                 ld      b,fltsz         ; 4 grand total flows
0457'  0E 04                 ld      c,5-1           ; 4 values
0459'  CD 0462'              call    shocnt 045C'  21 0502'              ld      hl,bfooter
045F'  C3 0000#              jp      pstrng 0462'          shocnt:         ; use 1 less than desired count, for fall through
                global shocnt
0462'  CD 0468'              call    showcma
0465'  0D                    dec     c
0466'  20 FA                 jr      nz,shocnt 0468'          showcma:
                global showcma
0468'  3E 2C                 ld      a,','
046A'  CD 0000#              call    putchar
               ; showasc prints b bytes @ hl as acsii hex values
046D'          showasc:
                global showasc
046D'  C5                    push    bc
046E'  48                    ld      c,b
046F'          showa1:
046F'  23                    inc     hl
0470'  0D                    dec     c
0471'  20 FC                 jr      nz,showa1

0473'  E5                    push    hl
0474'          showa2:
0474'  2B                    dec     hl
0475'  7E                    ld      a,(hl)
0476'  CD 0000#              call    adshx
0479'  10 F9                 djnz    showa2

04C3'          shodca:
                global shodca              ; show one byte at hl as decimal
04C3'  F5                    push    af
04C4'  7E                    ld      a,(hl)        ; get the byte
04C5'  23                    inc     hl            ; point to next
04C6'  E5                    push    hl
04C7'  6F                    ld      l,a
04C8'  CD 0000#              call    lbcd          ; convert to decimal
```

TABLE I

```
04CB'  67              ld      h,a              ; save the low chars
04CC'  CB 41           bit     0,c              ; 2 chars or 3 ?
04CE'  28 08           jr      z,shdcax         ; only 2

04D0'  7D              ld      a,l
04D1'  E6 0F           and     15               ; make it ascii
04D3'  F6 30           or      30h
04D5'  CD 0000#        call    putchar
04D8'          shdcax:
04D8'  7C              ld      a,h              ; get the low byte
04D9'  CD 0000#        call    adshx            ; show it
04DC'  E1              pop     hl
04DD'  F1              pop     af
04DE'  10 DC           djnz    shdca            ; show another 04E0'  C9              ret ; chrest Resets bit # in a of word at ix. Range 1- maxchans,
                ;        carry on out of range.
04E1'          chrest:
                global chrest
04E1'  CD 0020#        call    bcdbin           ; convert to binary
04E4'  2A FFFF#        ld      hl,(lstchn-1)    ; get the last channel #
04E7'  24              inc     h
04E8'  24              inc     h
04E9'  BC              cp      h                ; check range
04EA'  D0              ret     nc 04EB'  3D              dec     a                ; 1 - maxchans to 0 - lstchn
04EC'  F8              ret     m                ; minus is out of range 04ED'  6F              ld      l,a
04EE'  E5              push    hl               ; put channel # on stack
04EF'  21 0000         ld      hl,0
04F2'  39              add     hl,sp            ; point to it
04F3'  CD 0000#        call    prtbit           ; get the bit mask in d
04F6'  E1              pop     hl 04F7'  4F              ld      c,a              ; and byte # in a
04F8'  06 00           ld      b,0
04FA'  DD 09           add     ix,bc 04FC'  7A              ld      a,d
04FD'  2F              cpl                      ; reverse the mask
04FE'  DD A6 00        and     (ix+0)           ; turn off the bit
0501'  DD 77 00        ld      (ix+0),a
0504'  37              scf
0505'  C9              ret 0506'          ctable:
0506'  50              defb    'P'
0507'  0240'           defw    cpcmd
0509'  47              defb    'G'
050A'  0256'           defw    cgcmd
050C'  44              defb    'D'
050D'  025F'           defw    cdcmd
050F'  4F              defb    'O'
0510'  0271'           defw    cocmd
0512'  48              defb    'H'
0513'  027A'           defw    chcmd
0515'  59              defb    'Y'
0516'  0295'           defw    cycmd
0518'  46              defb    'F'
0519'  029E'           defw    cfcmd
051B'  49              defb    'I'
051C'  02E3'           defw    cicmd
051E'  52              defb    'R'
051F'  020E'           defw    crcmd
0521'  43              defb    'C'
0522'  0228'           defw    cccmd
0524'  54              defb    'T'
```

TABLE I

```
0525' 0201'                    defw    ctcmd
0527' 4D                       defb    'M'
0528' 021C'                    defw    cmcmd
052A' 53                       defb    'S'
052B' 0263'                    defw    cscmd
052D' 41                       defb    'A'
052E' 0283'                    defw    cacmd
0530' 56                       defb    'V'
0531' 028C'                    defw    cvcmd
                       ;       defb    'X'
                       ;       defw    cxcmd
0533' 5A                       defb    'Z'
0534' 0225'                    defw    czcmd
0536' 00                       defb    0
0537'                  cheader:
0537' 0D 0A 23 23              defb    cr,lf,'## FLHI FLMX FP  DW  SC  OP  SH  AV  OV SY SRP GRPT',0
                        ;...  .... ....  ..  ... ... ... ... ... ... ... .. ....

056D'                  cfooter:
056D' 0D 0A 46 4C              defb    cr,lf,'FLMI FLMS INST AVRG IAHI ACHI',cr,lf,0 ; POUT',CR,LF,0
                        ;.... .... .... .... .... ....  ;  .....

058F'                  bheader:
058F' 20 20 53 54              defb    '  START   STOP    AUTT  OVRT SYRT '
                               rept    2*flsz-4                , adjust for flow field size
                                  defb    20h
                               endm
05B1' 20               A       defb    20h
05B2' 20               A       defb    20h
05B3' 41 55 54 46              defb    'AUTF '
                               rept    2*flsz-4                ; adjust for flow field size
                                  defb    20h
                               endm
05B8' 20               A       defb    20h
05B9' 20               A       defb    20h
05BA' 4F 56 52 46              defb    'OVRF  AT  OT FLHI FLMX',0,'$'
                        ;......  ......  .... ....  ....  ....  .... ..  .... ....

05D2'                  bfooter:
05D2' 0D 0A 20 20              defb    cr,lf,'   DATE   TIME OPEN CLOS SYRN  POMIN POCN FLHI FLMS INST
0613' 0D 0A 49 41              defb    cr,lf,'IAHI ACHI CNTS-AUTO   -OVERIDE   -OFFLINE'
063F' 20 20 2D 49              defb    '   -INACTIVE   -TOTAL',0
                        ;........  ........ .... .... .... ...... .... .... .... ....

;....  ....  ..........  ..........  .........
                        ;  ...........  ..........
                               end
  0 Error(s) Detected.  1622 Program Bytes.
516 Symbols Detected.
                               .list
                               .z80 global  setime, rdtime
                               global  rdtims external timmsg, buffin, inbuf, inbcnt, tbuf
                               external ssecs, smins, syear, tsecs, tmins, tyear
                               external swwrite, swread, pstrng, pascii, crlf, suberr
                               external adshx, putchar, clkupdate, parms, monerr
                               external cmins, omins, cntdec, parmcnt, parml, delim
                               external hldshx, ymins, opday0, opday1, clwks1, clockdif 0000'                  setime:
0000' D9                       exx
0001' 06 00                    ld      b,0             ; clear the display flag
0003' D9                       exx
0004' 62                       ld      h,d             ; duplicate pointer in hl
0005' 6B                       ld      l,e
0006' CA 0093'                 jp      z,etime         ; parms, set the clock
```

TABLE I

```
0009' 1A                  ld      a,(de)
000A' FE 41               cp      'A'             ; check for alpha
000C' 38 01               jr      c,set1

000E' 23                  inc     hl
000F'           set1:
000F' B7                  or      a
0010' CA 00A3'            jp      z,stime         ; zero no parms or alpha 0013' CD 0000#            call    parms           ; check for parms
0016' 3A 0000#            ld      a,(parmcnt)
0019' FE 01               cp      1               ; parameters ?
001B' 1A                  ld      a,(de)          ; get the secondary command
001C' 30 25               jr      nc,stptim       ; nc, parms, update the time
001E'           tsho:
001E' 2A 0000#            ld      hl,(cmins)      ; get the old stop time
0021' E6 5F               and     5fh             ; convert to upper
0023' FE 50               cp      'P'             ; stop time ?
0025' 28 16               jr      z,shoit         ; no, check start time 0027' 2A 0000#            ld      hl,(omins)      ; get the old start time
002A' FE 53               cp      'S'             ; start time ?
002C' 28 0F               jr      z,shoit         ; no check short time 002E' 2A 0000#            ld      hl,(ymins)      ; get the old syringe time
0031' FE 59               cp      'Y'             ; syringe time ?
0033' 28 08               jr      z,shoit         ; no check short time 0035' 2A 0000#            ld      hl,(tmins)      ; get the time
0038' FE 54               cp      'T'             ; short set ?
003A' C2 0111'            jp      nz,scalendar    ; no, check calendar
003D'           shoit:                            ; sho the time
003D' CD 0000#            call    hldshx
0040' C3 0000#            jp      crlf            ; return with a line feed 0043'           stptim:
0043' FE 43               cp      'C'             ; set the calendar ?
0045' CA 0182'            jp      z,setcalendar   ; z, yes
0048' ED 5B 0000#         ld      de,(parm1)      ; get parm1 in de
004C' 21 2359             ld      hl,2359h
004F' E6 5F               and     5fh             ; convert sub cmd to upper
0051' ED 52               sbc     hl,de
0053' DA 0000#            jp      c,suberr        ; nc, too big, error out ex      de,hl           ; parm in hl
0056' EB                  cp      'P'             ; stop time ?
0057' FE 50               jr      nz,strtim       ; no, check start time
0059' 20 04

005B' 22 0000#            ld      (cmins),hl      ; update the stop time
005E' C9                  ret
005F'           strtim:
005F' FE 53               cp      'S'             ; start time ?
0061' 20 04               jr      nz,syrtim       ; no check syringe time 0063' 22 0000#            ld      (omins),hl      ; update the start time
0066' C9                  ret
0067'           syrtim:
0067' FE 59               cp      'Y'             ; syringe time ?
0069' 20 04               jr      nz,ttime        ; no check short time 006B' 22 0000#            ld      (ymins),hl      ; update the syringe time
006E' C9                  ret
006F'           ttime:
006F' D6 54               sub     'T'             ; short set
0071' C2 0000#            jp      nz,monerr       ; no, must be error ; set up 1 second to min change
0074' 3E 58               ld      a,58h           ; move time into settime
0076' 11 0000#            ld      de,ssecs
0079' F3                  di
007A' 12                  ld      (de),a
```

TABLE I

```
007B'  21 0000#            ld      hl,tmins
007E'  13                  inc     de
007F'  01 0006             ld      bc,6
0082'  ED B0               ldir 0084'  2A 0000#            ld      hl,(parm1)      ; get the new value
0087'  11 0001             ld      de,1
008A'  CD 0000#            call    clockdif
008D'  22 0000#            ld      (smins),hl
0090'  FB                  ei
0091'  18 43               jr      sturt           ; go set the clock
0093'              etime:
0093'  CD 0000#            call    delim           ; discard delimiters
0096'  CD 0000#            call    cntdec          ; check the string
0099'  FE 0E               cp      14              ; check for 14 chars
009B'  21 022E'            ld      hl,clkerr
009E'  C2 0000#            jp      nz,pstrng       ; nz, wrong count 00A1'  18 1C               jr      st03            ; load the new time
00A3'              stime:
00A3'  D9                  exx
00A4'  06 FF               ld      b,-1            ; set the display flag
00A6'  D9                  exx
00A7'  21 0000#            ld      hl,timmsg       ; print the message
00AA'  CD 0000#            call    pstrng 00AD'  CD 0000#            call    buffin          ; get the time
00B0'  3A 0000#            ld      a,(inbcnt)
00B3'  FE 0E               cp      14              ; check for 14 chars
00B5'  21 022E'            ld      hl,clkerr
00B8'  C2 0000#            jp      nz,pstrng       ; nz, wrong count 00BB'  F3                  di                      ; do not disturb
00BC'  11 0000#            ld      de,inbuf
00BF'              st03:
00BF'  21 0000#            ld      hl,tbuf
00C2'  4F                  ld      c,a             ; setup the count
00C3'  06 00               ld      b,0             ; pack data at tbuf
00C5'  CD 0000#            call    pascii 00C8'  21 0000#            ld      hl,tbuf         ; turn the string around
00CB'  11 0000#            ld      de,syear        ; into setting buffer'
00CE'  06 07               ld      b,7
00D0'              setl01:
00D0'  7E                  ld      a,(hl)
00D1'  12                  ld      (de),a
00D2'  1B                  dec     de
00D3'  23                  inc     hl
00D4'  10 FA               djnz    setl01
00D6'              sturt:
00D6'  D9                  exx                     ; get the display flag
00D7'  78                  ld      a,b
00D8'  D9                  exx
00D9'  B7                  or      a               ; display ?
00DA'  F5                  push    af              ; save the flag
00DB'  F3                  di                      ; hold off interrupts for
00DC'  CD 0000#            call    swrite          ; smart watch access 00DF'  F3                  di                      ; ensure no interrupts
00E0'  21 FFFF             ld      hl,-1           ; force a clock update
00E3'  22 0000#            ld      (tsecs),hl
00E6'  CD 0000#            call    clkupdate       ; update the clock
00E9'  FB                  ei 00EA'  F1                  pop     af              ; restore the flag
00EB'  C8                  ret     z               ; z, no display 00EC'              rdtim1:
00EC'  21 0217'            ld      hl,tstrng
00EF'  CD 0000#            call    pstrng
```

TABLE I

```
00F2'                   rdtime:
00F2' 21 0000#                  ld      hl,tyear        ; point to the buffer
00F5' 06 07                     ld      b,7
00F7'                   rdti01:
00F7' 7E                        ld      a,(hl)          ; get a byte
00F8' 2B                        dec     hl              ; point to the next
00F9' CD 0000#                  call    acshx           ; print it as ascii
00FC' 3E 20                     ld      a,' '           ; separate with spaces
00FE' CD 0000#                  call    putchar
0101' 10 F4                     djnz    rdti01

0103' AF                        xor     a
0104' 32 0000#                  ld      (inbuf),a       ; clear the input buffer 0107' C3 0000#                  jp      crlf 010A'                   rdtime:
010A' F3                        di                      ; do not disturb the read
010B' CD 0000#                  call    clkupdate       ; update the clock
010E' FB                        ei
010F' 18 D8                     jr      rdtim1          ; display results ; scalendar  display position of today,
                        ;       display the old calendar reading,
                        ;       await a new setting
0111'                   scalendar:
                        global scalendar
0111' FE 43                     cp      'C'             ; correct option
0113' C2 0000#                  jp      nz,monerr 0116' 21 01B3'                  ld      hl,wklgnd       ; explain
0119' CD 0000#                  call    pstrng
011C' CD 0000#                  call    clmsk           ; get the mask and offset
                                                        ;  a = bit mask, hl = week # 1/2
011F' 07                        rlca                    ; bit 7 is don't care
0120' 4F                        ld      c,a             ; mask in c
0121' CB 45                     bit     0,l             ; is l odd or even
0123' 28 06                     jr      z,evenwk        ; z, its even 0125' 21 01F8'                  ld      hl,spcdout      ; send some spaces
0128' CD 0000#                  call    pstrng
012B'                   evenwk:
012B' 3E 20                     ld      a,' '           ; fill to the bit
012D' 06 08                     ld      b,8             ; don't get carried away
012F'                   daysho:
012F' CB 01                     rlc     c               ; find the bit
0131' 38 06                     jr      c,prnt1         ; c, found it 0133' CD 0000#                  call    putchar
0136' 10 F7                     djnz    daysho 0138' C3 0000#                  jp      monerr          ; error out
013B'                   prnt1:
013B' 3E 31                     ld      a,'1'
013D' CD 0000#                  call    putchar         ; send a one
0140' CD 0187'                  call    showeek         ; show the current setting 0143' CD 0000#                  call    buffin          ; get the new setting
0146' 3A 0000#                  ld      a,(inbcnt)
0149' B7                        or      a
014A' C8                        ret     z               ; z, no input quit 014B' 21 0000#                  ld      hl,inbuf        ; point to the input buffer
014E'                   setweek:
                        global setweek
014E' DD 21 0000#                ld     ix,opday0       ; do the first week
0152' CD 0000#                  call    delim           ; discard leading delimiters
0155' C8                        ret     z               ; z, no more to do
0156' CD 0161'                  call    wkshft          ; load the new setting
```

TABLE I

```
0159' CD 0000#              call    delim          ; discard leading delimiters
015C' C8                    ret     z              ; z, no more to do 015D' DD 21 0000#            ld     ix,opday1      ; do the second week ; wkshft  Shift week data at hl into (ix+0)
                    ;         stops at first non binary ascii data
                    ;         exits with hl-> to next byte
0161'               wkshft:
0161' C5                    push    bc
0162' DD 4E 00              ld      c,(ix+0)
0165' CB 01                 rlc     c              ; skip the high bit
0167' 06 07                 ld      b,7
0169'               wkcirc:
0169' 7E                    ld      a,(hl)         ; get the input
016A' D6 30                 sub     '0'
016C' 38 0B                 jr      c,clnup        ; c, out of range 016E' FE 02                 cp      2
0170' 30 07                 jr      nc,clnup       ; nc, out of range 0172' 0F                    rrca                   ; shift the bit into carry
0173' CB 11                 rl      c              ; and into the week mask
0175' B7                    or      a              ; clear carry
0176' 23                    inc     hl             ; next bit
0177' 10 F0                 djnz    wkcirc         ; loop for all the bits
0179'               clnup:
0179' CB 01                 rlc     c              ; finish the rotation
017A' 10 FC                 djnz    clnup 017D' DD 71 00              ld      (ix+0),c
0180' C1                    pop     bc
0181' C9                    ret ; setcalendar  load new setting into opday0 & 1,
                    ;              display new setting
                    ;
                    ;              de -> to secondary command
0182'               setcalendar:
                    global setcalendar
0182' EB                    ex      de,hl
0183' 23                    inc     hl
0184' CD 014E'              call    setweek        ; load the new data
                    ; fall into showeek
                    ; showeek display the week legend and the week settings - on/off
0187'               showeek:
                    global showeek
0187' 21 0202'              ld      hl,wkdays      ; print the map
018A' CD 0000#              call    pstrng 018D' 3A 0000#              ld      a,(opday0)     ; show the bits
0190' 07                    rlca                   ; bit 7 is don't care
0191' 06 07                 ld      b,7            ; just show seven bits
0193' CD 01A5'              call    bitout 0196' 3E 20                 ld      a,' '
0198' CD 0000#              call    putchar        ; add a space
019B' 3A 0000#              ld      a,(opday1)     ; show the bits
019E' 07                    rlca                   ; bit 7 is don't care
019F' CD 01A5'              call    bitout
01A2' C3 0000#              jp      crlf ; bitout  send b hi bits of a as ascii 1's & 0's
01A5'               bitout:
                    global bitout
01A5' C5                    push    bc
01A6' 4F                    ld      c,a
01A7'               bitloop:
01A7' AF                    xor     a
01A8' CB 01                 rlc     c              ; shift bits into carry
01AA' CE 30                 adc     a,'0'          ; make the 1 or 0 ascii
01AC' CD 0000#              call    putchar
```

TABLE I

```
01AF' 10 F6                    djnz    bitloop         ; loop again

01B1' C1                       pop     bc
01B2' C9                       ret

01B3' 0D 0A 31 20      wklgnd: db      cr,lf,'1 Appears above today. '
01CC' 45 6E 74 65              db      'Enter 1 below water days, 0 for no water',cr,lf,0,'$'
01F8' 20 20 20 20      spcdout: defb   '         ',0,'$'
0202' 0D 0A 4D 54      wkdays: defb    cr,lf,'MTWTFSS MTWTFSS',CR,LF,0,'$'
0217'
0217'                  tstrng:
0217' 20 20 59 72              db      ' YrMoDaWdHrMiSe - ',0,'$'

022E'                  clkerr:
022E' 0D 0A 07 20              db      cr,lf,bell,'  Must enter EXACTLY 14 characters !',cr,lf,0,'$' end
     0 Error(s) Detected.   622 Program Bytes.
   438 Symbols Detected.
                       .z80
                       .LIST ; extracted from monitr as development only tools.  Set the
                       ;       finished equate false to assemble this code FFFF         1       if not finished  ; development tool
                       1
                       1       external paschx, putchar, suberr, buffin
                       1       external hldshx, adshx, crlf, dispregs
                       1
                       1       external inbuf, inbcnt, delimd, parm1, parm2, parm3, parm4
                       1       external cldstk, spdat, goadr, subadr, jmprou
                       1       external regmsg, afmsg, afdat, bcdat, dedat, hldat
                       1       external affdt, bccdt, deedt, hlldt, ixdat, iydat
                       1       page 64
                       1   ; go transfers control to the address in goadr unless G is followed
                       1   ;       by a parameter, in which case the parameter is loaded into
                       1   ;       goadr first. The code executed acts like a subroutine in that
                       1   ;       a ret encountered with proper stack phasing will transfer
                       1   ;       control back to the monitor.
                       1   ;       More than 1 parameter will cause an error return
0000'                  1   go:
                       1       global go
0000' 38 09            1       jr      c,go01          ; no parameter use the last address
                       1
0002' C2 0000#         1       jp      nz,suberr       ; more than 1 parm is illegal
                       1
0005' 2A 0000#         1       ld      hl,(parm1)
0008' 22 0000#         1       ld      (goadr),hl      ; load the new parm
000B'                  1   go01:
000B' 2A 0000#         1       ld      hl,(goadr)      ; get the jump target
000E' 22 0001#         1       ld      (jmprou+1),hl   ; load the jmp vector
0011' 3E C3            1       ld      a,0c3h
0013' 32 0000#         1       ld      (jmprou),a      ; and instruction
                       1
0016' 2A 0000#         1       ld      hl,(hldat)      ; put the registers in their places
0019' ED 5B 0000#      1       ld      de,(dedat)
001D' ED 4B 0000#      1       ld      bc,(bcdat)
                       1
0021' D9               1       exx                     ; include ' registers
0022' ED 5B 0000#      1       ld      de,(deedt)
0026' ED 4B 0000#      1       ld      bc,(bccdt)
                       1
002A' 2A 0000#         1       ld      hl,(afdat)
002D' E5               1       push    hl
002E' F1               1       pop     af
                       1
002F' 08               1       ex      af,af'
```

TABLE I

```
0030'  2A 0000#      1        ld     hl,(affdt)
0033'  E5            1        push   hl
0034'  F1            1        pop    af
0035'  08            1        ex     af,af'
                     1
0036'  DD 2A 0000#   1        ld     ix,(ixdat)      ; and index registers
003A'  FD 2A 0000#   1        ld     iy,(iydat)
                     1
003E'  2A 0000#      1        ld     hl,(hlldt)      ; restore hl
0041'  D9            1        exx
                     1
0042'  ED 73 0000#   1        ld     (oldstk),sp     ; save the sp 0046'  ED 7B 0000#   1        ld     sp,(spdat)      ; load the test sp
                     1
004A'  CD 0000#      1        call   jmprou          ; go there
                     1
004D'  ED 73 0000#   1        ld     (spdat),sp      ; save the sp
0051'  ED 7B 0000#   1        ld     sp,(oldstk)     ; get the original
0055'  C3 0000#      1        jp     dispregs 1   ; movmem moves a memory block to another address,
                     1   ;        tests for move direction to prevent data destruction
0058'                1   movmem:
                     1     global movmem
0058'  FE 02         1        cp     2                ; need 3 parms
005A'  37            1        scf                     ; set carry for error return
005B'  C0            1        ret    nz
                     1
005C'  2A 0000#      1        ld     hl,(parm2)       ; hl = stop address
005F'  E5            1        push   hl               ; save stop
0060'  ED 5B 0000#   1        ld     de,(parm1)       ; de = start address
0064'  ED 4B 0000#   1        ld     bc,(parm3)       ; bc = target address
0068'  B7            1        or     a                ; clear carry
0069'  ED 52         1        sbc    hl,de            ; compute the block size
006B'  E3            1        ex     (sp),hl          ; swap size/stop
006C'  EB            1        ex     de,hl            ; de = stop/hl = start
006D'  E5            1        push   hl               ; stack= size, start
006E'  B7            1        or     a
006F'  ED 42         1        sbc    hl,bc            ; who's first
0071'  E1            1        pop    hl               ; hl = start (sp) = size
0072'  38 08         1        jr     c,moveup         ; c, source is lower
                     1
0074'  C5            1        push   bc
0075'  D1            1        pop    de               ; de = target, discard stop
0076'  C1            1        pop    bc               ; bc = size
0077'  03            1        inc    bc               ; correct for last byte
0078'  ED B0         1        ldir                    ; move the block down
007A'  B7            1        or     a                ; no carry return
007B'  C9            1        ret
007C'                1   moveup:
007C'  C5            1        push   bc
007D'  E1            1        pop    hl               ; hl = target, discard start
007E'  C1            1        pop    bc               ; bc = size
007F'  09            1        add    hl,bc            ; compute end of target
0080'  03            1        inc    bc               ; correct for last byte
0081'  EB            1        ex     de,hl            ; de = target/hl = stop
0082'  ED B8         1        lddr                    ; move the block up
                     1
0084'  B7            1        or     a                ; return no carry
0085'  C9            1        ret
                     1
                     1   ; filmem fills a block of memory parm1-parm2 with data parm3
0086'                1   filmem:
                     1     global filmem
0086'  FE 02         1        cp     2                ; need 3 parms
0088'  37            1        scf                     ; set carry for error return
0089'  C0            1        ret    nz
                     1
008A'  2A 0000#      1        ld     hl,(parm2)       ; hl = stop address
```

TABLE I

```
0080' ED 5B 0000#    1           ld      de,(parm1)       ; de = start address
                     1
0091' B7             1           or      a                ; clear carry
0092' ED 52          1           sbc     hl,de            ; compute the block size
0094' D8             1           ret     c                ; c, no loop back allowed
                     1
0095' 37             1           scf
0096' C8             1           ret     z                ; z, another loop back 0097' 3A 0000#       1           ld      a,(parm3)        ; data in a
009A' 12             1           ld      (de),a           ; then @ de
009B' 44             1           ld      b,h              ; size in bc
009C' 4D             1           ld      c,l
009D' 0B             1           dec     bc               ; less 1
009E' 78             1           ld      a,b
009F' B1             1           or      c
00A0' C8             1           ret     z                ; z= 1 byte fill
                     1
00A1' 62             1           ld      h,d              ; source in hl
00A2' 6B             1           ld      l,e
00A3' 13             1           inc     de               ; destination in de
00A4' ED B0          1           ldir                     ; fill the block
00A6' C9             1           ret
                     1
00A7'                1   substitute:
                     1   global substitute
00A7' 2A 0000#       1           ld      hl,(subadr)      ; get the old address
00AA' 38 06          1           jr      c,subsome        ; no parms use old address
                     1
00AC' C2 0000#       1           jp      nz,suberr        ; more than 1 parm is illegal
                     1
00AF' 2A 0000#       1           ld      hl,(parm1)       ; get the new address
00B2'                1   subsome:
                     1   global subsome
00B2' CD 0000#       1           call    crlf             ; start a new line
00B5' 3E 20          1           ld      a,space          ; indent a couple spaces
00B7' CD 0000#       1           call    putchar
00BA' CD 0000#       1           call    putchar
00BD' CD 0000#       1           call    hldshx           ; show the address
00C0' 3E 3D          1           ld      a,'='            ; and address flag
00C2' CD 0000#       1           call    putchar
00C5' 7E             1           ld      a,(hl)           ; get the byte
00C6' CD 0000#       1           call    adshx            ; show it
00C9' 3E 20          1           ld      a,space          ; separate with a space
00CB' CD 0000#       1           call    putchar
00CE' CD 0000#       1           call    buffin           ; get the operator input
00D1' 11 0000#       1           ld      de,inbuf         ; point to the input buffer
00D4' CD 0000#       1           call    delimd           ; discard delimiters
00D7' 28 27          1           jr      z,subso0         ; z, terminator only
                     1
00D9' FE 22          1           cp      '"'              ; ascii input flag ?
00DB' 20 0E          1           jr      nz,subso1        ; nz, nope regular input
                     1
00DD' EB             1           ex      de,hl            ; swap hl,de/src.,dest.
00DE' ED 4B 0000#    1           ld      bc,(inbcnt)      ; get the count
00E2' 06 00          1           ld      b,0
00E4' 23             1           inc     hl               ; step past the "
00E5' 0D             1           dec     c                ; exclude it from the count
00E6' ED B0          1           ldir                     ; move the chars in place
00E8' EB             1           ex      de,hl            ; restore the registers
00E9' 18 16          1           jr      subso2
00EB'                1   subso1:
00EB' E5             1           push    hl               ; save hl
00EC' 21 0000#       1           ld      hl,parm4         ; use parm4 for temporary storage
00EF' CD 0000#       1           call    paschx           ; convert the string
00F2' E1             1           pop     hl
00F3' CA 0000#       1           jp      z,suberr         ; no char converted is an error
                     1
```

TABLE I

```
00F6' CD 0000#     1            call   delimd
00F9' DA 0000#     1            jp     c,suberr      ; non delimiter is an err
                   1
00FC' 3A 0000#     1            ld     a,(parm4)     ; get the new value
00FF' 77           1            ld     (hl),a        ; make the substitution
0100'              1   subsc0:
0100' 23           1            inc    hl            ; next address
0101' 22 0000#     1   subsc2:  ld     (subadr),hl   ; save the new address
0104' 18 AC        1            jr     subsome       ; loop for more
                   1
                       endif end
  0 Error(s) Detected.   262 Program Bytes.
 412 Symbols Detected.

.z80
                   .LIST; ON external solctr, csistart, csisav, getrd6, putchar
           external offl, int200, pstrng, crlf, keytbl, keymsg, rowmsg
           external clkmsg, lbcd, separate, keyval, ilprint global keytst 006A' 23                    inc    hl
006B' 66                    ld     h,(hl)
006C' 6F                    ld     l,a
006D' 19                    add    hl,de          ; add the day of the month
006E' F1                    pop    af             ; get the month
006F' C1                    pop    de
0070' FE 03                 cp     3              ; is it before feb
0072' 38 09                 jr     c,juliex       ; c, yes 0074' 79                    ld     a,c
0075' B7                    or     a
0076' 28 05                 jr     z,juliex       ; turn of century ?
                                                  ; z, yes 0078' E6 03                 and    3              ; is it leap year
007A' 20 01                 jr     nz,juliex      ; nz, nope 007C' 23                    inc    hl             ; add feb 29
007D'           juliex:
007D' F1                    pop    af             ; restore af
007E' C9                    ret 007F' 0000  001F  jultbl: defw 000,031,059,090,120,151,181,212,243,273,304,334
0097'             ;            jan feb mar apr may jun jul aug sep oct nov dec
                  end
  0 Error(s) Detected.   151 Program Bytes.
 17 Symbols Detected.
                   .z80
                   .LIST; ON ; 11-09-88 Added power out time display and clear to error
           ;          display/correction routine.
           ;    drk ; 09-17-88 Separated keytst from monitr.mac as keytst.mac.
           ;    drk ; 12-23-87 Added a routine to display and reset system errors.
           ;          Also added a toggle of SCO mode, the Master Valve output,
           ;          and the Overide output.
           ;    drk
```

TABLE I

```
; rom resident program to allow byte input/output, jump to address,
;       memory dump in hex and ascii, byte substitution in memory
;       and hexfile (intel format) download.
```

|          |              |   |                                                                |
|----------|--------------|---|----------------------------------------------------------------|
| FFFF     |              | 1 | if not finished          ; used in development only            |
|          |              | 1 | external download                                              |
|          |              |   | endif                                                          |
|          |              |   | external restim, solctr, chrest, pwrsho, sdefaults, putime     |
|          |              |   | external keytst, llrest, prtbit, hlbcd, pumins, pucnt, puerbt  |
|          |              |   | external altchan, bocks, host, dspers, syser0, lperbt, finatm  |
|          |              |   | external hexasc, tmins, timdsp, csistart, csisav, stack        |
|          |              |   | external getrd6, getchar, putchar, parms, tblsch               |
|          |              |   | external monparse, cmdbuf, cmdptr, suberr, delim, deliml       |
|          |              |   | external off1, onh, int200                                     |
|          |              |   | external parptr, parmcnt, parm1, parm2, msoldla, hbcbin        |
|          |              |   | external goadr, subadr, dmpadr, target                         |
|          |              |   | external buffin, hldshx, adshxs, adshx, sho5hl                 |
|          |              |   | external pause, pstrng, crlf, ilprint                          |
|          |              |   | external regmsg, afmsg, afdat, bcdat, dedat, hldat             |
|          |              |   | external affdt, bccdt, deedt, hlldt, ixdat, iydat              |
|          |              |   | external prmpt, debexp, monexp, lcdmsg                         |
|          |              |   | external keytbl, keymsg, rowmsg, crtoex                        |
|          |              |   | external clkmsg, lbcd, separate, setime, rdtime                |
|          |              |   | external noupdt, keyval, zzstak                                |
|          |              |   | external oldstk, spdat, msg30, msg38, crcprm, prmcrc           |
| FFFF     |              | 1 | if not finished                                                |
|          |              | 1 | external go, filmem, movmem, substitute                        |
|          |              |   | endif                                                          |
|          |              |   | global monitr, monloop, dsregset, han30, hhan38, mhan38        |
|          |              |   | global disregs, rgdisp                                         |
|          |              |   | global dump, moveon                                            |
|          |              |   | global prompt, explain, lcdisplay                              |
|          |              |   | global repcmd                                                  |

| 0000'    |              | monitr: |         |                 |                                |
| 0000' F3 |              |     | di      |                 |                                |
| 0001' 31 0000# |        |     | ld      | sp,stack        | ; reload the stack pointer     |
| 0004' FB |              |     | ei      |                 |                                |
| 0005' 21 0550' |        |     | ld      | hl,shortins     |                                |
| 0008' CD 0000# |        |     | call    | pstrng          | ; show the short menu          |
|          |              |     |         |                 |                                |
| 000B' AF |              |     | xor     | a               |                                |
| 000C' 32 0000# |        |     | ld      | (cmdbuf),a      | ; clear the command buffer     |
| 000F' 67 |              |     | ld      | h,a             |                                |
| 0010' 6F |              |     | ld      | l,a             |                                |
| 0011' 22 0000# |        |     | ld      | (target),hl     | ; zero the download address    |
| 0014' 22 0000# |        |     | ld      | (goadr),hl      |                                |
| 0017' 22 0000# |        |     | ld      | (subadr),hl     |                                |
| 001A' 22 0000# |        |     | ld      | (dmpadr),hl     |                                |
| 001D' ED 73 0000# |     |     | ld      | (oldstk),sp     | ; save the stack pointer       |
| 0021' 21 0000# |        |     | ld      | hl,zzstak       | ; set up the go stack          |
| 0024' 22 0000# |        |     | ld      | (spdat),hl      | ; save it                      |
| 0027'    |              | monloop: |        |                 |                                |
| 0027' 21 0516' |        |     | ld      | hl,cmdtbl       | ; load the monitor command table |
| 002A' 22 0000# |        |     | ld      | (parptr),hl     | ; into the parsing pointer     |
| 002D' CD 003E' |        |     | call    | prompt          |                                |
| 0030' 21 0000# |        |     | ld      | hl,cmdbuf       | ; preset the buffer pointers   |
| 0033' 22 0000# |        |     | ld      | (cmdptr),hl     |                                |
| 0036' CD 0000# |        |     | call    | buffin          |                                |
| 0039' CD 0000# |        |     | call    | monparse        |                                |
| 003C' 18 E9 |         |     | jr      | monloop         |                                |

; prompt display the monitor prompt
| 003E'    |              | prompt: |         |                 |                                |
| 003E' E5 |              |     | push    | hl              |                                |
| 003F' CD 0000# |        |     | call    | crlf            |                                |
| 0042' 3A 0000# |        |     | ld      | a,(dspers)      | ; check for error display      |
| 0045' B7 |              |     | or      | a               |                                |
| 0046' 28 05 |         |     | jr      | z,promp0        |                                |

TABLE I

```
0048' 3E 45                    ld      a,'E'           ; flag the error status
004A' CD 0000#                 call    putchar
004D'           prompe:
004D' 21 0000#                 ld      hl,prmpt
0050' 3A 0000#                 ld      a,(host)
0053' B7                       or      a
0054' 28 03                    jr      z,mprompt 0056' 21 005E'                 ld      hl,hostprmpt
0059'           mprompt:
0059' CD 0000#                 call    pstrng
005C' E1                       pop     hl
005D' C9                       ret 005E' 48 20 2A 00  hostprmpt:  defb    'H *',0,'$'
0063'
                ; explain prints the command menu
0063'           explain:
0063' E5                       push    hl
0064' 21 0000#                 ld      hl,monexp       ; point to the command menu
0067' CD 0000#                 call    pstrng          ; print it
006A' E1                       pop     hl
006B' F6 FF                    or      255             ; return non zero
006D' C9                       ret ; dexplain prints the debug command menu
006E'           dexplain:
006E' E5                       push    hl
006F' 21 0000#                 ld      hl,dabexp       ; point to the command menu
0072' CD 0000#                 call    pstrng          ; print it
0075' E1                       pop     hl
0076' F6 FF                    or      255             ; return non zero
0078' C9                       ret ; port   If port is followed by 1 parameter, it displays input
                ;        from that port number. If it is followed by 2 parameters,
                ;        it ouputs the second parameter to the port number in
                ;        the first parameter.
                ;        Parameters are truncated from the left to form a 1 byte value.
                ;        Parameters are required but no more than 2
0079'           port:
                  global port
0079' DA 0000#                 jp      c,suberr        ; no parms is illegal 007C' ED 4B 0000#              ld      bc,(parm1)      ; parm1 is the port #
0080' 20 37                    jr      nz,outport      ; 1 parm is an input command
0082'           inport:
0082' 79                       ld      a,c             ; check for legal port #
0083' FE 40                    cp      40h             ; ppi port ?
0085' 30 24                    jr      nc,inprt1       ; nc, nope, > 3fh 0087' E6 03                    and     3               ; mask for control port
0089' FE 03                    cp      3
008B' 20 1E                    jr      nz,inprt1       ; nz, legal port for read
008D' CD 0000#                 call    ilprint         ; print the following message
0090' 20 2D 20 49  db ' - Illegal Read Request',0
00A8' C3 0000#                 jp      crlf
00AB'           inprt1:
00AB' 3E 3D                    ld      a,'='           ; use = for a separator
00AD' CD 0000#                 call    putchar
00B0'                          inn
00B0' ED 78       A1           in      a,(c)           ; read the port
00B2' CD 0000#                 call    adshxs          ; show value, leading space
00B5' B7                       or      a               ; return no carry
00B6' C3 0000#                 jp      crlf            ; carriage return line feed for repeats
00B9'           outport:
        0000    ;   if finished ; input only in finished product
                1   else                                ; output allowed for development
00B9' 3D        1           dec     a
```

TABLE I

```
008A' 37            1           scf                     ; set carry for error exit
008B' C2 0000#      1           jp       nz,suberr      ; more than 2 parms is illegal
                    1
00BE' 3A 0000#      1           ld       a,(parm2)      ; parm2 is output value
00C1'               1           outt     (c),a          ; send the value to the port.
00C1' ED 79         A1          out      (c),a
00C3' 87            1           or       a              ; return no carry
00C4' C9            1           ret
                                endif ; han30 & han38 save the stack pointer, display registers and
                                ;    go to the monitor loop
          0000      1           if finished
                    1           else ; finished
00C5'               1           han30:
00C5' 22 0000#      1               ld       (hldat),hl       ; save hl for display
00C8' E1            1               pop      hl               ; get the go addr
00C9' 2B            1               dec      hl
00CA' 22 0000#      1               ld       (goadr),hl
00CD' ED 73 0000#   1               ld       (spdat),sp       ; save the stack pointer
00D1' 31 0000#      1               ld       sp,oldstk        ; reset to monitor start
                    1
00D4' ED 53 0000#   1               ld       (dedat),de       ; save de for display
00D8' 21 0000#      1               ld       hl,msg30         ; point to the message
00DB' CD 0000#      1               call     pstrng
00DE' CD 0110'      1               call     rstregs          ; show the regs
00E1' C3 0027'      1               jp       monloop
                                endif ; else finished
00E4'                           hhan38:
00E4'                           mhan38:
00E4' F1                            pop      af               ; han38 pushed af
00E5' 22 0000#                      ld       (hldat),hl       ; save hl for display
00E8' ED 53 0000#                   ld       (dedat),de       ; save de for display
00EC' 11 0000#                      ld       de,msg38         ; point to the message
00EF'                           rshandler:
00EF' E1                            pop      hl               ; get the go addr
00F0' 2B                            dec      hl
00F1' 22 0000#                      ld       (goadr),hl
00F4' ED 73 0000#                   ld       (spdat),sp       ; save the stack pointer
00F8' 31 0000#                      ld       sp,oldstk        ; reset to monitor start 00FB' EB                            ex       de,hl            ; get the rst message
00FC' FB                            ei                        ; renable the interrupts
00FD' CD 0000#                      call     pstrng
0100' CD 0110'                      call     rstregs          ; show the regs
0103' CD 0000#                      call     crcprm           ; check the prom crc
0106' C3 0027'                      jp       monloop
                                ; display registers
0109'                           dispregs:
0109' 22 0000#                      ld       (hldat),hl       ; put the registers in their places
010C' ED 53 0000#                   ld       (dedat),de
0110'                           rstregs:                      ; come here from a restart 3x
0110' ED 43 0000#                   ld       (bcdat),bc 0114' D9                            exx                       ; include ' registers
0115' 22 0000#                      ld       (hlldt),hl
0118' ED 53 0000#                   ld       (dcedt),de
011C' ED 43 0000#                   ld       (bccdt),bc 0120' F5                            push     af
0121' E1                            pop      hl
0122' 22 0000#                      ld       (afda'),hl 0125' 08                            ex       af,af'
0126' F5                            push     af
0127' E1                            pop      hl
0128' 22 0000#                      ld       (affdt),hl
012B' 08                            ex       af,af'
```

TABLE I

```
012C'  CD 22 0000#            ld      (ixdat),ix
0130'  FD 22 0000#            ld      (iydat),iy 0134'  2A 0000#               ld      hl,(hldt)       ; restore hl
0137'  09                     axx ; display the registers set
0138'                         dsregset:
0138'  E5                     push    hl
0139'  C5                     push    bc
013A'  CD 0000#               call    crlf            ; get a fresh line 013D'  21 0000#               ld      hl,afdat        ; put the value pointer
0140'  22 0000#               ld      (regmsg),hl     ; in place
0143'  21 0000#               ld      hl,afmsg        ; get the header pointer 0146'  06 0C                  ld      b,12            ; set the count
0148'  CD 015D'               call    rgdisp          ; display the registers 014B'  CD 0000#               call    pstrng          ; print the ir message
014E'  ED 5F                  ld      a,r
0150'  6F                     ld      l,a
0151'  ED 57                  ld      a,i
0153'  67                     ld      h,a
0154'  CD 0000#               call    hldshx          ; and data 0157'  C1                     pop     bc
0158'  E1                     pop     hl
0159'  C9                     ret ; display/change registers
015A'                         exregs:
                               global exregs
015A'  C3 0138'               jp      dsregset ; print the current register message then the register data
015D'                         rgdisp:
015D'  CD 0000#               call    pstrng          ; print the header message
0160'  23                     inc     hl              ; move to the next message
0161'  E5                     push    hl              ; save the message position 0162'  2A 0000#               ld      hl,(regmsg)     ; get the data pointer
0165'  7E                     ld      a,(hl)          ; get the data
0166'  23                     inc     hl
0167'  4E                     ld      c,(hl)
0168'  23                     inc     hl              ; point to the next
0169'  22 0000#               ld      (regmsg),hl     ; save the next pointer 016C'  61                     ld      h,c
016D'  6F                     ld      l,a
016E'  CD 0000#               call    hldshx          ; print the data 0171'  E1                     pop     hl              ; restore the header pointer
0172'  10 E9                  djnz    rgdisp
0174'  C9                     ret
                              ; dump  Show a block of memory in ascii hex and plain ascii
                              ;       representation. Dump shows the block starting at dmpadr
                              ;       plus 160 bytes, 16 bytes per line, ending on an even hex
                              ;       (16) boundary. If dump has parameters the first sets the
                              ;       start address and, if present, the second sets the stop
                              ;       address. In any case the stop address becomes the new
                              ;       starting address.
0175'                         dump:
0175'  ED 5B 0000#            ld      de,(dmpadr)     ; get the old start address
0179'  21 00A0                ld      hl,0a0h         ; compute the end address
017C'  38 13                  jr      c,dmpcmp        ; no parms use old values 017E'  ED 5B 0000#            ld      de,(parm1)      ; get the first parm
0182'  28 0C                  jr      z,dmpcmp        ; 1 parm use first parm as start
```

TABLE I

```
0184' 3D                        dec     a
0185' C2 0000#                  jp      nz,suberr       ; more than 2 parms is illegal
0188' FA 0191'                  jp      m,dmpcmp        ; m, no second parm 0188' 2A 0000#                  ld      hl,(parm2)      ; get the second parm as end address
018E' 23                        inc     hl              ; add one to stop to show the stop
018F' 18 05                     jr      dmpdsp
0191'           dmpcmp:
0191' 19                        add     hl,de           ; compute 10 lines of output
0192' 7D                        ld      a,l
0193' E6 F0                     and     0fff0h          ; mask for even hex boundary
0195' 6F                        ld      l,a
0196'           dmpdsp:
0196' B7                        or      a
0197' ED 52                     sbc     hl,de           ; compute the block size
0199' EB                        ex      de,hl           ; start in hl, size in de
019A'           dmpds0:
019A' CD 0000#                  call    pause           ; suspend output ?
019D' 38 54                     jr      c,dmpds6        ; c, cancel the dump 019F' CD 0000#                  call    crlf            ; start a new line
01A2' 3E 20                     ld      a,space         ; indent the display
01A4' CD 0000#                  call    putchar
01A7' CD 0000#                  call    putchar
01AA' CD 0000#                  call    hldshx          ; show the line start address
01AD' D5                        push    de              ; save the start and count
01AE' E5                        push    hl
01AF' 3E 3A                     ld      a,':'           ; delimit the address with a :
01B1' CD 0000#                  call    putchar
01B4' 3E 20                     ld      a,space
01B6' CD 0000#                  call    putchar 01B9'           dmpds1:
01B9' 7E                        ld      a,(hl)          ; get a byte
01BA' CD 0000#                  call    adshxs          ; show it with a leading space
01BD' CD 01F7'                  call    moveon          ; check for 8 byte boundary
01C0' 20 F7                     jr      nz,dmpds1

01C2' F5                        push    af
01C3' 3E 20                     ld      a,space         ; put in an extra space
01C5' CD 0000#                  call    putchar
01C8' F1                        pop     af
01C9' 30 05                     jr      nc,dmpds2       ; nc end of block 01CB' 7D                        ld      a,l
01CC' E6 0F                     and     15              ; check for line end
01CE' 20 E9                     jr      nz,dmpds1       ; nz, nope show some more
01D0'           dmpds2:
01D0' E1                        pop     hl              ; get back the start & count
01D1' D1                        pop     de
01D2' 3E 20                     ld      a,space         ; separate with an extra space
01D4' CD 0000#                  call    putchar
01D7'           dmpds3:
01D7' 7E                        ld      a,(hl)          ; get a character
01D8' FE 7F                     cp      7fh             ; printable ?
01DA' 30 04                     jr      nc,dmpds4       ; nc, too big 01DC' FE 20                     cp      space
01DE' 30 02                     jr      nc,dmpds5       ; nc, is printable
01E0'           dmpds4:
01E0' 3E 2E                     ld      a,'.'           ; sub '.' for non printing chars
01E2'           dmpds5:
01E2' CD 0000#                  call    putchar         ; print the char
01E5' CD 01F7'                  call    moveon          ; check for line & block end
01E8' 20 ED                     jr      nz,dmpds3       ; nz, neither, print another character 01EA' 30 07                     jr      nc,dmpds6       ; nc, end of block 01EC' 7D                        ld      a,l
01ED' E6 0F                     and     15              ; check line end
01EF' 28 A9                     jr      z,dmpds0        ; z, end
```

TABLE I

```
01F1' 18 E4                    jr      dmpds3          ; finish the line
01F3'              cmpds6:
01F3' 22 0000#                 ld      (dmpadr),hl     ; make the end the new start address
01F6' C9                       ret ; moveon  Increments hl, decrements de. If de = z or
                   ;         hl is an even multiple of 16 the routine returns
                   ;         zero, otherwise non zero is returned.
01F7'              moveon:
01F7' 1B                       dec     de              ; move to the next byte
01F8' 23                       inc     hl
01F9' 7A                       ld      a,d             ; end of block
01FA' 83                       or      e
01FB' C8                       ret     z 01FC' 7D                       ld      a,l             ; check for 8 byte boundary
01FD' E6 07                    and     7
01FF' 37                       scf                     ; carry for byte boundary, not end block
0200' C9                       ret ; errdsp  Display errors present, allow the reset of same
0201'              errdsp:
                   global errdsp
0201' 1A                       ld      a,(de)          ; de -> non delim past command
0202' E6 5F                    and     5fh             ; is it the terminator ?
0204' CA 0294'                 jp      z,edisplay      ; z, yes, display only 0207' EB                       ex      de,hl           ; pointer in hl
0208' 23                       inc     hl              ; next char please
0209' 47                       ld      b,a             ; save the secondary command
020A' CD 0000#                 call    parms           ; for tblsch
020D' 7A                       ld      a,d             ; get the command
020E' E6 5F                    and     5fh             ; adjust to upper case
0210' 21 036A'                 ld      hl,errtbl       ; point to the table
0213' CD 0000#                 call    tblsch          ; find the command, index on b
0216' 3E 07                    ld      a,bell
0218' CC 0000#                 call    c,putchar       ; c, bad command
021B' 38 77                    jr      c,edisplay      ; display the errors any way 021D' 7E                       ld      a,(hl)          ; get the jump address
021E' 23                       inc     hl
021F' 66                       ld      h,(hl)
0220' 6F                       ld      l,a
0221' 3A 0000#                 ld      a,(parmcnt)
0224' B7                       or      a
0225' 3A 0000#                 ld      a,(parm1)       ; get the station bcd #
0228' E9                       jp      (hl)            ; execute
0229'              pwrout:
0229' AF                       xor     a
022A' 67                       ld      h,a
022B' 6F                       ld      l,a             ; reset the total
022C' 22 0000#                 ld      (pumins),hl
022F' 32 0000#                 ld      (pucnt),a
0232' 3A 0000#                 ld      a,(puerbt)      ; and error bit
0235' E6 FB                    and     255-puermsk
0237' 32 0000#                 ld      (puerbt),a
023A' 18 45                    jr      errexit
023C'              llrout:
023C' CD 0000#                 call    llrest
023F' 18 40                    jr      errexit
0241'              lprout:
0241' 20 10                    jr      nz,lpchan       ; decode parm1 for channel error 0243' 3A 0000#                 ld      a,(lperbt)
0246' E6 FE                    and     255-lpermsk     ; reset the eror bit
0248' 32 0000#                 ld      (lperbt),a 024B' 3A 0000#                 ld      a,(restim)
024E' 32 0000#                 ld      (finstm),a      ; start an error delay
0251' 18 2E                    jr      errexit
```

TABLE I

```
0253'                   lpchan:
0253' DD 21 0010#               ld      ix,offl+flowe
0257' CD 0000#                  call    chrest
025A' 3E 07                     ld      a,bell
025C' D4 0000#                  call    nc,putchar      ; nc, out of range
025F' 30 33                     jr      nc,edisplay     ; display the errors any way
0261' 18 1E                     jr      errexit
0263'                   eprout:
0263' DD 21 0012#               ld      ix,offl+pwr0
0267' CD 0000#                  call    chrest
026A' 3E 07                     ld      a,bell
026C' D4 0000#                  call    nc,putchar      ; nc, out of range
026F' 30 23                     jr      nc,edisplay     ; display the errors any way
0271' 18 0E                     jr      errexit
0273'                   hprout:
0273' DD 21 0014#               ld      ix,offl+ded0
0277' CD 0000#                  call    chrest
027A' 3E 07                     ld      a,bell
027C' D4 0000#                  call    nc,putchar      ; nc, out of range
027F' 30 13                     jr      nc,edisplay     ; display the errors any way
0281'                   errexit:
0281' 21 0000#                  ld      hl,syser0
0284' 7E                        ld      a,(hl)
0285' 06 05                     ld      b,sysern-1      ; check all the error bytes
0287'                   erxloop:
0287' 23                        inc     hl
0288' B6                        or      (hl)
0289' 10 FC                     djnz    erxloop 028B' 32 0000#                  ld      (dspers),a      ; revise the dspers byte
028E' 21 0000#                  ld      hl,tmins
0291' CD 0000#                  call    timdsp          ; up date the clock
0294'                   edisplay:
0294' 3A 0000#                  ld      a,(dspers)
0297' B7                        or      a
0298' C8                        ret     z 0299' CD 0000#                  call    crlf
029C' 21 037A'                  ld      hl,errhdr
029F' CD 0000#                  call    pstrng
02A2' DD 21 0010#               ld      ix,offl+sys1    ; index from power bytes 02A6' 3A 0000#                  ld      a,(syser0)      ; show system errors
02A9' E6 30                     and     lpermsk+puermsk+llermsk
02AB' CA 0357'                  jp      z,nosys         ; no system errors 02AE' CD 0000#                  call    ilprint
02B1' 0D 0A 53 59       defb    cr, lf, 'SYSTEM ERRORS - ',0
02C4' 0F                        rrca
02C5' 30 12                     jr      nc,comer 02C7' CD 0000#                  call    ilprint
02CA' 45 58 43 45       defb    'EXCESS FLOW    ',0
02D9'                   comer:
02D9' 0F                        rrca
02DA' 30 00                     jr      nc,pwr
02DC'                   pwr:
02DC' 0F                        rrca
02DD' 30 5F                     jr      nc,ll 02DF' 2A 0000#                  ld      hl,(pucnt)      ; get the off count
02E2' 26 00                     ld      h,0
02E4' CD 0000#                  call    hibcd           ; make it decimal
02E7' 67                        ld      h,a
02E8' 7C                        ld      a,l
02E9' E6 0F                     and     15
02EB' C6 30                     add     a,'0'           ; make the high digit ascii
02ED' CD 0000#                  call    putchar
02F0' 7C                        ld      a,h
02F1' CD 0000#                  call    adshx           ; show the last 2 digits
```

TABLE I

```
02F4' CD 0000#              call    ilprint
02F7' 20 43 59 43            defb  ' CYCLES FOR ',0

0304' 2A 0000#               ld     hl,(pumins)      ; get the time off
0307' CD 0000#                call   sho5hl           ; show all 5 digits
030A' CD 0000#                call   ilprint
030D' 20 4D 49 4E            defb  ' MINUTES OFF, ON AT ',0
0322' 2A 0000#               ld     hl,(putime)
0325' CD 0000#                call   hldshx
0328' CD 0000#                call   ilprint
032B' 0D 0A 20 20            defb   cr,lf,'           ',0
033E'                  ll:
033E' 0F                            rrca
033F' 30 13                         jr     nc,onsys 0341' CD 0000#                call   ilprint
0344' 53 45 4E 53            defb   'SENSORS OFFLINE',0
0354'                  onsys:
0354' CD 0000#                call   crlf
0357'                  nosys:
0357' 21 0417'                ld     hl,flomsg
035A' CD 0000#                call   pwrsho
035D' 21 03FE'                ld     hl,pwrmsg
0360' CD 0000#                call   pwrsho
0363' 21 042F'                ld     hl,dedmsg
0366' CD 0000#                call   pwrsho
0369'                  nosho:
0369' C9                            ret 036A' 46             errtbl: defb   'F'
036B' 0241'                   defw   lprout
036D' 4F                      defb   'O'
036E' 023C'                   defw   llrout
0370' 50                      defb   'P'
0371' 0263'                   defw   eprout
0373' 4E                      defb   'N'
0374' 0273'                   defw   hprout
0376' 54                      defb   'T'
0377' 0229'                   defw   pwrout
0379' 00                      defb   0

037A' 20 54 4F 20    errhdr: defb   ' TO RESET ERRORS ENTER ''E''  PLUS', cr, lf
039C' 20 20 20 46            defb   '   F - FLOW, O - OFFLINE, T - TIME OFF, P - POWER, N - NO FLOW,'
03DD' 20 20 20 20            defb   '    [PLUS STATION ##]',CR,LF,0,'$'
03FE' 0D 0A 45 58    pwrmsg: defb   cr, lf, 'EXCESS POWER STATIONS ',0
0417' 0D 0A 45 58    flomsg: defb   cr, lf, 'EXCESS FLOW STATIONS ',0
042F' 0D 0A 4E 4F    dedmsg: defb   cr, lf, 'NO FLOW STATIONS ',0

0443'                ; lcdisplay
                     ;       display the lcd message, take raw key board input, display
                     ;       the input on the lcd display.
0443'                  lcdisplay:
0443' 21 0000#                ld     hl,lcdmsg
0446' CD 0000#                call   pstrng
0449' 06 04                   ld     b,4              ; can only display 4 chars
044B' 0E 70                   ld     c,dspdig         ; start with the left most char
044D'                  lcdins:
044D' CD 0000#                call   getchar          ; get a char
0450' FE 0D                   cp     cr               ; terminator
0452' 28 3B                   jr     z,lcdinx         ; z, yes, wait for cr & quit 0454' FE 18                   cp     'X'-40h          ; cancel char?
0456' C8                      ret    z                ; z, yep, quit
0457' 57                      ld     d,a              ; char in d
0458' FE 30                   cp     '0'              ; check for numbers
045A' 38 04                   jr     c,lcdini         ; c, too small 045C' FE 3A                   cp     '9'+1
045E' 38 22                   jr     c,lcdsho         ; c, it's a #
0460'                  lcdini:
```

TABLE I

```
0460'  FE 20                cp      ' '              ; is it space
0462'  16 0F                ld      d,15             ; load space code
0464'  28 1C                jr      z,lcdsho         ; z, yep, show space 0466'  FE 2D                cp      '-'              ; is it a dash
0468'  16 0A                ld      d,10             ; load the dash code
046A'  28 16                jr      z,lcdsho         ; z, yep, show the dash 046C'  E6 5F                and     5fh              ; mask for upper case
046E'  1E 04                ld      e,4              ; four characters to check
0470'  21 04A6'             ld      hl,lcdtbl        ; point to the legal characters
0473'              lcdin2:
0473'  14                   inc     d                ; step up to next char
0474'  BE                   cp      (hl)
0475'  28 0B                jr      z,lcdsho 0477'  23                   inc     hl
0478'  1D                   dec     e
0479'  20 F8                jr      nz,lcdin2        ; nz, more to try 047B'  3E 07                ld      a,bell           ; not a legal char, ring the bell
047D'  CD 0000#             call    putchar
0480'  18 CB                jr      lcdins
0482'              lcdsho:
0482'  CD 0000#             call    putchar          ; echo the character
0485'  3E FF                ld      a,255            ; disable clock updates
0487'  32 0000#             ld      (noupdt),a
048A'                       outt    (c),d            ; sho the character
048A'  ED 51    A1          out     (c),d
048C'  0C                   inc     c                ; setup for next position
048D'  10 BE                djnz    lcdins
048F'              lcdinx:
048F'  21 0000#             ld      hl,crtoex        ; print the exit message
0492'  CD 0000#             call    pstrng
0495'              lcdin3:
0495'  CD 0000#             call    getchar
0498'  D6 0D                sub     cr
049A'  20 F9                jr      nz,lcdin3        ; wait for a cr to quit 049C'  32 0000#             ld      (noupdt),a       ; enable updates
049F'  21 0000#             ld      hl,tmins         ; point to the time
04A2'  CD 0000#             call    timdsp           ; display it
04A5'  C9                   ret 04A6'              lcdtbl:
04A6'  45 48 4C 50          db      'EHLP'

; soljust Adjust the number 12.5 msec waits till trying the next
;         channel for a dry condition.
04AA'              soljust:
                  global soljust
04AA'  38 1A                jr      c,soljds         ; show the current value if no parms
       FFFF       1  if not finished
04AC'  2A 0000#   1         ld      hl,(parm1)
04AF'  CD 0000#   1         call    hxbin            ; make parm1 binary
04B2'  11 0020    1         ld      de,32
04B5'  87         1         or      a
04B6'  ED 52      1         sbc     hl,de            ; is it in range ?
04B8'  38 02      1         jr      c,soljok         ; c, yes
04BA'  2E 1F      1         ld      l,31             ; make it maximum
04BC'            1 soljok:
04BC'  7D        1          ld      a,l
04BD'  CB 27     1          sla     a                ; multiply by 8
04BF'  CB 27     1          sla     a 04C1'  CB 27     1          sla     a
04C3'  32 0000#  1          ld      (msoldla),a      ; set the new delay
                  endif
04C6'              soljds:
```

TABLE I

```
04C6'  CD 0000#            call    ilprint         ; explain what we see
04C9'  0D 0A 20 20         defb    cr,lf,' Moisture Measuring Delay in Tenths of seconds = ',0
04FE'  2A 0000#            ld      hl,(msoldla)
0501'  CB 3D               srl     l               ; divide by 8 to get tenths
0503'  CB 3D               srl     l
0505'  CB 3D               srl     l
0507'  CD 0000#            call    lbcd            ; make it bcd
050A'  CD 0000#            call    adshx           ; show the value
050D'  C3 0000#            jp      crlf            ; return with new line 0510'                  bcdcmd:                     ; commands requiring bcd parms
                          global bcdcmd
0510'  41 42 43 45         db      'A','B','C','E','U',0

0516'                  cmdtbl:                     ; command vector table
0516'                  nonrep:                     ; non repeating commands
0516'  41                  db      'A'
0517'  0000#               dw      altchan
0519'  55                  db      'U'
051A'  0000#               dw      setime
051C'  3F                  db      '?'
051D'  0263'               dw      explain
051F'  2F                  db      '/'
0520'  006E'               dw      dexplain
0522'  4B                  db      'K'
0523'  0000#               dw      keytst
0525'  4C                  db      'L'
0526'  0443'               dw      lcdisplay
       FFFF           1 if sdelaychk              ; set/display solenoid delay
0528'  4A             1      db     'J'
0529'  04AA'          1      dw     soljust
                        endif
       FFFF           1 if not finished           ; use these commands in development
052B'  53             1      db     'S'
052C'  0000#          1      dw     substitute
052E'  48             1      db     'H'
052F'  0000#          1      dw     download
0531'                 1 repcmd:                   ; repeating commands
0531'  47             1      db     'G'
0532'  0000#          1      dw     go
0534'  4D             1      db     'M'
0535'  0000#          1      dw     movmem
0537'  46             1      db     'F'
0538'  0000#          1      dw     filmem
                      1 else                      ; end of development commands
                        endif
053A'  42                   db     'B'
053B'  0000#                dw     books
053D'  43                   db     'C'
053E'  0000#                dw     sdefaults
0540'  45                   db     'E'
0541'  0201'                dw     errdsp
0543'  50                   db     'P'
0544'  0079'                dw     port
0546'  54                   db     'T'
0547'  0000#                dw     rdtime
0549'  58                   db     'X'
054A'  015A'                dw     exregs
054C'  44                   db     'D'
054D'  0175'                dw     dump
054F'  00                   db     0

0550'                 shortins:
0550'  0D 0A 0A 20          db     cr,lf,lf,' ? <RET> FOR LIST !',0 end
     0 Error(s) Detected.  1383 Program Bytes.
   537 Symbols Detected.
```

TABLE I

```
.z80
.list

; 10-27-88 Changed default and bookkeeping routines to support
;          decimal entry and display.  Added flow percent variable,
;          power off time reset, and system reset calls.
;          drk ; external pumins
  external lstchn
  external pascdx, chnc01, keyno, keyval, monerr, delim
  external hlbcd, bcdbin, hbcbin, lbcd, hexacc, hidshx
  external adshxs, adshx, adsdc, faston
  external bookbf, crlf, putchar, bcdbin, pause
  external combin, pstrng, tblsch, prtbit
  external koffl, kautol, konl, solenl
  external tyear, tsecs, tmins, omins, cmins, ymins, pupmin, pupcnt
  external unitno, book, inarat, cmenu
  external bflov, bflper, bgrup, maxrat, inahi, currat, avgrat
  external bflohi, bdwel, bsokv
  external bopen, bshut, bfaiv, bovrv, bsyrv
  external parmd, parmcnt, parm1, parm2, parm3, parm4

; altchan  Parses buffer into channel-function pairs
;          sending commands as detected.
;          Disables interrupts while processing commands.
;          Enters with de pointing to cmd string
```

```
0000'                         altchan:
                                global altchan
0000' 3A 0000#                      ld      a,(parm1)       ; get parm 1
0003' CD 0000#                      call    bcdbin          ; convert to binary
0006' 3D                            dec     a               ; change to base 0
0007' FA 0091'                      jp      m,staerr        ; m, out of range 000A' 3A 0000#                      ld      hl,(lstchn)     ; get the highest channel
000D' 2C                            inc     l
000E' BD                            cp      l               ; too big ?
000F' F2 0091'                      jp      p,staerr        ; p, yes 0012' 4F                            ld      c,a             ; save it
0013' 3A 0000#                      ld      a,(parm2)       ; get parm 2
0016' CD 0000#                      call    bcdbin          ; convert to binary
0019' 47                            ld      b,a
001A' 3A 0000#                      ld      a,(parmcnt)     ; check single or range
001D' FE 03                         cp      3
001F' 30 3A                         jr      nc,altrng       ; nc, range
0021'                         rngfalse:
0021' 78                            ld      a,b             ; check the row
0022' FE 05                         cp      5
0024' 30 6B                         jr      nc,staerr       ; nc, too big, error
0026'                         scochk:                       ; check for faston, sco or chnchg
0026' FE 03                         cp      3
0028' F3                            di
0029' DA 003F'                      jp      c,chnchg        ; c, its normal chan change
002C' CA 0038'                      jp      z,dosco         ; z, its sco ld      b,2             ; make it look like an ON key
002F' 06 02                         call    faston          ; do the faston
0031' CD 0000#                      jr      z,stasho
0034' 28 61                         jr      badchng
0036' 18 0C
0038'                         dosco:
0038' CD 0000#                      call    combin          ; set sco mode
003B' 28 5A                         jr      z,stasho        ; successful change
003D' 18 05                         jr      badchng
003F'                         chnchg:
003F' CD 0000#                      call    chnc01          ; set the valves
0042' 28 53                         jr      z,stasho
0044'                         badchng:
0044' FB                            ei
```

TABLE I

```
0045' CD 0000#              call    crlf            ; new line
0048' 3A 0000#              ld      a,(bookbf)      ; get the channel #
004B' C6 02                 add     a,2             ; adjust to 1- maxchans decimal
004D' D6 01                 sub     1
004F' 27                    daa 0050' CD 0000#              call    adshx           ; show the channel
0053' 21 0130'              ld      hl,badstrng     ; show the problem
0056' CD 0000#              call    pstrng
0059' 18 3C                 jr      stasho 005B'              altrng:
005B' 79                    ld      a,c
005C' 90                    sub     b               ; legal range
005D' 30 32                 jr      nc,staerr       ; nc, not a range 005F' ED 44                 neg                     ; get the sense right
0061' 57                    ld      c,a             ; count in d
0062' 3A 0000#              ld      a,(parm3)       ; get the row
0065' CD 0000#              call    cdbin           ; make it binary
0068' FE 05                 cp      5               ; check the range
006A' 30 25                 jr      nc,staerr       ; nc, out of range 006C' 47                    ld      b,a             ; row in b
006D'              altloop:
006D' C5                    push    bc              ; save the parameters
006E' D5                    push    de
006F' 78                    ld      a,b
0070' FE 03                 cp      3               ; sco, faston, or other ?
0072' F3                    di
0073' 38 0E                 jr      c,altl1         ; c, other
0075' 28 07                 jr      z,rngsco        ; z, its sco 0077' 06 02                 ld      b,2             ; make it look an ON key
0079' CD 0000#              call    faston          ; set faston mode
007C' 18 08                 jr      altl2           ; check for an error or loop
007E'              rngsco:
007E' CD 0000#              call    combin          ; toggle sco
0081' 18 03                 jr      altl2           ; check for an error or loop
0083'              altl1:
0083' CD 0000#              call    chnc01          ; change the setting
0086'              altl2:
0086' FB                    ei
0087' D1                    pop     de
0088' C1                    pop     bc
0089' 20 06                 jr      nz,staerr       ; nz, unsucessful change 008B' 0C                    inc     c               ; next channel
008C' 15                    dec     d               ; more to go ?
008D' 20 DE                 jr      nz,altloop      ; nz, yes 008F' 18 06                 jr      stasho 0091'              staerr:
                   global   staerr
0091' FB                    ei
0092' 3E 07                 ld      a,bell
0094' CD 0000#              call    putchar
0097'              stasho:                          ; show the station switch state
                   global   stasho
0097' FB                    ei
0098' CD 0000#              call    crlf
009B' E5                    push    hl              ; put sco byte on the stack
009C' 2A 0000#              ld      hl,(konl)
009F' E5                    push    hl              ; on
00A0' ED 5B 0000#           ld      de,(kautol)
00A4' D5                    push    de              ; auto
00A5' ED 4B 0000#           ld      bc,(koffl)
00A9' C5                    push    bc              ; off 00AA' DD 21 0006            ld      ix,6
```

TABLE I

```
00AE'  DD 39              add    ix,sp          ; point to the stack sco byte 00B0'  7C                 ld     a,h            ; make the sco high byte
00B1'  B2                 or     d              ; on or auto
00B2'  A0                 and    b              ; and off
00B3'  DD 77 01           ld     (ix+1),a
00B6'  2F                 cpl                   ; make the mask for other keys
00B7'  67                 ld     h,a 00B8'  7D                 ld     a,l            ; and the low byte
00B9'  B3                 or     e
00BA'  A1                 and    c
00BB'  DD 77 00           ld     (ix),a
00BE'  2F                 cpl                   ; and the low mask
00BF'  6F                 ld     l,a 00C0'  06 03              ld     b,3            ; three keys to mask
00C2'              scoloop:
00C2'  DD 2B              dec    ix             ; move to the next key
00C4'  DD 2B              dec    ix
00C6'  DD 7E 00           ld     a,(ix)         ; mask the other keys
00C9'  A5                 and    l              ; with the sco complement
00CA'  DD 77 00           ld     (ix),a
00CD'  DD 7E 01           ld     a,(ix+1)
00D0'  A4                 and    h
00D1'  DD 77 01           ld     (ix+1),a
00D4'  10 EC              djnz   scoloop 00D6'  21 00FC'           ld     hl,offmsg      ; show current switch state
00D9'  CD 0142'           call   pwrsho
00DC'  21 0109'           ld     hl,autmsg      ; auto
00DF'  CD 0142'           call   pwrsho
00E2'  21 0116'           ld     hl,onmsg       ; on
00E5'  CD 0142'           call   pwrsho
00E8'  21 0123'           ld     hl,scomsg
00EB'  CD 0142'           call   pwrsho 00EE'  E1                 pop    hl             ; clear the stack variables
00EF'  E1                 pop    hl
00F0'  E1                 pop    hl
00F1'  E1                 pop    hl 00F2'  DD 21 0000#        ld     ix,solen1      ; solenoids
00F6'  21 0130'           ld     hl,solmsg
00F9'  C3 0142'           jp     pwrsho 00FC'  4F 46 46 20  offmsg: defb  'OFF - - - - ',0
0109'  41 55 54 4F  autmsg: defb  'AUTO - - - ',0
0116'  4F 4E 20 20  onmsg:  defb  'ON - - - - ',0
0123'  53 43 4F 20  scomsg: defb  'SCO - - - - ',0
0130'  53 4F 4C 45  solmsg: defb  'SOLENOIDS - ',0
013D'  20 42 43 07  badstrng: defb ' BC',bell,0
0142'
                    ; pwrsho Prints position numbers of 1 bits of 2 bytes
                    ;   pointed to by ix. If a bit is found the message
                    ;   pointed to by hl is printed as a leader, and last
                    ;   number printed is followed by a crlf. If no bits
                    ;   are found nothing is sent to the consol.
0142'               pwrsho:
                    global pwrsho
0142'  C5                 push   bc
0143'  D5                 push   de
0144'  11 0000            ld     de,0           ; d for bit flag, e for offset
0147'  DD 4E 00           ld     c,(ix+0)
014A'  CD 0150'           call   shfsho
014D'  1E 08              ld     e,8            ; second byte, add 8

014F'  DD 4E 00           ld     c,(ix+0)
0152'  CD 0150'           call   shfsho
0155'  7A                 ld     a,d            ;
0156'  D1                 pop    de
```

TABLE I

```
0157' C1                    pop     bc
0158' B7                    or      a
0159' C8                    ret     z               ; z, nothing printed, skip crlf 015A' C3 0000#              jp      crlf
015D'            shfsho:
015D' 06 08                  ld     b,8             ; 8 bits per byte
015F'            shfsh1:
015F' CB 09                  rrc    c               ; bit turned on ?
0161' 30 10                  jr     nc,skpsho       ; nc, nope 0163' 7A                     ld     a,d
0164' B7                     or     a
0165' CC 0000#               call   z,pstrng        ; z, yep, print leader
0168' 78                     ld     a,b             ; get the position
0169' ED 44                  neg
016B' C6 09                  add    a,9             ; use 1-8
016D' 83                     add    a,e             ;   add byte offset
016E' 27                     daa                    ; convert to bcd
016F' CD 0000#               call   adshxs          ; print with leading space
0172' 14                     inc    d               ; flag the print
0173'            skpsho:
0173' 10 EA                  djnz   shfsh1

0175' DD 23                  inc    ix
0177' C9                     ret

; unitem, strtdwn, unitno, book, dwnsize
; blstr 3, blstp 3, bautc 2, bovrc 2, bsyrc 2, bautf 2, bovrf 2,
; bfait 1, bovrt 1, bflohi 2, bflov 2, bflper 1,
; bdwel 1, bsokv 1, bopen 1, bshut 1, bfaiv 1, bovrv 1, bsyrv 1,
; bgrup 1, bgrupt 2,
; inarat 2, maxrat 2, currat 2, hprate 2, inahi 2, actlo 2, acthi 2,
; altflo 4, floina 4, ovrftot 4, offltot 4, flotal 4, astop 3
;
;
; adjustment commands  D-bdwel, S-bsokv, O-bopen, U-bshut, A-faiv,
;   V-bovr, Y-bsysrv, F-bflov, I-inarat, R-maxrat
; clear commands  C-bflohi, T-inahi, actlo, & acthi
;
0178'            sdefaults:                         ; enters w/de-> 1st non delim,
                 global sdefaults                   ; af=(parmcnt)-1, (cmdptr)-> next nondelim
0178' FD E5                  push   iy
017A' FD 21 2000              ld    iy,maxchans*256 ; show all channels
017E' FD E5                  push   iy              ; make a variable
0180' FD 21 0000              ld    iy,0
0184' FD 39                  add    iy,sp           ; make the pointer 0186' 1A                     ld     a,(de)          ; get the secondary command ?
0187' 47                     ld     b,a
0188' B7                     or     a
0189' CA 02F1'               jp     z,shstat        ; 0, is terminator, show all 018C' 3A 0000#               ld     a,(parmcnt)     ; check for parms
018F' B7                     or     a
0190' 28 2F                  jr     z,sdef00        ; z, decode 2nd command 0192' 3A 0000#               ld     a,(parm1)       ; get the channel #
0195' CD 0000#               call   bcdbin
0198' 3D                     dec    a               ; convert base 1 to 0
0199' FE 20                  cp     maxchans        ; in range ?
019B' D2 02F1'               jp     nc,shstat       ; nc, nope 019E' FD 77 00               ld     (iy),a          ; starting channel
01A1' FD 36 01 01            ld     (iy+1),1        ; show 1

01A5' 3A 0000#               ld     a,(parmcnt)
01A8' FE 01                  cp     1               ; 1 or 2 ?
01AA' CA 02F1'               jp     z,shstat        ; one parm
```

TABLE I

```
01A0' 3A 0000#              ld      a,(parm2)           ; get the ending station
0180' CD 0000#              call    bcdbin
0183' FD 96 00              sub     (iy)                ; compute the # of stations
0186' FE 21                 cp      maxchans+1          ; check the range
0188' D2 02F1'              jp      nc,shstat           ; nc, show one 018B' FD 77 01              ld      (iy+1),a            ; show the proper count
018E' C3 02F1'              jp      shstat
01C1'               sdef00:
01C1' 21 0536'              ld      hl,ctable           ; set up a table search
01C4' CD 0000#              call    tblsch
01C7' 3E 07                 ld      a,bell
01C9' CC 0000#              call    c,putchar           ; c, bad match
01CC' DA 02F1'              jp      c,shstat 01CF' D5                    push    de                  ; save cmdbuf pointer
01D0' 5E                    ld      e,(hl)              ; get jump address
01D1' 23                    inc     hl
01D2' 56                    ld      d,(hl)              ; restore cmd ptr 01D3' E1                    pop     hl                  ; get cmdbuf pointer
01D4' 23                    inc     hl
01D5' CD 0000#              call    parmd               ; get the parms 01D8' 06 01                 ld      b,1                 ; set up for 1 channel
01DA' 3A 0000#              ld      a,(parmcnt)
01DD' B7                    or      a
01DE' 28 31                 jr      z,skpthr            ; z, no parms, skip 01E0' 2A 0000#              ld      hl,(parm1)          ; get the channel #
01E3' 7D                    ld      a,l
01E4' CD 0000#              call    bcdbin 01E7' 3D                    dec     a                   ; convert base 1 to 0
01E8' FE 20                 cp      maxchans            ; in range ?
01EA' 4F                    ld      c,a                 ; save start channel #
01EB' FD 77 00              ld      (iy),a              ; starting channel 01EE' 3A 0000#              ld      a,(parmcnt)
01F1' FE 01                 cp      1                   ; only 1 parm ?
01F3' 28 1C                 jr      z,skpthr            ; z, yes, skip 01F5' 2A 0000#              ld      hl,(parm2)          ; assume a range of staions
01F8' 7D                    ld      a,l
01F9' CD 0000#              call    bcdbin
01FC' 91                    sub     c                   ; compute the # of stations 01FD' FE 21                 cp      maxchans+1          ; check the range
01FF' 38 02                 jr      c,sdef01            ; c, its ok 0201' 3E 01                 ld      a,1                 ; error ?, use 1 station
0203'               sdef01:
0203' 47                    ld      b,a                 ; save the count
0204' FD 77 01              ld      (iy+1),a ; hl = parm2, bc = count,start, de = jump address 0207' 3A 0000#              ld      a,(parmcnt)
020A' FE 02                 cp      2                   ; 0, 1, 2, or 3?
020C' 28 03                 jr      z,skpthr            ; not 3 parms 020E' 2A 0000#              ld      hl,(parm3)          ; value in parm3 if 3 parms
0211'               skpthr:
0211' CD 0000#              call    hbcbin              ; convert the parm to binary 0214' D5                    push    de                  ; jump address on the stack
0215' 54                    ld      d,h                 ; parm in de
0216' 5D                    ld      e,l
0217' E1                    pop     hl                  ; get the jump address
```

TABLE I

```
0218' 3A 0000#           ld      a,(parmcnt)     ; get the parm count
021B' E9                 jp      (hl)
                 ; af = parm count, bc = station count,start
                 ; de = new value or last station, hl = jump address, 021C'            cmcmd:
021C' CD 0000#           call    crlf            ; initial line feed
021F' 21 0000#           ld      hl,cmenu ; show the sub menu
0222' C3 0359'           jp      sdefx1
0225'            czcmd:
0225' C3 0000            jp      0               ; restart the controller
0228'            cccmd:
0228' B7                 or      a               ; need at least 1 parm
0229' CC 0000#           call    z,putchar       ; not enough parms
022C' CA 02F1'           jp      z,shstat 022F' 79                 ld      a,c             ; get the station #
0230' FE 20               cp      maxchans       ; range ok ?
0232' D4 0000#           call    nc,monerr
0235' D2 035E'           jp      nc,sdefsx
0238'            cccmd0:
0238' C5                 push    bc              ; save the chan info
0239' 06 25              ld      b,booksz
023B' 21 0000#           ld      hl,bflchi       ; find the record
023E' ED 4C              mlt     bc
0240' 09                 add     hl,bc
                         ld      b,2             ; clear 2 bytes
0241'            cccmd1:
0241' 36 00              ld      (hl),0
0243' 23                 inc     hl
0244' 36 00              ld      (hl),0
                 ;       djnz    cccmd1

0246' C1                 pop     bc              ; get the chan info
0247' 0C                 inc     c               ; next channel
0248' 10 EE              djnz    cccmd0          ; loop for more 024A' C3 02F1'           jp      shstat          ; show the new values
                 .z80

.list global timdsp, bytdsp, dspdsp, dspdns, blank, tdspns, blank4 external savall, lodigit, hidigit, pmnotam, outctr

; timdsp
                 ;       display the minute and hour pointed to by hl
                 ;       converts 24 hour time to am/pm
0000'            timdsp:
0000' CD 0000#           call    savall
0003'            tdspns:
0003' 16 00              ld      d,0             ; start with am
0005' 7E                 ld      a,(hl)          ; load the display buffer
0006' 32 0000#           ld      (lodigit),a
0009' 23                 inc     hl              ; point to the hours
000A' 7E                 ld      a,(hl)          ; get the hours
000B' E6 3F              and     3fh             ; clear the controls
000D' 20 04              jr      nz,notmid       ; z = midnite 000F' 3E 12              ld      a,12h           ; make midnite 12
0011' 18 08              jr      notpm
0013'            notmid:
0013' FE 12              cp      12h
0015' 38 07              jr      c,notpm         ; c, earlier than pm 0017' 16 20              ld      d,pmmask        ; change to pm
0019' 28 03              jr      z,notpm         ; z, noon, don't subtract 001B' D6 12              sub     12h
001D' 27                 daa
```

TABLE I

```
001E'                   notpm:
001E' 32 0000#                  ld      (hidigit),a
0021' 7A                        ld      a,d             ; condition the pm indicator
0022' 32 0000#                  ld      (pmnotam),a
0025' 18 28                     jr      dspdns ; bytdsp
                        ;       display the low nibble of 4 bytes pointed to by hl
                        ;       hl points to high digit
0027'                   bytdsp:
0027' C5                        push    bc              ; save bc & hl
0028' E5                        push    hl
0029' 06 04                     ld      b,4             ; send 4 bytes to port in c
002B' 0E 70                     ld      c,dspdig        ;

002D'                   bytds0:
002D'                           outii                   ; send a byte, count, move pointer
002D' ED A3         A1          outi
002F' 28 03                     jr      z,bytds1

0031' 0C                        inc     c               ; use next port
0032' 18 F9                     jr      bytds0

0034'                   bytds1:
0034' E1                        pop     hl              ; restore hl & bc
0035' C1                        pop     bc
0036' C9                        ret
                        ; blank
                        ;       blank turns off all display segments
                        ; blank4
                        ;       displays four of character in a
0037'                   blank:
0037' 3E 0F                     ld      a,blankchr      ; load the blank character
0039'                   blank4:
0039'                           outt    (dspdig+0),a    ; send it to all 4 digits
0039' 03 70         A1          out     (dspdig+0),a
003B'                           outt    (dspdig+1),a
003B' 03 71         A1          out     (dspdig+1),a
003D'                           outt    (dspdig+2),a
003D' 03 72         A1          out     (dspdig+2),a
003F'                           outt    (dspdig+3),a
003F' 03 73         A1          out     (dspdig+3),a
0041' 3A 0000#                  ld      a,(outctr)      ; get the pm marker
0044' E6 0F                     and     not pmmask      ; turn it off
0046' 32 0000#                  ld      (outctr),a
0049'                           outt    (clkyprt),a
0049' 03 02         A1          out     (clkyprt),a
004B' C9                        ret ; dspdsp
                        ;       display the bytes at hidigit through pmnotam 004C'                   dspdsp:
004C' CD 0000#                  call    savall
004F'                   dspdns:
004F' 21 0000#                  ld      hl,hidigit      ; point to the high digit
0052' 01 026F                   ld      bc,200h+dspdig-1        ; load the count and high digit 0055'                   dspdlp:
0055' 0C                        inc     c               ; move up on port
0056' ED 6F                     rld                     ; get the high nibble
0058'                           outt    (c),a           ; send it
0058' ED 79         A1          out     (c),a
005A' 0C                        inc     c               ; next port
005B' ED 67                     rrd
005D'                           outii                   ; send low nibble, count, point to next
005D' ED A3         A1          outi
005F' 20 F4                     jr      nz,dspdlp       ; nz, next byte 0061' 3A 0000#                  ld      a,(outctr)      ; get the pm port status
```

TABLE I

```
0064' E6 DF              and    not pmmask      ; clear the pm bit
0066' B6                 or     (hl)            ; or in the new bit
0067' 32 2200#           ld     (outctr),a
006A'                    outt   (clkyprt),a     ; send the byte
006A' D3 02      A1      out    (clkyprt),a
006C' C9                 ret
                         end
    0 Error(s) Detected.    109 Program Bytes.
  387 Symbols Detected.

.z80
                         .list public ssecs, smins, shour, sdawk, sdamo, smont, syear
                         public tsecs, tmins, thour, tdawk, tdamo, tmont, tyear, tbuf
                         public smtdummy, smtbtw, smtbtr, dstathd FFE7            ssecs    EQU    -25           ; 7 bytes temporary storage
         FFE8            smins    equ    ssecs+1       ; for setting time
         FFE9            shour    equ    ssecs+2
         FFEA            sdawk    equ    ssecs+3
         FFEB            sdamo    equ    ssecs+4
         FFEC            smont    equ    ssecs+5
         FFED            syear    equ    ssecs+6

FFEE            tsecs    equ    ssecs+7       ; 7 bytes storage for current second
         FFEF            tmins    equ    ssecs+8       ; etc. for min. hour. etc.
         FFF0            thour    equ    ssecs+9
         FFF1            tdawk    equ    ssecs+10
         FFF2            tdamo    equ    ssecs+11
         FFF3            tmont    equ    ssecs+12
         FFF4            tyear    equ    ssecs+13

FFF5            dstathd  equ    ssecs+14      ; 1 byte dma state storage
         FFF6            tbuf     equ    ssecs+15      ; 8 byte time input/output buffer FFFE            smtdummy equ    ssecs+23      ; 2 byte location for
         FFFE            smtbtw   equ    ssecs+23      ; smart watch access
         FFFF            smtbtr   equ    ssecs+24      ;

cseg
                         public swpatrn, swaccess, swwrite, swwrb, swwrbr, swread
                         public swrdb, swrdx, swwrx ; The Dallas Semiconductor DS1216 "Smartwatch" incorporates a
;     real time clock and backup battery into a 28 pin JEDEC
;     socket.  The clock must be accessed by shifting a 64 bit
;     pattern into data bit 0 of any ram location(s) within the
;     block controlled by the socket with intervning reads from
;     that block of memory.  Following the pattern 8 one byte
;     registers of the clock may read or written through bit 0
;     in the same fashion as the matching pattern. Each byte should
;     be either written or read on a bit by bit basis.  Reads and
;     writes should not be intermixed within one byte.
;
;     The registers are accessed from low order bit to high order
;     bit, the clock registers are in BCD format as follows:
;
;     0 = 0.1-secs | 0.01-secs.          1 = 10-secs. | seconds
;     2 = 10-min.  | minutes             3 = 12/24 0 P/A 10-HR | hours
;     4 = 0 0 oscx resetx| 0 week day    5 = 0 0 10 date | date
;     6 = 0 0 0 10-month | month         7 = 10-year | year
;
;     The hex values for matching pattern are:
;        C5, 3A, A3, 5C, C5, 3A, A3, 5C
;
; The device for 32k memory devices uses pin 1 for both A14 and
;     reset.  When the reset function (Day of week bit 4 [10H])
;     is not inhibited (0) a low in pin 1 causes the access
;     sequence to be reset.  Therefore to use the reset function
```

TABLE I

```
              ;       both the routines and access byte must reside from
              ;               4000h - 7fffh  or  0c000h to 0ffffh ;  SWRITE disables interrupts & dma to prevent any interruptions,
              ;       performs an acces match up and sends the values in the time
              ;       setting bytes to the clock. Fractions of seconds are always
              ;       written with .01
0000'             swwrite:
0000' 21 0010'           ld      hl,swwr1        ; load the return address 0003' D9                 exx
0004' 2A FFE8            ld      hl,(smins)      ; load the values to send first
0007' ED 5B FFEA         ld      de,(sdawk)
000B' ED 4B FFEC         ld      bc,(smont)
                  ;      set     7,h             ; set the am/pm mode
              FFFF    1  if bigram
000F' CB E3   1          set     4,e             ; disable reset response
              1    else
                   endif
0011' 7B                 ld      a,e
0012' E6 07              and     7               ; clear osc & reset bits
0014' 5F                 ld      e,a
0015' D9                 exx
0016' 08                 ex      af,af'
0017' 3A FFE7            ld      a,(ssecs)       ; seconds in af'
001A' 08                 ex      af,af'

001B' 18 5B              jr      swaccess        ; send the matching bytes
001D'             swwr1:
001D' 01 0807            ld      bc,807h         ; set the counts
0020' AF                 xor     a
0021' 3C                 inc     a
0022'             swwr3:
0022' 32 FFFE            ld      (smtbtw),a      ; load a bit
0025' 17                 rla                     ; shift to next position
0026' 30 FA              jr      nc,swwr3        ; load all 8 bits (seconds < 1)

0028'             swwr5:
0028' 08                 ex      af,af'
0029' 57                 ld      d,a
002A' 08                 ex      af,af'
002B' 7A                 ld      a,d
002C' 21 002F'           ld      hl,swwrb1       ; set up the loop jump
002F'             swwrb1:
002F' 06 08              ld      b,8             ; set up an 8 bit load
0031'             swwrb2:
0031' 32 FFFE            ld      (smtbtw),a      ; load a bit
0034' 0F                 rrca                    ; shift next into position
0035' 10 FA              djnz    swwrb2          ; load all 8 bits 0037' 0D                 dec     c               ; check the byte count
0038' 28 35              jr      z,swwrx         ; zero, quit 003A' D9                 exx                     ; aux reg's have values
003B' 7D                 ld      a,l             ; shift the bytes down
003C'             swwrbr:  ; read entry point, discards seconds fraction
003C' 6C                 ld      l,h
003D' 63                 ld      h,e
003E' 5A                 ld      e,d
003F' 51                 ld      d,c
0040' 48                 ld      c,b 0041' 47                 ld      b,a
0042' D9                 exx                     ; main reg's have controls
0043' E9                 jp      (hl)            ; loop for next byte
              ; if utility
              ;here:
              ;next    equ     here-swwrite
              ; .dephase
```

TABLE I

```
            ; .phase ((next+10h)/10h) *10h +1f50h
            ; else
            ;here   equ     $ -swwrite
            ; org ((here+10h)/10h) *10h
            ; endif ; SWREAD disables interrupts & dma to prevent any interruptions,
            ;       performs an acces match up, reads clock registers and
            ;       updates the time keeping bytes. Fractions of seconds are
            ;       discarded.
0044'            swread:
0044' 21 0049'          ld      hl,swrd1        ; load access return address 0047' 18 2F             jr      swaccess        ; send the matching bytes
0049'            swrd1:
0049' 0E 08             ld      c,8h            ; set the byte count 004B' 21 004E'          ld      hl,swrdb        ; set up the loop jump
004E'            swrdb:
004E' 06 08             ld      b,8             ; set up an 8 bit load
0050'            swrdb1:
0050' 3A FFFF           ld      a,(smtbtr)      ; get a bit
0053' 0F                rrca                    ; shift the bit into the carry
0054' CB 1B             rr      e               ; shift the bit into the byte
0056' 10 F8             djnz    swrdb1          ; load all 8 bits 0058' 7B                ld      a,e             ; put byte in a for shifting
0059' 0D                dec     c               ; check the byte count
005A' 28 03             jr      z,swrdx         ; zero, finished reading 005C' D9                exx                     ; aux reg's for values
005D' 18 DD             jr      swwrbr          ; shift the bytes down
005F'            swrdx:
005F' 32 FFF4           ld      (tyear),a       ; year is in a, save it
0062' D9                exx                     ; aux reg's for other values
0063' ED 43 FFF2        ld      (tdamo),bc
0067' ED 53 FFF0        ld      (thour),de
006B' 22 FFEE           ld      (tsecs),hl
006E' D9                exx
006F'            swwrx:
006F' 3A FFF5           ld      a,(dstathd)     ; get old dma status
0072' 01 0080           ld      bc,dstat        ; restore dma
0075'                   outt    (c),a
0075' ED 79    A1       out     (c),a 0077' C9                ret ; The SW routines presume a small system (ie. one with only one
            ;       ram socketed in the SmartWatch) and as such the routines
            ;       make no extraneous accesses to ram such as pushes and pops
            ;       or calls and returns once the clock read or write sequence
            ;       has started.

0078'            swaccess:

0078' AF                xor     a
0079'                   inn     a,(dstat)       ; and dma
0079' DB 80    A1       in      a,(dstat)
0079' E6 CF             and     not 30h         ; enable write
007D' 32 FFF5           ld      (dstathd),a     ; save the status
0080' AF                xor     a
0081'                   outt    (dstat),a       ; disable dma
0081' D3 80    A1       out     (dstat),a 0083' EB                ex      de,hl           ; save the return address
0084' 0E 08             ld      c,8             ; set the # bytes to send
0086' 21 009A'          ld      hl,swpatrn-1    ; initialize pointers
0089' 3A FFFF           ld      a,(smtbtr)      ; initial read for pat. recog.
008C'            swacls:
008C' 06 08             ld      b,8             ; set the # bits to shift
008E' 23                inc     hl
```

TABLE I

```
008F' 7E                    ld      a,(hl)          ; get the next pattern byte
0090'           swaclt:
0090' 32 FFFE               ld      (smtbtw),a      ; offer a bit for matching
0093' 0F                    rrca                    ; shift the next bit into position
0094' 10 FA                 djnz    swaclt          ; send all 8 on their way 0096' 0D                    dec     c
0097' 20 F3                 jr      nz,swacls       ; send all 8 bytes 0099' EB                    ex      de,hl           ; restore return address in hl
009A' E9                    jp      (hl)            ; jp return, no calls allowed 009B' C5 3A A3 5C   swpatrn:        defb    0C5h, 3Ah, 0A3h, 5Ch, 0C5h, 3Ah, 0A3h, 5Ch
00A3'
                            ; if utility
                            ; .dephase
                            ;smtbe:
                            ; global smtbe
                            ; endif
                            end
    0 Error(s) Detected.    163 Program Bytes.
  406 Symbols Detected.
                            .z80

.list global  irptsv, iret cseg

; irptsv/iret saves/restores all main registers for interrupts
                            ; only irptsv should be called, since it pushes a return to iret
0000'                       irptsv:
0000' E3                            ex      (sp),hl         ; push hl, pop irptsv return
0001' D5                            push    de              ; save the registers
0002' C5                            push    bc
0003' F5                            push    af
0004' E5                            push    hl
0005' 21 000A'                      ld      hl,iret         ; push the irptsv return
0008' E3                            ex      (sp),hl         ; push iret, pop irptsv return
0009' E9                            jp      (hl)            ; jp there 000A'                       iret:
000A' F1                            pop     af              ; restore the registers
000B' C1                            pop     bc
000C' D1                            pop     de
000D' E1                            pop     hl
        FFFF        1       if not cpm
000E' FB            1               ei
                            endif
000F' ED 4D                         reti
                            end
    0 Error(s) Detected.    17 Program Bytes.
  372 Symbols Detected.
                            .z80 public savz80, getixz, getiyz
                            external savall cseg

; savz80 uses successive savall calls to save all z80 registers.
0000'                       savz80:
0000' FD E3                         ex      (sp),iy         ; save iy
0002' FD E5                         push    iy              ; save return address
0004' FD 21 0025'                   ld      iy,getiyz
0008' FD E3                         ex      (sp),iy         ; push getiy add
000A' 08                            ex      af,af'          ; switch to aux.
```

TABLE I

```
0008' D9                       exx
000C' CD 0000#                 call    savall          ; save aux 000F' DD E5                    push    ix              ; save ix
0011' FD E3                    ex      (sp),iy         ; save return
0013' FD 21 0020'              ld      iy,getixz
0017' FD E3                    ex      (sp),iy         ; push getix, get return
0019' 08                       ex      af,af'          ; switch back to main
001A' D9                       exx
001B' CD 0000#                 call    savall          ; save main
001E' FD E9                    jp      (iy)

0020'             getixz:
0020' DD E1                    pop     ix
0022' 08                       ex      af,af'
0023' D9                       exx
0024' C9                       ret
0025'             getiyz:
0025' FD E1                    pop     iy
0027' 08                       ex      af,af'
0028' D9                       exx
0029' C9                       ret
                  end
   0 Error(s) Detected.    42 Program Bytes.
   4 Symbols Detected.
                        .z80 public savall, getmost, getall, savix, getix
                        public asave, bsave, dsave, hsave cseg ; savall/getall saves/restores all main registers.  Only
            ;       savall should be called, since it pushes a return
            ;       to getall.  Asave, bsave, dsave, hsave give offsets
            ;       into the stack to return particular registers.
            ; getmost is a replacement return which passes af back to caller.

0000'             savall:
0000' E3                       ex      (sp),hl         ; push hl, pop savall return
0001' D5                       push    de              ; save the registers
0002' C5                       push    bc
0003' F5                       push    af
0004' E5                       push    hl              ; save the return
0005' 21 0015'                 ld      hl,getall       ; setup the regs restore
0008' E3                       ex      (sp),hl         ; push the restore address
0009' E5                       push    hl              ; push the return address 000A' F5                       push    af              ; save af
000B' 21 000C                  ld      hl,12           ; offset for hl
000E' 39                       add     hl,sp           ; get the address 000F' 7E                       ld      a,(hl)          ; get the data
0010' 23                       inc     hl
0011' 66                       ld      h,(hl)
0012' 6F                       ld      l,a 0013' F1                       pop     af              ; restore af
0014' C9                       ret                     ; return 0015'             getall:                              ; restore the registers
0015' F1                       pop     af
0016' C1                       pop     bc
0017' D1                       pop     de
0018' E1                       pop     hl
0019' C9                       ret 001A'             getmost:                             ; restores all registers but af
001A' C1                       pop     bc
001B' C1                       pop     bc
001C' D1                       pop     de
```

TABLE I

```
0010' E1                      pop      hl
001E' C9                      ret

001F'               savix:                    ; save the index registers
001F' DD E3                   ex       (sp),ix     ; save ix
0021' FD E5                   push     iy          ; and iy
0023' DD E5                   push     ix          ; and the caller's return
0025' DD 21 002E'             ld       ix,getix    ; load the get address
0029' DD E3                   ex       (sp),ix     ; put it behind the caller
002B' DD E5                   push     ix
002D' C9                      ret 002E'               getix:                    ; retstore the index registers
                    global   getix
002E' FD E1                   pop      iy
0030' DD E1                   pop      ix
0032' C9                      ret 0002          asave    equ      2          ; offsets into stack for af ... hl
      0004          bsave    equ      4
      0006          dsave    equ      6
      0008          hsave    equ      8

0033'               scopyr:
0033' 43 6F 70 79             db       'Copyright (c) 1985,1986, 1987, Dean R. Krause, San Diego,
                    ;ecopyr:
                    end
  0 Error(s) Detected.   111 Program Bytes.
  10 Symbols Detected.
                                       .z80

0000'               vector:

external  asvector, asci global   vector, jmpvec, jmpasv, jmpvc6

0000'               jmpvc6:
0000' C5                      push     bc
0001' 0E 06                   ld       c,6
0003' CD 0000'                call     jmpasv
0006' C1                      pop      bc
0007' C9                      ret 0008'               jmpasv:
0008' CD 0000#                call     asci
                    ;
                    ;         push     hl
                    ;         ld       hl,(asvector)
                    ;         call     jmpvec
                    ;         pop      hl
000B' C9                      ret 000C'               jmpvec:
000C' E9                      jp       (hl)

end
  0 Error(s) Detected.    13 Program Bytes.
  6 Symbols Detected.

.LIST
                    .z80
0000'               crc:

; crcchecks
                    ;       on entry a has byte to calculate & hl points to
                    ; the proper crc to deal with
                    external  savall, crcseed, prmcrc, promck, getmost, endmark
                    external  ignmsg, crcmsg, pstrng, hldshx, crcok, crcbad, crlf
                    external  getchar, putchar, timdsp, noupdt, tmins
```

TABLE I

```
                external  swread, outctr, bytdsp, ignadd, getinst global crcprm, crcrst, crccal, crca0, ignore, help, ignloop 0000' 0C 0B 0D 0E    help:  defb  12, 11, 13, 14
0004'
                     ; crcprm check the computed crc of prom with saved value
0004'                crcprm:
0004' CD 0000#              call    savall
0007' 21 0000#              ld      hl,getmost
000A' E3                    ex      (sp),hl             ; return af when done 000B' 21 0000#              ld      hl,crcmsg           ; print the header
000E' CD 0000#              call    pstrng
0011'                crcp11:
                     global crcp11
0011' 21 0000#              ld      hl,prmcrc           ; point to the storage
0014' CD 009A'              call    crcrst              ; init the sum 0017' 11 0002#              ld      de,promck+2         ; compute the program size
001A' 21 0000#              ld      hl,endmark
001D' B7                    or      a
001E' ED 52                 sbc     hl,de
0020' 44                    ld      b,h                 ; put size in bc
0021' 4D                    ld      c,l 0022' 21 0000#              ld      hl,prmcrc           ; point to the crc sum
0025'                prmcr1:
0025' 1A                    ld      a,(de)              ; get a byte
0026' CD 00A6'              call    crccal              ; add it into the sum
0029' 13                    inc     de                  ; next byte
002A' 0B                    dec     bc                  ; count
002B' 78                    ld      a,b                 ; check for done
002C' B1                    or      c
002D' 20 F6                 jr      nz,prmcr1           ; nz, more to go 002F' 2A 0000#              ld      hl,(prmcrc)         ; show the result value
0032'                crcp12:
                     global crcp12
0032' CD 0000#              call    hldshx 0035' ED 5B 0000#           ld      de,(promck)         ; and stored value
0039' 87                    or      a
003A' ED 52                 sbc     hl,de               ; do they match
003C' 21 0000#              ld      hl,crcok
003F' 28 03                 jr      z,showcrc 0041' 21 0000#              ld      hl,crcbad
0044'                showcrc:
0044' CD 0000#              call    pstrng
0047' C8                    ret     z                   ; good show quit 0048'                badcrc:
0048' 3E FF                 ld      a,255
004A' 32 0000#              ld      (oupdt),a           ; hold lcd updates 004D' 21 0000'              ld      hl,help             ; show help on lcd
0050' CD 0000#              call    bytdsp
0053' CD 0089'              call    ignore
0056'                badloop:
0056' CD 006B'              call    ignloop             ; wait for consol help
0059' 20 FB                 jr      nz,badloop 005B' CD 0000#              call    swread              ; read the clock
005E' 3A 0000#              ld      a,(outctr)
0061' E6 BF                 and     not csiblk          ; unblank the latches
0063' 32 0000#              ld      (outctr),a
0066'                       outt    (octrpt),a
0066' D3 22       A1        out     (octrpt),a
0068' C3 0000#              jp      crlf                ; exit with crlf
```

TABLE I

```
006B'                   ignloop:
006B' E5                        push    hl
006C' CD 0000#                  call    getinst         ; check for character
006F' 3E FF                     ld      a,255           ; insure no match
0071' 28 12                     jr      z,ignexit       ; z, no char yet 0073' 2A 0000#                  ld      hl,(ignadd)     ; point to the character
0076' CD 0000#                  call    getchar         ; get input
0079' E6 5F                     and     5fh             ; make upper case
007B' CD 0000#                  call    putchar         ; echo it
007E' BE                        cp      (hl)            ; check for match
007F' 20 09                     jr      nz,ignor1       ; nz, no match, start over 0081' 23                        inc     hl              ; next char
0082' 22 0000#                  ld      (ignadd),hl     ; save it
0085'                   ignexit:
0085' FE 45                     cp      'E'             ; check for last character
0087' E1                        pop     hl
0088' C9                        ret 0089'                   ignore:
0089' E5                        push    hl
008A'                   ignor1:
008A' 21 0000#                  ld      hl,ignmsg       ; ask for advice
008D' CD 0000#                  call    pstrng
0090' 21 0009#                  ld      hl,ignmsg+9
0093' 22 0000#                  ld      (ignadd),hl     ; save the compare string
0096' E1                        pop     hl
0097' F6 FF                     or      255             ; return non zero - no match
0099' C9                        ret 009A'                   crcrst:                         ; plant the seed for a new crc
009A' D5                        push    de
009B' E5                        push    hl 009C' ED 5B 0000#                ld      de,(crcseed)
00A0' 73                        ld      (hl),e
00A1' 23                        inc     hl
00A2' 72                        ld      (hl),d
00A3' E1                        pop     hl
00A4' D1                        pop     de 00A5' C9                        ret 00A6'                   crccal:                         ; include a in new calculation
00A6' CD 0000#                  call    savall
00A9' 5E                        ld      e,(hl)          ; get the accumulated crc
00AA' 23                        inc     hl
00AB' 56                        ld      d,(hl)
00AC' EB                        ex      de,hl           ; save the pointer in de 00AD' 06 08                     ld      b,8
00AF'                   crca2:
00AF' 87                        add     a,a             ; shift argument left 1
00B0' ED 6A                     adc     hl,hl           ; into the crc 00B2' 30 0A                     jr      nc,crca1        ; nc, skip the xor 00B4' 4F                        ld      c,a
00B5' 7C                        ld      a,h             ; do the feed back shift
00B6' EE 10                     xor     010h            ; the polynomial is
00B8' 67                        ld      h,a             ; x^16 + x^12 + x^5 +1
00B9' 7D                        ld      a,l
00BA' EE 21                     xor     21h
00BC' 6F                        ld      l,a
00BD' 79                        ld      a,c
00BE'                   crca1:
00BE' 10 EF                     djnz    crca2           ; loop for all 8 bits
```

TABLE I

```
00C0' EB                    ex      de,hl           ; pointer back in hl
00C1' 72                    ld      (hl),d          ; load the new value
00C2' 2B                    dec     hl
00C3' 73                    ld      (hl),e
00C4' C9                    ret end
    0 Error(s) Detected.   197 Program Bytes.
  410 Symbols Detected.

.z80

.list external outctr, cflcsi, pstrng, getrd6 global  csip

; csip Send bit stream 1010 0000 to serial string latches
                   ;      repeatedly until a key is pressed.
0000'              csip:
0000' 21 0046'              ld      hl,message
0003' CD 0000#              call    pstrng 0006' 01 008A               ld      bc,cntr
0009' 3A 0000#              ld      a,(dflcsi)
000C' E6 8F                 and     not (te+re+eie)
000E'                       outt    (c),a
000E' ED 79       A1        out     (c),a
0010'              csip1:
0010' 01 008B               ld      bc,trdr
0013' 3E A0                 ld      a,0a0h
0015'                       outt    (c),a
0015' ED 79       A1        out     (c),a
0017' 0D                    dec     c
0018' 3A 0000#              ld      a,(dflcsi)
001B' F6 10                 or      te
001D'                       outt    (c),a
001D' ED 79       A1        out     (c),a
001F'              csip2:
001F' AF                    xor     a
0020' DB 8A                 in      a,(cntr)
0022' E6 10                 and     te
0024' C2 001F'              jp      nz,csip2
0027' 01 0002               ld      bc,octrpt
002A' 3A 0000#              ld      a,(outctr)
002D' F6 80                 or      csistb
002F'                       outt    (c),a
002F' ED 79       A1        out     (c),a
0031' E6 7F                 and     not csistb
0033' 32 0002#              ld      (outctr),a
0036'                       outt    (c),a
0036' ED 79       A1        out     (c),a
0038' 06 01                 ld      b,1
003A'              csip3:
003A' E3                    ex      (sp),hl
003B' E3                    ex      (sp),hl
003C' 10 FC                 djnz    csip3

003E' CD 0000#              call    getrd6
0041' B7                    or      a
0042' CA 0010'              jp      z,csip1

0045' C9                    ret

0046' 0D 0A 50 52   message: defb   cr,lf,'PRESS ANY KEY TO QUIT',0,'$'
005F'                       end 0 Error(s) Detected.   95 Program Bytes.
  379 Symbols Detected.
```

TABLE I

```
		.z80

.list external pstrng, getchar, getrd6
		external csicount, leadout, offl
		external csistart, dflcsi global csit 0000'		csit:
0000' 21 0061'		ld	hl,message		; check for abort
0003' CD 0000#		call	pstrng
0006' CD 0000#		call	getchar
0009' E6 5F		and	5fh
000B' FE 51		cp	'Q'
000D' CA 004F'		jp	z,csitsx		; z, quit 0010' 3E 00		ld	a,0
0012' 32 0005#		ld	(offl+5),a
0015'		csits0:
0015' 21 0000#		ld	hl,leadout
0018' 06 15		ld	b,csitot
001A' 3A 0004#		ld	a,(offl+4)
001D'		csits1:
001D' 77		ld	(hl),a
001E' 3C		inc	a
001F' 23		inc	hl
0020' 10 FB		djnz	csits1

0022' AF		xor	a
0023' DB 8A		in	a,(cntr)		; wait for tx to complete
0025' E6 10		and	te
0027' 20 18		jr	nz,csits3

0029' CD 0000#		call	getrd6		; check for keyin
002C' B7		or	a
002D' 28 0F		jr	z,csits2
002F'		csitsc:
002F' E6 5F		and	5fh		; check for quit
0031' FE 51		cp	'Q'
0033' 28 1A		jr	z,csitsx
0035' CD 0000#		call	getchar
0038' E6 5F		and	5fh		; check for quit
003A' FE 51		cp	'Q'
003C' 28 11		jr	z,csitsx
003E'		csits2:
003E' CD 0000#		call	csistart
0041'		csits3:
0041' CD 0000#		call	getrd6		; check for keyin
0044' B7		or	a
0045' 20 E8		jr	nz,csitsc 0047' 3A 0000#		ld	a,(csicount)
004A' B7		or	a
004B' 28 C8		jr	z,csits0

004D' 18 F2		jr	csits3
004F'		csitsx:
004F' 3A 0000#		ld	a,(dflcsi)
0052' E6 9F		and	not (te+re+eie)
0054' 01 208A		ld	bc,cntr
0057'		outt	(c),a		; stop the csi
0057' ED 79	A1	out	(c),a 0059' 3E 40		ld	a,csiblk
005B' 01 0002		ld	bc,octrpt
005E'		outt	(c),a		; blank the latches
005E' ED 79	A1	out	(c),a
```

TABLE I

```
0060'  C9                          ret

0061'  0D 0A 54 79    message: defb 0dh,0ah,'Type Q to Quit, other key to'
007F'  20 74 6F 67             defb ' toggle start/stop!', 13,10,0,'$'
                     end
  0 Error(s) Detected.   150 Program Bytes.
 386 Symbols Detected.

.list

; subtract time at de from time at hl
                     ; return  a = hours, h = minute, l = seconds
                     ;        carry (de) > (hl)
0000'                secdif:
                       global secdif
0000'  C5                    push    bc
0001'  D5                    push    de
0002'  EB                    ex      de,hl 0003'  CD 0017'              call    demnhl          ; subtract seconds
0006'  4F                    ld      c,a 0007'  CD 0017'              call    demnhl          ; then minutes
000A'  47                    ld      b,a 000B'  CD 0017'              call    demnhl          ; finally hours
000E'  60                    ld      h,b             ; return in ahl hr-min-sec
000F'  69                    ld      l,c 0010'  D1                    pop     de
0011'  C1                    pop     bc
0012'  D0                    ret     nc 0013'  C6 40                 add     a,64            ; borrow 24 not 60
0015'  27                    daa
0016'  C9                    ret ; Subtract value at hl from value at de in sexigesimal
                     ; Save bc, de
0017'                demnhl:
                       global demnhl
0017'  1A                    ld      a,(de)          ; get the two values
0018'  96                    sub     (hl)            ; get the difference
0019'  27                    daa                     ; it's bcd
001A'  23                    inc     hl              ; point to the next set
001B'  13                    inc     de
001C'  D0                    ret     nc              ; nc, done
001D'  C6 3C                 add     a,60            ; borrow 60 not 100
001F'  27                    daa
0020'  C9                    ret end
  0 Error(s) Detected.   33 Program Bytes.
  2 Symbols Detected.

.z80 global clockdif

; clockdif
                     ;       subtracts the time in de from the time in hl
                     ;       assumes 24 hour clock mode ;       adjusts for am/pm to show elapsed time
                     ; returns elapsed time in hl
                     ;       carry set indicates 24 hour mismatch or
                     ;       de greater than hl
0000'                clockdif:
```

TABLE I

```
0000' 7D                    ld      a,l
0001' 93                    sub     e               ; compute the lapsed time
0002' 27                    daa                     ; adjust for bcd
0003' 30 03                 jr      nc,clckd1       ; nc= no 100/60 offset 0005' D6 40                 sub     40h             ; adjust for 60 minute carry
0007' 37                    scf 0008'           clckd1:
0008' 6F                    ld      l,a             ; save minutes
0009' 7C                    ld      a,h             ; settle the hours
000A' 9A                    sbc     a,d
000B' 27                    daa                     ; still using bcd
000C' 30 03                 jr      nc,clckd4
                .list
000E'           clckd2:
000E' C6 24                 add     a,24h           ; adjust for 24 hour mismatch
0010'           clckd3:
0010' 27                    daa
                ;           jr      clckdx
                ;
0011'           clckd4:
                .list
0011'           clckdx:
0011' 67                    ld      h,a
0012' C9                    ret
                end
    0 Error(s) Detected.   19 Program Bytes.
    6 Symbols Detected.

.list
                external bcdbin

0000'           timsecs: . ; convert secs, mins, hours @ hl to seconds in ahl
                global timsecs
0000' D5                    push    de
0001' 7E                    ld      a,(hl)          ; get the seconds 0002' CD 0000#              call    bcdbin 0005' 5F                    ld      e,a 0006' 23                    inc     hl
0007' 7E                    ld      a,(hl)          ; and the minutes
0008' CD 0000#              call    bcdbin 000B' 57                    ld      d,a
000C' 7B                    ld      a,e
000D' 1E 3C                 ld      e,60            ; 60 seconds / minute
000F' ED 5C                 mlt     de
0011' 83                    add     a,e
0012' 5F                    ld      e,a
0013' 7A                    ld      a,d
0014' CE 00                 adc     a,0
0016' 57                    ld      d,a             ; minutes +seconds 0017' 23                    inc     hl              ; point to the hours
0018' 7E                    ld      a,(hl)          ; get the hours
0019' CD 0000#              call    bcdbin 001C' 67                    ld      h,a
001D' 2E E1                 ld      l,225           ; 3600 = 225 * 16
001F' ED 6C                 mlt     hl              ; hours * 225
0021' 7C                    ld      a,h
0022' 65                    ld      h,l
0023' 2E 00                 ld      l,0             ; times 16

0025' 19                    add     hl,de           ; add in minutes and seconds
0026' CE 00                 adc     a,0             ; settle the carry
0028' D1                    pop     de
0029' C9                    ret                     ; ahl = seconds at hl
```

TABLE I

```
                                    end
0 Error(s) Detected.    42 Program Bytes.
2 Symbols Detected.

.z80 global daydif external hldvl6, atohex, hltohx, tyear, tdamo, tdawk

; daydif
                    ;       subtracts the date in bde from the date in chl,
                    ;       adjusts for leap year,
                    ;       assumes less than 1 year difference ; returns elapsed days in hl
                    ;       carry set indicates bde later than chl
0000'               daydif:
0000' D5                    push    de              ; save the early date
0001' D5                    push    de              ; save the early month twice
0002' C5                    push    bc              ; save the years
0003' E5                    push    hl              ; save the late date
0004' 48                    ld      c,b             ; start with early date
0005' EB                    ex      de,hl
0006' CD 005D'              call    julian          ; compute the julian date
0009' EB                    ex      de,hl           ; put early in de
000A' E1                    pop     hl              ; restore hl, bc
000B' C1                    pop     bc
000C' CD 005D'              call    julian          ; get the julian date
000F' F1                    pop     af              ; get the early month
0010' 87                    or      a
0011' ED 52                 sbc     hl,de           ; compute the difference
0013' D1                    pop     de              ; phase the stack
0014' D0                    ret     nc              ; nc, done 0015' D5                    push    de
0016' 57                    ld      d,a             ; save the early month
0017' 79                    ld      a,c             ; get the late year
0018' B8                    cp      b
0019' 38 0E                 jr      c,julx          ; c, early is bigger 001B' 11 0160               ld      de,365          ; add back the year offset
001E' 19                    add     hl,de
001F' E6 03                 and     3               ; late year mod 4
0021' 20 06                 jr      nz,julx         ; nz, not leap year 0023' 7A                    ld      a,d             ; get the early month
0024' FE 03                 cp      3               ; before feb ?
0026' 38 01                 jr      c,julx          ; c, yes 0028' 23                    inc     hl              ; add in the leap year day
0029'               julx:
0029' D1                    pop     de
002A' C9                    ret ;clwksl
                    ;       Creates a mask for day of the week in a
                    ;       sets hl to 0 or 1 for odd or even week offset
002B'               clwksl:
                    global clwksl
002B' C5                    push    bc 002C' 3A 0000#              ld      a,(tyear)       ; year in a
002F' CD 0000#              call    atohex          ; make it binary
0032' 4F                    ld      c,a
0033' 2A 0000#              ld      hl,(tdamo)      ; month/day in hl
0036' CD 0000#              call    hltohx          ; in binary
0039' 3A 0000#              ld      a,(tdawk)       ; day of week in a
003C' 18 01                 jr      clwkent         ; skip the push bc
                    ; clwksl
```

TABLE I

```
;       Finds julian day from date c,h,l yr,mnth,day
;       Finds julian week & day (/7), uses a = day of the week.
; returns
;       hl = odd/even week offset   a = day of week mask bit
003E'           dwksel:
                global dwksel
003E' C5                push    bc
003F'           clwkent:
003F' D5                push    de
0040' E6 07             and     7               ; mask for 7 days
0042' CD 005D'          call    julian          ; get the julian day
0045' 11 0007           ld      de,7
0048' 47                ld      b,a             ; use day of week for counter
0049' CD 0000#          call    hldv16          ; get the julian week, & week day
004C' 2C                inc     l               ; based at 1
004D' 95                sub     l               ; day of week bigger ?
004E' 30 01             jr      nc,wksame       ; nc, jdawk <=, no increment 0050' 1C                inc     e               ; bump the week
0051'           wksame:
0051' 7B                ld      a,e
0052' E6 01             and     1               ; mask for odd or even offset
0054' 6F                ld      l,a             ; return it in hl
0055' 3E 80             ld      a,80h           ; setup the week day mask
0057'           wkloop:                         ; rotate the bit around
0057' 0F                rrca
0058' 10 FD             djnz    wkloop          ; to find this day ; return mask in a
005A' D1                pop     de
005B' C1                pop     bc
005C' C9                ret ; julian
;       Looks up the month in h.  Adds the julian date to l result
;       in hl.  Increments hl if c mod 4 is 0.
005D'           julian:
                global julian
005D' F5                push    af              ; save some registers
005E' D5                push    de
005F' EB                ex      de,hl           ; put month and day in hl
0060' 21 0070'          ld      hl,jultbl-2     ; point to the date table
0063' D5                push    de              ; save the month
0064'           juloop:
0064' 23                inc     hl              ; next entry
0065' 23                inc     hl
0066' 15                dec     d               ; is this it
0067' 20 FB             jr      nz,juloop       ; nz, nope 0069' 7E                ld      a,(hl)          ; get the value
0027' FE 70              cp      strkey
0029' 21 0000#          ld      hl,omins        ; start key ?
002C' 28 19             jr      z,settim        ; z= open/start value 002E' FE 60             cp      settime         ; last try, time key ?
0030' 20 3F             jr      nz,clckx0       ; nz, no, exit 0032' 3E FF             ld      a,255
0034' 32 0000#          ld      (setit),a       ; flag setting the clock 0037' 21 0000#          ld      hl,tmins        ; point to the current time
003A' 7A                ld      a,d             ; save the fast/slow
003B' 11 0000#          ld      de,smins        ; transfer time to set time storage
003E' 01 0006           ld      bc,6            ; update the set storage
0041' ED B0             ldir                    ; restore fast/slow
0043' 57                ld      d,a
0044' 21 0000#          ld      hl,smins        ; point to the setting address
0047'           settim:
0047' CD 0000#          call    tindsp          ; display the current setting
004A' 7A                ld      a,d             ; get fast or slow
004B' FE 04             cp      fastkey         ; slow
004D' 28 0F             jr      z,setfst        ; z= fast key
```

TABLE I

```
004F'  FE 26              cp      slowkey
0051'  20 19              jr      nz,clckex          ; not fast or slow try again 0053'  3A 0000#           ld      a,(slotmo)         ; check the timeout
0056'  B7                 or      a
0057'  20 13              jr      nz,clckex          ; nz= not done yet 0059'  3E 28              ld      a,slowcnt          ; load the slow count
005B'  32 0000#           ld      (slotmo),a
005E'              setfst:
005E'  3A 0000#           ld      a,(fstimo)         ; check the timeout
0061'  B7                 or      a
0062'  20 08              jr      nz,clckex          ; nz= not done yet 0064'  3E 02              ld      a,fstcnt/2         ; load the fast timeout
0066'  32 0000#           ld      (fstimo),a         ; load the fast count
0069'  CD 020E'           call    clkinc             ; increment the vlaue
006C'              clckex:
006C'  CD 0000#           call    clockrow           ; check for input
006F'  38 92              jr      c,clcke1           ; c= input, decode it
0071'              clckx0:
0071'  AF                 xor     a                  ; allow display updates
0072'  32 0000#           ld      (noupdt),a
0075'  3A 0000#           ld      a,(setit)          ; setting the clock ?
0078'  B7                 or      a
0079'  28 0A              jr      z,clckx1           ; z= no 007B'  AF                 xor     a
007C'  32 0000#           ld      (setit),a          ; 0 the setting flag
007F'  32 0000#           ld      (ssecs),a          ; and the seconds
0082'  C3 037D'           jp      setcl1             ; nz, yep, exit by set routine
0085'              clckx1:
0085'  21 0000#           ld      hl,tmins           ; display the time
0088'  C3 0000#           jp      tdspns             ; use the dirty routine 008B'              setdwll:
008B'  21 0000#           ld      hl,bdwel           ; point to the dwell table base
008E'  3A 0000#           ld      a,(lstchn)
0091'  47                 ld      b,a
0092'  3A 0000#           ld      a,(dwchan)         ; get the existing channel
0095'  3D                 dec     a                  ; check it
0096'  B8                 cp      b                  ; against last channel
0097'  38 02              jr      c,setdw0           ; c, it's ok 0099'  3E 00              ld      a,0                ; reset to first channel
009B'              setdw0:
009B'  4F                 ld      c,a
009C'  06 25              ld      b,booksz           ; compute the offset to the
009E'  ED 4C              mlt     bc                 ;   dwel storage
00A0'  09                 add     hl,bc              ; offset to the channel
00A1'  3C                 inc     a                  ; offset for 1 in display
00A2'  32 0000#           ld      (dwchan),a
00A5'              setdw1:
00A5'  3A 0000#           ld      a,(dwchan)         ; display channel # as high digit
00A8'  CD 0000#           call    atobcd             ; make a bcd
00AB'  32 0000#           ld      (hidigit),a 00AE'  7E                 ld      a,(hl)             ; display the dwell as low digit
00AF'  CD 0000#           call    atobcd             ; convert the value to bcd
00B2'  32 0000#           ld      (lodigit),a
00B5'  CD 0000#           call    dspdsp 00B8'  7A                 ld      a,d                ; check for fast or slow
00B9'  FE 0F              cp      15
00BB'  28 26              jr      z,stdwx            ; z= display only 00BD'  FE 04              cp      fastkey            ; looking for fast set
00BF'  28 0F              jr      z,fstdwel          ; z= yes bump up the dwell 00C1'  FE 06              cp      slowkey            ; is it slow
```

TABLE I

```
00C3' 20 1E              jr       nz,stdwx        ; nz= illegal input

00C5' 3A 0000#           ld       a,(slotmo)      ; check timout
00C8' 87                 or       a
00C9' 20 18              jr       nz,stdwx        ; nz= timeout not done 00CB' 3E 28              ld       a,slowcnt       ; load the slow count #
00CD' 32 0000#           ld       (slotmo),a
00D0'           fstdwel:
00D0' 3A 0000#           ld       a,(fstimo)      ; check timout
00D3' 87                 or       a
00D4' 20 0D              jr       nz,stdwx        ; nz= timeout not done 00D6' 3E 04              ld       a,fstcnt        ; load the fast count #
00D8' 32 0000#           ld       (fstimo),a 00DB' 7E                 ld       a,(hl)          ; get the dwell
00DC' 3C                 inc      a               ; increment it
00DD' FE 1E              cp       maxdwell        ; check the range
00DF' 38 01              jr       c,setdw2        ; c= in range 00E1' AF                 xor      a               ; wrap to 0
00E2'           setdw2:
00E2' 77                 ld       (hl),a          ; load the new figure 00E3'           stdwx:                            ; check for a new channel #
00E3' CD 0000#           call     rdlns
00E6' 30 0D              jr       nc,stdwx1       ; nc= no chan input ld       a,c             ; get the key #
00E8' 79                 ld       b,booksz        ; offset per record
00E9' 06 25              mlt      bc              ; compute the gross offset
00EB' ED 4C              ld       hl,bdwel        ; start with dwell table base
00ED' 21 0000#           add      hl,bc           ; add the offset # for the address
00F0' 09

; change column into bcd
                         inc      a               ; add one to the column #
00F1' 3C                 ld       (dwchan),a      ; save the new column #
00F2' 32 0000#
00F5'           stdwx1:
00F5' CD 0000#           call     clockrow        ; check for key still down
00F8' D2 0071'           jp       nc,clckx0       ; nc= no key exit 00FB' CD 0000#           call     separate        ; separate function / fast, slow
00FE' CA 0071'           jp       z,clckx0        ; z= no function key 0101' FE 90              cp       dwkey
0103' C2 006C'           jp       nz,clckex       ; nz, no speed key 0106' 18 9D              jr       setdw1          ; z= still playing with dwell ;spding  Fast ke, combo check
0108'           spding:
0108' FE 04              cp       fastkey
010A' C0                 ret      nz              ; not a fast key either 010B' CD 0000#           call     rdlns
010E' D0                 ret      nc              ; nc, no key in
010F'           faston:
                global faston
010F' 78                 ld       a,b             ; get the row
0110' E6 03              and      3
0112' FE 02              cp       2
0114' C0                 ret      nz              ; nz, not an on row 0115' CD 0000#           call     hfrest          ; force a half power turn on
0118' CD 0000#           call     cnnc01          ; do the turn on stuff
011B' F5                 push     af              ; save the return status
011C' 3E FF              ld       a,255
011E' 32 0000#           ld       (hfset),a       ; keep the half power on 0121' 3A 0000#           ld       a,(solctr)      ; set the overide control
```

TABLE I

```
0124' E6 7F              and     255-ovridem     ; turn off the overide
0126' 32 0000#           ld      (solctr),a
0129' 3C                 inc     a
012A' 32 0000#           ld      (csiupd),a      ; force a csi update
012D' F1                 pop     af              ; return the turn on status
012E' C9                 ret ; check for a speed key, channel combo
012F'            spdchk:
                   global spdchk
012F' 7A                 ld      a,d
0130' FE 26              cp      slowkey         ; slow setting key ?
0132' 20 04              jr      nz,spding       ; nz, nope, try fast 0134' 3A 0000#           ld      a,(scodbn)      ; previous combo key
0137' B7                 or      a
0138' C0                 ret     nz              ; yep exit 0139' CD 0000#           call   rdins
013C' D0                 ret    nc               ; nc, no character
013D'            combin:
                   global combin   ; entry with column in c for host/monitor calls
013D' CD 0000#           call    savix
0140' DD 21 0000#        ld      ix,offl         ; point to the leds/keys
0144' CB 59              bit     3,c             ; high or low ?
0146' 28 02              jr      z,lowspd        ; z, low 0148' DD 23              inc     ix              ; use high bytes
014A'            lowspd:
014A' C5                 push    bc              ; put column on the stack
014B' 21 0000            ld      hl,0
014E' 39                 add     hl,sp           ; point to it
014F' CD 0000#           call    prbit           ; mask - d, high/low - a
0152' C1                 pop     bc              ; phase the stack 0153' DD 7E 10           ld      a,(ix+flow0)    ; check for error lock out
0156' DD B6 12           or      (ix+pwr0)
0159' A2                 and     d               ; in this channel
015A' C2 0000#           jp      nz,beep         ; nz, error lock out
                 ; resetclock
                 ;      Set the clock to all 1's, clear the clock scratch ram.
                 ;      Set the clock ram to the stock program.
                 ;      Show flashing 8's until clock set key is pressed 0227'            resetclock:
0227' CD 0000#           call    savall
022A' E1                 pop     hl
022B' 21 0000#           ld      hl,getmost      ; return af
022E' E5                 push    hl
022F' 21 FFFF            ld      hl,-1
0232' 22 0000#           ld      (keyval),hl     ; prevent a false key read
0235' 22 0000#           ld      (temkey),hl
0238' 21 0000#           ld      hl,clkscr       ; point to clock scratch pad
023B' 06 ??              ld      b,clkscz-1      ; set the count 023D' 21 0000#           ld      hl,tdawk        ; point to the day of the week
0240' 06 04              ld      b,4             ; check 4 values
0242'            clkrs0:
0242' 7E                 ld      a,(hl)          ; get a value
0243' C6 00              add     a,0             ; don't change it
0245' 27                 daa                     ; make it bcd
0246' 20 02              jr      nz,clkr01       ; nz, its ok 0248' 3E 01              ld      a,1             ; make it 1
024A'            clkr01:
024A' 77                 ld      (hl),a
024B' 23                 inc     hl              ; next byte
024C' 10 F4              djnz    clkrs0

024E' 21 0000#           ld      hl,tsecs
```

TABLE I

```
0251' 11 0000#              ld      de,secs
0254' 01 0007               ld      bc,7
0257' ED B0                 ldir
0259' CD 0376'              call    setclk
025C' 01 0000#              ld      bc,clkscz
025F' 41                    ld      b,c
0260' 21 0000#              ld      hl,clkscr          ; clear the scratch pad
0263'              clkrs1:
0263' 36 00                 ld      (hl),0             ; 0 that ram
0265' 23                    inc     hl
0266' 10 FB                 djnz    clkrs1

0268' 3A 0000#              ld      a,(solctr)         ; clear the ok bit
026B' E6 BF                 and     not ckmsk
026D' 32 0000#              ld      (solctr),a
0270'              clkrs3:
0270' 3E FF                 ld      a,255              ; disable lcd updates
0272' 32 0000#              ld      (noupdt),a 0275' 21 03A8'              ld      hl,rmbdmsg         ; print the reason for ignore
0278' CD 0000#              call    pstrng 027B' CD 0000#              call    ignore             ; display ignore message on console
         FFFF       1  if not cpm   ; don't do this in test system
027E'               1  blinker:
027E' 7A            1        ld      a,d
027F' FE 0F         1        cp      blankchr          ; showing blank lcd ?
0281' 16 88         1        ld      d,88h             ; change to 88
0283' 28 02         1        jr      z,eights          ; z, it's blanked show eights
0285' 16 0F         1        ld      d,blankchr        ; set the blank char
0287'               1  eights:
0287' 7A            1        ld      a,d               ; get the character
0288' CD 0000#      1        call    blank4            ; fill the lcd with it
028B'               1  clkrs4:
028B' 3A 0000#      1        ld      a,(chgscs)        ; check for a seconds change
028E' B7            1        or      a
028F' 3E 00         1        ld      a,0               ; clear the change what ever
0291' 32 0000#      1        ld      (chgscs),a
0294' 20 E8         1        jr      nz,blinker 0296' CD 0000#      1        call    ignloop           ; check for ignore input
0299' 3E 00         1        ld      a,0
029B' CA 033F'      1        jp      z,clkrs6          ; z, leave ram alone 029E' 3A 0001#      1        ld      a,(keyval +1)     ; setting time?
02A1' FE 0E         1        cp      clkrow            ; check row
02A3' 20 E6         1        jr      nz,clkrs4         ; nz, nope try again 02A5' 3A 0000#      1        ld      a,(keyval)
02A8' E6 F0         1        and     0f0h              ; strip low nibble
02AA' FE 60         1        cp      settime           ; check function
02AC' 20 DD         1        jr      nz,clkrs4         ; nz, nope try again
                       endif                          ; end of test elimination 02AE'              rdefaults:
                       global rdefaults
02AE' 21 0000#              ld      hl,clrspc          ; clear the download area
02B1' 11 0001#              ld      de,clrspc+1
02B4' 01 FFFF#              ld      bc,clrsize-1
02B7' 36 00                 ld      (hl),0
02B9' ED B0                 ldir 02BB' 3A 0000#              ld      a,(llrsdf)         ; set the llreset value
02BE' 32 0000#              ld      (llrsvl),a
02C1' 3A 0000#              ld      a,(hcrdfl)         ; load the hi current timeout
02C4' 32 0000#              ld      (hcrmem),a
02C7' 3A 0000#              ld      a,(soldfl)         ; get the sense timeout
02CA' 32 0000#              ld      (msoldla),a 02CD' 3A 0000#              ld      a,(solctr)         ; set the ok mask to flag
02D0' F6 40                 or      okmsk              ;  that clock is set
```

TABLE I

```
02D2'  32 0000#             ld      (solctr),a

02D5'  3A 0000#             ld      a,(dfdawk)           ; get the legal days of the week
02D8'  32 0000#             ld      (opday0),a           ; setup for 7 or 14 day timing
02DB'  32 0000#             ld      (opday1),a 02DE'  21 0000#             ld      hl,dosec             ; point to the stock program
02E1'  11 0000#             ld      de,osecs             ; and the program storage
02E4'  01 0000#             ld      bc,notdfl            ; load the count
02E7'  ED B0                ldir                         ; load the program 02E9'  3E 02                ld      a,tiers              ; get # of tiers
02EB'  32 0000#             ld      (tiercn),a           ; save the tier count
02EE'  3E 1F                ld      a,maxchans-1         ; get the last channel #
02F0'  32 0000#             ld      (lstchn),a           ; save it for later
02F3'  32 0000#             ld      (mstrauto),a         ; setup the initial auto channel
02F6'  32 0000#             ld      (hotchn),a
02F9'  32 0000#             ld      (lstauto),a
02FC'  3C                   inc     a                    ; set the # of defaults to fill 02FD'  21 0000#             ld      hl,bflohi            ; point to the first storage spot
0300'              ldbklp:
0300'  EB                   ex      de,hl                ; destination in de
0301'  21 0000#             ld      hl,bdflts            ; source in hl
0304'  01 0000#             ld      bc,numdfl            ; set the count
0307'  ED B0                ldir                         ; transfer the defaults
0309'  21 ????              ld      hl,booksz-numdfl     ; offset to next dest. record
030C'  19                   add     hl,de                ; next record
030D'  3D                   dec     a                    ; more to load ?
030E'  20 F0                jr      nz,ldbklp            ; nz, yes 0310'  2A 0000#             ld      hl,(dfina)           ; load the default system
0313'  22 0000#             ld      (inarat),hl          ;   flow rates
0316'  21 0000              ld      hl,0
0319'  22 0000#             ld      (maxrat),hl          ; max is set on the fly
031C'  22 0000#             ld      (currat),hl          ; 0 the rate counters
031F'  22 0000#             ld      (hprate),hl
0322'  22 0000#             ld      (inahi),hl
0325'  22 0000#             ld      (acthi),hl
0328'  2B                   dec     hl
0329'  22 0000#             ld      (keyval),hl
032C'  22 0000#             ld      (keync),hl
032F'  21 0478#             ld      hl,book+booksz*(maxchans-1)
0332'  22 0000#             ld      (actrec),hl 0335'  06 03                ld      b,sample
0337'  21 0000#             ld      hl,ratbuf
033A'  AF                   xor     a
033B'              clkrs5:
033B'  77                   ld      (hl),a
033C'  23                   inc     hl
033D'  10 FC                djnz    clkrs5
033F'              clkrs6:
033F'  32 0000#             ld      (noupdt),a
0342'  32 0000#             ld      (windoa),a
0345'  32 0000#             ld      (erproc),a
0348'  32 0000#             ld      (smflag),a
034B'  32 0000#             ld      (alton),a
034E'  32 0000#             ld      (lstovr),a
0351'  32 0000#             ld      (lston),a
0354'  32 0000#             ld      (syrbit),a
0357'  3C                   inc     a
0358'  32 0000#             ld      (dwchan),a
035B'  3E 80                ld      a,80h
035D'  32 0000#             ld      (autbit),a
0360'  3D                   dec     a
0361'  32 0000#             ld      (newmin),a
0364'  21 0000#             ld      hl,tmins
0367'  C3 0000#             jp      tdspns               ; show the time
```

TABLE I

```
                        ; clkhl
                        ;       move clock reading (mins, hours, day of month) into (hl)
036A'                   clkhl:
036A' CD 0000#                  call    savall
036D' EB                        ex      de,hl           ; destination in de 036E' 21 0000#                  ld      hl,tmins        ; source in hl
0371' 01 0002                   ld      bc,2            ; move 2 bytes
0374' ED B0                     ldir
0376' 23                        inc     hl              ; skip day of the week
0377' ED A0                     ldi
0379' C9                        ret ; setclk
                        ;       load the clock with values at smins-syear
                        ;       display the time
037A'                   setclk:
037A' CD 0000#                  call    savall          ; save the environment 037D'                   setcl1:
037D' F3                        di
037E' 21 0000#                  ld      hl,ssecs        ; check minutes & seconds
0381' 06 02                     ld      b,2
0383'                   setcl1a:
0383' 7E                        ld      a,(hl)          ; check for valid seconds
0384' FE 5A                     cp      5ah             ; less than 60
0386' 30 06                     jr      nc,setcl2       ; nc, nope fix it 0388' E6 0F                     and     15              ; mask for low digit
038A' FE 0A                     cp      10              ; in range
038C' 38 02                     jr      c,setcl3        ; c, its ok
038E'                   setcl2:
038E' AF                        xor     a
038F' 77                        ld      (hl),a          ; bad value make it 0
0390'                   setcl3:
0390' 10 F1                     djnz    setcl1a 0392' 21 0000#                  ld      hl,smins
0395' 11 0000#                  ld      de,tmins        ; load new time in working regs
0398' D5                        push    de
0399' 01 0006                   ld      bc,6            ; load 6 registers
039C' ED B0                     ldir 039E' E1                        pop     hl
039F' E5                        push    hl
03A0' CD 0000#                  call    swwrite
03A3' E1                        pop     hl              ; display the new time
03A4' FB                        ei
03A5' C3 0000#                  jp      tdspns 03A8'                   rmbdmsg:
03A8' 0D 0A 20 20              defb    cr,lf,'   Ramcheck BAD ',cr,lf,0,'$'
                        end
0 Error(s) Detected.    962 Program Bytes.
538 Symbols Detected.

.z80
                        .LIST

; 12-07-88 Added erproc test in OFF routines to allow hi current
                        ;       turn off during SMF.
                        ;       drk ; 11-10-88 Rearranged error display order, LP, EP, HP.
                        ;       drk
```

TABLE I

```
;  02-20-88 Added a test of smflag before processing ON or OFF.
;          If measuring is in process ON and OFF are not allowed,
;          only AUTO is allowed.  The clock routine will also allow
;          toggling between SCO and normal AUTO modes.
;          drk ;  01-10-87 Added call to set close to set the shut down rates
;          and times for inactive flow checking.
;          drk ;  01-06-88 Added erproc flag test to off routines to allow
;          channel shutdown from error processing routines without
;          clearing any errors.
;          drk ;  12-21-87 Added return flag. Zero = successful setup. Non zero
;          = unsuccessful. A reselect is considered successful
;          since the desired condition is achieved.
;          drk ;  10-33-87 Added code to allow channels to have multiple leds
;          and keys on to display compound select functions. Namely
;          Sense Cycle Overide which displays the OFF LED concurrently
;          with the AUTO or ON LED to indicate selection of the
;          function, and all three LEDs illuminated to indicate
;          activation of the channel in that condition. Sensing of
;          all KEYs off was also added to indicate a channel in an
;          error condition. The only selection allowed during an
;          error condition is OFF which clears the error display and
;          allows normal operation of the channel.
;          drk
```

```
0000'                watval:
                      global watval, chnchk

; external  offtbl, autotbl, ontbl
                      external  maset
                      external  offl, offh, autol, autoh, onl, onh, solenl, solenh
                      external  solctr, konl, konh, active, hpcnt, erproc
                      external  savix, csiupd, keytim, hperrc, clkhl
                      external  tsecs, temkey
                      external  solenl, keyaddr, csistart, keyno, maxchn, mstrauto
                      external  savall, prtbit, autoff, astop, finatm
                      external  recstop, recstart, getmost, dovrmx, fndreh
                      external  mstron, windos, lstovr, lston
                      external  book, setclose, addrate
                      external  smflag, beeptm
                      page 64
                    ; chnchk
                    ; Checks keyboard scan input. Exits on illegal input, or ; ON - Forces a channel into override if the max number
                    ;   of solenoids on is not exceeded. If the active is maximum the
                    ;   routine tries first to turn off an auto channel in the selected
                    ;   tier, else it looks for any auto to turn off or, if none is found
                    ;   it does nothing.
                    ; OFF and AUTO put the selected channel in that state. If the channel
                    ;   was ON and no other channel was in overide,
                    ;   then overide is turned off.
```

```
0000'                      chnchk:
                            global chnchk
0000' ED 4B 0000#           ld    bc,(keyno)      ; get the key number
0004' 78                    ld    a,b
0005' FE 08                 cp    kbsid           ; check for legal function
0007' D0                    ret   nc              ; nc, too big
0008'                      chnc01:
                            global chnc01
0008' CD 0000#              call  savix           ; save the index registers
000B' ED 43 0000#           ld    (temkey),bc
```

TABLE I

```
000F'  21 0000#              ld      hl,temkey        ; point to temporary storage
0012'  CD 0000#              call    prtbit           ; convert to byte/bit posit 0015'  59                    ld      e,c              ; channel # in e
0016'  78                    ld      a,b              ; get the row
0017'  CB 27                 sla     a                ; times 2
0019'  FE 04                 cp      4                ; in the on row ?
001B'  38 02                 jr      c,noton          ; nope 001D'  C6 0A                 add     a,kon-lon        ; use the kb flag for on
001F'                noton:
001F'  4F                    ld      c,a              ; offset in bc
0020'  06 00                 ld      b,0
0022'  DD E5                 push    ix
0024'  E1                    pop     hl               ; point to the keyboard stat
0025'  09                    add     hl,bc            ;   bit is in this byte
0026'  22 0000#              ld      (keyaddr),hl     ; save the byte position 0029'  4B                    ld      c,e              ; get the channel #
002A'  06 25                 ld      b,booksz
002C'  ED 4C                 mlt     bc               ; compute book offset
002E'  FD 21 0000#           ld      iy,book
0032'  FD 09                 add     iy,bc            ; book channel base -> in iy ; hl -> keyboard flag byte, d = mask bit e = channel #
                ; ix -> led/kb array, iy -> channel book array
0034'  3A 0001#              ld      a,(temkey+1)     ; decode the function
0037'  B7                    or      a
0038'  CA 00C9'              jp      z,choff          ; c= it's off 003B'  4F                    ld      c,a
003C'  7E                    ld      a,(hl)           ; get the current stat
003D'  2F                    cpl                      ;  return ok status on reselect
003E'  A2                    and     d                ; reselect ?
003F'  C8                    ret     z                ; z, yes 0040'  DD 7E 10              ld      a,(ix+flow0)     ; get the flow error stat
0043'  DD B6 12              or      (ix+pwr0)        ; and the power error stat
0046'  A2                    and     d                ; either one non zero ?
0047'  C0                    ret     nz               ; nz, yes, no auto or on allowed 0048'  3A 0001#              ld      a,(temkey+1)     ; decode the function
004B'  FE 01                 cp      1                ; is it auto ?
004D'  CA 0183'              jp      z,chauto         ; z= yes, it's auto ; On Key routines.
                ; hl -> keyboard flag byte, d = mask bit e = channel #
                ; ix -> led/kb array, iy -> channel book array
0050'                chon:
                     global chon
0050'  3A 0000#              ld      a,(smflag)
0053'  3C                    inc     a                ; measuring done ?
0054'  28 09                 jr      z,chon0          ; yes 0056'  3D                    dec     a                ; started ?
0057'  28 06                 jr      z,chon0          ; no, 0059'  3E 06                 ld      a,2*beepdur      ; give a double long beep
005B'  32 0000#              ld      (beeptm),a
005E'  C9                    ret                      ; don't turn on a channel
005F'                chon0:
005F'  21 0000#              ld      hl,active        ; point to active channel count
0062'  3A 0000#              ld      a,(maxchn)       ; check for max # of active channels
0065'  3D                    dec     a
0066'  BE                    cp      (hl)
0067'  D8                    ret     c                ; c= maxed out already, non zero here 0068'  CD 0000#              call    mstron           ; check & turn on the master valve
006B'  C0                    ret     nz               ; nz, lp error, no turn on !
```

TABLE I

```
006C' 7B                      ld      a,e                 ; get the channel number
006D' 32 0000#                ld      (lstcn),a           ; save it for ni current checks 0070' 34                      inc     (hl)                ; add in this channel to active count
0071' 3A 0000#                ld      a,(hperrc)          ; check the timeout
0074' FD BE 10                cp      (iy+open)
0077' 30 06                   jr      nc,skonhp 0079' FD 7E 10                ld      a,(iy+open)         ; start the settle time
007C' 32 0000#                ld      (hperrc),a
007F'              skonhp:
007F' CD 0000#                call    addrate 0082' CD 0000#                call    autoff              ; clear any active auto
0085' 34                      inc     (hl)                ; bump up the count 0086' 3A 0000#                ld      a,(solctr)          ; get the overide byte
0089' F6 80                   or      ovridem             ; turn on the overide
008B' 32 0000#                ld      (solctr),a 008E' 01 0000                 ld      bc,lstr             ; use the start record
0091' FD E5                   push    iy
0093' E1                      pop     hl
0094' 09                      add     hl,bc
0095' CD 0000#                call    clkhl               ; record the start time 0098' FD 4E 20                ld      c,(iy+ovrv)         ; get the overide timeout
009B' FD 71 15                ld      (iy+ovrt),c         ; load the timer 009E' DD 7E 06                ld      a,(ix+solen)        ; get the control byte
00A1' B2                      or      d
00A2' DD 77 06                ld      (ix+solen),a        ; turn on the solenoid
00A5' DD 77 04                ld      (ix+lon),a          ;   the on led
00A8' DD 77 0E                ld      (ix+kon),a          ;   and the key 00AB' DD 7E 0C                ld      a,(ix+kauto)        ; test the auto
00AE' 4F                      ld      c,a                 ; save the byte
00AF' 7A                      ld      a,d
00B0' 2F                      cpl
00B1' 5F                      ld      e,a                 ; save the complement
00B2' A1                      and     c                   ; reset the auto
00B3' DD 77 0C                ld      (ix+kauto),a
00B6' DD 77 02                ld      (ix+lauto),a 00B9' 79                      ld      a,c
00BA' 2F                      cpl                         ; invert for ok return
00BB' A2                      and     d                   ; was auto key on ?
00BC' C8                      ret     z                   ; yes leave the off alone 00BD' 7B                      ld      a,e                 ; get the complement mask
00BE' DD A6 0A                and     (ix+koff)           ; reset the off key
00C1' DD 77 0A                ld      (ix+koff),a
00C4' DD 77 08                ld      (ix+loff),a
00C7' AF                      xor     a                   ; ok return
00C8' C9                      ret ; Off Key routines
00C9'             choff:
                      global choff
                      ; hl -> keyboard flag byte, d = mask bit e = channel #
                      ; ix -> led/kb array, iy -> channel book array, b = 0
00C9' 3A 0000#                ld      a,(smflag)
00CC' 3C                      inc     a
00CD' 28 0F                   jr      z,choff0            ; measuring done ?
                                                          ; yes 00CF' 3D                      dec     a                   ; started ?
00D0' 28 0C                   jr      z,choff0            ; no,
```

TABLE I

```
0002' 3A 0000#           ld     a,(erproc)        ; check for an error turn off
0005' B7                 or     a
0006' 20 06              jr     nz,choff0         ; nz, error turn off, allow it 0008' 3E 06              ld     a,2*beepdur       ; give a double long beep
000A' 32 0000#           ld     (beeptm),a
000D' C9                 ret                      ; don't turn off the channel
000E'             choff0:
000E' DD 7E 0A           ld     a,(ix+koff)       ; turn on the off key & led
00E1' B2                 or     d
00E2' DD 77 0A           ld     (ix+koff),a
00E5' DD 77 00           ld     (ix+loff),a 00E8' 3A 0000#           ld     a,(mstrauto)      ; check for atuo turnoff
00EB' E6 3F              and    3fh               ; mask for channels only
00ED' BB                 cp     e                 ; same channel ?
00EE' 20 03              jr     nz,choff1         ; nz no match, wrong key 00F0' CD 0000#           call   autoff            ; kill the auto if necessary
00F3'             choff1:
00F3' CD 012E'           call   chnoff 00F6' 7A                 ld     a,d
00F7' 2F                 cpl
00F8' 5F                 ld     e,a               ; save the complement mask 00F9' DD 7E 0C           ld     a,(ix+kauto)
00FC' A3                 and    e                 ; turn off the auto key & led.
00FD' DD 77 0C           ld     (ix+kauto),a
0100' DD 77 02           ld     (ix+lauto),a 0103' 3A 0000#           ld     a,(erproc)        ; check for error turnoff
0106' B7                 or     a                 ; in process ?
0107' 20 14              jr     nz,chofsk         ; nz, yes, skip the clear
0109' 06 03              ld     b,erbytct         ; set up a loop count
010B'             choflp:
010B' DD 7E 10           ld     a,(ix+sys1)       ; get the error byte
010E' 4F                 ld     c,a               ; save it
010F' A3                 and    e                 ; clear the bit
0110' DD 77 10           ld     (ix+sys1),a       ; restore the error byte
0113' 79                 ld     a,c
0114' A2                 and    d                 ; this one set ?
0115' 20 0D              jr     nz,choflx         ; yes quit 0117' DD 23              inc    ix                ; move to the next error byte
0119' DD 23              inc    ix
011B' 10 EE              djnz   choflp
011D'             chofsk:

011D' 3E FF              ld     a,255             ; force a csi update
011F' 32 0000#           ld     (csiupd),a
0122' AF                 xor    a                 ; ok return
0123' C9                 ret
0124'             choflx:
0124' 3E 58              ld     a,sysrdbnc        ; start the debounce timeout
0126' 32 0000#           ld     (keytim),a
0129' 32 0000#           ld     (csiupd),a
012C' AF                 xor    a                 ; ok return
012D' C9                 ret ; record stop time, settle active count, record astop time,
; kill solenoid,
; hl -> keyboard flag byte, d = mask bit e = channel #
; ix -> led/kb array, iy -> channel book array, b = 0
012E'             chnoff:
                  global chnoff
012E' DD 7E 0E           ld     a,(ix+kon)
0131' A2                 and    d                 ; kill the on ?
```

TABLE I

```
0132'  28 3C                    jr      z,chnof1         ; z = no turn off

0134'  7B                       ld      a,e              ; get the channel #
0135'  32 0000#                 ld      (lstovr),a       ; record the # for flow checks
0138'  CD 0000#                 call    recstop          ; note the stop time 013B'  21 0000#                 ld      hl,active        ; point to active channel count
013E'  7E                       ld      a,(hl)           ; decrement active
013F'  D6 01                    sub     1
0141'  38 03                    jr      c,chnof2         ; nc= already zero 0143'  77                       ld      (hl),a
0144'  20 27                    jr      nz,chnof3        ; nz, more than 1 on leave overide
0146'              chnof2:
0146'  D5                       push    de               ; save mask and channel #
0147'  01 0003                  ld      bc,3             ; move 3 time bytes
014A'  11 0000#                 ld      de,astop
014D'  21 0000#                 ld      hl,tsecs
0150'  ED B0                    ldir
0152'  D1                       pop     de 0153'  3A 0000#                 ld      a,(solctr)       ; get the overide byte
0156'  E6 7F                    and     not ovridem      ; turn it off
0158'  32 0000#                 ld      (solctr),a
015B'  AF                       xor     a
015C'  32 0000#                 ld      (maset),a        ; clear the ma set flag 015F'  3A 0000#                 ld      a,(windoa)       ; is the window active ?
0162'  B7                       or      a
0163'  20 08                    jr      nz,chnof3        ;.nz, yes, skip master off 0165'  3A 0000#                 ld      a,(solctr)
0168'  E6 CF                    and     255-mstrmsk      ; turn off the master valve
016A'  32 0000#                 ld      (solctr),a
016D'              chnof3:
016D'  CD 0000#                 call    setclose         ; settle the shutdown rates & counts
0170'              chnof1:
0170'  7A                       ld      a,d              ; reverse the mask
0171'  2F                       cpl
0172'  DD A6 06                 and     (ix+solen)
0175'  DD 77 06                 ld      (ix+solen),a     ; to turn off solenoid
0178'  DD 77 04                 ld      (ix+lon),a       ;  and the led
017B'  DD A6 0E                 and     (ix+kon)         ; mask with the key
017E'  DD 77 0E                 ld      (ix+kon),a       ; turn off the key
0181'  AF                       xor     a                ; ok return
0182'  C9                       ret ; Auto Key routines
0183'              chauto:
                   global chauto
                   ; hl -> keyboard flag byte, d = mask bit a = channel #
                   ; ix -> led/ac array, iy -> channel book array 0183'  DD 7E 0C                 ld      a,(ix+kauto)
0186'  B2                       or      d                ; turn on the key & led
0187'  DD 77 0C                 ld      (ix+kauto),a
018A'  DD 77 02                 ld      (ix+lauto),a 018D'  3A 0000#                 ld      a,(windoa)       ; window active ?
0190'  B7                       or      a
0191'  3E 00                    ld      a,0
0193'  20 06                    jr      nz,yeswindo      ; nz, yes 0195'  DD B6 06                 or      (ix+solen)       ; need a turn off ?
0198'  DD B6 04                 or      (ix+lon)
019B'              yeswindo:
019B'  DD B6 0E                 or      (ix+kon)         ; on key to kill ?
019E'  A2                       and     d                ; any on condition to kill ?
019F'  F3                       di
```

TABLE I

```
01A0'  3E FF                  ld      a,255
01A2'  32 0000#               ld      (csiupd),a   ; force a csi update
01A5'  C2 012E'               jp      nz,chnoff    ; yes, settle times, solenoids etc.

01A8'  7A                     ld      a,d
01A9'  2F                     cpl
01AA'  DD A6 0A               and     (ix+koff)    ; turn off the off key & led.
01AD'  DD 77 0A               ld      (ix+koff),a
01B0'  DD 77 0C               ld      (ix+loff),a
01B3'  AF                     xor     a            ; ok return
01B4'  C9                     ret
                              end
      0 Error(s) Detected.  437 Program Bytes.
    435 Symbols Detected.

.z80
                              .list

; 12-16-87 Added code at csinit to zero the system error bytes.
                          ;          drk ; 07-25-87 removed initial interrupt from csistart. First
                          ;          character or the string will be sent immediately. The
                          ;          rest of the string will be sent when ever interrupts are
                          ;          enabled. (Interrupts are enabled most of the time except
                          ;          during service of an interrupt and briefly for some
                          ;          operations which must be undisturbed.)

external  outctr, csicount, solctr, leadout, offl, autol, onl
                              external  offh, autoh, onh, solenl, solenh, serstrng
                              external  saveli, savix, irptsv, dflcsi, dflstr, csterm
                              external  syser2, syser1, active, tiercn, lstchn 0002        1   if shftfactor
                          1   external  shfter
                              endif
              0000        1   if csitrmint
                              endif public   csistart, csiint, csinit, csidis cseg ; CSIINT csi interrupt. The interrupt occurs as the last data
                          ;        bit (MSB) is output onto the TXS pin. The service routine
                          ;        when outputing the strobe takes about 90 clock cycles from
                          ;        the loading of last msb until the strobe goes low.
                          ;        The strobe lasts 16 clock cycles. The impact of these facts
                          ;        is that the maximum baud rate factor is three if the data is
                          ;        to be clocked in on the rising edge of the clock pulse.
0000'                         csiint:
0000'  CD 0000#                  call    irptsv         ; save some registers
              0000        1      if 0; not finished
                                 endif
0003'  AF                        xor     a
0004'                            inn     a,(trdr)       ; read trdr to clear end flag
0004'  DB 88     A1              in      a,(trdr)
              0000        1      if testing
                                 endif
0006'  3A 0000#                  ld      a,(csicount)   ; check the count
0009'  B7                        or      a
000A'  C2 00AF'                  jp      nz,csisend     ; not 0, send next byte 0000        1      if csitrmint           ; if terminal interrupt available
                                 endif
                                                        ; strobe in the data
000D'  3A 0000#                  ld      a,(outctr)     ; get the control byte
0010'  F6 80                     or      csistb         ; strobe high
0012'                            out     (octrpt),a
```

TABLE I

```
0012' D3 02       A1              out     (octrpt),a
0014' E6 3F                       and     255-(csistb or csiblk)
0016'                             outt    (octrpt),a      ; then strobe & blank low
0016' D3 02       A1              out     (octrpt),a
0018' 32 0000#                    ld      (outctr),a
001B' AF                          xor     a 001C' 32 0000#                    ld      (csterm),a      ; clear the csi terminate byte
001F' 3A 0000#                    ld      a,(dflcsi)      ; clear interrupt & tx enable
0022' C3 00C6'                    jp      csifin 0025'                  csistart:                          ; enter here to commence sending the data
              0000   :     if cpm
                           endif
                      ;    di                             ; first char sent immediate, rest on next
0025' CD 0000#                    call    savall          ; ei from cpuini, timer,
0028' CD 0000#                    call    savix           ;   keyin, or flow interrupt 002B' 3A 0000#                    ld      a,(dflcsi)      ; kill the current tx & interrupt
002E' 01 028A                     ld      bc,cntr
0031'                             outt    (c),a
0031' ED 79       A1              out     (c),a 0033' 21 0000#                    ld      hl,leadout      ; move led data
0036' 11 0000#                    ld      de,serstrng     ; to working space
0039' ED A0                       ldi
003B' 06 02                       ld      b,tiers         ; get the tier count
003D' C5                          push    bc
003E' 18 05                       jr      csilo1
0040'                  csiloop:
0040' C5                          push    bc
0041' 01 000C                     ld      bc,csictrlao
0044' 09                          add     hl,bc
0045'                  csilo1:
0045' 01 000A                     ld      bc,csisiz
0048' ED B0                       ldir
004A' C1                          pop     bc
004B' 10 F3                       djnz    csiloop
                      ; leddsp Flash leds for error channels.  LEDs track the colon,
                      ;        c = colon state.
004D'                  leddsp:
004D' 3A 0000#                    ld      a,(solctr)      ; get the control byte
0050' E6 10                       and     clnmsk          ; mask the colon bit
0052' 20 46                       jr      nz,leddsx       ; nz, its on, show normal 0054' DD 21 0000#                 ld      ix,cff1         ; point to the first error byte
0058' 21 0001#                    ld      hl,serstrng+1   ; and led byte
005B' ED 4B 0000#                 ld      bc,(tiercn)     ; # of passes to make
005F'                  leddsf:
005F' DD 7E 10                    ld      a,(ix+flow0)    ; get low errors
0062' DD B6 12                    or      a,(ix+pwr0)
0065' DD B6 14                    or      a,(ix+ded0)
0068' 2F                          cpl                     ; 0 the bad bits
0069' 5F                          ld      e,a
006A' DD 7E 11                    ld      a,(ix+flow1)    ; get high errors
006D' DD B6 13                    or      a,(ix+pwr1)
0070' DD B6 15                    or      a,(ix+ded1)
0073' 2F                          cpl                     ; 0 the bad bits
0074' 57                          ld      d,a
0075' A3                          and     e               ; any errors to show ?
0076' 2F                          cpl                     ; errors were 0
0077' B7                          or      a
0078' 06 03                       ld      b,3             ; process all rows
007A' 28 0A                       jr      z,leddsl        ; z, no 007C'                  ledsfl:
007C' 7B                          ld      a,e
007D' A6                          and     (hl)            ; kill the bad ones 007E' 77                          ld      (hl),a
```

TABLE I

```
0077'  23                           inc    hl
0080'  7A                           ld     a,d
0081'  A6                           and    (hl)              ; high byte also
0082'  77                           ld     (hl),a
0083'  23                           inc    hl
0084'  10 F6                        djnz   ledsfl
0086'              ledcsl:
0086'  0D                           dec    c
0087'  28 11                        jr     z,ledcsx          ; z, no more tiers 0089'  78                           ld     a,b
008A'  07                           rlca
008B'  5F                           ld     e,a               ; add the offset if no
008C'  16 00                        ld     d,0               ; ledsfl pass
008E'  19                           add    hl,de
008F'  11 0004                      ld     de,csisiz-6       ; and output string
0092'  19                           add    hl,de
0093'  11 0016                      ld     de,csictrlsz      ; offset to next tier control
0096'  DD 19                        add    ix,de
0098'  18 C5                        jr     leddsf
009A'              ledcsx:
009A'  ED 4B 0000#                  ld     bc,(tiercn)       ; get active tier count
009E'  06 0A                        ld     b,csisiz          ; and size
00A0'  ED 4C                        mlt    bc                ; compute string size
00A2'  0C                           inc    c
00A3'  79                           ld     a,c
       0002       1       if shftfactor
00A4'  F5         1               push   af
00A5'  47         1               ld     b,a               ; string size in b
00A6'  0E 02      1               ld     c,shftfactor      ; adjust the whole string
00A8'  21 0000#   1               ld     hl,serstrng       ; by shftfactor bits
00AB'  CD 0000#   1               call   shfter
00AE'  F1         1               pop    af
                                endif
00AF'              csisend:
00AF'  3D                           dec    a
00B0'  32 0000#                     ld     (csicount),a      ; save the new count
00B3'  21 0001#                     ld     hl,serstrng+1     ; use it as offset
00B6'  85                           add    a,l               ; to byte to send
00B7'  6F                           ld     l,a
00B8'  30 01                        jr     nc,csisel 00BA'  24                           inc    h
00BB'              csisel:
00BB'  7E                           ld     a,(hl)            ; get the byte
00BC'  01 008B                      ld     bc,trdr
00BF'                               outt   (c),a             ; load (clears interrupt flag)
00BF'  ED 79      A1                out    (c),a 00C1'  3A 0000#                     ld     a,(dflcsi)
00C4'  F6 50                        or     te+eie
00C6'              csifin:
00C6'  01 008A                      ld     bc,cntr
00C9'                               outt   (c),a             ; load the control register
00C9'  ED 79      A1                out    (c),a
       FFFF       1       if not finished
00CB'             1               inn    a,(0c0h)
00CB'  DB C0      A1              in     a,(0c0h)
                                endif
00CD'  C9                           ret ; csinit Init the csi, load the default setup and send it
                        ;        on its way.
00CE'              csinit:
00CE'  3A 0000#                     ld     a,(dflcsi)        ; kill the current tx & interrupt
00D1'  01 008A                      ld     bc,cntr
00D4'                               outt   (c),a
00D4'  ED 79      A1                out    (c),a 00D6'  3E 4F                        ld     a,cctrbyte        ; init the control byte
00D8'  32 0000#                     ld     (outctr),a
```

TABLE I

```
00CB'                              outt    (octrpt),a
00CB' D3 02         A1             out     (octrpt),a 00DD' 21 0000#                     ld      hl,dflstr        ; load default set up
00E0' 11 0000#                     ld      de,leadout       ; into csi string
00E3' 01 000B                      ld      bc,csisiz+1
00E6' ED B0                        ldir
00E8' 21 0001#                     ld      hl,dflstr +1     ; match leds into
00EB' 01 0006                      ld      bc,6             ; key flags
00EE' ED B0                        ldir
00F0' 01 0005                      ld      bc,sysern-1
00F3' 62                           ld      h,d
00F4' 6B                           ld      l,e
00F5' 13                           inc     de
00F6' 36 00                        ld      (hl),0
00F8' ED B0                        ldir
00FA' 3E 02                        ld      a,tiers
00FC' 21 0000#                     ld      hl,cfl           ; point to start
00FF'              csinil:                                  ; of csi data
00FF' 3D                           dec     a
0100' 28 07                        jr      z,csinix 0102' 01 0016                      ld      bc,csictrlsz
0105' ED B0                        ldir
0107' 18 F6                        jr      csinil
0109'              csinix:
0109' 21 0000                      ld      hl,0
010C' 22 0000#                     ld      (syser0),hl      ; clear the system error byte
010F' AF                           xor     a 0110' 32 0000#                     ld      (active),a       ; show no active channels
0113' C3 0025'                     jp      csistart ; csidis Blank the latches.
                  ;        Use polled mode to load 0's into all latches
0116'             csidis:
0116' 3A 0000#                     ld      a,(outctr)       ; get the out control byte
0119' F6 C0                        or      csiblk or csistb ; latches - blank & transparent
011B' 32 0000#                     ld      (outctr),a
011E'                              outt    (octrpt),a
011E' D3 02        A1              out     (octrpt),a 0120' 01 000A                      ld      bc,cntr          ; setup the csi control register
0123' 3A 0000#                     ld      a,(dflcsi)       ; set baud, disable tx, rx, & tie
0126'                              outt    (c),a
0126' ED 79        A1              out     (c),a
0128' 16 0A                        ld      d,10             ; send 10 bytes (clears 8 devices)
012A' AF                           xor     a
012B'             csidi1:
012B' 0C                           inc     c                ; use tx register
012C'                              outt    (c),a
012C' ED 79        A1              out     (c),a
012E' 0D                           dec     c                ; point to control register
012F' 3A 0000#                     ld      a,(dflcsi)
0132' F6 10                        or      te               ; transmit no interrupts
0134'                              outt    (c),a
0134' ED 79        A1              out     (c),a
0136'             csidi2:
0136'                              inn     a,(c)            ; check for tx in progress
0136' ED 78        A1              in      a,(c)
0138' E6 10                        and     te               ; wait for te to disable
         0000      1       iff emulate
013A' C2 0136'     1              jp       nz,csidi2        ; nz, still sending
                          endif
013D' 15                           dec     d                ; count bytes left
013E' C2 012B'                     jp      nz,csidi1        ; nz, more to send 0141' 3A 0000#                     ld      a,(outctr)       ; get the out control byte
0144' E6 7F                        and     255-csistb       ; latch the data
0146' F6 40                        or      csiblk           ; blank latches
```

TABLE I

```
0148' 32 0000#              ld      (outctr),a
0148'                       outt    (octrpt),a
0148' D3 02        A1       out     (octrpt),a 014D' AF                    xor     a
014E' 32 0000#              ld      (csterm),a      ; clear the terminate byte
0151' C9                    ret
                   end
    0 Error(s) Detected.    339 Program Bytes.
413 Symbols Detected.

.list external rstat0, rcntb0, rcnta0, rstat1, rcntb1, rcnta1
                   external irptsv, savall, savix, getmost, monitr
                   external inp0cnt, inp0q, inp0h, inp0t, xon0
                   external inp1cnt, inp1q, inp1h, inp1t, xon1 global asci, ascom, ascut, asin, asdirts, asenrts, asinit
                   global asost, aslst, asist ; 01-26-89 added interrupt driven buffered receive
                   ;        drk ; asci device vectors
                   ;   if c =
                   ;        0 - 1   initialize the port
                   ;        2 - 3   return with input
                   ;        4 - 5   return after output
                   ;        6 - 7   communicate according to e
                   ;        8 - 9   return input status
                   ;       10 -11   return output status
                   ;       12 -13   disable rts
                   ;       14  15   enable rts
                   ;       16  17   return line status (cts)
                   ;   bit 0 flags port 0 or 1
0000'              asci:
0000' C5                    push    bc              ; save bc
0001' CD 0006'              call    ascivs
0004' C1                    pop     bc
0005' C9                    ret 0006'              ascivs:
0006' 79                    ld      a,c             ; get the function #
0007' F5                    push    af              ; save it 0008' E6 01                 and     1               ; mask for port 0 or 1
000A' F6 84                 or      stat0           ; set the stat port
000C' 4F                    ld      c,a             ; put it in c
000D' 06 00                 ld      b,0             ; use bc for i/o address 000F' F1                    pop     af
0010' E6 FE                 and     0feh            ; check for init
0012' CA 00DE'              jp      z,asinit 0015' FE 10                 cp      16
0017' D2 0007'              jp      nc,asb4         ; >15 = third tier of functions 001A' CD 0000#              call    savall          ; save the state
001D' 21 0000#              ld      hl,getmost      ; return a
0020' E3                    ex      (sp),hl
0021' CD 0000#              call    savix           ; save the indices 0024' FE 08                 cp      8
0026' D2 007D'              jp      nc,asb3         ; >7 = second tier of functions 0029' FE 04                 cp      4
002B' CA 0072'              jp      z,asout         ; 4, send character in e
```

TABLE I

```
002E' DA 003C'                    jp      c,asin          ; c = 2, get a character ; ascom ; if e = 255
                                ;     returns input status if no input
                                ;     input if present
                                ; if e <> 255
                                ;     outputs the value in e
                                ;
0031'                   ascom:
0031' 7B                          ld      a,e
0032' FE FF                       cp      255
0034' 20 3C                       jr      nz,asout 0036' CD 00A8'                    call    asist   ; check receiver status
0039' C8                          ret     z 003A' 18 05                       jr      asinr   ; get the character
003C'                   asin:
003C' CD 00A8'                    call    asist   ; check receiver status
003F' 28 FB                       jr      z,asin
0041'                   asinr:
        FFFF          1         if intcom
0041'                 1           tstiom  rie,asinr0      ; buffered or raw
0041' ED 74 08        A1          tstio   rie
0044' 20 13           1           jr      nz,asinrb ; nz, buffered
                                endif
0046'                   asinr0:
0046' 79                          ld      a,c
0047' D6 04                       sub     4       ; clear error bits at cntla0
0049' 4F                          ld      c,a
004A'                             inn     a,(c)
004A' ED 78           A1          in      a,(c)
004C' E6 F7                       and     255-efr 004E'                             outt    (c),a
004E' ED 79           A1          out     (c),a
0050' 79                          ld      a,c
0051' C6 08                       add     a,8
0053' 4F                          ld      c,a
0054'                             inn     a,(c)   ; get the input
0054' ED 78           A1          in      a,(c)
0056' E6 7F                       and     7fh     ; strip high bit
0058' C9                          ret
        FFFF          1         if intcom
0059'                 1 asinrb:
0059' DD E5           1           push    ix      ; get the structure address
005B' E1              1           pop     hl
005C' 11 0004         1           ld      de,qoff ; offset to the que
005F' 19              1           add     hl,de
0060' DD 7E 03        1           ld      a,(ix+toff)     ; offset to the tail
0063' 5F              1           ld      e,a
0064' 3C              1           inc     a       ; next position
0065' E6 7F           1           and     comqsz-1        ; mask for que size
0067' DD 77 03        1           ld      (ix+toff),a     ; save for next time
006A' 19              1           add     hl,de   ; adjust the pointer
006B' 7E              1           ld      a,(hl)  ; get the byte
006C' DD 35 00        1           dec     (ix+coff)       ; show the removal
006F' E6 7F           1           and     7fh     ; strip the high bit
0071' C9              1           ret
                                endif
0072'                   asout:
0072' CD 00C3'                    call    asost
0075' 28 FB                       jr      z,asout         ; wait for the status 0077' 7B                          ld      a,e
0078' 0C                          inc     c
0079' 0C                          inc     c
```

TABLE I

```
007A'                                 outt     (c),a              ; send it on its way
007A' ED 79          A1               out      (c),a
007C' C9                              ret ; asb3 decodes upper function #'s
                             ;
                             ;
007D'                        asb3:
007D' FE 0E                           cp       14
007F' 28 16                           jr       z,asenrts          ; 14 = enable rts 0281' FE 0A                           cp       10
0283' CA 00C3'                        jp       z,ascst            ; 10 = get output status 0086' DA 00A8'                        jp       c,asist            ; 8 = get input status ; asdirts disables the rts line
0089'                        asdirts:
0089' 79                              ld       a,c
008A' 0F                              rrca
008B' D8                              ret      c                  ; c, no rts1

008C' 07                              rlca
008D' D6 04                           sub      4                  ; use cntla 008F' 4F                              ld       c,a
0090'                                 inn      a,(c)              ; get the current command state
0090' ED 78          A1               in       a,(c)
0092' E6 E7                           and      not (rts0 or efr)  ; disable rts & clear errors
0094'                                 outt     (c),a
0094' ED 79          A1               out      (c),a
0096' C9                              ret ; asenrts enables the rts line
0097'                        asenrts:
        0000         1       if rtslow
                             endif
0097' 79                              ld       a,c
0098' 0F                              rrca
0099' D8                              ret      c                  ; c, no rts1

009A' 07                              rlca
009B' D6 04                           sub      4                  ; use cntla 009D' C5                              push     bc
009E' 4F                              ld       c,a
009F'                                 inn      a,(c)              ; get the current command state
009F' ED 78          A1               in       a,(c)
00A1' F6 10                           or       rts0               ; disable rts
00A3' E6 F7                           and      not efr            ; clear any errors
00A5'                                 outt     (c),a
00A5' ED 79          A1               out      (c),a
00A7' C9                              ret ; asist returns input status of port in bc
00A8'                        asist:
        FFFF         1       if intcom
00A8'                1                tstiom   rie,asist0         ; buffered input ?
00A8' ED 74 08       A1               tstio    rie
00AB' 20 05          1                jr       nz,asistb          ; yep, do that
                             endif
00AD'                        asist0:
00AD'                                 inn      a,(c)              ; check for receiver ready
00AD' ED 78          A1               in       a,(c)
00AF' E6 80                           and      rdrf
00B1' C9                              ret
        FFFF         1       if intcom
00B2'                1       asistb:
00B2' DD 21 0000#    1                ld       ix,inp0cnt         ; point to the counter
00B6' CB 41          1                bit      0,c                ; correct port ?
```

TABLE I

```
0059' 28 34            1           jr       z,asist0b  ; yes
                       1
005A' DD 21 0000#      1           ld       ix,inp0cnt ; get the correct pointer
005E'                  1  asist0b:
005E' DD 7E 00         1           ld       a,(ix+coff) ; check for characters ready
0061' B7               1           or       a          ; return the status
0062' C9               1           ret
                          endif
                          ; asost returns output status of port in bc
00C3'                     asost:
      FFFF             1   if intcom
00C3'                  1           inn      a,(c)     ; get the rcv interrupt status
00C3' ED 78            A1          in       a,(c)
00C5' CB 5F            1           bit      rieb,a
00C7' 20 03            1           jr       nz,asostb ; enabled check that
                          endif
00C9' E6 02                        and      tdre      ; check for tx ready
00CB' C9                           ret
      FFFF             1   if intcom
00CC'                  1  asostb:
00CC' CD 00B2'         1           call     asistb    ; get the proper pointer in ix
00CF'                  1           inn      a,(c)     ; check for tx ready
00CF' ED 78            A1          in       a,(c)
00D1' E6 02            1           and      tdre      ; mask for tx
00D3' DD A6 01         1           and      (ix+xonset) ; check against xon also
00D6' C9               1           ret
                          endif
00D7'                     asb4:
                      ;            jp       aslst     ; 16 = return line status ; aslst returns line status for port in bc
00D7'                     aslst:
00D7' 0D                           dec      c
00D8' 0D                           dec      c         ; use cntlb
00D9'                              inn      a,(c)     ; get the status
00D9' ED 78            A1          in       a,(c)
00DB' E6 20                        and      cts       ; mask for cts
00DD' C9                           ret ; asinit initializes the ascis
00DE'                     asinit:
00DE' C5                           push     bc
00DF' E5                           push     hl
      FFFF             1   if intcom
00E0' D5               1           push     de
00E1' 21 0000#         1           ld       hl,inp0cnt
00E4' 54               1           ld       d,h
00E5' 5D               1           ld       e,l
00E6' 13               1           inc      de
00E7' C5               1           push     bc
00E8' 01 010A          1           ld       bc,2*(comqsz+5)
00EB' 36 00            1           ld       (hl),0
00ED' ED B0            1           ldir
00EF' C1               1           pop      bc
00F0' D1               1           pop      de
00F1' 3E FF            1           ld       a,255
00F3' 32 0000#         1           ld       (xon0),a
00F6' 32 0000#         1           ld       (xon1),a
                      1   else
                          endif
00F9' 21 0000#                     ld       hl,rcnta0  ; point to init data
00FC' 79                           ld       a,c        ; get the port #
00FD' D6 04                        sub      4          ; offset to cntla
00FF' 4F                           ld       c,a
0100' 0D                           dec      c 0101' 06 03                        ld       b,3        ; # of ports in b
0103' 0F                           rrca
0104' 30 06                        jr       nc,skph    ; nc, is port 0
```

TABLE I

```
0106' 7D                    ld      a,l
0107' 80                    add     a,b             ; offset 3 for port 1
0108' 6F                    ld      l,a
0109' 30 01                 jr      nc,skph 010B' 24                    inc     h
010C'           skph:
010C' 0C                    inc     c               ; every other port
        0000        1   if emulate
                    1   else
0120' ED 63         1           otim                ; send a byte, inc hl & c, dec b
                        endif
010F' C2 010C'              jp      nz,skph 0112' 2B                    dec     hl              ; point back to cntb byte
0113' 2B                    dec     hl
0114' 0D                    dec     c               ; and stat register 0115' 7E                    ld      a,(hl)          ; get the stat byte
0116'           asin04:
0116' E1                    pop     hl
0117' C1                    pop     bc
0118' C9                    ret ; initialize the interrupt communications
0119'                   ascvinit:
                            global  ascvinit
0119' E5                    push    hl
011A' D5                    push    de
011B' 21 0000#              ld      hl,inp0cnt
011E' 54                    ld      d,h
011F' 5D                    ld      e,l
0120' 13                    inc     de
0121' C5                    push    bc
0122' 01 010A               ld      bc,2*(comqsz+5)
0125' 36 00                 ld      (hl),0
0127' ED B0                 ldir
0129' C1                    pop     bc
012A' D1                    pop     de
012B' E1                    pop     hl
012C' 3E FF                 ld      a,255
012E' 32 0000#              ld      (xon0),a
0131' 32 0000#              ld      (xon1),a
        FFFF        1   if intcom
0134' 01 0004      1           ld      bc,stat0
0137' 3A 0000#     1           ld      a,(rstat0)
013A' F6 08        1           or      rie
013C'              1           outt    (c),a
013C' ED 79        A1          out     (c),a
013E' 32 0000#     1           ld      (rstat0),a
                        endif
0141' C9                    ret FFFF        1   if intcom
0142'               1   asc0vc:
                    1       global  asc0vc
0142' CD 0000#      1           call    irptsv  ; save the processor state
0145' AF            1           xor     a
0146'               1           inn     a,(stat0)   ; who interrupted?
0146' DB 84         A1          in      a,(stat0)
0148' CB 7F         1           bit     7,a         ; receiver ?
014A' F5            1           push    af
014B' C4 0150'      1           call    nz,rcv0int  ; nz, yes
014E' F1            1           pop     af
                    1
014F'               1   tx0int:
014F' C9            1           ret
                    1
```

TABLE I

```
0150'                   1   rcv0int:
                        1       global rcv0int
0150'  5F               1           ld      e,a
0151'  E6 70            1           and     rcver           ; any receive errors ?
0153'  28 09            1           jr      z,no0errs       ; nope
                        1
0155'  01 0080          1           ld      bc,cntla0       ; clear errors
0158'                   1           inn     a,(c)
0158'  ED 78            A1          in      a,(c)
015A'  E6 F7            1           and     255-efr
015C'                   1           outt    (c),a
015C'  ED 79            A1          out     (c),a
015E'                   1   no0errs:
015E'  78               1           ld      a,e
015F'  E6 80            1           and     rdrf            ; received data ?
0161'  C8               1           ret     z               ; nope get out
                        1
0162'  AF               1           xor     a
0163'                   1           inn     a,(rdr0)        ; get the data
0163'  DB 88            A1          in      a,(rdr0)
0165'  E6 7F            1           and     07fh            ; strip the high bit
0167'  FE 13            1           cp      'S'-40h         ; is it XOFF
0169'  20 05            1           jr      nz,xon0tst      ; nz, nope, try XON
                        1
016B'  AF               1           xor     a               ; make it xoff
016C'  32 0000#         1           ld      (xon0),a        ; save the new state
016F'  C9               1           ret
0170'                   1   xon0tst:
0170'  47               1           ld      b,a
0171'  FE 11            1           cp      'Q'-40h         ; is it XON ?
0173'  20 06            1           jr      nz,not0xon      ; nz, no, skip
                        1
0175'  3E FF            1           ld      a,255           ; enable the transmitter
0177'  32 0000#         1           ld      (xon0),a
017A'  C9               1           ret                     ; z, yes, swallow it
017B'                   1   not0xon:
017B'  FE 18            1           cp      'X'-40h         ; cancel command ?
017D'  28 1C            1           jr      z,xcan          ; z, yes, go do that
                        1
017F'  3A 0000#         1           ld      a,(inp0cnt)     ; get the input count
0182'  FE 80            1           cp      comqsz          ; que full ?
0184'  C8               1           ret     z               ; yes, discard the char
                        1
0185'  3C               1           inc     a
0186'  32 0000#         1           ld      (inp0cnt),a     ; save the new count
0189'  21 0000#         1           ld      hl,inp0q        ; get the que pointer
018C'  3A 0000#         1           ld      a,(inp0h)
018F'  16 00            1           ld      d,0             ; and & offset
0191'  5F               1           ld      e,a
0192'  19               1           add     hl,de           ; point to the byte
0193'  70               1           ld      (hl),b          ; store the byte
0194'  3C               1           inc     a               ; next position
0195'  E6 7F            1           and     comqsz-1        ; mask for buffer size
0197'  32 0000#         1           ld      (inp0h),a       ; save the new offset
019A'  C9               1           ret
                        1
019B'                   1   xcan:
                        1       global xcan
019B'  CD 0119'         1           call    ascvinit        ; clear the buffers
019E'  C3 0000#         1           jp      mcnitr          ; start the program over endif ; intccm
                            end
        0 Error(s) Detected.   417 Program Bytes.
    421 Symbols Detected.

0329'  2F                          cpl
032A'  57                          ld      d,a
032B'  19                          add     hl,de           ; find the difference
```

TABLE I

```
032C' FD 75 23          ld      (iy+grupt),l      ; save it at grupt
032F' FD 74 24          ld      (iy+grupt+1),h 0332' FD E1             pop     iy
0334'           autofl:
0334' 3A 0000#          ld      a,(active)        ; decrement active if necessary
0337' D6 01             sub     1
0339' 38 03             jr      c,autofx          ; c = past 0, exit 033B' 32 0000#          ld      (active),a
033E'           autofx:
033E' 21 0000           ld      hl,0
0341' 22 0000#          ld      (grpdwn),hl       ; zero the group down counter
0344' F1                pop     af
0345' C9                ret ; setclose Set the close flows and timeouts
0346'           setclose:
                   global setclose
0346' CD 0000#          call    savall
0349' ED 5B 0000#       ld      de,(maxrat)       ; get the maximum rate
034D' FD 6E 18          ld      l,(iy+flov)       ; and station rate
0350' FD 66 19          ld      h,(iy+flov+1)
0353' FD 7E 1A          ld      a,(iy+flper)      ; get the adjust factor
0356' CD 0712'          call    peradjust         ; adjust for percentage cushion
0359' EB                ex      de,hl             ; position for subtract 035A' B7                or      a
035B' ED 52             sbc     hl,de             ; adjust the max rate
035D' 30 03             jr      nc,ldmaxrat       ; nc, not negative yet 035F' 21 0000           ld      hl,0              ; don't go below 0
0362'           ldmaxrat:
0362' 22 0000#          ld      (maxrat),hl
0365' 21 0000#          ld      hl,hperrc         ; load new shut count if
0368' FD 7E 1E          ld      a,(iy+shut)
036B' BE                cp      (hl)              ; bigger than remaining count
036C' 38 01             jr      c,oldshut         ; nc, hperrc is bigger 036E' 77                ld      (hl),a            ; use the new value
036F'           oldshut:
036F' C6 51             add     a,hperrcv         ; allow settling time for inactive
0371' 21 0000#          ld      hl,finatm         ; flow rate
0374' BE                cp      (hl)              ; check the inactive timeout.
0375' 38 01             jr      c,oldsh1          ; c, old is bigger 0377' 77                ld      (hl),a
0378'           oldsh1:
                   global oldsh1
0378' 3E 00             ld      a,hpcval          ; and a new count down
037A' 32 0000#          ld      (hpcnt),a
037D' 21 0000           ld      hl,0
0380' 22 0000#          ld      (hprate),hl       ; start a new hprate record
0383' C9                ret 0384'           addrate:
                   global addrate
0384' 2A 0000#          ld      hl,(maxrat)       ; get the maxrat 0387'           addra1:
                   global addra1
0387' 44                ld      b,h
0388' 4D                ld      c,l
0389' FD 6E 18          ld      l,(iy+flov)       ; get the station value
038C' FD 66 19          ld      h,(iy+flov+1)
038F' FD 7E 1A          ld      a,(iy+flper)      ; get the adjust factor
0392' CD 0712'          call    peradjust         ; adjust for percentage cushion
0395' 09                add     hl,bc             ; add in maxrat value
0396' 22 0000#          ld      (maxrat),hl       ; save the corrected value
```

TABLE I

```
0399' 21 0000#              ld      hl,hperrc       ; point to hperrc
039C' FD 7E 10              ld      a,(iy+open)     ; get the new count
039F' 77                    ld      (hl),a 03A0' AF                    xor     a
03A1' 32 0000#              ld      (finatm),a      ; clear finatm
                    ;       ld      hl,0
                    ;       ld      (hprate),hl     ; start a new hprate record
                    ;       ld      a,hpcval        ; and a new count down
                    ;       ld      (hpcnt),a
03A4' C9                    ret ; mstron
                    ; turn on the master valve if no lp error condition exists
                    ; returns non zero for error condition. zero = ok
03A5'               mstron:
                      global mstron
03A5' 3A 0000#              ld      a,(lperbt)      ; get the error flag
03A8' E6 01                 and     lpermsk         ; error present
03AA' C0                    ret     nz 03AB' 3A 0000#              ld      a,(solctr)      ; get the control byte
03AE' F6 20                 or      mstrmsk         ; set the valve on
03B0' 32 0000#              ld      (solctr),a
03B3' 32 0000#              ld      (solupd),a      ; force a solupdate next clock
03B6' AF                    xor     a
03B7' C9                    ret ; slvchk  Compare chan # against grup #.
                    ;         Returns carry set if slave, not set otherwise.
                    ;         a = negative offset to the master.
03B8'               slvchk:
                      global slvchk
03B8' D5                    push    de
03B9' 3A 0000#              ld      a,(mstrauto)    ; get the channel
03BC' E6 3F                 and     255-0c0h        ; clear condition bits & carry
03BE' 5F                    ld      e,a             ; channel in e
03BF' FD 7E 22              ld      a,(iy+grup)     ; get the grup #
03C2' 3D                    dec     a               ; check for 0 or high bit set
03C3' FA 03C7'              jp      m,slvchx        ; m, its not a slave, carry clear 03C6' 93                    sub     e               ; is it a legal slave ?
03C7'               slvchx:
03C7' D1                    pop     de              ; c, if chan # > grup #
03C8' C9                    ret ; grpdat  Find value offset by e from group
                    ;         Returns hl = two byte value, a = 1, c = group value
                    ;         nc = sco mode, or not a grouped channel.
03C9'               grpdat:
                      global grpdat
03C9' D5                    push    de
03CA' FD E5                 push    iy              ; get the book record
03CC' E1                    pop     hl              ; into hl
03CD' 16 00                 ld      d,0             ; compute the field posit.
03CF' 19                    add     hl,de 03D0' 3A 0000#              ld      a,(autbit)      ; check for sco
03D3' DD A6 0A              and     (ix+koff)
03D6' 20 12                 jr      nz,grpdtx       ; nz, its sco 03D8' CD 03B8'              call    slvchk          ; is it a slave ?
03DB' 30 0B                 jr      nc,grpdtx       ; nc, slave <= master, no 03DD' ED 44                 neg                     ; make offset positive
03DF' 5F                    ld      e,a
03E0' 16 25                 ld      d,booksz        ; compute the record offset
03E2' ED 5C                 mlt     de
03E4' B7                    or      a
```

TABLE I

```
03E5' ED 52              sbc    hl,de          ; point to the field/record
03E7' 37                 scf                   ; carry set for group return
03E8'            grpctx:

03E8' 7E                 ld     a,(hl)
03E9' 23                 inc    hl
03EA' 66                 ld     h,(hl)
03EB' 6F                 ld     l,a
03EC' D1                 pop    de
03ED' C9                 ret ; clrgpt clears the group timers for all channels
03EE'            clrgpt:
03EE' CD 0000#           call   savall
03F1' AF                 xor    a
03F2' 06 20              ld     b,maxchans     ; clear all channels
03F4' 11 0024            ld     de,booksz-1    ; skip value
03F7' 21 0000#           ld     hl,bgrupt      ; first target
03FA'            clrgpl:
03FA' 77                 ld     (hl),a
03FB' 23                 inc    hl
03FC' 77                 ld     (hl),a
03FD' 19                 add    hl,de
03FE' 10 FA              djnz   clrgpl 0400' C9                 ret ; nxtauto
                 ;      find an auto station with soak time done and accumulated
                 ;      time remaining.
                 ;      entry with ix -> offl or offh as appropriate to mstrauto
                 ;
                 ;      return  no carry = ok to turn on solenoid
                 ;              carry = too soon wait longer for solenoid start
                 ;              a = next channel #
                 ;              ix -> offl,offh as appropriate, iy -> correct record
0401'            nxtauto:
                 global nxtauto
0401' 3A 0000#           ld     a,(epsecs)     ; check for recent over current
0404' B7                 or     a
0405' 37                 scf                   ; flag not ready for turn on
0406' C0                 ret    nz             ; nz, wait another second
0407' 3A 0000#           ld     a,(hafcnt)     ; check for half power wait
040A' B7                 or     a
040B' 37                 scf                   ; flag not ready for turn on
040C' C0                 ret    nz             ; nz, wait a sec.

040D' C5                 push   bc             ; save some registers
040E' D5                 push   de
040F' E5                 push   hl 0410' ED 4B FFFF#        ld     bc,(lstchn-1)
0414' 04                 inc    b              ; compute the # of channels
0415' 3A 0000#           ld     a,(mstrauto)   ; get the previous auto
0418' E6 3F              and    255-2C0h       ; clear the flags
041A' 6F                 ld     l,a            ; old value in l
041B' 3C                 inc    a              ; next channel
041C' 67                 ld     h,a            ; working reg. h
041D' DD 4E 0C           ld     c,(ix+kauto)   ; get the auto bit map
0420' E6 07              and    7              ; mask for low byte
0422' 28 05              jr     z,nxta0
0424'            nxta01:
0424' CB 39              srl    c              ; rotate bits into position
0426' 3D                 dec    a
0427' 20 FB              jr     nz,nxta01
0429'            nxta0:
0429' 3A 0000#           ld     a,(lstchn)     ; get the last channel
042C' BC                 cp     h              ; h < than a ?
042D' 30 05              jr     nc,nxta02      ; nc, h is smaller
```

TABLE I

```
042F' 26 00               ld      h,e
0431' CD 03EE'            call    clrgpt          ; clear the group times
0434'            nxta0y:
0434' 7C                  ld      a,h
0435' E5                  push    hl
0436' 21 0000#            ld      hl,mstrauto
0439' 77                  ld      (hl),a          ; use the new byte
043A' E6 07                and     7
043C' 20 06                jr      nz,nxta2

043E' CD 075A'            call    prtbit
0441' DD 4E 00            ld      c,(ix+kauto)
0444'            nxta2:
                 global   nxta2
0444' E1                  pop     hl
0445' CB 39                srl     c
0447' 3F                   ccf                    ; check for channel in auto 0448' D4 0468'            call    nc,okstart      ; c, this channel is auto 044B' 30 17                jr      nc,nxta21
044D' 24                   inc     h              ; next channel please
044E' 10 D9                djnz    nxta2

0450' 7D                   ld      a,l            ; restore master auto
0451' 21 0000#             ld      hl,mstrauto
0454' 77                   ld      (hl),a
0455' 57                   ld      d,a            ; restore iy,
0456' 1E 25                ld      e,booksz       ; compute the offset
0458' FD 21 0000#          ld      iy,book
045C' ED 5C                mlt     de
045E' FD 19                add     iy,de          ; point to the record
0460' CD 075A'             call    prtbit         ; and ix.

0463' 37                   scf                    ; set carry for not found
0464'            nxta21:
0464' E1                   pop     hl             ; restore registers
0465' D1                   pop     de
0466' C1                   pop     bc
0467' C9                   ret                    ; exit ; okstart
                 ;    using mstrauto & keyboard flags, checks current time against
                 ;    last stop time of channel in h.
                 ;    If the difference is greater than the value stored at soak,
                 ;    returns no carry.
                 ;    if more time to wait, carry.
0468'            okstart:
                 global   okstart
                          ; (sp) = key board pointer, hl = new chn - old chn
                          ; de = offset, bc = pass count - bit map
0468' D5                   push    de             ; save offset
0469' E5                   push    hl             ; save new/old 046A' 7C                   ld      a,h            ; get the channel #
046B' 57                   ld      d,a
046C' 1E 25                ld      e,booksz       ; compute the offset
046E' FD 21 0000#          ld      iy,book
0472' ED 5C                mlt     de
0474' FD 19                add     iy,de          ; point to the record 0476' E6 07                and     7              ; mask for the row (8 positions)
0478' 3C                   inc     a              ; base 1
0479' 50                   ld      d,b
047A' 47                   ld      b,a            ; save the bit count
047B' 3E 80                ld      a,80h          ; get rotator
047D'            okstal:
047D' 07                   rlca                   ; rotate the bit into position
047E' 10 FD                djnz    okstal         ; nz, more to go
```

TABLE I

```
0480' 42                        ld      c,c             ; restore the bit count
0481' 32 0000#                  ld      (autbit),a      ; save the bit posit 0484' FD 5E 03                  ld      e,(iy+lstp)     ; get the last stop value
0487' FD 56 04                  ld      d,(iy+lstp+1)
048A' 2A 0000#                  ld      hl,(tmins)      ; get the current minutes
048D' CD 0000#                  call    clockdif        ; compute the elapsed time
0490' CD 0000#                  call    himin           ; convert hrs-mins to mins 0493' E5                        push    hl
0494' 1E 1C                     ld      e,sokv          ; point to the soak value
0496' CD 03C9'                  call    grpdat          ; get it, rets carry if grouped
0499' E1                        pop     hl
049A' 30 20                     jr      nc,oksta2       ; not grouped, check soak 049C' 1E 23                     ld      e,grupt         ; ignore soak, check group time
049E' CD 03C9'                  call    grpdat
04A1' 7D                        ld      a,l
04A2' B4                        or      h
04A3' 22 0000#                  ld      (grpdwn),hl     ; start the group seconds timer
04A6' 37                        scf
04A7' 28 17                     jr      z,noksx
04A9'                   oksta2:
04A9' 5F                        ld      e,a
04AA' AF                        xor     a
04AB' 57                        ld      d,a
04AC' ED 52                     sbc     hl,de           ; set the carry if too small 04AE' 38 10                     jr      c,noksx         ; c, nok to start, exit 04B0' FD 7E 14                  ld      a,(iy+fait)     ; get the failcont
04B3'                   cksx:
04B3' FD 77 23                  ld      (iy+grupt),a    ; zero the group seconds
04B6' FD 77 24                  ld      (iy+grupt+1),a 04B9' 3A 0000#                  ld      a,(mstrauto)    ; get the new #
04BC' 32 0000#                  ld      (hotchn),a      ; save it at hotchn also
04BF' B7                        or      a               ; clear the carry flag
04C0'                   noksx:
04C0' E1                        pop     hl
04C1' D1                        pop     de
04C2' C9                        ret ; floupdate Record the flow rates. Set the hp or lp error, as
                        ;     apprproiate, and turnoff the channel if lp error.
04C3'                   floupdate:
                        global floupdate 04C3' C5                        push    bc
04C4' 47                        ld      b,a
04C5' C5                        push    bc
04C6' CD 04F0'                  call    recflow         ; update the flow rate storage
04C9' 30 01                     jr      nc,floup1       ; nc, flow is ok 04CB' 3A 0000#                  ld      a,(flocwn)      ; check the channel count
04CE' B7                        or      a
04CF' 20 20                     jr      nz,floup2       ; nz, no catastrophe yet 04D1' 32 0000#                  ld      (finatm),a      ; 0 finatm so chkmax will work
04D4' ED 4B 0000#                ld      bc,(hprate)     ; get the rate
04D8' 2A 0000#                  ld      hl,(maxrat)     ;  and the maximum
04DB' CD 0000#                  call    chkmax          ; let chkmax kill the master valve
04DE'                   floup2:
04DE' 3E FF                     ld      a,255
04E0' 32 0000#                  ld      (flperc),a      ; flag the error
04E3' 3A 0000#                  ld      a,(hotchn)      ; get the channel #
04E6' 4F                        ld      c,a
04E7' 06 00                     ld      b,0             ; setup a turn off
04E9' CD 0000#                  call    chnc01          ; c, exceeded max flow rate, turnoff
```

TABLE I

```
04EC'                   floupl:

04EC' C1                        pop     bc
04ED' 78                        ld      a,b
04EE' C1                        pop     bc
04EF' C9                        ret
                        ; recflow Record the high observed flow in bflohi of
                        ;       the record at iy
                        ;       compares actual with allowed, and record the error if
                        ;       out of range.
                        ;       carry = grossly out of range, shutdown required
04F0'                   recflow:
                          global recflow
04F0' 3A 0000#                  ld      a,(meter)       ; check for a meter
04F3' B7                        or      a
04F4' C8                        ret     z               ; no meter quit 04F5' 3A 0000#                  ld      a,(hperrc)      ; time out done ?
04F8' B7                        or      a
04F9' C0                        ret     nz              ; nope 04FA' 3A 0000#                  ld      a,(alton)       ; alternate controller
04FD' B7                        or      a               ; active ?
04FE' C0                        ret     nz              ; yes 04FF' C5                        push    bc
0500' D5                        push    de
0501' E5                        push    hl
0502' ED 4B 0000#               ld      bc,(hprate)     ; get the new rate
0506'                   rnoflo:
0506' 78                        ld      a,b             ; no flow situation ?
0507' B1                        or      c
0508' 3A 0000#                  ld      a,(autbit)      ; get the bit to write
050D' 20 0E                     jr      nz,rgdflo       ; no, turn off hp error 050D' DD B6 14                  or      (ix+ded0)       ; turn on the no flow error
0510' DD 77 14                  ld      (ix+ded0),a
0513' 32 0000#                  ld      (dspers),a
0516' 18 37                     jr      rflox           ; and quit
0518'                   rgdflo:
0518' 2F                        cpl
0519' DD A6 14                  and     (ix+ded0)       ; turn off the no flow error
051C' DD 77 14                  ld      (ix+ded0),a
051F'                   rflohi:
051F' 3A 0000#                  ld      a,(active)      ; check the # active
0522' FE 02                     cp      2
0524' 30 11                     jr      nc,rmax         ; yes, no high rate save
0526' FD 6E 16                  ld      l,(iy+flohi)
0529' FD 66 17                  ld      h,(iy+flohi+1)
052C' B7                        or      a
052D' ED 42                     sbc     hl,bc           ; new larger than old ?
052F' 30 06                     jr      nc,rmax         ; nc, nope 0531' FD 71 16                  ld      (iy+flohi),c
0534' FD 70 17                  ld      (iy+flohi+1),b
0537'                   rmax:
0537' 2A 0000#                  ld      hl,(maxrat)     ; get the max rate
053A' B7                        or      a
053B' ED 42                     sbc     hl,bc           ; compare the allowed w/ actual
053D' 30 10                     jr      nc,rflox        ; nc, allowed is larger 053F' 3A 0000#                  ld      a,(autbit)      ; get the bit posit 0542' DD B6 10                  or      (ix+flow0)      ; turn on the flow error
0545' DD 77 10                  ld      (ix+flow0),a
0548' 32 0000#                  ld      (dspers),a      ; set the shoerr flag
054B' 32 0000#                  ld      (erproc),a      ; flag the error setting for watval
054E' 37                        scf                     ; return carry for error
054F'                   rflox:
```

TABLE I

```
                        global  rflox
054F' E1                pop     hl
0550' D1                pop     de
0551' C1                pop     bc
0552' C9                ret ; smfproc Use the first loop trough the channels to measure
                        ;    the system leakage settling time from master on and the
                        ;    system leakage flow rate. Then for each channel measure
                        ;    the flow turn on settling time, the flow rate, and the
                        ;    flow turn off settling time.
0553'                   smfproc:
                        global  smfproc
0553' 21 0000#          ld      hl,solctr
0556' CB EE             set     mstrbit,(hl)      ; turn on the master valve
0558' 3A 0000#          ld      a,(ratonc)
055B' 4F                ld      c,a
055C' 3A 0000#          ld      a,(ratnc)         ; check for new sample
055F' B9                cp      c
0560' C8                ret     z 0561' 32 0000#          ld      (ratonc),a        ; force the next set of skips 0564' 3E FF             ld      a,255
0566' 32 0000#          ld      (hperrc),a        ; disable flow error checking
0569' 21 0000#          ld      hl,smflag
056C' 7E                ld      a,(hl)            ; check the process
056D' 4F                ld      c,a
056E' B7                or      a
056F' 28 06             jr      z,smf0            ; first pass ?
                                                  ; yes 0571' FE C0             cp      0c0h              ; first stage ?
0573' 30 33             jr      nc,smf1           ; yes 0575' 18 5C             jr      smf2
0577'                   smf0:
0577' 3E C0             ld      a,0c0h            ; flag first stage
0579' 32 0000#          ld      (smflag),a
057C' 32 0000#          ld      (csiupd),a        ; force a csi update 057F' CD 0286'          call    autoff            ; kill & record autos
0582' 21 0000#          ld      hl,solctr
0585' CB BE             res     ovrideb,(hl)      ; kill override
0587' 3A 0000#          ld      a,(lperbt)
058A' E6 FE             and     255-lpermsk
058C' 32 0000#          ld      (lperbt),a
058F' 21 0000           ld      hl,0
0592' 22 0000#          ld      (lper0),hl        ; clear any flow errors
0595'                   stonil:
0595' AF                xor     a
0596' 32 0000#          ld      (avgrat),a
0599' 32 0001#          ld      (avgrat+1),a
059C' 21 0000#          ld      hl,ratbuf         ; clear the rate buffers
059F' 06 06             ld      b,sample*2        ; two bytes per buffer
05A1'                   stonlp:
05A1' 77                ld      (hl),a
05A2' 23                inc     hl
05A3' 10 FC             djnz    stonlp 05A5' C3 060F'          jp      stoninit          ; init the smf variables
05A8'                   smf1:
05A8' 3A 0000#          ld      a,(syrtim)        ; check the timeout
05AB' B7                or      a
05AC' C2 06C2'          jp      nz,staben         ; stabilize 05AF' 2A 0000#          ld      hl,(avgrat)
05B2' 22 0000#          ld      (lrarat),hl       ; save the leakage rate 05B5' 11 0003           ld      de,sample         ; divide by # of samples
```

TABLE I

```
05B9' CD 0000#                call    hlovde
05BB' 13                       inc     de
05BC' 13                       inc     de             ; increase by 2 per sample
05BD' ED 53 0000#              ld      (oratvl),de    ; save as trigger val for off checks 05C1' 21 0000#                 ld      hl,smflag      ; point to smf flag
05C4' 3E 40                    ld      a,40h
05C6' 77                       ld      (hl),a         ; start the channels
                               ; start of channel processing
05C7'                  smf2:
05C7' CD 075A'                 call    prtbit         ; get the bit/byte
05CA' DD 7E 06                 ld      a,(ix+solen)   ; get the solenoid controls
05CD' B7                       or      a              ; is the target active?
05CE' 20 5D                    jr      nz,smf21       ; yes 05D0' DD 36 12 00              ld      (ix+flow0),0   ; clear lp errors
05D4' 7E                       ld      a,(hl)
05D5' CB 7F                    bit     7,a            ; set the channel #
05D7' 20 54                    jr      nz,smf21       ; off check ?
05D9'                  smf20:                         ; yes
05D9' E6 3F                    and     3fh            ; mask off the control bits
05DB' 4F                       ld      c,a            ; save the channel #
05DC'                  smf22:
05DC' DD 7E 02                 ld      a,(ix+iauto)   ; check for channel in auto
05DF' A2                       and     d              ; auto active ?
05E0' CA 068A'                 jp      z,smf4         ; no, try next channel 05E3' DD 7E 12                 ld      a,(ix+pwre)    ; check for overcurrent error.
05E6' A2                       and     d
05E7' 28 12                    jr      z,smf24        ; z, no continue 05E9' 2A 0000#                 ld      hl,(hprate)    ; force a rate load
05EC' ED 5B 0000#              ld      de,(inarat)    ; adjust for the leakage
05F0' ED 52                    sbc     hl,de
05F2' FD 75 18                 ld      (iy+flov),l
05F5' FD 74 19                 ld      (iy+flov+1),h  ; save the new rate
05F8' C3 068A'                 jp      smf4           ; try next channel
05FB'                  smf24:
05FB' DD 72 06                 ld      (ix+solen),d   ; turn on the solenoid
05FE' DD 72 04                 ld      (ix+lon),d     ; and the on led
0601' 79                       ld      a,c            ; get the channel #
0602' F6 80                    or      80h            ; flag auto on
0604' 32 0000#                 ld      (mstrauto),a
0607' 3A 0000#                 ld      a,(solctr)     ; get the solenoid control byte
060A' F6 80                    or      ovridem        ; turn on override
060C' 32 0000#                 ld      (solctr),a
060F'                  stoninit:
                               global stoninit
060F' 21 0000                  ld      hl,0
0612' 22 0000#                 ld      (hprate),hl
0615' 22 0000#                 ld      (oratvl),hl    ; zero some buffers
0618' 3E 03                    ld      a,hpcval
061A' 32 0000#                 ld      (hpcnt),a      ; start a new count
061D' 3E 01                    ld      a,1
061F' 32 0000#                 ld      (active),a     ; flag one channel active
0622'                  stofinit:
                               global stofinit
0622' 3E FF                    ld      a,255
0624' 32 0000#                 ld      (syrtim),a     ; max the seconds counter
0627' 3E 02                    ld      a,sample/2+1

0629' 32 0000#                 ld      (ratcnt),a     ; start a new count down
062C' C9                       ret
062D'                  smf21:
062D' 3A 0000#                 ld      a,(smflag)     ; check the progress
0630' 4F                       ld      c,a
0631' E6 3F                    and     3fh            ; mask off the flags
0633' 5F                       ld      e,a
0634' 16 00                    ld      d,booksz       ; compute the book offset
```

TABLE I

```
0636'  ED 5C              mlt     de
0638'  FD 21 0000#        ld      iy,book          ; point to the book
063C'  FD 19              add     iy,de 063E'  79                 ld      a,c
063F'  FE 80              cp      80h              ; on or off check
0641'  30 40              jr      nc,smf3          ; nc, off check 0643'  3A 0000#           ld      a,(syrtim)
0646'  B7                 or      a
0647'  28 05              jr      z,smf23          ; zero count, load rate 0649'  CD 06C2'           call    stabon           ; check the process
064C'  D8                 ret     c                ; not ready yet 064D'  FD 77 10           ld      (iy+open),a      ; save the count
0650'  C9                 ret
0651'             smf23:
0651'  2A 0000#           ld      hl,(oratvl)      ; get the rate
0654'  54                 ld      d,h
0655'  1E 03              ld      e,sample         ; set the multiplier
0657'  63                 ld      h,e
0658'  ED 6C              mlt     hl
065A'  ED 5C              mlt     de
065C'  19                 add     hl,de
065D'  ED 5B 0000#        ld      de,(inarat)      ; adjust for the leakage
0661'  ED 52              sbc     hl,de
0663'  FD 75 18           ld      (iy+flov),l
0666'  FD 74 19           ld      (iy+flov+1),h    ; save the new rate 0669'  AF                 xor     a
066A'  DD 77 06           ld      (ix+solen),a     ; turn off the solenoid
066D'  DD 77 04           ld      (ix+lon),a       ;   and the ON led 0670'  3A 0000#           ld      a,(solctr)
0673'  E6 7F              and     255-ovridem      ; and the overide
0675'  32 0000#           ld      (solctr),a 0678'  3A 0000#           ld      a,(smflag)
067B'  EE C0              xor     0c0h             ; switch to turn off testing
067D'  32 0000#           ld      (smflag),a       ; 40h -> 80h
0680'  C3 0622'           jp      stofinit
0683'             smf3:
0683'  CD 06E2'           call    staboff
0686'  D8                 ret     c 0687'  FD 77 1C           ld      (iy+shut),a      ; save the turn off value
                  ; start a new channel here
068A'             smf4:
068A'  3A 0000#           ld      a,(smflag)       ; switch to turn on testing
068D'  E6 3F              and     3fh              ; clear controls
068F'  2A 0000#           ld      hl,(lstchn)
0692'  BD                 cp      l
0693'  28 0E              jr      z,smffin         ; last channel ?

0695'  3C                 inc     a                ; next channel
0696'  F6 40              or      40h              ; set turn on mode
0698'  21 0000#           ld      hl,smflag        ; point to the smf flag
069B'  77                 ld      (hl),a           ; save the new value
069C'  CD 075A'           call    prtbit           ; set up masks & flags
069F'  7E                 ld      a,(hl)
06A0'  C3 05D9'           jp      smf20            ; process the next channel
06A3'             smffin:
                  global smffin
06A3'  2A 0000#           ld      hl,(inarat)      ; adjust inactive rate by percent
06A6'  3A 0000#           ld      a,(percent)
06A9'  CD 0712'           call    peradjust
06AC'  22 0000#           ld      (inarat),hl      ; save the value at inarat
```

TABLE I

```
06AF' AF                    xor     a
06B0' 32 0000#              ld      (syrtim),a          ; clear the solenoid wait count
06B3' 67                    ld      h,a
06B4' 6F                    ld      l,a
06B5' 22 0000#              ld      (maxrat),hl         ; zero the max system rate 06B8' 3D                    dec     a
06B9' 32 0000#              ld      (smflag),a          ; flag the smf process as done
06BC' 3E 3E                 ld      a,3E
06BE' 32 0000#              ld      (hperrc),a          ; add a short error wait timeout
06C1' C9                    ret ; stabon Check for flow stabilization after turn on.
                            stabon:          ; returns carry clear for ready
06C2'                           global stabon
06C2' 21 0000#              ld      hl,ratbuf
06C5' 3A 0000#              ld      a,(ratno)
06C8' 07                    rlca                        ; two bytes per buffer
06C9' 5F                    ld      e,a
06CA' 16 00                 ld      d,0
06CC' 19                    add     hl,de               ; carry is clear here
06CD' 5E                    ld      e,(hl)              ; get current rate sample
06CE' 23                    inc     hl
06CF' 56                    ld      d,(hl)              ; in de
06D0' 2A 0000#              ld      hl,(oratvl)
06D3' ED 52                 sbc     hl,de               ; compare with current max.
06D5' 30 20                 jr      nc,stbofsk          ; nc, sample <= max, count down 06D7' ED 53 0000#           ld      (oratvl),de         ; make new max.
06DB'                   stbofsl:
06DB' 3E 02                 ld      a,sample/2+1
06DD' 32 0000#              ld      (ratcnt),a          ; restart count
06E0' 37                    scf                         ; flag not ready
06E1' C9                    ret ; staboff Check for flow stabilization after turn off.
                            staboff:
06E2'                           global staboff
06E2' 21 0000#              ld      hl,ratbuf
06E5' 3A 0000#              ld      a,(ratno)
06E8' 07                    rlca                        ; two bytes per buffer
06E9' 5F                    ld      e,a
06EA' 16 00                 ld      d,0
06EC' 19                    add     hl,de               ; carry is clear here
06ED' 5E                    ld      e,(hl)              ; get current rate sample
06EE' 23                    inc     hl
06EF' 56                    ld      d,(hl)              ; in de
06F0' 2A 0000#              ld      hl,(hratvl)
06F3' ED 52                 sbc     hl,de
06F5' 38 E4                 jr      c,stbofsl           ; c, sample > hratvl, restart count
06F7'                   stbofsk:
06F7' 3A 0000#              ld      a,(ratcnt)          ; get the rate counter
06FA' D6 01                 sub     1                   ; decrement the count
06FC' D8                    ret     c                   ; don't pass zero 06FD' 32 0000#              ld      (ratcnt),a
0700' 37                    scf                         ; set not ready flag
0701' C9                    ret     nz                  ; measure on zero
0702'                   stbofl:
0702' 3A 0000#              ld      a,(syrtim)          ; get the negative seconds
0705' C6 28                 add     a,sampcx(sample/2+1)
0707' ED 44                 neg
0709' 4F                    ld      c,a                 ; save the result
070A' 3E 3B                 ld      a,59                ; measure for a minute
070C' 32 0000#              ld      (syrtim),a          ; load the remainder of a minute
070F' 79                    ld      a,c
0710' B7                    or      a                   ; get the result
0711' C9                    ret
```

TABLE I

```
                        ; add percentage in a of hl to hl
0712'                   peradjust:
                         global peradjust
0712' F5                      push    af
0713' C5                      push    bc
0714' D5                      push    de 0715' 44                      ld      b,h
0716' 4D                      ld      c,l             ; save hl 0717' 57                      ld      d,a
0718' 5D                      ld      e,l
0719' ED 5C                   mlt     de              ; a times low byte 071B' 6F                      ld      l,a
071C' ED 6C                   mlt     hl              ; and high byte 071E' 65                      ld      h,l
071F' 2E 00                   ld      l,0
0721' 19                      add     hl,de           ; add them together 0722' 11 0064                 ld      de,100          ; divide 100 for percent
0725' CD 0000#                call    hldvde
0728' EB                      ex      de,hl
0729' 09                      add     hl,bc           ; add in the original value
072A' 23                      inc     hl              ; insure an increase of at least 1

072B' D1                      pop     de
072C' C1                      pop     bc
072D' F1                      pop     af
072E' C9                      ret 072F'                   syrproc:
                         global syrproc
072F' 00                      nop
0730'                   syrfin:
                         global syrfin 0730' AF                      xor     a               ; clear the syringe flag
0731' 32 0000#                ld      (syrbit),a
0734' C9                      ret ; recstart & recstop write the current time into the start or stop
                        ;       field (respectively) of the book for channel in a
0735'                   recstart:
0735' F5                      push    af
0736' E5                      push    hl
0737' 21 0000#                ld      hl,blstr        ; point to the start field
073A' 18 05                   jr      clkstuf
073C'                   recstop:
073C' F5                      push    af
073D' E5                      push    hl
073E' 21 0000#                ld      hl,blstp        ; point to the stop field
0741'                   clkstuf:
0741' CD 074D'                call    fndreh          ; get the record address in hl
0744' CD 0000#                call    clknl           ; put current clock in (hl)
0747' E1                      pop     hl
0748' F1                      pop     af
0749' C9                      ret ; fndrec  find the record for channel # in a
                        ; fndreh  enters with hl = element of record 0 of book to find
                        ;         returns hl = record/element address
074A'                   fndrec:
074A' 21 0000#                ld      hl,book
074D'                   fndreh:
074D' F5                      push    af
074E' D5                      push    de
074F' E6 3F                   and     3fh             ; mask off control bits
0751' 57                      ld      d,a
```

TABLE I

```
0752' 1E 25            ld      e,booksz
0754' ED 5C            mlt     de
0756' 19               add     hl,de           ; to the record
0757' D1               pop     de
0758' F1               pop     af
0759' C9               ret ; prtbit
                       ;       hl-> control byte (channel #)
                       ;       returns:
                       ;               a = upper/lower
                       ;               c = base port address
                       ;               d = mask bit
                       ;               ix= csi string block
075A'                  prtbit:
                         global prtbit
075A' C5               push    bc
075B' 7E               ld      a,(hl)          ; get the control byte
075C' 4F               ld      c,a
075D' E6 3F            and     3fh             ; mask for channel #
075F' 47               ld      b,a
0760' 3A 0000#         ld      a,(lstchn)      ; get the last channel
0763' B8               cp      b               ; check the count
0764' 79               ld      a,c             ; get the byte
0765' 30 03            jr      nc,prtbi0       ; nc, its ok 0767' E6 C0            and     0c0h            ; wrap to 0
0769' 77               ld      (hl),a          ; save the new value
076A'                  prtbi0:
076A' E6 30            and     30h             ; mask for tier #
076C' 1F               rra                     ; move it into the low nibble
076D' 1F               rra
076E' 1F               rra 076F' 1F               rra
0770' 47               ld      b,a             ; use it as the multiplier
0771' 0E 16            ld      c,csictrlsz     ; get the block size
0773' ED 4C            mlt     bc              ; compute the offset
0775' DD 21 0000#      ld      ix,cff1         ; point to the csi base address
0779' DD 09            add     ix,bc           ; add in the offset 077B' 7E               ld      a,(hl)          ; get the control byte
077C' E6 07            and     7               ; mask for 0-7
077E' 47               ld      b,a
077F' 04               inc     b               ; make 0-7 1-8
0780' 3E 80            ld      a,80h           ; set rotating bit in a
0782'                  prtbi1:
                         global prtbi1
0782' 07               rlca                    ; rotate the bit into position
0783' 10 FD            djnz    prtbi1

0785' 57               ld      d,a             ; return the bit in d
0786' 7E               ld      a,(hl)          ; get the control again
0787' E6 08            and     8               ; mask all but upper.or.lower
                       ; set the ix register to the high low byte
0789' 28 03                    jr      z,prtbi2        ; lower, don't inc ix 078B' DD 23            inc     ix
078D'                  prtbi2:
078D' 1F               rra                     ; change to byte offset 0 or 1
078E' 1F               rra
078F' 1F               rra 0790' C1               pop     bc
0791' C9               ret end
  2 Error(s) Detected.   1938 Program Bytes.
574 Symbols Detected.
```

TABLE I

```
                .list external lperbt, syser0, dspers, hperrc
                external astop, florep, flototal, offltot
                external floina, fltict, ovrftot, tieron
                external bautf, bcvrf, windoa
                external tsecs, alton, autflo, lstovr, lstauto
                external secdif
                external solctr, solenl, solenh, mstrauto
                external hldinc, irptsv, dcnta0

; 01-05-87 Moved flow measuring and error reporting to timeout
        ;         routines, PRTINT & WAITIM
        ;         drk ; 12-13-87 Added setting of lperbt flag to trigger display of
        ;         excess flow message. At the time of setting this flag
        ;         the master valve is also turned off.
        ;         drk ; The flow meter input is buffered and latched for monitoring
        ;         by interrupt 0 (INT0). The latch is cleared by taking
        ;         RTS0 bit (CNTLA0) low and enabled when RTS0 is
        ;         returned to high. During reset RTS0 is taken high.
        ;         All counts are tallied in the FLOTOTAL 4 byte register.

; Normal counts are due either to automatic watering or to overide
        ;         watering. Normal counts are tallied in either the apropriate
        ;         auto or ovr register associated with the appropriate channel.
        ;         During overide failure flocounts are also tallied in OVFLTOT.
        ;         If more than one controller reads the same meter and they
        ;         communicate with each other, the ALTON flag is set to indicate
        ;         that an alternate controller has active channels causing flow
        ;         ticks. These ticks are tallied in the ALTFLO 4 byte register.
        ;
        ; Abnormal counts are those which occur after the last valve is turned
        ;         off, hperrc is zero, and alton is zero. Abnormal inactive count
        ;         are tallied in the FLOINA 4 byte register.

; Worst case interrupt rate using Western Water Meter Company's
        ;         spec. sheet M-E WM-E for a 3" meter with 1 gallon pulses
        ;         is a pulse every 100 miliseconds at maximum flow.
                page 64
0000'           intlvc:
                global intlvc 0000' CD 0000#          call    irptsv          ; save regs, setup reti return
0003' 08                ex      af,af'          ; save aux a
0004' F5                push    af
0005' 21 0000#          ld      hl,flototal     ; adjust the total count
0008' 06 05             ld      b,flotsz
000A' CD 0000#          call    hldinc          ; increment the counter 000D' 3A 0000#          ld      a,(mstrauto)    ; check for auto
0010' CB 7F             bit     7,a
0012' C2 0097'          jp      nz,intlaut      ; nz, auto ; auto f
0015' 3A 0000#          ld      a,(solctr)
0018' E6 00             and     ovridem         ; is overide active 001A' 20 23             jr      nz,intlovr      ; nz, yes, use overide routine 001C' 3A 0000#          ld      a,(hperrc)      ; hperrc still counting ?
001F' B7                or      a
0020' CA 0051'          jp      z,intlina       ; z, no use inactive routine 0023' 3A 0000#          ld      a,(windoa)      ; window active ?
0026' B7                or      a
```

TABLE I

```
0027' C2 0093'                    jp      nz,intlal       ; nz, assume auto valve shut down 002A' 21 0000#                    ld      hl,bovrf        ; get the override counter
002D' 3A 0000#                    ld      a,(lstovr)      ; get the previous channel #
0030' E6 3F                       and     3fh             ; clear the control mask
0032' 57                          ld      d,a
0033' 1E 25                       ld      e,booksz
0035' ED 5C                       mlt     de              ; compute offset to the record
0037' 19                          add     hl,de
0038' 06 03                       ld      b,flsz
003A' CD 0000#                    call    hldinc          ; bump the counter
003D' 18 4E                       jr      intlox ; auto f, overide t
003F'                     intlovr:
003F' 3A 0000#                    ld      a,(tiercn)      ; get the tier count
0042' 47                          ld      b,a
0043' 07                          rlca                    ; tiers times 2 for banks
0044' 4F                          ld      c,a
0045' 11 0015                     ld      de,csictrlsz-1  ; load the offset
0048' AF                          xor     a
0049' 21 0000#                    ld      hl,solenl       ; get the solenoid control bytes
004C'                     intlol:
004C' B6                          or      (hl)            ; or in the data
004D' 23                          inc     hl
004E' B5                          or      l
004F' 19                          add     hl,de           ; offset to the next bank
0050' 10 FA                       djnz    intlol 0052' B7                          or      a               ; any solenoids active ?
0053' CA 0051'                    jp      z,intlina       ; z, no, use inactive counters 0056' DD E5                       push    ix
0058' DD 21 0000#                 ld      ix,solenl       ; point to the control byte
005C' 21 0000#                    ld      hl,bovrf        ; use the overide flow counters
005F'                     intlol:
005F' DD 7E 00                    ld      a,(ix)          ; get the low control
0062' 06 08                       ld      b,8             ; 8 bits
0064' 11 0025                     ld      de,booksz       ; booksz is the offset
0067' B7                          or      a
0068' 28 0D                       jr      z,intlo4        ; z, no counts for low control
006A'                     intlo2:
006A' 0F                          rrca                    ; check a channel
006B' 30 07                       jr      nc,intlo3       ; nc, not on 006D' C5                          push    bc
006E' 06 03                       ld      b,flsz
0070' CD 0000#                    call    hldinc          ; add 1 to the count
0073' C1                          pop     bc
0074'                     intlo3:
0074' 19                          add     hl,de           ; move to next channel
0075' 10 F3                       djnz    intlo2
0077'                     intlo4:
0077' 0D                          dec     c               ; more to go?
0078' 28 11                       jr      z,intlo9        ; z, nope 007A' DD 23                       inc     ix              ; next control
007C' 58                          ld      d,b             ; compute remaining offset
007D' ED 5C                       mlt     de
007F' 19                          add     hl,de           ; move to the next book
0080' CB 41                       bit     0,c             ; high or low bank
0082' 20 DB                       jr      nz,intlol       ; nz, low bank 0084' 11 0014                     ld      de,csictrlsz-2  ; offset to the next control
0087' DD 19                       add     ix,de
0089' 18 D4                       jr      intlol
008B'                     intlo9:
008B' DD E1                       pop     ix
008D'                     intlox:
008D' 21 0000#                    ld      hl,ovrftot      ; increment the override counter
```

TABLE I

```
0090' 06 05                    ld      b,ovflsz
0092' CD 0000#                 call    hidinc
0095' 18 58                    jr      floexit ; auto f
0097'              intlaut:
0097' AF                       xor     a
0098'                          inp     a,(instatp)
0098' DB 01        A1          in      a,(instatp)
009A' 2F                       cpl             ; complement for multiple test
009B' E6 C0                    and     cursns or online ; mask for current sense & online
009D' EE 00                    xor     cursnst or onlinef ; either cursns or not online ?
009F' 20 12                    jr      nz,intla1      ; nz, at least one is true 00A1' 3A 0000#                 ld      a,(solctr)
00A4' E6 80                    and     ovridem        ; overide w/ auto ?
00A6' 20 0B                    jr      nz,intla1      ; nz, yes, treat as auto 00A8' 3A 0000#                 ld      a,(hperrc)     ; in time out ?
00AB' B7                       or      a
00AC' 28 33                    jr      z,intlina      ; z, no, it's an error 00AE' 3A 0000#                 ld      a,(1stauto)    ; use the previous channel
00B1' 18 03                    jr      intla2
00B3'              intla1:
00B3' 3A 0000#                 ld      a,(mstrauto)   ; use the current channel
00B6'              intla2:
00B6' 21 0000#                 ld      hl,bautf       ; point to chan0 auto flow counter
00B9' E6 3F                    and     3fh            ; mask for channels only
00BB' 57                       ld      d,a
00BC' 1E 25                    ld      e,booksz
00BE' ED 5C                    mlt     de             ; compute offset to record
00C0' 19                       add     hl,de
00C1' 06 03                    ld      b,flsz
00C3' CD 0000#                 call    hidinc         ; bump the counter 00C6' 06 05                    ld      b,ovflsz       ; bump the auto total
00C8' 21 0000#                 ld      hl,autflo
00CB' CD 0000#                 call    hidinc 00CE'                          inp     a,(instatp)    ; sensors on line?
00CE' DB 01        A1          in      a,(instatp)
00D0' E6 40                    and     online
00D2' FE 40                    cp      onlinet 00D4' CA 00EF'                 jp      z,floexit      ; z, yes, sensors on line 00D7' 21 0000#                 ld      hl,offltot
00DA' 06 05                    ld      b,ovflsz
00DC' CD 0000#                 call    hidinc
00DF' 18 0E                    jr      floexit        ; clear the interrupt ; overide f, auto f
00E1'              intlina:
00E1' 3A 0000#                 ld      a,(alton)      ; check for alternate controller
00E4' B7                       or      a              ; active ?
00E5' 20 08                    jr      nz,floexit     ; yes, normal exit
00E7'              intli1:
00E7' 06 05                    ld      b,flotsz       ; bump 4 byte counter
00E9' 21 0000#                 ld      hl,floina
00EC' CD 0000#                 call    hidinc
00EF'              floexit:
00EF' 21 0000#                 ld      hl,tsecs       ; record the time of this tick
00F2' 11 0000#                 ld      de,fltict
00F5' 01 0003                  ld      bc,3
00F8' ED B0                    ldir 00FA' 01 0080                  ld      bc,cntla0      ; load asci 0 control a
00FD' 3A 0000#                 ld      a,(dcntla0)    ; get the value
0100' E6 EF                    and     not rts0       ; turn off rts0
```

TABLE I

```
0102'                           out         (c),a
0102' ED 79        A1           out         (c),a
      FFFF         1        if not cpa
0104' F6 10        1            or          rst0        ; then back on to reset
0106'              1            out         (c),a       ; the interrupt source
0106' ED 79        A1           out         (c),a
                            endif
0108' F1                        pop         af
0109' 08                        ex          af,af'
010A' 2A 0000#                  ld          hl,(florep) ; inc the flow rate counter
010D' 11 0001                   ld          de,1
0110' 19                        add         hl,de
0111' D8                        ret         c 0112' 22 0000#                  ld          (florep),hl
0115' C9                        ret
                            end
    0 Error(s) Detected.    278 Program Bytes.
  413 Symbols Detected.
                                .z80
                                .list ; Written for: Aquametrics Inc. to drive the controller designed
                            ;       by Floersch Engineering, San Diego, CA 0000'                       watkey:

external lstchn, tiercn
                            external keyno, keyval, keytim, beeptm, outctr
                            external savall, asave, bsave, dsave, hsave, irptsv
                            external clckeys, chnchk, beep, putchar, hldshx global watkey, clockrow
                            global rdlns, rdlnsl, keyprs, keyprx
                            global kbdcnv
                            global int2vc, int2en, int200

.comment | ; testing routine
                            external stack
                                    ld          sp,stack
                                    ld          a,15
                                    ld          (lstchn),a
                                    ld          a,1
                                    ld          (tiercn),a
                            keytst:
                            global keytst
                                    ld          a,0d0h
                                    ld          c,05h
                            brk:
                            global brk
                                    nop
                                    call        keyprs
                                    nop
                                    jp          keytst
                            ;|; end of test routine
                            ; int2vc
                            ;    Any keypress while the keyboard and interrupt 2 are armed
                            ;    causes an interrupt 2
0000'                       int2vc:
0000' CD 0000#                  call        irptsv 0003' 01 0084                   ld          bc,itc
0006'                           inn         a,(c)
0006' ED 78        A1           in          a,(c)       ; get the interrupt con stat
0008' E6 FB                     and         not ite2    ; turn off int 2
000A'                           out         (c),a
000A' ED 79        A1           out         (c),a
000C' FB                        ei                      ; let other interrupts go
```

TABLE I

```
0000' CD 0023'                    call    int200

0010' F5                          push    af
0011' CC 0000#                    call    z,clckeys       ; z, set the clock
0014' F1                          pop     af
0015' DC 0000#                    call    c,chnch'        ; c, set the channel valves 0018' F3                          di                      ; don't recurse til clear of this interrupt
0019'                     int2en:
0019' 01 0394                     ld      bc,itc          ; arm the kb interrupt
001C'                             inp     a,(c)
001C' ED 78           A1          in      a,(c)
001E' F6 04                       or      ite2
0020'                             outt    (c),a
0020' ED 79           A1          out     (c),a 0022' C9                          ret ;keyboard decoder
0023'                     int200:
0023' 3E 24                       ld      a,debounce      ; start the debounce timout
0025' 32 0000#                    ld      (keytim),a 0028' 21 FFFF                     ld      hl,-1
002B' 22 0000#                    ld      (keyno),hl      ; load an invalid key
002E' 22 0000#                    ld      (keyval),hl 0031'                     int201:
0031' ED 5B 0000#                 ld      de,(keyno)      ; put old value in de 0035' 3A 0000#                    ld      a,(keytim)      ; check the time out
0038' B7                          or      a
0039' 28 58                       jr      z,errexit       ; z, no valid key in time 003B' CD 009E'                    call    clockrow        ; check for a clock key
003E' 38 05                       jr      c,int202        ; c= clock key press 0040' CD 00CD'                    call    rdlns           ; check for a channel key
0043' 30 EC                       jr      nc,int201       ; nc= no key press
0045'                     int202:
0045' 2A 0000#                    ld      hl,(keyno)
0048' B7                          or      a
0049' ED 52                       sbc     hl,de           ; check for old-new match
004B' 20 E4                       jr      nz,int201       ; nz= no match 004D' ED 53 0000#                 ld      (keyval),de 0051' 3A 0000#                    ld      a,(outctr)      ; get the output status
0054' F6 0F                       or      keymsk
0056' 32 0000#                    ld      (outctr),a      ; arm the keyboard
0059'                             outt    (octrpt),a
0059' D3 22           A1          out     (octrpt),a 005B' 7A                          ld      a,d             ; check the row
005C' FE 0E                       cp      clkrow
005E' 28 04                       jr      z,int221        ; z, clock row 0060' FE 0B                       cp      kcsid
0062' 38 04                       jr      c,int222        ; c, channel key
0064'                     int221:
0064' EE 0E                       xor     clkrow          ; set z for clock, nc for syringe
0066' 7B                          ld      a,e             ; exit w/column in a
0067' C9                          ret                     ; z, clock key, no debounce
0068'                     int222:
0068' E6 C0                       and     0c0h            ; mask for the I.D.
006A' CB 27                       sla     a
006C' CB 27                       sla     a               ; times 4
006E' 83                          add     a,e             ; plus the column
006F' 32 0000#                    ld      (keyval),a      ; = the channel number
0072'                     int203:
0072'                             inp     a,(keysns)      ; check for key release
```

TABLE I

```
0072' DB 00      A1       in      a,(keysns)
0074' FE 00               cp      nokeyin
0076' 28 10               jr      z,int204        ; z= no key, check timeout 0078' 3E 02               ld      a,debounce/2    ; keep tmeout running
007A' 32 0000#            ld      (keytim),a 007D' 3A 0000#            ld      a,(beeptm)      ; check beep progress
0080' B7                  or      a
0081' 20 EF               jr      nz,int203       ; nz= still beeping 0083' CD 0000#            call    beep
0086' 18 EA               jr      int203
0088'            int204:
0088' 3A 0000#            ld      a,(keytim)      ; check the time out
008B' B7                  or      a
008C' 20 E4               jr      nz,int203       ; nz check keys again 008E' 7A                  ld      a,d             ; check the row
008F' FE 0E               cp      clkrow 0091' 7B                  ld      a,e             ; exit w/column in a
0092' D8                  ret     c               ; c, set channel return 0093'            errexit:
0093' 21 FFFF             ld      hl,-1
0096' 22 0000#            ld      (keyno),hl
0099' 22 0000#            ld      (keyval),hl
009C' B5                  or      l               ; no carry, no key
009D' C9                  ret ; clockrow
                 ;    The keyboard is decoded by two 1 of 10 priority
                 ;       encoders. With all inputs hi the output = 0. With
                 ;       1 or more inputs low, output is the ones complement
                 ;       of the highest numbered line (0-9) at a low level
                 ;       on each encoder.
                 ;    Returns:
                 ;       no carry = no key pressed   a = 255
                 ;          carry = key pressed      a = high and low encoder numbers
                 ;       (keyno) = 256*clkrow + key #'s 009E'            clockrow:
009E' C5                  push    bc
009F' 3A 0000#            ld      a,(outctr)      ; set the status of the port
00A2' E6 F0               and     not keymsk      ; disable all keys
00A4' F6 0E               or      clkmsk          ; arm the clock row
00A6' 32 0000#            ld      (outctr),a
00A9'                     outt    (octrpt),a
00A9' D3 02      A1       out     (octrpt),a 00AB' DD E3               ex      (sp),ix         ; give a few u secs
00AD' DD E3               ex      (sp),ix         ; for the keyboard to settle 00AF' 0E 00               ld      c,keysns        ; point to keyin port
00B1'                     inn     b,(c)           ; get the key value
00B1' ED 40      A1       in      b,(c)

00B3' F6 0F               or      keymsk          ; turn on all rows
00B5' 32 0000#            ld      (outctr),a
00B8'                     outt    (octrpt),a
00B8' D3 02      A1       out     (octrpt),a 00BA' 78                  ld      a,b             ; get the value in a
00BB' 01 FFFF             ld      bc,-1           ; set up error return 00BE' 2F                  cpl                     ; correct the sense
00BF' D6 FF               sub     -1 and 0ffh     ; sub -1 = add 1, except
00C1' 3D                  dec     a               ; no carry on 255, no key value
00C2' 30 03               jr      nc,clkrox       ; nc, no key, quit
```

TABLE I

```
00C4' 06 0E                    ld      b,clkrow        ; return clock row
00C6' 4F                       ld      c,a             ; and column
00C7'              clkrcx:
00C7' ED 43 0000#              ld      (keyno),bc      ; at keyno
00CB' C1                       pop     bc
00CC' C9                       ret FFFF        1   if kbs
                     1   ; rdlns scans the 9 rows & 2 I.D.'s of the keyboard
                     1   ; rdlnsl allows a different scan # to be used
                     1   ;        If input is detected b = row # and c = column 00CD'                1   rdlns:
00CD' 06 09          1           ld      b,9             ; assume a full keyboard
                     1
00CF'                1   rdlns1:                         ; entry for different # of rows
00CF' 3A 0000#       1           ld      a,(outctr)      ; get the ports setting
00D2' F5             1           push    af              ;  save it
00D3' E6 F0          1           and     not keymsk      ; mask off the key board lines
00D5' 4F             1           ld      c,a             ; save the value in c
00D6'                1   rdlns2:
00D6' 79             1           ld      a,c             ; get the row #
00D7' 32 0000#       1           ld      (outctr),a
00DA'                1           out     (octrpt),a      ; check that row
00DA' D3 02     A1             out     (octrpt),a
                     1
00DC' DD E3          1           ex      (sp),ix         ; give the keyboard
00DE' DD E3          1           ex      (sp),ix         ; a few u secs to settle
00E0' E6 03          1           and     3               ; ID row ?
00E2' EE 03          1           xor     3
00E4' 20 11          1           jr      nz,rdln22       ; nz, its a key row
                     1
00E6'                1           inn     a,(keysns)      ; read the keyboard
00E6' DB 02     A1             in      a,(keysns)
00E8' B7             1           or      a               ; ID present?
00E9' 20 09          1           jr      nz,rdln21       ; yes read the key board
                     1
00EB' 78             1           ld      a,b
00EC' D6 03          1           sub     3               ; try next keyboard
00EE' 28 2A          1           jr      z,nokeyx        ; z, no keys left to try 00F0' 79             1           ld      a,c
00F1' C6 03          1           add     a,3             ; try next keyboard
00F3' 4F             1           ld      c,a
00F4'                1   rdln21:
00F4' 0C             1           inc     c               ; next row
00F5' 18 DF          1           jr      rdlns2          ; check it
00F7'                1   rdln22:
00F7'                1           inn     a,(keysns)      ; read the keyboard
00F7' DB 02     A1             in      a,(keysns)
00F9' B7             1           or      a
00FA' 20 05          1           jr      nz,keyprs       ; not 0 must be key pressed
                     1
00FC' 0C             1           inc     c               ; next row
00FD' 10 D7          1           djnz    rdlns2          ; & loop again
                     1
00FF' 18 19          1           jr      nokeyx
                     1   else
                         endif
0101'                    keyprs:
0101' CD 012F'                   call    kbdcnv
0104' 41                         ld      b,c             ; return row in b
0105' 4F                         ld      c,a             ; return column in c 0106' 78                         ld      a,b             ; get the row
0107' E6 0C                      and     0ch             ; mask for kb #
0109' CB 27                      sla     a               ; compute the row offset
010B' CB 27                      sla     a
010D' 81                         add     a,c             ; add in the column #
```

TABLE I

```
010E'  4F                      ld      c,a             ; save it
010F'  78                      ld      a,b             ; mask the row #
0110'  E6 03                   and     3
0112'  47                      ld      b,a             ; return it in b 0113'  3A 0000#                ld      a,(lstchn)      ; check the column
0116'  B9                      cp      c               ; valid keys are 0 thru (maxchans-1)
0117'  3F                      ccf
0118'  38 04                   jr      c,keyprx        ; carry = 0-lstchn, valid column
011A'          nokeyx:
011A'  3E FF                   ld      a,255           ; load invalid row and column
011C'  47                      ld      b,a
011D'  4F                      ld      c,a
011E'          keyprx:
011E'  ED 43 0000#             ld      (keync),bc
       FFFF            1       if k48
0122'  E3              1       ex      (sp),hl         ; retrieve outctr
                               endif
0123'  F5                      push    af              ; save the carry & column
0124'  7C                      ld      a,h             ; get the original setting
0125'  F6 0F                   or      keymsk          ; enable all the key rows
0127'  32 0000#                ld      (outctr),a
012A'                          outt    (octrpt),a
012A'  D3 02           A1      out     (octrpt),a 012C'  F1                      pop     af
012D'  E1                      pop     hl              ; restore hl
012E'  C9                      ret ; kbdcnv converts 0F0h-0F9h to 0-9 or 00Fh-0aFh to 10-20
                               ; input in a,  result in a
012F'          kbdcnv:
012F'  2F                      cpl                     ; correct the sense from the encoder
0130'  D6 F0                   sub     0f0h            ; check for 0-9
       FFFF            1       if unscram
0132'  D0              1       ret     nc
                       1       else
                               endif
0133'  07                      rlca                    ; rotate high nibble into low
0134'  07                      rlca
0135'  07                      rlca
0136'  07                      rlca
0137'  C6 19                   add     a,25            ; add back the f and 10 more
       FFFF            1       if unscram
2139'  C9              1       ret
                       1       else
                               endif
                               end
  0 Error(s) Detected.    314 Program Bytes.
410 Symbols Detected.

.z80
                               .LIST

; 11-10-89 Added power out time reset to error reset routine.
                               ;       Changed error reset order, LPLP, P###, LLLL, channels.
                               ;       drk ; Written for Aquametrics Inc. of San Diego, CA
                               ;       to drive the controller designed by
                               ;               Floersch Engineering of San Diego, CA global clckeys, setclk, resetclock, clkhl, clkinc
                               global clckex, fstdwcl, stdwxl, settim, setdwll external maset, getmost, lstchn, tiercn, tiermk
                               external hcndfl, hcrmem, scldfl, msolcla, llrscn, llrsvl, llrsdf
                               external clrsize, clrspc, dfdawk, opday0, opday1
                               external erproc, smflag, alton, actrec, lstovr, lstauto, lston
                               external autbit, syrbit, mstrauto, book, windoa, newmin
```

TABLE I

```
                external inarat, maxrat, currat, hprate, percent, cnnc01, csiupd
                external inahi, acthi, ratbuf, dflov, dfina, pumins, pucnt
                external holdll, savix, scodbn, csistart, atobcd
                external lperbt, llerbt, syseri, dspers, llrest, restim, finatm
                external suwrite, savall, separa, ssecs, smins, tdawk, tmins, chgscs
                external clockrow, separate, setit, noupdt, omins, cmins, timdsp
                external slotmc, hidigit, lodigit, dspdsp, temkey, tsecs
                external dosec, csecs, ddwell, tdspns, clkscr, clkscz, beep, blank4
                external clkscr, clksce, clkscz, keyno, keyval, rdlrs, fetimo, duchan
                external ignore, ignloop, solctr, pstrng, sysrst, syser0, shoerr
                external koffl, kautol, konl, offl, onl, autol, hotchn
                external prtbit, keytim, bdwel, bflohi, bdflts, notdfl, numdfl
                page 64
                ; clckeys
                ;   clock setting key decode.  clockrow returns no carry for
                ;   no key or af = keys pressed.  separates byte into low nibble
                ;   (dwell, start, stop, time) and high nibble (fast, slow).
                ;   restores clock display before exit
0000'           clckeys:
0000' 3A 0000#          ld      a,(keyno)       ; get the value
0003'           clckel:
0003' CD 0000#          call    separate        ; separate the nibbles
0006' CC 012F'          call    z,spdchk        ; z, check the speed keys 0009' 3A 0000#          ld      a,(syser0)      ; check for error reset
000C' B7               or      a               ; error to clear ?
000D' C4 01CC'          call    nz,rsyser       ; nz, yep 0010' 3A 0000#          ld      a,(setit)
0013' B7               or      a               ; smins loaded already ?
0014' 20 31            jr      nz,settim       ; nz, yes 0016' 3E FF            ld      a,255
0018' 32 0000#          ld      (noupdt),a      ; disable updates while setting 001B' 7B               ld      a,e             ; get the function key
001C' FE 90            cp      dwkey           ; dwell key ?
001E' 28 6B            jr      z,setdwll       ; z= its dwell, go display it 0020' FE 82            cp      stpkey
0022' 21 0000#          ld      hl,cmins        ; stop key ?
0025' 28 20            jr      z,settim        ; z, yep 00BC' 3A 0000#          ld      a,(hcurtm)
00BF' B7               or      a               ; timeout finished ?
00C0' 20 78            jr      nz,eptllc       ; nz, nope
00C2'           eptst:
00C2' 21 0000#          ld      hl,lston        ; what channel caused it
00C5' CD 0000#          call    prtbit          ; get the bit and byte posit
00C8' 7A               ld      a,d             ; get the mask
00C9' DD A6 26          and     (ix+solen)      ; is the channel on ?
00CC' 20 41            jr      nz,eplbyte 00CE' DD 21 0000#       ld      ix,offl
00D2' 0E 02            ld      c,2
00D4' ED 5B 0000#       ld      de,(tieron)     ; get the tier count
00D8' AF               xor     a
00D9' 57               ld      d,a
00DA'           epoloop:
00DA' DD 36 26          or      (ix+solen)      ; find an active channel
00DC' 28 07            jr      z,epskplp       ; z, not this byte
00DF' 06 08            ld      b,8
00E1'           epiloop:
00E1' 0F               rrca
00E2' 38 14            jr      c,epndloop      ; found one decode it 00E4' 10 FB            djnz    epiloop         ; loop for more 00E6'           epskplp:
00E6' DD 23            inc     ix
00E8' 0D               dec     c
```

TABLE I

```
0089' 20 EF              jr      nz,epoloop      ; nz, ok to try

008B' 14                 inc     d               ; next key board
008C' 1D                 dec     e
008D' 28 45              jr      z,eptilc        ; can't find it 008F' 01 0014            ld      bc,csictrlsz-2
0092' DD 09              add     ix,bc
0094' 0E 02              ld      c,2
0096' 18 E2              jr      epoloop
00F8'            epndloop:
00F8' 78                 ld      a,b
00F9' ED 44              neg
00FB' C6 08              add     a,8             ; compute the channel found
00FD' 0D                 dec     c               ; low or high byte ?
00FE' 20 02              jr      nz,epnxt        ; nz, it was the low byte 0100' C6 08              add     a,8
0102'            epnxt:
0102' 1E 10              ld      e,tiersiz       ; compute the
0104' ED 5C              mlt     ce              ; key board offset
0106' 83                 add     a,e
0107' 32 0000#           ld      (lston),a       ; use it as last channel on
010A' 3E 01              ld      a,1
010C'            epnx1:
010C' 0F                 rrca                    ; rotate the bit into position
010D' 10 FD              djnz    epnx1

010F'            eplbyte:
010F' DD B6 12           or      (ix+pwr0)       ; turn on the channel error
0112' DD 77 12           ld      (ix+pwr0),a
0115' 32 0000#           ld      (dampers),a     ; and the flag 0118' 32 0000#           ld      (erproc),a      ; flag error in progress
011B' 3A 0000#           ld      a,(lston)       ; get the channel #
011E' 4F                 ld      c,a             ; use it as column
011F' 26 00              ld      h,0             ; set the off row
0121' CD 0000#           call    chnoel          ; turn off the channel 0124' 3A 0000#           ld      a,(csterm)      ; flag waiting for turn off
0127' F6 20              or      hicursn
0129' 32 0000#           ld      (csterm),a
012C' 32 0000#           ld      (colupd),a      ; force a csi update 012F' 3E 02              ld      a,eptimo        ; start the ep timeout
0131' 32 0000#           ld      (epsecs),a
0134'            eptstx:
        FFFF     1  if hcurtsti                  ; adjusting hi current timeout
0134' 3A 0000#   1       ld      a,(hcrmem)      ; get the value from ram
                 1  else
                    endif
0137' 32 0000#           ld      (hcurta),a
013A'            eptilc:
013A' DD E1              pop     ix              ; restore ix
013C'            llchk:
013C' AF                 xor     a
013D' 32 0000#           ld      (erproc),a      ; clear error process byte 0140' 3A 0000#           ld      a,(maset)       ; check for moisture adjusting
0143' 87                 or      a               ; in progress ?
0144' 20 35              jr      nz,nollrs       ; leave ll alone!

0146' 3A 0000#           ld      a,(colctr)
0149' E6 80              and     ovridem
014B' 20 13              jr      nz,llonline     ; in override ?
                                                 ; yes, count em down ;       ld      a,(windoa)      ; check window
                 ;       or      a               ; is it opened?
                 ;       jr      nz,nollrs       ; nz, yes leave ll alone!
                 ;
```

TABLE I

```
0140'                        inp       a,(instatp)      ; get the online status
0140' DB 01       A1         in        a,(instatp)
014F' E6 40                  and       online
0151' FE 40                  cp        onlinet          ; online ?
0153' 28 0B                  jr        z,llonline       ; z, yep 0155' 3A 0000#               ld        a,(llerbt)
0158' F6 08                  or        llermsk          ; set the ller mask
015A' 32 0000#               ld        (llerbt),a       ; flag the ll byte
015D' 32 0000#               ld        (dspers),a       ; and the display error byte
0160'             llonline:
0160' 3A 0000#               ld        a,(csterm)
0163' CB 4F                  bit       oflrbit,a        ; csi terminated yet ?
0165' 20 14                  jr        nz,nollrs        ; no wait
0167'             llovrd:
0167' 3A 0000#               ld        a,(llrscn)       ; get the llreset count
016A' D6 01                  sub       1
016C' 38 05                  jr        c,llrs           ; c, already zero 016E' 32 0000#               ld        (llrscn),a
0171' 20 08                  jr        nz,nollrs        ; nz, don't finish reset yet
0173'             llrs:
0173' 3A 0000#               ld        a,(leadout)
0176' E6 FD                  and       0ffh-oflrmsk     ; reset the bit
0179' 32 0000#               ld        (leadout),a
017B'             nollrs:
017B' 2A 0000#               ld        hl,(timup)       ; get the up counter
017E' 23                     inc       hl
017F' 22 0000#               ld        (timup),hl
0182' 7C                     ld        a,l              ; 100 milliseconds yet
0183' E6 27                  and       period
0185' 20 04                  jr        nz,clkupdate     ; nz, nope 0187' 3D                     dec       a
0188' 32 0000#               ld        (csiups),a 018B' B1                     or        c
018C' 32 0000#               ld        (cclctr),a 01E6' 3A 0000#               ld        a,(noupdt)       ; check for legal to update display
01E9' B7                     or        a
01EA' 20 15                  jr        nz,chksecs       ; nz= not legal to update 01EC' 3A 0000#               ld        a,(dspers)       ; errors to display?
01EF' B7                     or        a
01F0' 28 2F                  jr        z,chksecs        ; zero, nope 01F2' 21 0000#               ld        hl,tmins         ;
01F5' AF                     xor       a
01F6' B1                     cp        c                ; colon on or off ?
01F7' 20 05                  jr        nz,shotim        ; nz, on, show time 01F9' CD 032A'               call      shoerr           ; show any errors
01FC' 20 03                  jr        nz,chksecs       ; nz, showed one
01FE'             shotim:                               ; z, none to show so
01FE' CD 0000#               call      findsp           ; display the time 0201'             chksecs:
0201' 2A 0000#               ld        hl,(upsecs)      ; increment the up counter
0204' 23                     inc       hl
0205' 22 0000#               ld        (upsecs),hl 0208' 2A 0000#               ld        hl,(grpdwn)      ; check the group down counter
020B' 7C                     ld        a,h
020C' B5                     or        l
020D' 28 04                  jr        z,ngroup         ; don't pass 0

020F' 2B                     dec       hl
0210' 22 0000#               ld        (grpdwn),hl
0213'             ngroup:
```

TABLE I

```
0213' 21 0000#            ld      hl,secnts       ; point to 1st 1 second count
0216' 06 ??               ld      b,nosecs        ; get the count
0218' 3A 0000#            ld      a,(active)      ; any channels active ?
021B' 4F                  ld      c,a             ; save the state
021C' 3A 0000#            ld      a,(solctr)
021F' E6 80               and     ovridem         ; over ride acitve ?
0221' B1                  or      c               ; either one ?
0222' 28 02               jr      z,secer         ; neither, count finatm 0224' 23                  inc     hl              ; skip the finatm counter
0225' 05                  dec     b ; clkupdate
                    ;     update the current clock storage and check for window change
                    ;     reads registers starting with rmins into clock ram starting
                    ;     with tmins
018B'               clkupdate:
018B' 2A 0000#            ld      hl,(tsecs)      ; get the last second
018E' E5                  push    hl
018F' CD 0000#            call    swread          ; read the smart watch
0192' D1                  pop     de              ; get old secs & mins
0193' 2A 0000#            ld      hl,(tsecs)      ; and the new
0196' 7D                  ld      a,l             ; check for seconds change
0197' 93                  sub     e
0198' 20 1D               jr      nz,clkupc       ; process the second change 019A' 3A 0000#            ld      a,(windoa)
019D' B7                  or      a               ; window active ?
019E' C8                  ret     z               ; no, try later 019F' 3A 0000#            ld      a,(astrauto)    ; check auto condition
01A2' E6 40               and     40h             ; solwait true ?
01A4' C0                  ret     nz              ; yes, try later 01A5' 3A 0000#            ld      a,(llrscn)      ; check low power
01A8' B7                  or      a               ; active ?
01A9' C2 0000#            jp      nz,clkchk       ; nz, yes check the solenoid 01AC'                     inp     a,(instate)     ; check for cards or offline
01AC' DB 01       A1      in      a,(instate)
01AE' 2F                  cpl
01AF' E6 C0               and     online or cursns ; mask
01B1' EE 00               xor     onlinef or cursnsf ; cursns true or online false
01B3' C0                  ret     nz              ; nz, yes, no special processing
01B4' C3 0000#            jp      clkchk          ; update the auto process
01B7'               clkupc:
                    global clkupc
01B7' 32 0000#            ld      (chgscs),a      ; flag the change 01BA' 3A 0000#            ld      a,(solctr)      ; check for overide
01BD' E6 10               and     ovridem
01BF' 20 0E               jr      nz,clkup0       ; yes, no lllrest 01C1' 3A 0000#            ld      a,(windoa)      ; or in the window
01C4' B7                  or      a
01C5' 20 08               jr      nz,clkup0       ; no lllrest 01C7' 3A 0000#            ld      a,(syser0)      ; get the system error byte
01CA' CB 5F               bit     llerbit,a       ; ll error ?
01CC' C4 03D4'            call    nz,lllrest      ; nz, yep, fix it
01CF'               clkup0:
01CF' 5C                  ld      e,h             ; old/new minutes in d/e 01D0' 3A 0000#            ld      a,(outctr)
01D3' EE 10               xor     clnmsk          ; toggle the colon
01D5' 32 0000#            ld      (outctr),a      ; save the new value
01D8'                     out     (octrpt),a      ; and output the state
01D8' D3 02       A1      out     (octrpt),a 01DA' E6 10               and     clnmsk          ; copy colon bit
```

TABLE I

```
015C' 4F                        ld      c,a
015D' 3A 0000#                  ld      a,(sclctr)      ; into sclctr watchdog bit
0160' E6 EF                     and     not clnmsk 0226'                   secer:
0226' 7E                        ld      a,(hl)
0227' D6 01                     sub     1
0229' 38 01                     jr      c,nsecer        ; c, count was 0

022B' 77                        ld      (hl),a
022C'                   nsecer:
022C' 23                        inc     hl              ; next counter
022D' 10 F7                     djnz    secer ; check for flow rate calculations
022F'                   chkflo:
                        global  chkflo
022F' 3A 0000#                  ld      a,(meter)       ; check for meter
0232' B7                        or      a
0233' CA 02C5'                  jp      z,skpflo        ; z, no meter
0236' 3A 0000#                  ld      a,(tsecs)       ; check for time to sample
0239' 01 0000                   ld      bc,0            ; sample position count
023C' C6 01                     add     a,1             ; 0-59 -> 1-60
023E' 27                        daa                     ; time is in bcd
023F'                   samloop:
023F' D6 20                     sub     sambcd          ; find the multiple
0241' 27                        daa                     ;   in bcd
0242' DA 02C5'                  jp      c,skpflo        ; c, not this time
0245' 28 03                     jr      z,record 0247' 0C                        inc     c               ; try again
0248' 18 F5                     jr      samloop
024A'                   record:                         ; record the readings
024A' D5                        push    de              ; save the old/new minute
024B' 79                        ld      a,c
024C' 32 0000#                  ld      (ratno),a       ; save the buffer #
024F' 21 0000#                  ld      hl,ratbuf
0252' CB 21                     sla     c               ; two bytes per rate
0254' 09                        add     hl,bc           ; add to base pointer
0255' 4E                        ld      c,(hl)          ; get the old count
0256' 23                        inc     hl
0257' 46                        ld      b,(hl)
                        ; setup to compute flow rates
0258' ED 5B 0000#                ld     de,(florep)     ; get the new count
025C' 72                        ld      (hl),d          ; save the new value
025D' 2B                        dec     hl
025E' 73                        ld      (hl),e
025F' 21 0000                   ld      hl,0
0262' 22 0000#                  ld      (florep),hl     ; start a new 15 second total
0265' 3A 0000#                  ld      a,(hpcnt)       ; check the timeout
0268' D6 01                     sub     1               ; count down
026A' 38 03                     jr      c,skipdec       ; don't pass zero 026C' 32 0000#                  ld      (hpcnt),a       ; save the new count
026F'                   skipdec:
                        ; settle the instantaneous value
026F' 6B                        ld      l,e             ; l = low byte
0270' 1E 03                     ld      e,sample        ; # of samples in e
0272' 63                        ld      h,e             ;   and h
0273' ED 6C                     mlt     hl              ; current instantaneous rate
0275' ED 5C                     mlt     de
0277' 19                        add     hl,de
0278' 22 0000#                  ld      (currat),hl
                        ; settle the channel specific value 027B' 22 0000#                  ld      (hprate),hl     ; save the value
                        ; settle the moving average
027E' 3E 03                     ld      a,sample        ; use sample count
0280' 21 0000#                  ld      hl,ratbuf       ; point to the rate buffers
0283' 11 0000                   ld      de,0            ; start with a 0
0286'                   avloop:
```

TABLE I

```
0286' 4E              ld      c,(hl)          ; get the buffer content
0287' 23              inc     hl
0288' 46              ld      b,(hl)
0289' 23              inc     hl              ; point to next buffer
028A' EB              ex      de,hl           ; swap total & pointer
028B' 09              add     hl,bc           ; add in the buffer
028C' EB              ex      de,hl           ; swap back
028D' 3D              dec     a
028E' 20 F6           jr      nz,avloop       ; nz, next buffer 0290' EB              ex      de,hl           ; value in hl
0291' 22 0000#        ld      (avgrat),hl     ; save the moving average
              ; load the min. and maxs.
0294' 44              ld      b,h
0295' 4D              ld      c,l             ; move new value to bc
0296' 78              ld      a,b
0297' B1              or      c               ; new value 0 ?
0298' 28 2A           jr      z,skpflx        ; z, yes 029A' 3A 0000#        ld      a,(hperrc)      ; turn on/off timeout
029D' B7              or      a               ;   in progress ?
029E' 20 24           jr      nz,skpflx       ; nz, yes, quit
02A0' 3A 0000#        ld      a,(active)      ; get the active count
02A3' B7              or      a               ; any stations active ?
02A4' 20 13           jr      nz,chkact       ; nz, yes, process that 02A6' 2A 0000#        ld      hl,(inarat)     ; do an error check
02A9' CD 0312'        call    chkmax 02AC' 2A 0000#        ld      hl,(inahi)      ; get old inactive value
02AF' ED 42           sbc     hl,bc           ; old >= new ?
02B1' 30 11           jr      nc,skpflx       ; nc, yep 02B3' ED 43 0000#     ld      (inahi),bc      ; load the new hi value
02B7' 18 0B           jr      skpflx
02B9'         chkact:
02B9' 2A 0000#        ld      hl,(acthi)      ; get the old hi value
02BC' ED 42           sbc     hl,bc           ; old >= new ?
02BE' 30 04           jr      nc,skpflx       ; nc, old is >=

02C0' ED 43 0000#     ld      (acthi),bc      ; load the new hi value
02C4'         skpflx:
02C4' C1              pop     bc              ; restore the old/new minute
02C5'         skpflc:
02C5' 7B              ld      a,e
02C6' 92              sub     d               ; check for minute change
02C7' CA 0000#        jp      z,clkchk        ; z= no change return 02CA' 21 0000#        ld      hl,tdweld       ; point to 1st minute counter
02CD' 06 ??           ld      b,numincntrs    ; get the number
02CF'         miners:
02CF' 7E              ld      a,(hl)
02D0' D6 01           sub     1
02D2' 38 01           jr      c,min2          ; c, count was 0

02D4' 77              ld      (hl),a
02D5'         min2:
02D5' 23              inc     hl
02D6' 10 F7           djnz    miners          ; next counter 02D8' 3A 0000#        ld      a,(noupdt)      ; check for legal to update display
02DB' B7              or      a
02DC' 20 06           jr      nz,updat2       ; nz= not legal to update 02DE' 21 0000#        ld      hl,tmins        ; display the time
02E1' CD 0000#        call    timdsp
02E4'         updat2:

02E4' ED 5B 0000#     ld      de,(omins)      ; get the open time
02E8' 2A 0000#        ld      hl,(tmins)      ; and present time
```

TABLE I

```
02EB' CD 0000#           call    clockdif
02EE' E5                 push    hl              ; save the difference 02EF' 2A 0000#           ld      hl,(cmins)      ; compute size of the window
02F2' CD 0000#           call    clockdif 02F5' D1                 pop     de              ; get back the time since opening
02F6' AF                 xor     a               ; close the window
02F7' 32 0000#           ld      (windoa),a
02FA' ED 52              sbc     hl,de           ; compare the sizes
02FC' DA 0000#           jp      c,clkchk        ; c, it's closed ; Insert day of the week processing here. If 7 day processing
                ; is used, check the bit against opday0. For 14 day processing
                ; compare the julian day of the week (julian.mod.7) with the
                ; clock day of the week. Even weeks use opday0 while odd weeks
                ; use opday1. Opday0 = 1 - 7, opday1 = 8 - 13
                ; clwksl returns  a = day of week mask  hl = 0/1 = odd/even week.
                ;    algorithm is   week# = jdawk>tdawk?jweek++;jweek
02FF' CD 0000#           call    clwksl          ; get the mask and offset 0302' 11 0000#           ld      de,opday0       ; use the base week
0305' 19                 add     hl,de           ; offset by hl
0306' A6                 and     (hl)            ; mask for the day of the week
0307' CA 0000#           jp      z,clkchk        ; z, this one's disabled
030A' F6 FF              or      255
030C' 32 0000#           ld      (windoa),a      ; open the window
030F' C3 0000#           jp      clkchk ; chkmax Check that rate in bc is not greater than value in hl
                ;    sets lperbt if bc is greater
0312'           chkmax:
                global chkmax
0312' 3A 0000#           ld      a,(finatm)      ; check for a timeout
0315' B7                 or      a
0316' C0                 ret     nz 0317' ED 42              sbc     hl,bc
0319' D0                 ret     nc              ; nc, hl is bigger 031A' 3D                 dec     a
031B' 32 0000#           ld      (dspers),a
031E' 21 0000#           ld      hl,lperbt
0321' CB C6              set     lperbit,(hl)    ; set the flow error flag
0323' 21 0000#           ld      hl,solctr
0326' CB AE              res     mstrbit,(hl)    ; turn off the master valve
0328' 37                 scf                     ; return the error status
0329' C9                 ret ; shoerr Show the highest priority error code for dspers
                ; returns nz for error display,  z for no errors to show.
032A'           shoerr:
                global shoerr
032A' C5                 push    bc
032B' D5                 push    de
032C' E5                 push    hl
032D' 3A 0000#           ld      a,(lodigit)     ; save lodigit
0330' F5                 push    af 0331' 21 03D1'           ld      hl,lpermsg      ; point to the lp err msg
0334' 7E                 ld      a,(hl)          ; LPLP for system wide error
0335' 32 0000#           ld      (lodigit),a
0338' 3A 0000#           ld      a,(lperbt)      ; check for lp error
033B' CB 47              bit     lperbit,a       ; lp error?
033D' C2 03D1'           jp      nz,shoerd       ; nz, yes, show it 0340' 2B                 dec     hl              ; power up error pointer
0341' 3A 0000#           ld      a,(puerbt)      ; check for power up error
0344' CB 57              bit     puerbit,a
0346' 20 42              jr      nz,pushow
```

TABLE I

```
0348'                         staerproc:
0349' 21 0000#                      ld     hl,syser1         ; check for lp, ep, hp errors
034B' 01 0203                       ld     bc,tiers*256+erbytct ; 8 bits & # of error types
034E'                         bytloop:
034E' 16 00                         ld     d,0               ; 8 channel tier #
0350'                         bytlo1:
0350' 1E 00                         ld     e,0
0352' 7E                            ld     a,(hl)            ; get the byte
0353' B7                            or     a                 ; error here ?
0354' 20 50                         jr     nz,thsbit         ; nz, yes 0356' 14                            inc    d                 ; next tier
0357' 23                            inc    hl
0358' CB 42                         bit    0,d               ; odd tier ?
035A' 20 F4                         jr     nz,bytlo1         ; yes test the byte 035C' 7A                            ld     a,d               ; save tier #
035D' 11 0014                       ld     de,csictrlsz-2    ; next error bytes
0360' 19                            add    hl,de             ; offset to next tier
0361' 57                            ld     d,a               ; restore tier #
0362' 10 EC                         djnz   bytlo1            ; next keyboard
0364'                         nxtbyte:
0364' 0D                            dec    c                 ; next error byte ?
0365' 28 09                         jr     z,nxtbyx          ; z, nope 0367' 11 022A                       ld de,tiers*csictrlsz-2  ; move to first tier next error
036A' ED 52                         sbc    hl,de             ; add hl,de above clrs carry
036C' 06 02                         ld     b,tiers           ; reload keyboard count
036E' 18 DE                         jr     bytloop           ; nz, nope, try again
0370'                         nxtbyx:
0370' 21 03CF'                      ld     hl,llermsg        ; get the ll error message
0373' 7E                            ld     a,(hl)
0374' 32 0000#                      ld     (lodigit),a
0377' 3A 0000#                      ld     a,(llerbt)
037A' E6 00                         and    llermsk           ; ll error ?
037C' 20 43                         jr     nz,choerd         ; nz, show the ll error 037E' AF                            xor    a
037F' 32 0000#                      ld     (dspers),a        ; all errors clear
0382' F1                            pop    af 0383' 32 0000#                      ld     (lodigit),a       ; restore lodigit
0386' AF                            xor    a                 ; return zero for no errors to show
0387' C3 03C6'                      jp     shoerx 038A'                         pushow:
038A' ED 5B 0000#                   ld     de,(pumins)       ; get the display value
038E' 21 03E7                       ld     hl,999            ; check for too big
0391' B7                            or     a
0392' ED 52                         sbc    hl,de
0394' EB                            ex     de,hl
0395' 30 23                         jr     nc,pushok         ; c, pumins < 1000

0397' 21 03E7                       ld     hl,999
039A'                         pushok:
039A' CD 0000#                      call   hbcd
039D' 32 0000#                      ld     (lodigit),a       ; put the low digit away
03A0' 3E E0                         ld     a,pchar*16        ; lead hi digit with 'p'
03A2' B5                            or     l
03A3' C3 03C2'                      jp     shoerp            ; display the message
                              ; thsbit enters with a = error byte e = 0, d = 8 channel tier #
                              ; hl -> error byte  b = negative keyboard #  c = negative error #
03A6'                         thsbit:
03A6' 1C                            inc    e
03A7' 0F                            rrca
03A8' 30 FC                         jr     nc,thsbit         ; nc, no try again 03AA' 7A                            ld     a,d               ; 8 channel tier #
03AB' 07                            rlca                     ; times 8
03AC' 07                            rlca
```

TABLE I

```
03AD' 07                         rlca
03AE' 83                         add     a,e              ; plus channel #
03AF' CD 0000#                   call    atobcd           ; cnvert to bcd
03B2' 32 0000#                   ld      (lodigit),a      ; save as low digits 03B5' 21 03D1'                   ld      hl,lpermsg       ; point to lp error msg
03B8' 79                         ld      a,c              ; get the error type
03B9' ED 44                      neg                      ; make it posit
03BB' C6 03                      add     a,erbytct        ;  based at 0
03BD' 5F                         ld      e,a              ; offset to the message
03BE' 16 00                      ld      d,0
03C0' 19                         add     hl,de
03C1'              shoerd:
03C1' 7E                         ld      a,(hl)           ; get the message
03C2'              shoerp:
03C2' 32 0000#                   ld      (hidigit),a
03C5' CD 0000#                   call    dspdsp
03C8' F1                         pop     af
03C9' F6 FF                      or      255              ; return nz for error display
03CB'              shoerx:
03CB' E1                         pop     hl
03CC' D1                         pop     de
03CD' C1                         pop     bc
03CE' C9                         ret ; put station errors, (lp, ep, etc.) in descending precedence order.
03CF' DD          llermsg: defb  lchar*16+lchar
03D0' E8          permsg:  defb  pchar*16
                  ;hhermsg: defb hchar*16+hchar
03D1' CE          lpermsg: defb  lchar*16+pchar
03D2' BE          epermsg: defb  echar*16+pchar
03D3' CE          hpermsg: defb  hchar*16+pchar
                                 ; llrest Reset the o'lrbit in the leadout byte and in the csterm
                                 ;        byte
03D4'             lllrest:
03D4' 3A 0000#                   ld      a,(holdll)       ; holding off ll reset ?
03D7' B7                         or      a
03D8' 20 21                      jr      nz,llrstx        ; nz, yes, wait 03DA'             llrest:
                  global llrest
03DA' E5                         push    hl
03DB' 3E FF                      ld      a,255            ; force a csl update
03DD' 32 0000#                   ld      (cslupd),a
03E0' 21 0000#                   ld      hl,leadout
03E3' CB CE                      set     o'lrbit,(hl)     ; set the reset bit
03E5' 21 0000#                   ld      hl,csterm
03E8' CB CE                      set     o'lrbit,(hl)
03EA' 21 0000#                   ld      hl,llerbt
03ED' CB 9E                      res     llerbit,(hl)
03EF' 21 0000#                   ld      hl,holdll        ; point to the ll hold count
03F2' 36 05                      ld      (hl),llhold      ; reload the count
03F4' 3E 0C                      ld      a,llrsval        ; load the timeout
03F6' 32 0000#                   ld      (llrscn),a       ; load the reset delay counter
03F9' AF                         xor     a
03FA' E1                         pop     hl
03FB'             llrstx:
03FB' C9                         ret ; beep  enables sets tout/al8 to the tout function
03FC'             beep:
03FC' F5                         push    af
03FD' C5                         push    bc
03FE' 01 0092                    ld      bc,tctcr
0401'                            inn     a,(c)
0401' ED 78       A1             in      a,(c)
       0000       1     if cpm
                  1     else
0403' F6 17       1              or      prtmode+tdel+toc0   ; restart w/tout enabled
                        endif
```

TABLE I

```
0405'                        outt    (c),a
0405' ED 79     A1           out     (c),a 0407' 3E 03                  ld      a,beepdur           ; set the beep duration
0409' 32 0000#               ld      (beeptm),a
040C' C1                     pop     bc
040D' F1                     pop     af
040E' C9                     ret ; prtlvc
040F'           prtlvc:
040F' F5                     push    af
0410' C5                     push    bc
0411' 01 0090                ld      bc,tcr
0414'                        inn     a,(c)
0414' ED 78     A1           in      a,(c)
0416' F5                     push    af                  ; save tcr value
0417' 0E 94                  ld      c,tmdr11
0419'                        inn     a,(c)
0419' ED 78     A1           in      a,(c)
041B' 0C                     inc     c
041C'                        inn     a,(c)
041C' ED 78     A1           in      a,(c)

041E' F1                     pop     af                  ; get tcr value
041F' E6 DF                  and     not tie1            ; disable the interrupt
0421' 0E 90                  ld      c,tcr
0423'                        outt    (c),a
0423' ED 79     A1           out     (c),a
0425' C1                     pop     bc
0426' F1                     pop     af
0427' FB                     ei
0428' C9                     ret end
  0 Error(s) Detected.  1065 Program Bytes.
528 Symbols Detected.
```

```
                .list

; 10-27-88 Added clrgpt to clear group times storage whenever
;          nxtauto fails to find a legal station and at the start
;          of a new window.
;             Changed the load of grpdwn to occur in nxtauto upon
;          finding a grouped channel.
;          drk ; 11-29-88 Separated inxrat-maxrat inter-dependency by loading
;          0 into maxrat if it goes below 0.

; 11-04-88 Finished group processing by changing failst to
;          check for grouping, fait timeout, tdwel timeout, and
;          grpdwn timeout.
;          Added slvchk which compares chan # to group # and returns
;          carry and negative offset to master,
;          or no carry if not a slave.
;          Added a check of epsecs to prevent consecutive ep errors.
;          drk ; 11-02-88 Loaded grupt seconds storage with (epsecs) at solck1:
;          Computed group time in seconds at autofx: and stored the
;          value in (grupt)
;          drk ; 10-28-88 Zeroed grupt seconds storage at oksx:
;          drk ; 10-26-88 Changed smf to use flper in booking to adjust max flow
;          on an individual basis for each channel.
;          Removed the low flow recording.
;          drk
```

TABLE I

```
; 21-21-88 Added detection on smf and syringe flags.  Syringe does
;       no more than clear the flag and exit.  Ditto for smf until
;       sco is tested more thoroughly.
;       drk ; 01-07-88 Adjusted code to allow Sensor Cycle Overide and Station
;       Measured Flow features.  Changed overide check to a check
;       for channels in on condition.
;       drk ; 11-29-87 added code to handle a master valve control during auto
;       and on watering and to turn it off when all valves are off
;       the window is closed
;
;       added a test to allow auto watering to start with channel 1
;       or at next channel in sequence.
;       drk ; 07-25-87 added adjustable solenoid wait timer.  Uses solcnt as the
;       the variable and soldfl as the default timeout from watdfl.
;       newn3: and solck0: are the locations of the changes.
;       drk
```

```
0000            listit  equ     false
0000'                   wattim:
                        global  wattim global  clkchk
                        global  fndrch, fndrec, nxtauto
                        global  okstart, clkstuf, recstop, recstart
                        global  shut, auto, ovrc, lstr, lstp, booksz
                        ; variables
                        external hafcnt, csterm, leadout, llrscn, llrsvl, tiercn
                        external window, newmin, mstrauto, newndow, hotchn
                        external onl, onh, solenl, solenh, solctr, csiupd
                        external kautcl, koffl, konl, temkey, erproc, epsecs
                        external book, blstr, blstp, bdwel, upsecs, grpdwn, syrtim
                        external daccnx, cficnt, firatm, tmins, soak, soldfl, msolcla
                        external tdwel0, solcnt, active, astop, tsecs, inarat, maxrat
                        external bautc, bohut, flcdwn, flcpro, eper0
                        external actrec, offh, offl, alton, lper0
                        external lperbt, hperrc, hpcnt, hprate, ratcnt, ratno, ratono
                        external hratvl, oratvl, temauto, percent, ratbuf, avgrat
                        external autbit, lstcn, lctautc, dspers, bgrupt
                        external meter, smflag, syrbit
                        external lotchn
                        ; subroutines
                        external clkhl, hldinc, chnc01, savix, hldvde, llrest
                        external himin, savall, getmcst, clockdif, chkmax, putchar ; clkchk
                        ; Check for active window.
                        ; If not in the window reset any solenoid waits and active autos.
                        ;       If minutes has changed,
                        ;       set the data pointer to the override byte and
                        ;       settle the counts for active channels.
                        ; If in the window activate channels as necessary.
                        ;       If minutes has changed,
                        ;       set the data pointer to the auto byte and
                        ;       settle the counts for active channels.

0000'                   clkchk:
                        ;marker
                        ;       ld      a,':'
                        ;       call    putchar 0000' 21 0000#          ld      hl,newmin       ; get the old values
0003' 3A 0000#          ld      a,(tmins)       ; get the current value
0006' 96                sub     (hl)
0007' 77                ld      (hl),a          ; save the difference
```

TABLE I

```
0008'  CD 0000#              call    savix
000B'  FD 21 0000#            ld      iy,book         ; point to the book
000F'  DD 21 0000#            ld      ix,off1         ; set the led, kb pointer 0013'  3A 0000#               ld      a,(tiercn)
0016'  47                     ld      b,a             ; tier count in b
0017'  11 0016                ld      de,csictrlsz    ; tier offset
001A'  DD 7E 0E               ld      a,(ix+kon)      ;
001D'              ovtstl:
001D'  DD B6 0E               or      (ix+kon)
0020'  DD B6 0F               or      (ix+kon+1)      ; or in all channels
0023'  DD 19                  add     ix,de           ; point to next tier
0025'  10 F6                  djnz    ovtstl          ; check all tiers 0027'  DD 21 0000#            ld      ix,off1         ; restore the pointer
002B'  B7                     or      a               ; any channels on?
002C'  CA 0040'               jp      z,ovrfal        ; z, no check auto activity ; overide t
                        ; ovrproc
                        ; Increment the minute counts for active channels.

002F'              ovrproc:
                        global ovrproc
                        ; overide t,
                        ; marker
                        ;              ld    a,'o'
                        ;              call  putchar
002F'  3E 03                  ld      a,flowdwnv
0031'  32 0000#               ld      (flodwn),a      ; reset flow error count
0034'  3A 0000#               ld      a,(autbit)      ; save the auto bit
0037'  F5                     push    af
0038'  2A 0000#               ld      hl,(temkey)     ; save temkey
003B'  E5                     push    hl 003C'  3A 0000#               ld      a,(tiercn)
003F'  CB 27                  sla     a               ; 2 passes per tier
0041'  4F                     ld      c,a
0042'  21 0000#               ld      hl,autbit       ; use autbit for bit pointer
0045'  36 80                  ld      (hl),80h 0047'  21 0000#               ld      hl,hotchn       ; setup the channel pointer
004A'  36 00                  ld      (hl),0
004C'              ovrpr1:
004C'  CD 075A'               call    prtbit
004F'  06 08                  ld      b,8             ; 8 bits to test
0051'              ovrpr2:
0051'  DD 7E 0C               ld      a,(ix+solen)    ; get the low order solenoids
0054'  21 0000#               ld      hl,autbit       ; use autbit for bit pointer
0057'  CB 06                  rlc     (hl)            ; position the autbit
0059'  A6                     and     (hl)            ; check for solenoid on
005A'  28 20                  jr      z,ovrpr5        ; z = channel not active 005C'  CD 0403'               call    floupdate       ; record the flow rates
005F'  38 0E                  jr      c,ovrpr5        ; channel shutdown for overflow
0061'              ovrpr3:
0061'  3A 0000#               ld      a,(newmin)
0064'  B7                     or      a               ; new minute ?
0065'  28 22                  jr      z,ovrpr5        ; same minute, skip accounting 0067'  C5                     push    bc              ; save the counters
0068'  FD 7E 15               ld      a,(iy+ovrt)     ; get the max overide
006B'  B7                     or      a
006C'  28 1E                  jr      z,ovrpr5        ; z, already zero skip counts 006E'  FD 35 15               dec     (iy+ovrt)       ; decrement overide time
0071'  20 09                  jr      nz,ovrpr6       ; nz, skip the turn off ; overide t, newmin t, ovrt f
```

TABLE I

```
0073'  3A 0000#                 ld      a,(hotchn)          ; get the channel #
0076'  4F                       ld      c,a                 ; channel # in c
0077'  06 01                    ld      b,1                 ; auto row (1), column in c
0079'  CD 0000#                 call    chncol              ; set the channel to auto
007C'                   ovrpr6:
007C'  11 0029                  ld      de,ovrc
007F'  FD E5                    push    iy                  ; get the book posit
0081'  E1                       pop     hl
0082'  19                       add     hl,de
0083'  06 23                    ld      b,ovsz
0085'  CD 0000#                 call    hldinc              ; increment overide counter
0088'  C1                       pop     bc                  ; restore the counters
0089'                   ovrpr5:
0089'  11 0025                  ld      de,booksz           ; offset to the next record
008C'  FD 19                    add     iy,de
008E'  21 0000#                 ld      hl,hotchn
0091'  34                       inc     (hl)
0092'  10 BD                    djnz    ovrpr2              ; try the next channel
0094'                   ovrpr7:
0094'  0D                       dec     c
0095'  20 B5                    jr      nz,ovrpr1           ; nz, test the high channels
0097'                   ovrprx:
0097'  E1                       pop     hl                  ; restore temkey
0098'  22 0000#                 ld      (temkey),hl
009B'  F1                       pop     af                  ; restore the auto bit
009C'  32 0000#                 ld      (autbit),a
009F'  C9                       ret
                        ; overide false
00A0'                   ovrfal:
                           global ovrfal
                        ; marker
                        ;        ld      a,'f'
                        ;        call    putchar
00A0'  3A 0000#                 ld      a,(windoa)          ; is the window active
00A3'  B7                       or      a
00A4'  C2 0152'                 jp      nz,wndoon           ; nz= yes go process that ; ovride f, window off
00A7'  67                       ld      h,a                 ; no stations active
00A8'  6F                       ld      l,a
00A9'  22 0002#                 ld      (maxrat),hl         ; clear maxrat (FLMS)
00AC'                           inn     a,(itc)
00AC'  DB B4          A1        in      a,(itc)             ; check for keyboard intrpt.
00AE'  E6 04                    and     ite2                ; disabled ?
00B0'  28 08                    jr      z,ovrfal            ; yes, skip solctr clear 00B2'  3A 0000#                 ld      a,(solctr)          ; get the master valve control
00B5'  E6 5F                    and     255-(mstrmsk+ovridem)   ; kill the master valve
00B7'  32 0000#                 ld      (solctr),a          ; and overide
00BA'                   ovrfa1:
00BA'  3A 0000#                 ld      a,(newndow)
00BD'  B7                       or      a                   ; new window ?
00BE'  20 25                    jr      nz,scofskp          ; yes, skip the aso turn off 00C0'  3A 0000#                 ld      a,(tiercn)          ; get the tier count
00C3'  4F                       ld      c,a
00C4'  11 0014                  ld      de,csictrlsz-2      ; load the control offset
00C7'                   scofl0:
00C7'  06 02                    ld      b,2                 ; two passes per tier
00C9'                   scofloop:
00C9'  DD 7E 25                 ld      a,(ix+kon)          ; on or
00CC'  DD B6 0C                 or      (ix+kauto)          ;   auto and
00CF'  DD A6 0A                 and     (ix+koff)           ; off = sco
00D2'  2F                       cpl                         ; reverse to toggle off
00D3'  DD A6 0A                 and     (ix+koff)           ; mask off the sco channels
00D6'  DD 77 0A                 ld      (ix+koff),a
00D9'  DD 77 0C                 ld      (ix+loff),a
00DC'  DD 23                    inc     ix                  ; next set of bytes
00DE'  10 E9                    djnz    scofloop
```

TABLE I

```
00E0'  DD 19              add     ix,de           ; next tier
00E2'  0D                 dec     c               ; count down the tiers
00E3'  20 E2               jr      nz,scofl0       ; next tier
00E5'              scofskp:
00E5'  3E FF              ld      a,-1            ; set new window true
00E7'  32 0000#           ld      (newndow),a
00EA'  3A 0000#           ld      a,(mstrauto)    ; auto active ?
00ED'  CB 7F              bit     7,a
00EF'  C8                 ret     z               ; nope, quit
                    ; overide f, window f, auto t
00F0'              stpauto:
00F0'  FD 2A 0000#        ld      iy,(actrec)
00F4'  CD 02B9'           call    autoff          ; kill active auto ; window off, active auto true
00F7'  2F                 cpl
00F8'  E6 40              and     40h             ; solenoid wait false ?
00FA'  C8                 ret     z               ; z, yes quit 00FB'  CD 04C3'           call    flupdate        ; record the flow rates
00FE'  21 0000#           ld      hl,mstrauto
0101'  CD 075A'           call    prtbit          ; set up the pointers
                    ; window off, newndow false, active auto true, solwait false
                    ; failtst checks fait, tdwel0, grpdwn, as appropriate,
                    ;   and returns the 0 non zero status.
0104'              failtst:
                    global failtst                ; global for testing
0104'  3A 0000#           ld      a,(newmin)
0107'  D6 01              sub     1               ; real minute change ?
0109'  38 1C              jr      c,failt2        ; c, nope, same ole minute 010B'                     inn     a,(instatp)
010B'  DB 01      A1      in      a,(instatp)
010D'  E6 40              and     online
010F'  FE 40              cp      onlinet
0111'  28 20              jr      z,failt1        ; z, yep 0113'  21 0000#           ld      hl,oflcnt       ; point to the off line counter
0116'  06 05              ld      b,offlsz        ; get the size
0118'  CD 0000#           call    hldinc          ; increment it
011B'              failt1:
011B'  CD 0144'           call    cntauto
011E'  FD 7E 14           ld      a,(iy+fait)     ; dec the fail count
0121'  B7                 or      a
0122'  28 03              jr      z,failt2        ; don't pass below 0

0124'  FD 35 14           dec     (iy+fait)
0127'              failt2:
0127'  3A 0000#           ld      a,(autbit)      ; get the bit position
012A'  DD A6 0A           and     (ix+koff)       ; sco active ?
012D'  20 05              jr      nz,dwelchk      ; nz, yes, ignore grouping
012F'              isslav:
012F'  CD 03B3'           call    slvchk          ; is it a slave ?
0132'  30 06              jr      nc,dwelchk      ; nc, slave <= master, no 0134'  2A 0000#           ld      hl,(grpdwn)     ; get the down count seconds
0137'  7C                 ld      a,h
0138'  B5                 or      l               ; 0 yet ?
0139'  C9                 ret                     ; return group condition
013A'              dwelchk:
013A'  3A 0000#           ld      a,(tdwel0)
013D'  B7                 or      a               ; tdwell false ?
013E'  C8                 ret     z               ; z, yes, return the status
013F'              failtx:
013F'  FD 7E 14           ld      a,(iy+fait)
0142'  B7                 or      a
0143'  C9                 ret 0144'              cntauto:
                    global cntauto
```

TABLE I

```
0144'  21 0006                ld      hl,autc
0147'                  twoup:
                        global twoup
0147'  06 02                   ld      b,2             ; 2 byte counter 0149'  D5                      push    de
014A'  FD E5                   push    iy
014C'  D1                      pop     de
014D'  19                      add     hl,de
014E'  D1                      pop     de
014F'  C3 0000#                jp      hldinc          ; increment a decimal counter ; window t.
0152'                   wndoon:
                         global wndoon
                        ; marker
                        ;       ld      a,'w'
                        ;       call    putchar
0152'  3A 0000#                ld      a,(meter)       ; meter present ?
0155'  B7                      or      a
0156'  28 14                   jr      z,smfdone       ; nope 0158'                          inn     a,(instatp)
0158'  DB 01         A1        in      a,(instatp)
015A'  E6 04                   and     smfmsk          ; ok to measure ?
015C'  20 0A                   jr      nz,smfclr       ; no
015E'  3A 0000#                ld      a,(smflag)      ; check for station measuring
0161'  FE FF                   cp      255             ; measured ?
0163'  28 27                   jr      z,smfdone       ; yes 0165'  C3 0553'                jp      smfproc         ; go measure
0168'                  smfclr:
0168'  AF                      xor     a
0169'  32 0000#                ld      (smflag),a      ; clear the smf flag
016C'                  smfdone:
016C'  3A 0000#                ld      a,(syrbit)      ; syringe active
016F'  B7                      or      a
0170'  C2 0725'                jp      nz,syrproc      ; yes, go there 0173'  21 0000#                ld      hl,mstrautc
0176'  CD 075A'                call    prtbit          ; set up the registers
0179'  7E                      ld      a,(hl)
017A'  E6 C0                   and     0c0h            ; clear flags
017C'  32 0000#                ld      (hotchn),a      ; save current target channel #

017F'  FD 2A 0000#             ld      iy,(actrec)     ; get the channel #
0183'  CD 03A5'                call    mstron          ; arm the master valve
0186'  C2 0399'                jp      nz,autoff       ; nz, lp error, shut down !

0189'  3A 0000#                ld      a,(newndow)     ; 1st pass w/ window active ?
018C'  B7                      or      a
018D'  CA 0230'                jp      z,olowndow      ; z, no ; window t, newndow t
0190'  AF                      xor     a
0191'  32 0000#                ld      (flepro),a      ; and flag 0194'                          inn     a,(instatp)     ; ok to reset to 1 ?
0194'  DB 01         A1        in      a,(instatp)
0196'  E6 22                   and     chanls          ; mask the bit
0198'  FE 00                   cp      chanlst
019A'  20 0D                   jr      nz,skpone       ; nz, no 019C'  3A 0000#                ld      a,(lstchn)
019F'  77                      ld      (hl),a          ; set up highest channel previous
01A0'  DD 21 0000#             ld      ix,0ffh         ; high byte of led/keyb
01A4'  3E 80                   ld      a,80h           ; high bit of the mask byte
01A6'  32 0000#                ld      (autbit),a
01A9'                  skpone:
01A9'  AF                      xor     a               ; reset newndow
```

TABLE I

```
01AA'  32 0000#              ld      (newndow),a
01AD'  FD 21 0000#            ld      iy,book 01B1'  11 0025                ld      de,booksz
01B4'  06 20                  ld      b,maxchanc
01B6'              loadfail:
01B6'  FD 7E 1F               ld      a,(iy+faiv)      ; load the max auto allowed
01B9'  FD 77 14               ld      (iy+falt),a
01BC'  FD 19                  add     iy,de
01BE'  10 F6                  djnz    loadfail 01C0'  CD 23EE'               call    clrgpt           ; clear the group times
01C3'              newn0:
                   global newn0
01C3'  3A 0000#               ld      a,(fleprc)       ; check for flow error
01C6'  B7                     or      a
01C7'  28 10                  jr      z,newn01         ; nz, none present 01C9'  AF                     xor     a
01CA'  32 0000#               ld      (fleprc),a       ; reset the flag
01CD'  3A 0000#               ld      a,(flodwn)       ; get the down counter
01D0'  D6 01                  sub     1                ; decrement
01D2'  CE 00                  adc     a,0              ; not past 0
01D4'  32 0000#               ld      (flodwn),a
01D7'  18 05                  jr      newn02
01D9'              newn01:
01D9'  3E 03                  ld      a,flowdunv       ; reset the value
01DB'  32 0000#               ld      (flodwn),a
01DE'              newn02:
01DE'  3A 0000#               ld      a,(mstrauto)     ; get the auto status
01E1'  E6 80                  and     80h              ; auto active ?
01E3'  20 22                  jr      nz,nohalf        ; yes, skip the half power
01E5'  3A 0000#               ld      a,(llrsvl)       ; check for half power test
01E8'  B7                     or      a
01E9'  28 1C                  jr      z,nohalf         ; z, skip the half power 01EB'  3A 0000#               ld      a,(leadout)      ; get the half power bit
01EE'  CB 4F                  bit     ofirbit,a        ; is it set?
01F0'  20 03                  jr      nz,termwt        ; yes, check completion 01F2'  CD 0000#               call    llrest
01F5'              termwt:
01F5'  3A 0000#               ld      a,(csterm)
01F8'  E6 02                  and     oflrmsk          ; complete?
01FA'  28 0B                  jr      z,nohalf         ; yes skip restart 01FC'  3E 04                  ld      a,hafpval        ; load half power wait
01FE'  32 0000#               ld      (hafcnt),a       ; start it
0201'  3A 0000#               ld      a,(llrsvl)       ; restart the ll reset
0204'  32 0000#               ld      (llrscn),a       ;    timeout
0207'              nohalf:
0207'  CD 2421'               call    nxtauto          ; check for new auto channel
020A'  D8                     ret     c                ; carry, try again later 020B'  FD 22 0000#            ld      (actrec),iy      ; save the book position
020F'  F6 C0                  or      0c0h             ; set auto & solwait flags
0211'  32 0000#               ld      (mstrauto),a 0214'  3A 0000#               ld      a,(autbit)       ; get the channel mask
0217'  4F                     ld      c,a              ; save the mask
0218'  DD 77 06               ld      (ix+solen),a     ; turn the solenoid on
021B'  DD 77 04               ld      (ix+lon),a       ; and the ON led
       FFFF        1   if sdelaychk 021E'  3A 0000#     1         ld      a,(msoldla)      ; start the current sense timeout
               1        else
                        endif
0221'  32 0000#               ld      (solcnt),a       ;
```

TABLE I

```
0224'  CD 7E 0A               ld      a,(ix+koff)      ; check the off key
0227'  A1                     and     c                ; sco mode set ?
0228'  C8                     ret     z                ; z, nope 0229'  21 0000#               ld      hl,solctr        ; and solenoid control
022C'  CB FE                  set     ovrideb,(hl)     ; enable overide
022E'  18 2E                  jr      solck1           ; start the dwell ; window t, newndow f
0230'                         oldwndow:
                                global oldwndow
0230'  7E                     ld      a,(hl)           ; check the auto status
0231'  CB 7F                  bit     7,a
0233'  28 85                  jr      z,newn0          ; z, not active, start a new channel ;window t, newndow f, active auto t
0235'                         solchk:
0235'  CB 77                  bit     6,a              ; check solwait bit
0237'  28 55                  jr      z,autoupd        ; z, solwait false, check the flow 0239'  CD 03B8'               call    slvchk           ; check if this a slave
023C'  30 07                  jr      nc,curlck        ; nc, not a slave 023E'  1E 1B                  ld      e,dwel           ; get master dwell
0240'  CD 03C9'               call    grpdat
0243'  18 10                  jr      solck2           ; load the new dwell ; window t, newndow f, active auto t, solwait true
0245'                         curlck:
                                global curlck
0245'                         inn     a,(instatp)      ; check for sense
0245'  DB 01        A1        in      a,(instatp)
0247'  2F                     cpl                      ; complement for multiple check
0248'  E6 C0                  and     online or cursns ; mask for cursns & online
024A'  EE 00                  xor     cursnst or onlinef ; offline or true sense ?
024C'  20 10                  jr      nz,solck1        ; yes, start dwell ; window t, newndow f, active atuo t, solwait t,
                              ; cursns f and online t
024E'  3A 0000#               ld      a,(solcnt)       ; check the solenoid timeout
0251'  B7                     or      a
0252'  C0                     ret     nz               ; nz= wait another second ; window t, newndow f, active atuo t, solwait t,
                              ; cursns f and online t, solenoid timeout done
0253'                         solck0:
0253'  CD 02B8'               call    autoff           ; kill the old auto
0256'  21 0000#               ld      hl,solctr
0259'  CB BE                  res     ovrideb,(hl)     ; clear the overide
025B'  C3 01C3'               jp      newn0            ; start a new one ; window t, newndow f, active auto t, solwait t,
                              ; cursns t or online f
025E'                         solck1:
025E'  FD 7E 1B               ld      a,(iy+dwel)      ; get the dwell time
0261'                         solck2:
0261'  32 0000#               ld      (tdwel0),a       ; start the dwell timeout
0264'  21 0000#               ld      hl,mstrauto
0267'  CB B6                  res     6,(hl)           ; reset the solwait bit
0269'  7E                     ld      a,(hl)
026A'  E6 3F                  and     3fh              ; mask for chan count
026C'  32 0000#               ld      (lston),a        ; record the turn on
026F'  CD 2735'               call    recstart         ; record the start time
0272'  3E 01                  ld      a,1              ; set active count to 1
0274'  32 0000#               ld      (active),a 0277'  3A 0000#               ld      a,(leadout)      ; get the half power bit
027A'  E6 FD                  and     255-oflrmsk      ; clear it
027C'  32 0000#               ld      (leadout),a
```

TABLE I

```
027F' 2A 0000#              ld      hl,(upsecs)     ; get the running seconds
0282' FD 75 23              ld      (iy+grupt),l    ; save it at the group time
0285' FD 74 24              ld      (iy+grupt+1),h 0288' 21 0000               ld      hl,0            ; use 0 for base rate
028B' C3 0397'              jp      addral          ; for the new max rate ; window t, newndow f, active auto t, solwait f
028E'                       autoupd:
                              global autoupd
028E' CD 04C3'              call    floupdate       ; update the flow rate storage
0291' 38 1A                 jr      c,curfll        ; c, flow error, channel is off 0293' CD 0104'              call    failtst
0296' 28 0F                 jr      z,curfal        ; z, timeout over, start anew ; window t, newndow f, active auto t, solwait f, fait & dwell t or
                            ;    grp & grpdwn t
0298'                       snschk:
0298'                         inm     a,(instatp)
0298' DB 01        A1         in      a,(instatp)
029A' 2F                      cpl                     ; complement for multiple check
029B' E6 C0                   and     online or cursns ; mask for cursns & online
029D' EE 80                   xor     cursnst or onlinef ; offline or true sense ?
029F' C0                      ret     nz              ; yes, check again next time 02A0' 3A 0000#                ld      a,(autbit)      ; check scc mode
02A3' DD A6 0A                and     (ix+koff)       ; auto/off combo ?
02A6' C0                      ret     nz              ; nz, yes use total dwel & fait ; window t, newndow f, active auto t, solwait f,
                            ;    cursns f and online t and not scc
02A7'                       curfal:
02A7' 2A 0000#                ld      hl,(grpdwn)     ; check for group time
02AA' 7C                      ld      a,h             ; still running
02AB' B5                      or      l               ; 0 ?
02AC' C0                      ret     nz              ;
02AD'                       curfll:
02AD' 22 0000#                ld      (maxrat),hl     ; zero maxrat (FLMS)
02B0' 21 0000#                ld      hl,solctr       ; clear the overide
02B3' CB BE                   res     ovrideb,(hl)    ; whether or not it's there
02B5' CD 02BB'                call    autoff          ; stop the channel & record
02B8' C3 01C3'                jp      newn0           ; start a new channel
                            ; autoff exits with zero if no auto active
                            ;   records stop time if solwait is false
                            ;   clears solwait and auto flags
                            ;   kills active auto channel and on led
                            ;   exits with a.f = (mstrauto) . auto flag
02BB'                       autoff:
                              global autoff
02BB' CD 0002#                call    savall
02BE' E3                      ex      (sp),hl
02BF' 21 0000#                ld      hl,getmost      ; return af
02C2' E3                      ex      (sp),hl 02C3' 3A 0000#                ld      a,(mstrauto)    ; check for auto active
02C6' CB 7F                   bit     7,a
02C8' C0                      ret     z               ; z= nope, return 02C9' F5                      push    af              ; save mstrauto & auto flag
02CA' DD E5                   push    ix
02CC' DD 21 0000#              ld     ix,offl         ; point to first tier
02D0' 11 0016                  ld     de,csictrlsz    ; setup the offset
02D3' ED 4B FFFF#              ld     bc,(tiercn-1)   ; get the tier count for restore
02D7'                       autof2:
02D7' DD 6E 0E                 ld     l,(ix+kon)      ; move kb on state into
02DA' DD 66 0F                 ld     h,(ix+kon+1)
02DD' DD 75 06                 ld     (ix+solen),l    ; solenoids
02E0' DD 74 07                 ld     (ix+solen+1),h
```

TABLE I

```
02E3'  DD 75 04         ld      (ix+lon),l          ; on leds
02E6'  DD 74 05         ld      (ix+lon+1),h
02E9'  DD 19            add     ix,de
02EB'  10 EA            djnz    autof0

02ED'  DD E1            pop     ix

02EF'  21 0000#         ld      hl,mstrauto         ; point to the auto bytes
02F2'  CB BE            res     7,(hl)              ; clear the auto bit 02F4'  CB 76            bit     6,(hl)              ; solenoid wait ?
02F6'  CB B6            res     6,(hl)              ; reset it
02F8'  CC 073C'         call    z,recstop           ; z, no solenoid wait, record stop
02FB'  20 41            jr      nz,autofx           ; nz, solenoid wait skip bookkeeping 02FD'  E6 3F            and     255-0c0h            ; mask for channel #
02FF'  32 0000#         ld      (lstauto),a         ; save the # for flow interrupts 0302'  01 0003          ld      bc,3                ; record the stop time
0305'  21 0000#         ld      hl,tsecs            ;  for the flow interrupt
0308'  11 0000#         ld      de,astop
030B'  ED B0            ldir
030D'  57               ld      d,a
030E'  1E 25            ld      e,booksz
0310'  ED 5C            mlt     de
0312'  FD E5            push    iy
0314'  FD 21 0000#      ld      iy,book             ; point to the channel
0318'  FD 19            add     iy,de               ;  data structure
031A'  CD 0346'         call    setclose            ; reduce the maximum flow rate 031D'  2A 0000#         ld      hl,(upsecs)         ; get the seconds count
0320'  FD 7E 23         ld      a,(iy+grupt)        ; and the old count
0323'  ED 44            neg                         ; make it negative to solve
0325'  5F               ld      e,a                 ; the 16 bit wrap problem
0326'  FD 7E 24         ld      a,(iy+grupt+1)      ; on subtraction
                .list ; 09-02-88 Added hrnfl for addjustable high current time out.

; 12-16-87 Added vector interrupt tables in this module. Added
;          defaults for additional features. Individual shut count,
;          flow rates, etc.
;          drk ; 07-25-87 added soldfl for solenoid wait timeout in seconds FFFF      dbtables       equ     true
FFFF      pgmprom        equ     true ;xxxxxxxxxxxxxxxxxxxxxxxxxxxxxxxxxxxx
; Set dbtbles to true and pgmprom false to activate the DB TABLES
;       for creation of a hex file to append to the begining of
;       the program file.
;
; Set dbtables and pgmprom true to make a program file including
;       the defaults
;
; Set dbtbles to false to activate the EQUATES TABLES for
;       inclusion of the addresses only in the program hex file.

;xxxxxxxxxxxxxxxxxxxxxxxxxxxxxxxxxxxx

; this module starts at 0 with a jump to startup.
; it contains the restart vectors at 30h & 38h
; and the nmi interrupt vector at 66h.
;
; in the prom vesion system data resides here also, however,
; the program can be assembled as an equates file with later
; assembly of the data section for easy customization to
; particular user requirements.
```

TABLE I

```
                          global llrsdf
                          global maxchn, dosec, domin, dohour, dcsec, dcmin, dchour
                          global dysec, dymin, dyhour, notdfl, numdfl, dgrup, dfdawk
                          global daccmx, dovrmx, bdflts, dflohi, dflper, ddwell, soak
                          global opentim, shuttim, daccmx, dovrmx, dsyrv, dflov
                          global dfina, soldfl, hcrdfl, restim, dsmwait
                          global calbak
          FFFF         1    if pgmprom
                       1    public watdfl
                       1    public crcseed, promck, stpstr, dflcsi, dasvec, dflstr, dflcnt
                       1    public dcnta0, dcntb0, dstat0, dcntal, dcntbl, dstatl
                       1    public mcnta0, mcntb0, mstat0, mcntal, mcntbl, mstatl
                       1    public icvcbs
                       1
                       1    external asci, startup, rst30vec, rst38vec, han30, hannmi, han38
                       1    external intlvc, int2vc, prt0vc, prtlvc, dma0vc, dmalvc, asc0vc
                       1    external asclvc, csiint, endmark
                            endif
                            page 64
          FFFF         1    if pgmprom
 0000'                 1    watdfl:
 0000' C3 0000#        1          jp         startup        ; go start the program
                            endif
 0003'                      wdflstr:
          FFFF         1    if dbtables
                       1    ;                xxxxx    DB TABLES    xxxxx
                       1
 0003' 24              1    maxchn:  defb   maxactive      ; max # channels active concurrently 0004' FF              1    dfdawk:  defb   okdays         ; default legal days to water
 0005' 00              1    dosec:   defb   0              ; default window open second
 0006' 2300            1    domin:   defw   dfstrt         ; default window open min
       0007'           1    dohour   equ    domin+1        ; default window open hour
 0008' 00              1    dcsec:   defb   0              ; default window close second
 0009' 0500            1    dcmin:   defw   dfstop         ; default window close minute
       000A'           1    dchour   equ    dcmin+1        ; default window close hour
 000B' 00              1    dysec:   defb   0              ; default syringe start second
 000C' 0001            1    dymin:   defw   systrt         ; ditto minute
       000D'           1    dyhour   equ    dymin+1        ; ditto hour
       0009            1    notdfl   equ    1-dcsec
                       1
 000E'                 1    bdflts:  ; start of book defaults
                       1
 000E' 0000            1    dflohi:  defw   0              ; max measured flow rate
 0010' 0064            1    dflov:   defw   maxchrat       ; max flow rate after settling
 0012' 14              1    dflper:  defb   errpercent     ; default flow error percent
 0013' 20              1    ddwell:  defb   dfdwell        ; default dwell time
 0014' 0F              1    soak:    defb   dfloop         ; default minimum loop time in minutes
 0015' 1F              1    opentim: defb   dfopen         ; flow start settling time in seconds
 0016' 1F              1    shuttim: defb   dfshut         ; flow stop settling time in seconds
 0017' 2A              1    daccmx:  defb   maxaccum       ; max auto + override fail time/chan/day
 0018' 0F              1    dovrmx:  defb   maxovr         ; max continuous override/channel
 0019' 00              1    dsyrv:   defb   dfsyrv         ; default syringe value (seconds)
 001A' 00              1    dgrup:   defb   0              ; default grouping (none)

001B' 000F            1    dfina:   defw   okflo          ; allowable inactive flow rate
       000D            1    numdfl   equ    dfina-dflohi   ; number of default bytes to load 001D' A0              1    soldfl:  defb   soldela        ; 12.5ms waits for current sense
                       1
 001E' 28              1    hcrdfl:  defb   hcurwait       ; 12.5ms samples to hi current error
                       1
 001F' 51              1    restim:  defb   resetime       ; seconds allowed after flow error rese
                                                           ; before resuming checking
 0020' 3C              1    dsmwait: defb   smwaitv        ; seconds to wait for measured flow set 1    ; phone # for ringback in communications
                       1    ;  ac1 - ac4 = area code, ph1 - ph7 = phone #.
                       1    ;  use ascii codes for numbers.
                       1    ;  insert non-numerics in unwanted positions.
```

TABLE I

```
                           1  ; terminate the string with a binary 0
                           1
2021'                      1  calbak::  homphn        ; use home phone macro
0021' 36 31 39 20  A             defb      '619 277 2820',0
                           1
                           1            ; end of db tables
                           1
                           1  else  ; equates for external references in program
                              endif
         FFFF              1  if pgmprom      ; don't include the following in a parameter prom
                           1
         0000              2  if ($-watdfl) gt 30h
                           2  else ; gt 30h
                           2
         0002              2  fill    defl   30h+watdfl-$    ; fill up to rst 30
         0002              3    if fill
                           3    rept       fill
                           3        defb   255
                           3        .xlist
                           3    endm
002E' FF            A          defb      255
002F' FF            A          defb      255
                           3    .list
                           2  endif ; fill
                           1  endif ; gt 30h
         0030'             1         org       watdfl+30h
0030' C3 0038#             1  rst30:   jp        rst30.hi 0033' 0000#                1  dasvec: defw      asci           ; iovector
0035' 00                   1  cflcsi: defb      csibaud        ; internal i/o setup defaults
0036' FFFF                 1  crcseed: defw     crcdflt        ; starting value for crc calculations 0038'             1         org       watdfl+38h
0038'                      1  rst38:
0038' C3 0000#             1         jp        han38

003B' 74                   1  dcnta0: defb     cntla0byt
003C' 00                   1  dcntb0: defb     cntlb0byt
003D' 00                   1  dstat0: defb     stat0byt
003E' 64                   1  dcnta1: defb     cntla1byt
003F' 00                   1  dcntb1: defb     cntlb1byt
0040' 04                   1  dstat1: defb     stat1byt
         0006              1  dflcnt  equ      $-dcnta0

0041' 74                   1  mcnta0: defb     cntla0myt
0042' 02                   1  mcntb0: defb     cntlb0myt
0043' 00                   1  mstat0: defb     stat0myt
0044' 64                   1  mcnta1: defb     cntla1myt
0045' 02                   1  mcntb1: defb     cntlb1myt
0046' 04                   1  mstat1: defb     stat1myt 0047'                      1  dflstr: strngdfl                 ; default serial string macro
0047' 00 00 00 FF  A             defb 0, 0, 0, 255, 255, 0, 0, 0, 0, solmode, syrmode 0000              2  if $-watdfl gt 60h
                           2  else ; gt 60h
         000E              2  fill    defl     watdfl-$+60h
         000E              3    if fill
                           3    rept       fill           ; fill with 255
                           3.       defb   255
                           3        .xlist
                           3    endm
0052' FF            A          defb      255
0053' FF            A          defb      255
0054' FF            A          defb      255
0055' FF            A          defb      255
0056' FF            A          defb      255
0057' FF            A          defb      255
```

TABLE I

```
0058' FF         A         defb    255
0059' FF         A         defb    255
005A' FF         A         defb    255
005B' FF         A         defb    255
005C' FF         A         defb    255
005D' FF         A         defb    255
005E' FF         A         defb    255
005F' FF         A         defb    255
                 3         .list
                 2         endif ; fill
                 1       endif ; gt 60h
      0060'      1           org     watdfl+60h
0060' FFFF       1  promck: defw    -1              ; prom crc value for data from here on
                 1
0062' 0000# 0062' 1 stpstr: defw    endmark, promck+2  ; put nmi at 66h
0066'            1
0066' C3 0000#   1  nmi:    jp      hannmi          ; go to the nmi handler
                 1
0069' 0C         1  llrscf: defb    llrsval         ; default llll reset pulse width
                 1
      0016       1         fill    defl    20h-($-watdfl) mod 20h
      0016       2         if fill
                 2           rept fill              ; fill with 255
                 2             defb    255
                 2           .xlist
                 2           endm
006A' FF         A         defb    255
006B' FF         A         defb    255
006C' FF         A         defb    255
006D' FF         A         defb    255
006E' FF         A         defb    255
006F' FF         A         defb    255
0070' FF         A         defb    255
0071' FF         A         defb    255
0072' FF         A         defb    255
0073' FF         A         defb    255
0074' FF         A         defb    255
0075' FF         A         defb    255
0076' FF         A         defb    255
0077' FF         A         defb    255
0078' FF         A         defb    255
0079' FF         A         defb    255
007A' FF         A         defb    255
007B' FF         A         defb    255
007C' FF         A         defb    255
007D' FF         A         defb    255
007E' FF         A         defb    255
007F' FF         A         defb    255
                 2         .list
                 1       endif ; fill
                 1       .lall
0080'            1  icvcbs:
0080'            1         vcstbl                  ; put the interrupt vector table here
                 A
                 A         global tblvcs, tint1, tint2, tprt0, tprt1
                 A         global tdma0, tdma1, tcsi, tasc0, tasc1
                 A
0080'            A  tblvcs:
                 A
0080' 0000#      A  tint1:  dw      int1vc
0082' 0000#      A  tint2:  dw      int2vc
0084' 0000#      A  tprt0:  dw      prt0vc
0086' 0000#      A  tprt1:  dw      prt1vc
0088' 0000#      A  tdma0:  dw      han30; dma0vc
008A' 0000#      A  tdma1:  dw      han30; dma1vc
008C' 0000#      A  tcsi:   dw      csiint
```

TABLE I

```
008E' 0000#      A    tasc0:  dw    asc0vc
0090' 0000#      A    tasc1:  dw    han30; asc1vc
                 A
                 :
        000E     1    fill    defl  20h-($-watdfl) mod 20h
        000E     2    if fill
                 2      rept fill                    ; fill with 255
                 2          defb   255
                 2          .xlist
                 2      endm
0092' FF         A          defb   255
0093' FF         A          defb   255
0094' FF         A          defb   255
0095' FF         A          defb   255
0096' FF         A          defb   255
0097' FF         A          defb   255
0098' FF         A          defb   255
0099' FF         A          defb   255
009A' FF         A          defb   255
009B' FF         A          defb   255
009C' FF         A          defb   255
009D' FF         A          defb   255
009E' FF         A          defb   255
009F' FF         A          defb   255
                 :          .list
                 1    endif ; fill
                 1    .lall
                 1
00A0'            1    nomvcs:
                 1    global nomvcs
00A0'            1           nomtbl              ; put the no meter table here
                 A
                 A    global mblvcs, mint1, mint2, mprt0, mprt1
                 A    global mdma0, mdma1, mcsi, masc0, masc1
                 A    external nometer
                 A
00A0'            A    mblvcs:
                 A
00A0' 0000#      A    mint1:  dw    nometer
00A2' 0002#      A    mint2:  dw    int2vc
00A4' 0000#      A    mprt0:  dw    prt0vc
00A6' 0000#      A    mprt1:  dw    prt1vc
00A8' 0000#      A    mdma0:  dw    han30; dma0vc
00AA' 0000#      A    mdma1:  dw    han30; dma1vc
00AC' 0000#      A    mcsi:   dw    csiint
00AE' 0000#      A    masc0:  dw    asc0vc
00B0' 0000#      A    masc1:  dw    han30; asc1vc
                 A
        0000     2    if cpm
                 2    endif ; cpm
                 1    endif ; pgmprom 00B2'                 wdflend:

end
  0 Error(s) Detected.   178 Program Bytes.
470 Symbols Detected.

.z80
                      .list

; 01-26-89 added interrupt driven receive buffers and pointers
                      ;      drk ; 12-07-88 marked area from csi space thru the bookkeeping &
                      ;      flo_ data for clearing in frst power on or ram space
                      ;      change ; 11-28-88 added storage for powerup timeout, and soldelay ; 11-29-87 converted from equates file to data file
```

TABLE I

```
; Written for:  Aquametrics Inc.
;               5060 Convoy St.
;               San Diego, CA
;               (619) 277 2820
        global  hafcnt, maset, tiercn, lstchn, tiermk
        global  holdll, csiupd, erproc, host, iesave, autbit, syrbit
        global  secnts, hperrc, syrtim, nosecs, hpcnt, oflcnt, epsecs
        global  solcnt, csterm, sysrst, scodbn, upsecs, grpdwn, grpflg global  watdat, rambas, ramend, ramnex, varstr, varend, varsiz
        global  clkscr, clksce, clkscz, bookbf, active, kbaddr, msoldla
        global  setit, keyaddr, keyno, temkey, monkey, dwchan
        global  hotchn, temauto, windoa, newndow, mstrauto, nexrec, actrec
        global  meter, smflag, alton, lston, lstovr, lstauto, opday0, opday1
        global  floflg, newmin, fltict, finatm, ratbuf, ratno, ratcnt, ratono
        global  hratvl, oratvl, percent, flepro, flodwn
        global  rotcnt, rstime, hcrmem
        global  pupmin, pupcnt, pumins, pucnt, putime
        global  hidigit, lodigit, pmnotam, florep
        global  zstack, zzstak, clrspc, clrsize global  mnvrst, mnvrsz, mnvren
        global  parptr, parmcnt, parm1, parm2, parm3, parm4, thiscmd
        global  subadr, dmpadr, target
        global  afdat, bcdat, dedat, hldat, spdat, goadr
        global  affdt, bccdt, deedt, hildt, ixdat, iydat
        global  dspcnt, tabcnt, tabtbl, asvector, intvector global  rcnta0, rcntb0, rstat0, rcnta1, rcntb1, rstat1 global  keyval, chgscs
        global  inbcnt, inbptr, inbuf, cmdcnt, cmdptr, cmdbuf
        global  regmsg, hlsafe, csisav global  osecs, omins, ohour, csecs, cmins, chour
        global  ysecs, ymins, yhour
        global  tdwel0, tdwel1, tdwel2, tdwel3, tsweep, numincntrs
        global  ncupdt, timup, beeptm, slotmc, chrtim
        global  hourtm, keytim, fstimo, num1bcntrs, llrscn, llrsvl public  outctr, hlsave ;       global  msgrdy, asctem, seqno, rcvcnt, rhdr, rerrfg
;       global  crcchk, crccnt, crctx, crcrx, lsttrn
;       global  txbfrp, txbfr, tunit, tseqno, tmslen, tcmd, tmsg, txbend
;       global  rxbfrp, rxbfr, runit, rseqno, rmslen, rcmd, rmstrt, rxbend
;       global  nakbfr, nunit, nakseq, nakset, chretry
;       global  calhome, ringit, quitfg, needtx, offhook, alsent, sstatus
;       global  retry page 64
;       data            ; start of read/write memory
                dseg
```

```
0000"                   varstr:
0000"                   watdat:
0000"                   rambas:                         ; base address of ram
        2000"           ramnex  equ     rambas+ramsiz   ; first address in next ram device
        1FFF"           ramend  equ     ramnex-1        ; last address in ram global  stacksp, stack, oldstk, ignadd, prmcrc, ramstrng
                        global  rst30vec, rst30vec, jmprou, trpadr 0000"   0080            stacksp: defs   stacksize
0080"   0002            stack:   defs   2               ; initial stack pointer value
        0080"           oldstk   equ    stack           ; storage for stack pointer in monitor
0082"
0082"   0001            hcrmem: defs    1               ; hi current wait load value
0083"   0001            msoldla: defs   1               ; solcnt load value (soldfl) = soldela
0084"   0001            llrsvl: defs    1               ; ll reset pulse width value
0085"
```

TABLE I

```
0085"   0000        putime: defs    13              ; total mins power off since error reset
        0087"       pucnt   equ     putime+2        ; one byte # of this turn on
        0088"       pumins  equ     putime+3        ; two byte time of power on
        008A"       pupcnt  equ     putime+5        ; 4 digit decimal rollover cycle counter
        008C"       pupmin  equ     putime+7        ; 6 digit decimal rollover minute counter
        008F"       rstcnt  equ     putime+10       ; # of this rst 30/38
        0090"       rstime  equ     putime+11       ; time of same
0092"
0092"   0010        ramstrng: defs  16              ; ram check string
00A2"   0004        ignadd: defs    4               ; ignore string pointer
        00A4"       prmcrc  equ     ignadd+2        ; crc scratch pad for prom check
00A6"
00A6"   000B        jmprou: defs    11              ; jump & restart vectors
        00A9"       rst30vec equ    jmprou+3
00B1"
        00AC"       rst38vec equ    rst30vec+3
        00AF"       trpadr  equ     rst38vec+3      ; trap interrupt storage 00B1"   0006        iesave: defs    6               ; interrupt mask storage
00B7"   0002        asvector: defs  2               ; vector to appropriate interface
00B9"
00B9"   0006        rcnta0: defs    6               ; ascii default space
        00BA"       rcntb0  equ     rcnta0+1
        00BB"       rstat0  equ     rcnta0+2
        00BC"       rcnta1  equ     rcnta0+3
        00BD"       rcntb1  equ     rcnta0+4
        00BE"       rstat1  equ     rcnta0+5
00BF"
00BF"               mnvrst:                         ; start of monitor variables 00BF"   0002        regmsg: defs    2               ;pointer to current register message
00C1"   0002        monkey: defs    2               ; key value for monitor display
00C3"   0001        noupdt: defs    1               ; setting clock, don't update display
00C4"   0002        hlsafe: defs    2               ;safe place for hl durring register display
00C6"   0002        thiscmd: defs   2               ;current command address
00C8"   0002        intvector: defs 2               ;interrupt vector
00CA"
00CA"   0002        subadr: defs    2               ; substitute
00CC"   0002        dmpadr: defs    2               ; dump
00CE"
00CE"   000B        parptr: defs    11              ;pointer to parsing command table
        00D0"       parmcnt equ     parptr+2        ; parameter count
        00D1"       parm1   equ     parptr+3        ; parameter 1
        00D3"       parm2   equ     parptr+5        ; parameter 2
        00D5"       parm3   equ     parptr+7        ; parameter 3
        00D7"       parm4   equ     parptr+9        ; parameter 4
00D9"
00D9"   0018        afdat:  defs    24              ; af register value
        00DB"       bcdat   equ     afdat+2         ; bc register value
        00DD"       dedat   equ     afdat+4         ; de register value
        00DF"       hldat   equ     afdat+6         ; hl register value
        00E1"       spdat   equ     afdat+8         ; sp register value
        00E3"       goadr   equ     afdat+10        ; go (execute) vector
        00E5"       affdt   equ     afdat+12        ; af' register value
        00E7"       bcdt    equ     afdat+14        ; bc' register value
        00E9"       dedt    equ     afdat+16        ; de' register value
        00EB"       hlldt   equ     afdat+18        ; hl' register value
        00ED"       ixdat   equ     afdat+20        ; ix register value
        00EF"       iydat   equ     afdat+22        ; iy register value
00F1"
00F1"   0002        target: defs    2               ; hex file offset
00F3"   002D        csisav: defs    csictot         ; csi string storage for monitor
0120"
                    ; monitor input & command buffers, counters, & pointers
                    ; monitor function addressing variables ; tab expansion variables
0120"   0000        dspcnt: defs    monlnl+2        ; current # of characters displayed
        0121"       tabcnt  equ     dspcnt+1        ; current # of tabs displayed
        0122"       tabtbl  equ     dspcnt+2        ; # spaces to expand each tab displayed
```

TABLE I

```
0142"
0142"   0023        inbcnt: defs    mcnlnl+3        ; # of characters in the input buffer
        0143"       inbptr  equ     inbcnt+1        ; next position to fill
        0145"       inbuf   equ     inbcnt+3        ; input buffer
0165"
0165"   0023        cmdcnt: defs    mcnlnl+3        ; # of characters in the command buffer
        0166"       cmdptr  equ     cmdcnt+1        ; next position to fill
        0168"       cmdbuf  equ     cmdcnt+3        ; command buffer
0188"
0188"               mnvren:                         ; end of the monitor varaiables
        00C9        mnvrsz  equ     mnvren-mnvrst   ; size of monitor variables 0188"   0002        opday0: defs    2               ; day of the week flags first week
        018A"       opday1  equ     opday0+1        ; day of the week flags second week
018A"   0009        osecs:  defs    9               ; window opening second
        018B"       omins   equ     osecs+1         ; window opening minute
        018C"       ohour   equ     osecs+2         ; window opening hour
        018D"       csecs   equ     osecs+3         ; window closing second
        018E"       cmins   equ     osecs+4         ; window closing minute
        018F"       chour   equ     osecs+5         ; window closing hour
        0190"       ysecs   equ     osecs+6         ; syringe start time second
        0191"       ymins   equ     osecs+7         ;     minute
        0192"       yhour   equ     osecs+8         ;     hour
0193"
0193"   0003        hidigit: defs   3       ; display storage
        0194"       lodigit equ     hidigit+1
        0195"       omnotam equ     hidigit+2
0196"
0196"               clkscr:                 ; start of clock scratchpad 0196"   0001        maset:  defs    1               ; flag for setting ma's
0197"   0001        chgscs: defs    1               ; flag for run bit
0198"   0001        csiupd: defs    1               ; update csi string next prtint
0199"   0001        erproc: defs    1               ; keyboard flag for error reporting
019A"   0001        beeptm: defs    1               ; beep isn't counted like others
019B"
                    ; one minute counters
019B"   0001        tdwel0: defs    1       ; one minute down counter 0
019C"   0001        tdwel1: defs    1       ;   "     "    "    "    1
019D"   0001        tdwel2: defs    1       ;   "     "    "    "    2
019E"   0001        tdwel3: defs    1       ;   "     "    "    "    3
019F"   0001        tswecd: defs    1       ; one minute down counter 4
        0005        numlmcntrs equ  $-tdwel0        ; number of 1 minute down counters
01A0"
                    ; one second counters must start with finatm
01A0"   0001        secnts: defs    1
        01A0"       finatm  equ     secnts  ; flo emerg. secs down counter
01A1"   0001        hperrc: defs    1       ; flo settling counter
01A2"   0001        syrtim: defs    1       ; syringe timeout counter
01A3"   0001        holdll: defs    1       ; hold off llerr display secs dwn cntr
01A4"   0001        epsecs: defs.   1       ; over current time out
        0005        nosecs  equ     $-secnts ; number of one second counters
01A5"
01A5"   0001        llrscn: defs    1       ; ll reset pulse width counter
01A6"
01A6"   0002        upsecs: defs    2       ; 2 byte seconds up counter
01A8"   0002        grpdwn: defs    2       ; 2 byte group seconds down counter
01AA"
                    ; 12.5 millisecond counters
        0008        numlbcntrs equ  8               ; number of 1 byte down counters
                    ; hcurtm must be first counter for correct operation
01AA"   0008        hcurtm: defs    numlbcntrs      ; hi current test timeout
        01AB"       keytim  equ     hcurtm+1        ; key press debounce timeout
        01AC"       fctimo  equ     hcurtm+2        ; fast clock setting timeout
        01AD"       slotmo  equ     hcurtm+3        ; slow clock setting timeout
        01AE"       sysrst  equ     hcurtm+4        ; system error reset timeout
        01AF"       scodbn  equ     hcurtm+5        ; sco key combo debounce
        01B0"       solcnt  equ     hcurtm+6        ; solenoid turn on delay counter
        01B1"       hafcnt  equ     hcurtm+7        ; half power delay counter
01B2"
```

TABLE I

```
0182"   0002        timup:  defs    2               ; two byte up counter
0184"
0184"   0002        chrtim: defs    2               ; character wait timeout
0186"   0001        cdtimo: defs    1               ; carrierr detect/ringback time out
0187"
0187"               clksce:                         ; end of clock scratchpad
        0021        clkscz  equ     clksce-clkscr   ; size of clock scratchpad 0187"   0001        dwchan: defs    1               ; storage for chan# for set dwell
0188"   0002        keyval: defs    2               ; key pad return value for monitor
01BA"   0002        keyno:  defs    2               ; storage for input keynumber
01BC"   0002        temkey: defs    2               ; temporary storage for key number
01BE"   0002        keyaddr: defs   2               ; storage for keyboard byte address
01C0"   0003        bookbf: defs    3               ; 3 byte buffer for altchan routine
01C3"   0001        setit:  defs    1               ; setting clock in progress flag
01C4"
01C4"   0001        host:   defs    1               ; host/monitor flag
01C5"   0003        fltict: defs    3               ; time of last flotic
01C8"   0003        flofig: defs    3               ; last active chan in flow interrupt
01CB"   0001        meter:  defs    1               ; meter present flag
01CC"   0001        snflag: defs    1               ; station measuring flag
01CD"   0001        grpflg: defs    1               ; group station active flag
01CE"   0001        altch:  defs    1               ; alternate channel active flag
01CF"
01CF"   0002        actrec: defs    2               ; current active record
01D1"   0002        nexrec: defs    2               ; index to next record position
01D3"
01D3"   0001        windoa: defs    1               ; flag for ok to water
01D4"   0001        newdow: defs    1               ; flag for first pass in clkchk w/windoa
01D5"   0001        tenauto: defs   1               ; temporary tier control byte
01D6"   0001        hctchn: defs    1               ; status of channel on/auto/off
01D7"
01D7"   0001        outctr: defs    1               ; control port status byte
01D8"   0001        lstovr: defs    1               ; most recent overide turn off channel
01D9"   0001        lston:  defs    1               ; most recent turn on channel
01DA"   0001        lstauto: defs   1               ; most recent auto turn off channel
01DB"   0001        autbit: defs    1               ; bit posit of auto current channel 01DC"
01DC"   0001        newmin: defs    1               ; wattim flag for changed minute
01DD"   0001        mstrauto: defs  1               ; auto channel tier control byte
01DE"   0001        syrbit: defs    1               ; syringe control byte
01DF"   0001        tiermk: defs    1               ; tier detection mask
01E0"   0001        tiercn: defs    1               ; active tier control
01E1"   0001        lstchn: defs    1               ; # of last logical channel
01E2"
01E2"   0002        hlsave: defs    2               ; temporary storage for hl
01E4"
                                    ; start of the area cleared on bad mem check
01E4"               clrspc:
01E4"   0006        ratbuf: defs    sample*2        ; flow rate buffers, 1 per sample
01EA"   0002        florep: defs    2               ; flo rate tick counter
01EC"   0001        ratno:  defs    1               ; last buffer updated
01ED"   0001        ratono: defs    1               ; buffer # saved by smf routines
01EE"   0001        ratcnt: defs    1               ; samples left to stable flow
01EF"   0002        oratvl: defs    2               ; max/min of current process
01F1"   0002        hratvl: defs    2               ; max flow rate before measuring turn off
01F3"   0001        percent: defs   1               ; offset for error checking
01F4"   0001        hpcnt:  defs    1               ; channel flo settling counter
01F5"   0004        nflcnt: defs    4
01F9"   0001        flerro: defs    1               ; flow error flag
01FA"   0001        fledwn: defs    1               ; flow error down counter
01FB"               .lall
01FB"   0001        csterm: defs    1               ; csi termination flag
01FC"   0002        kbaddr: defs    2               ; base address of current kb byte
01FE"   0001        active: defs    1               ; number of channels active
01FF"                       csispc                  ; csi space macro for serial string, leds, keys.
            A       .lall
            A       global solctr, leadout, offl, autol, onl, csicount
            A       public offh, autoh, onh, solenl, solenh, syrevn, serstrng
```

TABLE I

```
                A    global koffl, koffh, kautol, kautoh, konl, konh
                A    global lperbt, puerbt, llerbt, eper0, eper1, lper0, lper1
                A    global hper0, hper1, dspers
                A    global syser0
                A
01FF"   0216    A    serstrng: defs   csitot+1
0215"   0001    A    csicount: defs   1                ; string + counter
0216"   0020    A    leadout:  defs   csittot
        0217"   A    offl      equ    leadout+1
        0218"   A    offh      equ    leadout+2
        0219"   A    autol     equ    leadout+3
        021A"   A    autoh     equ    leadout+4
        021B"   A    onl       equ    leadout+5
        021C"   A    onh       equ    leadout+6
        021D"   A    solenl    equ    leadout+7
        021E"   A    solenh    equ    leadout+8
        021F"   A    solctr    equ    leadout+9
        0220"   A    syrevn    equ    leadout+10
0243"           A
        0221"   A    koffl     equ    leadout+11       ; keyboard on key status
        0222"   A    koffh     equ    leadout+12
        0223"   A    kautol    equ    leadout+13
        0224"   A    kautoh    equ    leadout+14
        0225"   A    konl      equ    leadout+15
        0226"   A    konh      equ    leadout+16
                A
        0227"   A    lper0     equ    leadout+17       ; excessive flow error bytes
        0228"   A    lper1     equ    leadout+18
        0229"   A    eper0     equ    leadout+19       ; excessive current bytes 022A"           A    eper1     equ    leadout+20
022B"           A    hper0     equ    leadout+21       ; current no flow bytes
022C"           A    hper1     equ    leadout+22
                A
                A    global syser1
        0227"   A    syser1    equ    lper0
                A
0243"   0002    A    syser0:   defs   2                ; system error byte
        0244"   A    dspers    equ    syser0+1         ; display errors flag
0245"           A
        0243"   A    lperbt    equ    syser0           ; flow/no current byte
        0243"   A    puerbt    equ    syser0           ; power out error flag
        0243"   A    llerbt    equ    syser0           ; offline/override fail ; start of the down load area
0245"                     dwnspc  ; download data macro
                A    .lall
0245"   0001    A    unitem:   defs   1                ; tempoerary unit # during header check
0246"           A
0246"           A    strtdwn:
0246"   0001    A    unitno:   defs   1                ; storage for the unit #
0247"           A
                A    ; dwell and book data
                A
0247"   04A0    A    book:     defs   maxchans*booksz  ; bookkeeping for maxchans channels
        0247"   A    blstr     equ    book+lstr        ; last stop time
        0249"   A    blstp     equ    book+lstp        ; last start time
        024D"   A    bautc     equ    book+autc        ; auto minutes counter
        0250"   A    bovrc     equ    book+ovrc        ; overide minutes counter
        0253"   A    bsyrc     equ    book+syrc        ; syringe minutes counter
        0255"   A    bautf     equ    book+autf        ; automatic flow counter
        0258"   A    bovrf     equ    book+ovrf        ; overide flow counter field
        025B"   A    bfait     equ    book+fait        ; combined auto/fail down counter
        025C"   A    bovrt     equ    book+ovrt        ; maximum override time down count
        025D"   A    bflohi    equ    book+flohi       ; maximum recorded flow after settling
        025F"   A    bflov     equ    book+flov        ; maximum allowed flow includes flper
        0261"   A    bflper    equ    book+flper       ; observed flow adjustment percent
        0262"   A    bdwel     equ    book+dwel        ; dwell value
        0263"   A    bsckv     equ    book+sckv        ; sweep timeout (minutes)
        0264"   A    bopen     equ    book+open        ; solenoid opening settle time (seconds
        0265"   A    bshut     equ    book+shut        ; solenoid closing settle time (seconds
```

TABLE I

```
        0266"   A   tfaiv   equ     book+faiv       ; maximum automatic time (minutes)
        0267"   A   bovrv   equ     book+ovrv       ; maximum override time (minutes)
        0268"   A   bsyrv   equ     book+syrv       ; syringe timeout (seconds)
        0269"   A   bgrup   equ     book+grup       ; group channel target
        026A"   A   bgrupt  equ     book+grupt      ; group timeout (seconds)
06E7"           A
06E7"   0002    A   inarat: defs    2               ; maximum inactive flow rate (ticks/min
06E9"   0002    A   maxrat: defs    2               ; maximum active flow rate
06EB"   0002    A   currat: defs    2               ; 4* current 15 sec flow ticks
06ED"   0002    A   avgrat: defs    2               ; sum of 15 sec flow ticks since turn o
06EF"   0002    A   hprate: defs    2               ; rate used for error comparisons
06F1"   0002    A   inahi:  defs    2               ; max. recorded inactive rate after set
06F3"   0002    A   acthi:  defs    2               ; max. recorded active etc.
06F5"           A
06F5"   0005    A   autflo: defs    cvflsz          ; alternate controller flow ticks
06FA"   0005    A   ovrftot: defs   cvflsz          ; flow ticks with override active
06FF"   0005    A   offltot: defs   cvflsz          ; flow ticks in auto/overide fail mode
0704"   0005    A   floina: defs    flotsz          ; inactive flow counter
0709"   0005    A   flototal: defs  flotsz          ; total flow tick counter
070E"           A 070E"   0003    A   astop:  defs    3               ; time when all channels went inactive
0711"           A
        04CB        dwnsize equ     $-strtdwn       ; size the down load area
                A
                A       global  unitem, strtdwn, unitno, book, dwnsize
                A       global  blstr, blstp, bautc, bovrc, bsyrc, bautf, bovrf, bfait
                A       global  bovrt, bflohi, bflov, bflper, bdwel, bsokv, bopen, bshut
                A       global  bfaiv, bovrv, bsyrv, bgrup, bgrupt
                A       global  currat, avgrat, hprate, inarat, maxrat, inahi, acthi
                A       global  autflo, ovrftot, offltot, floina, offltot, flototal, astop
                                                    ; end of the down load area
                        .xall
        0520        clrsize equ     $-clrspc        ; size of the block to clear in rdefaults:

0711"   0080    zstack: defs        stacksize       ; alternate stack for subroutines
0791"   0002    zzstak: defs        2
0793"
                        .lall
0793"                           ascbfsp             ; make the asci vector space
                A
0793"   0005    A   inp0cnt: defs   5+comqsz
        0794"   A   xon0    equ     inp0cnt+xonset
        0795"   A   inp0h   equ     inp0cnt+hoff
        0796"   A   inp0t   equ     inp0cnt+toff
        0797"   A   inp0q   equ     inp0cnt+qoff
0818"           A
0818"   0005    A   inp1cnt: defs   5+comqsz
        0819"   A   xon1    equ     inp1cnt+xonset
        081A"   A   inp1h   equ     inp1cnt+hoff
        081B"   A   inp1t   equ     inp1cnt+toff
        081C"   A   inp1q   equ     inp1cnt+qoff
089D"           A
                A       global inp0cnt,xon0,inp0h,inp0t,inp0q
                A       global inp1cnt,xon1,inp1h,inp1t,inp1q
                A
                        .xall .comment
                        ;retry  db      maxtries        ; retry counter crcchk: defs    2       ; received crc compiled here
                        rerrfg: defs    1       ; receive error flag
                        rhdr:   defs    1       ; # of header characters left to receive
                        rcvcnt: defs    2       ; # message characters left to receive
                        seqno:  defs    1       ; current sequence #
                        asctem: defs    6       ; temporary ascii conversion buffer
                        msgrdy: defs    1       ; message ready flag
                        rmlen:  defs    1       ; storage for received message length
```

TABLE I

```
crcrx:   defs   2            ; receive crc
crctx:   defs   2            ; transmit crc
crccnt:  defs   1            ; crc byte to send, 0 or 1, 2 = must compute is
sstatus: defs   1            ;
needtx:  defs   1            ; transmission in progress flag
quitfg:  defs   1            ; finish tx and quit flag
ringit:  defs   1            ; dialup attempt flag
calhome: defs   1            ; ring back retry counter
alsent:  defs   1            ; end of transmission flag
ofhook:  defs   1            ; current telephone condition
chretry: defs   1            ; character timeout retry counter
nakset:  defs   1                    ; nak message transferred flag nakbfr:  defs   13           ; nak buffer
nunit    equ    nakbfr+1     ; position of unit #
nakseq   equ    nunit+2      ; position of sequence #
nmslen   equ    nakseq+1     ; position of message length
ncmd     equ    nmslen+3     ; position of command
nmsg     equ    ncmd+1       ; start of crc
nakbend  equ    nakbfr+13    ; nak buffer terminator rxbfrp:  defs   2            ; position for next received char rxbfr:   defs   rxbfrsize    ; receive buffer
runit    equ    rxbfr+1      ; position of unit #
rseqno   equ    runit+2      ; position of sequence #
rmslen   equ    rseqno+1     ; position of message length
rcmd     equ    rmslen+3     ; position of command
rmstrt   equ    rcmd+1       ; start of message body
rxbend   equ    rxbfr+rxbfrsize ; receive buffer terminator txbfrp:  defs   2            ; position of next char to xmit lsttrn:  defs   2            ; address of previous tx buffer txbfr:   defs   txbfrsize    ; transmitter buffer
tunit    equ    txbfr+1      ; position of unit #
tseqno   equ    tunit+2      ; position of sequence #
tmslen   equ    tseqno+1     ; position of message length
tcmd     equ    tmslen+3     ; position of command
tmsg     equ    tcmd+1       ; start of message
txbend   equ    txbfr+txbfrsize ; transmit buffer terminator ;end of .comment varend:
varsiz   equ    varend-varstr
         end
0 Error(s) Detected.  2205 Data Bytes.
626 Symbols Detected.
         .list ; 01-27-09 Added call to ascvinit to initialize receive
;          interrupt
;          drk ; 11-02-89 Added processing to compute power off time at
;          power on.
;          drk ; 12/87 Added modules to process interrupts 2 and 1.
;   Interrupt 2 coresides with rst 38.  The code tests for
;     a normal rst 38 or an interrupt 2.  In the case of
;     an interrupt 2 the system is reinitialized in monitor
;     mode.
;
;   Interrupt 1 is used to check for the presence or absence of
;     a flow meter.  If the meter present jumper is in resetting
;     the flow flip flop causes no interrupt of itself.  If the
;     jumper is in the no meter position the reset causes an
```

TABLE I

```
                ;       interrupt 1 which clears the meter flag, turns off the
                ;       interrupt and disables the flow flip flop.
        external    iesave, host, meter, nomvcs, atchex, hltchx
        external    dcnta0, mcnta0, rcnta0, ascvinit
        external    hldshx, savall, alton, smflag, ratbuf, hlding, hlbcd
        external    outctr, active, hidigit, dspdsp
        external    iovcbs, tsecs, timup, rstclk, noupdt
        external    int1vc, int2vc, prt0vc, dma0vc, prt1vc
        external    dma1vc, csiint, asc0vc, asc1vc
        external    rst30vec, rst38vec, han30, hhan30, mhan38, trpadr
        external    rstime, rstcnt, pucnt, putime, tmins
        external    resetclock, csistart, pstrng, clkupdate
        external    syser0, syser1, syser2, syser3, syser4
        external    pucrbt, dspers
        external    tyser, tcamo, tmins, putime, pucnt, putmir external    putchar
        external    csinit, csidis, dasvec, asvector, dflent, rcnstrng
        external    jmpasv, asci, prtini, intden, crcprm, pclctr, blank
        external    asinit, llrest, swread, daydif, clockdif, Main global      cpuini, cpuend, hannmi, ramset, memchk 0000            1   if cpm
                1   else
                1   external tblvcs, tint1, tint2, tprt0, tprt1
                1   external tdma0, tdma1, tcsi, tasc0, tasc1
                    endif external mnvrst, mnvrcr, stack, mcnitr, tiercn, lstchn global strtup, startup
        page 64
        ;start up module to:
        ;       initialize processor interrupts, stack pointer, etc.
        ;       initialize communications, elements as appropriate.

;       initialize processor interrupts, stack pointer, etc.

0000'                   strtup:
                            cseg
0000'                   startup:
0000' F3                    di
        0000        1       if cpm
                            endif
0001' E1                    pop     hl                  ; get possible trap vector
0002' 31 0000#              ld      sp,stack            ; set up the stack
0005' 2B                    dec     hl                  ; compute real trap address
0006' 22 0000#              ld      (trpadr),hl         ; save it
0009' CD 015E'              call    timoff              ; compute the minutes power off
000C' 3E 02                 ld      a,tiers             ; set the default tier cont
000E' 32 0000#              ld      (tiercn),a
0011' 3E 1F                 ld      a,maxchans-1        ; and last channel
0013' 32 0000#              ld      (lstchn),a
0016'                   startc:
                            global startc
0016' F3                    di
0017' 01 0000#              ld      bc,dflcnt           ; setup to move
001A' 11 0000#              ld      de,rcnta0           ; asci defaults
001D' 21 0000#              ld      hl,mcnta0           ; assume host mode
0020' ED B0                 ldir                        ; load the host (modem) defaults 0022' 21 038C'              ld      hl,vectors          ; set to place rst vectors
0025' 11 0000#              ld      de,rst30vec
0028' 01 0006               ld      bc,6
002B' ED B0                 ldir 002D' 3E FF                 ld      a,255
002F' 32 0000#              ld      (host),a            ; set host mode
0032'                   mnvrst:                         ; interrupt 2 entry
```

TABLE I

```
0032' 31 0000#                   ld      sp,stack
0035' CD 02F2'                   call    stpints         ; put interrupts in reset condition
0038' CD 0042'                   call    cpuini          ; init the hardware
003B' 21 0000#                   ld      hl,mnvrst       ; point to start of monitor variables
003E' 54                         ld      d,h
003F' 5D                         ld      e,l
0040' 13                         inc     de
0041' 01 FFFF#                   ld      bc,mnvrsz-1     ; clear all the monitor variables
0044' 36 00                      ld      (hl),0
0046' ED B0                      ldir 0048' C3 0000#                   jp      monitr          ; jump to the start of processing 004B'                  cpuini:
004B' F3                         di
          0000        1 if cpm                           ; code for use in cpm environment
                      1 else                             ; target environment code, non cpm
004C' ED 56           1          im      1               ; use mode 1 interrupts
                      1
004E' 3E 00           1          ld      a,0             ; set up internal io addresses
0050' 01 00BF         1          ld      bc,icr          ; to base 0 first to start at
0053'                 1          outt    (c),a           ; a known point
0053' ED 79          A1          out     (c),a
                      1
0055' 01 003F         1          ld      bc,icr-iobase   ; set up internal io addresses
0058' 3E 80           1          ld      a,iobase and 0c0h+12h ; to running values, addr
005A'                 1          outt    (c),a           ; overlays ppi mode port (92h = val)
005A' ED 79          A1          out     (c),a
                      1
005C' 3E 92           1          ld      a,psmodwd       ; setup the ppi
005E'                 1          outt    (pselmod),a
005E' D3 03          A1          out     (pselmod),a
0060' 3E 4F           1          ld      a,octrbyte      ; init the control port
0062' 32 0000#        1          ld      (outctr),a
0065'                 1          outt    (octrpt),a
0065' D3 02          A1          out     (octrpt),a 0067' 01 0056         1          ld      bc,rcr          ; set the refresh cycles
006A' 3E 03           1          ld      a,rcrv
006C'                 1          outt    (c),a
006C' ED 79          A1          out     (c),a 006E' 3E 50           1          ld      a,dcntlval      ; set wait states
0070' 01 00ED         1          ld      bc,dcntl
0073'                 1          outt    (c),a
0073' ED 79          A1          out     (c),a
                      1
0075' 01 0004         1          ld      bc,stat0
0078' CD 0000#        1          call    asinit          ; init the async channels
          FFFF        2 if not cpm
007B' 0C              2          inc     c
007C' CD 0000#        2          call    asinit          ; init the async channels
                      1 endif
                      1
007F' 01 00B4         1          ld      bc,itc
0082'                 1          inn     a,(c)           ; check for a trap interrupt
0082' ED 78          A1          in      a,(c)
0084' CB 7F           1          bit     7,a
0086' CA 009A'        1          jp      z,cpui01
                      1
0089' E6 7F           1          and     255-trap        ; enters w/(trpadr) = (sp) - 1
008B'                 1          outt    (c),a
008B' ED 79          A1          out     (c),a
008D' E6 40           1          and     ufo             ; get the offset
008F' B7              1          or      a               ; from reset
0090' CA 009A'        1          jp      z,cpui01        ; z, it was first byte 0093' 2A 0000#        1          ld      hl,(trpadr)
0096' 2B              1          dec     hl              ; it was second byte
0097' 22 0000#        1          ld      (trpadr),hl     ; save the address
```

TABLE I

```
009A'                 1  cpui01:
                      1    public cpui01
                      1  ;marker
009A' 3E 54           1         ld      a,'T'           ; mark the spot
009C' CD 0389'        1         call    rawout
                      1
009F' 21 0000#        1         ld      hl,tblvcs       ; setup the interrupt vectors
00A2' 7C              1         ld      a,h
00A3' ED 47           1         ld      i,a             ; load the high byte
00A5' 7D              1         ld      a,l
00A6' 01 00B3         1         ld      bc,il           ; load the high 3 bits
00A9'                 1         out     (c),a
00A9' ED 79           A1        out     (c),a
                      1
                      1  ;marker
00AB' 3E 48           1         ld      a,'H'           ; mark the spot
00AD' CD 0389'        1         call    rawout
                      1
00B0' 3A 0000#        1         ld      a,(host)        ; check for host mode
00B3' B7              1         or      a
00B4' 20 0B           1         jr      nz,cpui02       ; host mode
                      1
00B6' 21 0000#        1         ld      bc,dflt#        ; setup to move
00B9' 11 0000#        1         ld      de,rcnta0       ; acci defaults
00BC' 21 0000#        1         ld      hl,ccnta0       ; use non host defaults
00BF' ED B0           1         ldir
                         endif                          ; cpm else
00C1'                    cpui02:
                         global cpui02
            FFFF      1  if not cpm
                      1  ;marker
00C1' 3E 46           1         ld      a,'F'           ; mark the spot
00C3' CD 0389'        1         call    rawout
                      1
00C6' CD 0204'        1         call    mtrtst          ; check for a motor
                         endif ; not cpm ;marker
00C9' 3E 44                     ld      a,'D'           ; mark the spot
00CB' CD 0389'                  call    rawout 00CE' CD 0000#                  call    coidis          ; disable all ooi outputs 00D1' 3E FF                     ld      a,255
00D3' 32 0000#                  ld      (noupdt),a      ; stop lcd updates
                         ;marker
00D6' 3E 45                     ld      a,'E'           ; mark the spot
00D8' CD 0389'                  call    rawout 00DB' FB                        ei                      ; start the interrupts
                         ;marker
00DC' 3E 63                     ld      a,'c'           ; mark the spot
00DE' CD 0389'                  call    rawout 00E1' CD 0000#                  call    crcprm FFFF      1  if not cpm
                      1  ;marker
00E4' 3E 50           1         ld      a,'P'           ; mark the spot
00E6' CD 0389'        1         call    rawout
00E9' CD 0000#        1         call    prtini          ; init the down counters
                      1  ;marker
00EC' 3E 30           1         ld      a,'0'
00EE' CD 0389'        1         call    rawout
                      1
00F1' F3              1         di
00F2' 01 00B4         1         ld      bc,itc
00F5'                 1         inn     a,(c)           ; get the old interrupts
00F5' ED 78           A1        in      a,(c)
00F7' F6 05           1         or      ite0+ite2       ; set up interrupts 0 & 2
```

TABLE I

```
00F9' 57              1              ld      d,a              ; save the value
00FA' 3A 0000#        1              ld      a,(host)         ; check host flag
00FD' B7              1              or      a
00FE' 7A              1              ld      a,d              ; restore itc value
00FF' 20 02           1              jr      nz,hosted        ; z, not hosted 0101' E6 FE           1              and     255-ite0         ; stop interrupt 0
0103'                 1  hosted:
0103'                 1              outt    (c),a            ; load the itc value
0103' ED 79           A1             out     (c),a
0105' FB              1              ei
                                endif
                             ;marker
0106' 3E 4D                          ld      a,'M'            ; mark the spot
0108' CD 0389'                       call    rawout
010B' F6 FF                          or      255
010D' CD 036C'                       call    memchk           ; check for valid program
0110' 28 25                          jr      z,ramok          ; z, checks good 0112' AF                             xor     a
0113' 32 0000#                       ld      (active),a       ; clear the active count
0116' 32 0000#                       ld      (alton),a        ; alternate controller flag
0119' 32 0000#                       ld      (smflag),a       ; measured flow flag
                             ;marker
011C' 3E 53                          ld      a,'S'
011E' CD 0389'                       call    rawout
0121' CD 0000#                       call    resetclock       ; wait for clock set or keyin 0124' 3A 0000#                       ld      a,(sclctr)       ; check keyin
0127' E6 40                          and     okmsk
0129' 28 0B                          jr      z,ramignore      ; z, keyin, skip the ramset 012B' CD 0350'                       call    ramset           ; load the check bytes
                             ;marker
012E' 3E 52                          ld      a,'R'
0130' CD 0389'                       call    rawout
0133' CD 0000#                       call    rsinit           ; ram not ok load default
0136'                        ramignore:
0136' F3                             di               ; hold off interrupts to finish init
0137'                        ramok:
0137' 3A 0000#                       ld      a,(sclctr)       ; enable the watch dog
013A' F6 40                          or      okmsk
013C' 32 0000#                       ld      (sclctr),a
013F' CD 0000#                       call    llrest           ; reset the piggy back board 0142' AF                             xor     a
0143' 32 0000#                       ld      (noupdt),a       ; allow time updates
0146' 21 FFFF                        ld      hl,-1
0149' 22 0000#                       ld      (tsecs),hl       ; force a clock update
014C' 22 0000#                       ld      (timup),hl
014F' CD 0000#                       call    rstclk 0152' 3E 41                          ld      a,'A'
0154' CD 0389'                       call    rawout
         FFFF         1           if intcom
0157' CD 0000#        1              call    ascvinit         ; init communication interrupts
                                endif
015A' FB                             ei 015B' C3 0000#                       jp      csistart         ; ram ok resend string
                            ; timoff
                            ;    compare the clock storage against the clock reading
015E'                        timoff:
                             global timoff
015E' 3A 0000#                       ld      a,(pucnt)        ; increment the power up counter
0161' 3C                             inc     a
0162' 28 03                          jr      z,timo01         ; z, it rolled over don't count it 0164' 32 0000#                       ld      (pucnt),a
0167'                        timo01:
0167' 06 02                          ld      b,2
```

TABLE I

```
0169' 21 0000#          ld      hl,pupcnt       ; point to the rollover counter
016C' CD 0000#          call    hldinc          ; decimal increment 016F' 3A 0000#          ld      a,(tyear)       ; get the old year
0172' CD 0000#          call    atohex
0175' F5                push    af              ; save the year
0176' 2A 0000#          ld      hl,(tdamo)      ; get the old date
0179' CD 0000#          call    hltchx          ; make it hex
017C' E5                push    hl              ; save the date
017D' 2A 0000#          ld      hl,(tmins)      ; get the old time
0180' E5                push    hl              ; save it
0181' CD 0000#          call    swread          ; update the storage 0184' D1                pop     de              ; get the old time 0185' 2A 0000#          ld      hl,(tmins)      ; get the current time
0188' 22 0000#          ld      (putime),hl     ; store it
018B' CD 0000#          call    clockdif        ; find the difference
018E' 08                ex      af,af'          ; save the carry
018F' CD 0000#          call    tlmin           ; hrs,mins to minutes 0192' D1                pop     de              ; get the old date
0193' F1                pop     af              ; get the old year in a
0194' E5                push    hl              ; save elapsed minutes
0195' 47                ld      b,a             ; old year in b
0196' 3A 0000#          ld      a,(tyear)       ; get the new year
0199' CD 0000#          call    atohex
019C' 4F                ld      c,a             ; new year in c 019D' 2A 0000#          ld      hl,(tdamo)      ; new month & day in hl
01A0' CD 0000#          call    hltchx 01A3' 08                ex      af,af'          ; get the borrowed day
01A4' 3E 00             ld      a,0
01A6' 8B                adc     a,e
01A7' 5F                ld      e,a
01A8' 3E 00             ld      a,0
01AA' 8A                adc     a,d
01AB' 57                ld      d,a
01AC' CD 0000#          call    daydif          ; compute elapsed days
01AF' C1                pop     bc              ; restore elasped minutes 01B0' EB                ex      de,hl           ; save days in de
01B1' 21 FFFF           ld      hl,65535        ; setup error exit
01B4' 7A                ld      a,d             ; check for too many days
01B5' B7                or      a
01B6' 20 26             jr      nz,timofx 01B8' 3E 2D             ld      a,45            ; maximum days to compute
01BA' BB                cp      e
01BB' 38 21             jr      c,timofx        ; c, too big 01BD' 21 05A0           ld      hl,1440         ; 1440 minutes per day
01C0' 54                ld      d,h             ; high byte in b
01C1' 63                ld      h,e             ; low byte in l
01C2' ED 6C             mlt     hl
01C4' ED 5C             mlt     de
01C6' 65                ld      h,l             ; high result in h
01C7' 2E 00             ld      l,0
01C9' 19                add     hl,de           ; 1440 X days in hl
01CA' 09                add     hl,bc           ; add the minutes diff
01CB' EB                ex      de,hl           ; difference in de
01CC' 42                ld      b,d             ; and in bc
01CD' 4B                ld      c,e
01CE' 21 FFFF           ld      hl,65535
01D1' 38 0B             jr      c,timofx        ; c, too big 01D3' 2A 0000#          ld      hl,(pumins)     ; add in the old count
01D6' 19                add     hl,de
01D7' EB                ex      de,hl
```

TABLE I

```
01D8' 21 FFFF            ld      hl,65535
01DB' 38 01              jr      c,timofx        ; carry is still too big 01DD' EB                 ex      de,hl
01DE'            timofx:
01DE' 22 0000#           ld      (pumins),hl     ; load the new time
01E1' 7C                 ld      a,h             ; check for non zero
01E2' B5                 or      l
01E3' C8                 ret     z               ; z, no error recorded 01E4' 3A 0000#           ld      a,(puerbt)
01E7' F6 04              or      puermsk         ; flag the error
01E9' 32 0000#           ld      (puerbt),a
01EC' 32 0000#           ld      (ospers),a 01EF' 60                 ld      h,b             ; get the elapsed time
01F0' 69                 ld      l,c
01F1' 06 03              ld      b,3             ; 3 bytes to deal with
01F3' CD 0000#           call   ~tbcd            ; convert to bcd
01F6' EB                 ex      de,hl
01F7' 21 0000#           ld      hl,pupmin       ; add the time to the rollover
01FA' B7                 or      a
01FB'            timofl:
01FB' 8E                 adc     a,(hl)
01FC' 27                 daa
01FD' 77                 ld      (hl),a
01FE' 23                 inc     hl              ; next byte
01FF' 7B                 ld      a,e
0200' 5A                 ld      e,d             ; shift the bytes around
0201' 10 F8              djnz    timofl 0203' C9                 ret FFFF    1   if not cpm
                 1   ; mtrtst Tests the flow meter jumper by setting the meter flag,
                 1   ;    resetting the meter flip flop, enabling interrupts and
                 1   ;    checking for a zero meter flag.  Since the int 1 is second
                 1   ;    priority below the host/monitor int 2, only a few cycles
                 1   ;    are nclesarry to check for the interrupt.
0204'            1   mtrtst:
                 1   global mtrtst
0204' F3         1       di
0205' 21 0000#   1       ld      hl,nomvcs       ; setup the interrupt vectors
0208' 7C         1       ld      a,h             ; for no meter
0209' ED 47      1       ld      i,a             ; load the high byte
020B' 7D         1       ld      a,l
020C' 01 00B3    1       ld      bc,il           ; load the high 3 bits
020F'            1       outt    (c),a
020F' ED 79      A1      out     (c),a
                 1
0211' 01 00B4    1       ld      bc,itc
0214'            1       inn     a,(c)

0214' ED 78      A1      in      a,(c)
0216' F6 02      1       or      ite1            ; start flow interrupts
0218'            1       outt    (c),a
0218' ED 79      A1      out     (c),a
                 1
021A' 01 0080    1       ld      bc,cntla0
021D' 3A 0000#   1       ld      a,(rcnta0)      ; get the normal status
0220' E6 EF      1       and     255-rts0        ; disable flow interrupt source
0222'            1       outt    (c),a
0222' ED 79      A1      out     (c),a
                 1
0224' 3E FF      1       ld      a,255           ; assume a meter
0226' 32 0000#   1       ld      (meter),a
0229' FB         1       ei                      ; and wait for an interrupt
                 1
022A' 00         1       nop                     ; first int after this nop
022B' 00         1       nop                     ; allow two to make sure
022C' 00         1       nop
                 1
```

TABLE I

```
0220' F3              1         di
022E' 3A 0000#        1         ld      a,(meter)        ; check for a meter
0231' B7              1         or      a
0232' C8              1         ret     z                ; no meter quit 0233' 3A 0000#        1         ld      a,(rcnta0)       ; get the normal status
0236' F6 10           1         or      rts0             ; turn on rts0
0238'                 1         outt    (c),a
0238' ED 79          A1         out     (c),a 023A' 3A 0005#        1         ld      a,(iesave+5)     ; get the iesave
023D' F6 02           1         or      ite1
023F' 32 0005#        1         ld      (iesave+5),a     ; enable ite1

0242' 21 0000#        1         ld      hl,tblvcs        ; setup the interrupt vectors
0245' 7C              1         ld      a,h              ; for meter present
0246' ED 47           1         ld      i,a              ; load the high byte
0248' 7D              1         ld      a,l
0249' 01 0053         1         ld      bc,il            ; load the high 3 bits
024C'                 1         outt    (c),a
024C' ED 79          A1         out     (c),a 024E' 01 0084         1         ld      bc,itc           ; point to the rts 0 port
0251'                 1         inn     a,(c)            ; get ite status
0251' ED 78          A1         in      a,(c)
0253' F6 02           1         or      ite1             ; start flow interrupts
0255'                 1         outt    (c),a
0255' ED 79          A1         out     (c),a 0257' C9              1         ret 0258'                 1 nometer:
                      1         global  nometer
0258' F3              1         di                       ; hold off the interrupts
0259' F5              1         push    af
025A' C5              1         push    bc 025B' 01 0084         1         ld      bc,itc
025E'                 1         inn     a,(c)
025E' ED 78          A1         in      a,(c)
0260' E6 FD           1         and     255-ite1         ; no meter if we're here
0262'                 1         outt    (c),a            ; stop flow interrupts 0262' ED 79          A1         out     (c),a 0264' 3A 0005#        1         ld      a,(iesave+5)     ; get the iesave
0267' E6 FD           1         and     255-ite1
0269' 32 0005#        1         ld      (iesave+5),a     ; disable ite1

026C' 01 0030         1         ld      bc,cntla0        ; point to the rts 0 port
026F' 3A 0000#        1         ld      a,(rcnta0)       ; get the normal status
0272' E6 EF           1         and     255-rts0         ; turn off rts0 to disable
0274' 32 0000#        1         ld      (rcnta0),a       ; the flow meter input
0277'                 1         outt    (c),a
0277' ED 79          A1         out     (c),a 0279' AF              1         xor     a
027A' 32 0000#        1         ld      (meter),a        ; flag no meter present 027D' E5              1         push    hl               ; clear the rate buffers
027E' 21 0000#        1         ld      hl,ratbuf
0281' 11 0001#        1         ld      de,ratbuf+1
0284' 01 0009         1         ld      bc,sample*2+3    ; include florep, & ratnos
0287' 77              1         ld      (hl),a
0288' ED B0           1         ldir
028A' E1              1         pop     hl 028B'                 1         inn     a,(instatp)      ; check for smf
028B' DB 01          A1         in      a,(instatp)
```

TABLE I

```
028D' E6 04         1              and      smfmsk
028F' 28 04         1              jr       z,nomex         ; smf switch is on, exit
                    1
0291' AF            1              xor      a
0292' 32 0000#      1              ld       (smflag),a      ; clear the smf flag
0295'               1    nomex:
0295' C1            1              pop      bc
0296' F1            1              pop      af
0297' FB            1              ei
0298' C9            1              ret                      ; no meter here
                    1
                              endif 0299'                    hannmi:
                              global   hannmi
0299' 21 0392'                     ld       hl,nmimsg
029C' 31 0000#                     ld       sp,stack
029F' CD 0000#                     call     pstrng
02A2' C3 0016'                     jp       startc ; Restart 38 occurred. Decode for monitor startup (Interrupt 0),
                         ;        or a real rst 38.
02A5'                    han38:
                              global   han38
02A5' F5                           push     af
02A6' ED 57                        ld       a,i             ; ief2 to parity
02A8' F3                           di                       ; p/v = ief2
                                                            ; po = int0
02A9' EA 02E3'                     jp       pe,tst38x       ; pe, rst 38

02AC' ED 38 B4                     in0      a,(itc)         ; test for interrupt 0
02AF' CB 47                        bit      0,a             ; interrupt 0 active
02B1' CA 02E3'                     jp       z,tst38x        ; no, must be rst 38

02B4' 3A 0000#                     ld       a,(host)        ; host active ?
02B7' B7                           or       a
02B8' 20 0E                        jr       nz,tst38        ; nz, yes, test it out 02BA' E6 FE                        and      255-ite0        ; turn off int0
02BC' ED 39 B4                     out0     (itc),a
02BF' 21 0000#                     ld       hl,mhan38       ; monitor rst 38 vector
02C2' 22 0001#                     ld       (rst38vec+1),hl 02C5' C3 0032'                     jp       monrst          ; restart the monitor
02C8'                    tst38:
02C8' CD 02F2'                     call     stpints         ; stop each interrupt
02CB' AF                           xor      a
02CC' 32 0000#                     ld       (host),a        ; clear the host flag
02CF' 3E 01                        ld       a,ite0          ; enable interupt 0
02D1' ED 39 B4                     out0     (itc),a 02D4' F1                           pop      af
02D5' FB                           ei
02D6' 00                           nop                      ; wait a few beats
02D7' 00                           nop
02D8' 00                           nop
                                                            ; if we get to here it was some other interrupt
02D9' F3                           di                       ;  with a rst 38 in it
02DA' F5                           push     af
02DB' CD 0325'                     call     strints         ; restart each interrupt
02DE' 3E FF                        ld       a,255
02E0' 32 0000#                     ld       (host),a
02E3'                    tst38x:
02E3' E5                           push     hl
02E4' 21 0000#                     ld       hl,rstcnt       ; count the pass
02E7' 34                           inc      (hl)
02E8' 2A 0000#                     ld       hl,(tmins)
02EB' 22 0000#                     ld       (rstime),hl     ; record the time
02EE' E1                           pop      hl
02EF' C3 0000#                     jp       rst38vec
```

TABLE I

```
                        ; clear all interrupt registers for an int0 check
                        cstop   macro   p,dt
                                ld      c,p
                                ld      d,dt
                                call    intstop
                        endm
02F2'                   stpints:
                                global  stpints
02F2' CD 0000#                  call    savall
02F5' 21 0000#                  ld      hl,iesave       ; save the interupt statuses
02F8' 01 0004                   ld      bc,stat0        ; disable all interrupts
02FB' 16 F6                     ld      d,255-tie-rie
02FD' CD 031D'                  call    intstop
0300' 0C                        inc     c
0301' CD 031D'                  call    intstop
0304'                           cstop   cntr,255-eie
0304' 0E 9A         A           ld      c,cntr
0306' 16 EF         A           ld      d,255-eie
0308' CD 031D'      A           call    intstop
030B'                           cstop   tcr,255-tie0-tie1
030B' 0E 92         A           ld      c,tcr
030D' 16 CF         A           ld      d,255-tie0-tie1
030F' CD 031D'      A           call    intstop
0312'                           cstop   dstat,255-die0-die1
0312' 0E B0         A           ld      c,dstat
0314' 16 F3         A           ld      d,255-die0-die1
0316' CD 031D'      A           call    intstop
0319' 0E 54                     ld      c,itc
031B' 16 F8                     ld      d,255-ite0-ite1-ite2
031D'                   intstop:
                                global  intstop
031D'                           in      a,(c)
031D' ED 78         A1          in      a,(c)
031F' 77                        ld      (hl),a
0320' A2                        and     d
0321'                           outt    (c),a
0321' ED 79         A1          out     (c),a
0323' 23                        inc     hl
0324' C9                        ret ; Set interrupts back to states at iesave
                        cstart  macro   p
                                ld      c,p
                                ld      a,(hl)
                                outt    (c),a
                                inc     hl
                        endm 0325'                   strints:
                                global  strints
0325' CD 0000#                  call    savall
0328' 21 0000#                  ld      hl,iesave       ; save the interupt statuses
032B' 01 0004                   ld      bc,stat0        ; disable all interrupts
032E' 7E                        ld      a,(hl)
032F'                           outt    (c),a
032F' ED 79         A1          out     (c),a
0331' 23                        inc     hl
0332' 0C                        inc     c
0333' 7E                        ld      a,(hl)
0334'                           outt    (c),a
0334' ED 79         A1          out     (c),a
0336' 23                        inc     hl
0337'                           cstart  cntr
0337' 2E 8A         A           ld      c,cntr
0339' 7E            A           ld      a,(hl)
033A' ED 79         B1          out     (c),a
033C' 23            A           inc     hl 033D'                           cstart  tcr
033D' 0E 92         A           ld      c,tcr
033F' 7E            A           ld      a,(hl)
```

TABLE I

```
0340' ED 79     B1              out     (c),a
0342' 23        A               inc     hl
0343'                           cstart  dstat
0343' 0E 08     A               ld      c,dstat
0345' 7E        A               ld      a,(hl)
0346' ED 79     B1              out     (c),a
0348' 23        A               inc     hl
0349'                           cstart  itc
0349' 0E 84     A               ld      c,itc
034B' 7E        A               ld      a,(hl)
034C' ED 79     B1              out     (c),a
034E' 23        A               inc     hl
034F' C9                        ret
0350'                   ramset:
0350' 3E 08                     ld      a,8
0352' 47                        ld      b,a
0353' 21 0002#                  ld      hl,ramstrng     ; point to the string
0356'                   ramse1:
0356' 77                        ld      (hl),a          ; load a byte
0357' 23                        inc     hl              ; point to next
0358' 3D                        dec     a               ; make new value
0359' 20 FB                     jr      nz,ramse1

035B' 78                        ld      a,b             ; new starting value
035C'                   ramse2:
035C' 3C                        inc     a               ; new value
035D' 77                        ld      (hl),a          ; load a byte
035E' 23                        inc     hl              ; next
035F' 10 FB                     djnz    ramse2

0361' 06 05                     ld      b,5             ; clear 5 error bytes
0363' AF                        xor     a
0364' 21 0002#                  ld      hl,syserr
0367'                   ramse3:
0367' 77                        ld      (hl),a
0368' 23                        inc     hl
0369' 10 FC                     djnz    ramse3

036B' C9                        ret

036C'                   memchk:
036C' C5                        push    bc
036D' E5                        push    hl
036E' 3E 08                     ld      a,8             ; starting value & count
0370' 47                        ld      b,a
0371' 21 0002#                  ld      hl,ramstrng     ; point to the string
0374'                   memch1:
0374' BE                        cp      (hl)            ; check a byte
0375' C2 0386'                  jp      nz,memchx       ; nz, bad match quit 0378' 23                        inc     hl              ; point to next
0379' 3D                        dec     a               ; make new value
037A' 20 F8                     jr      nz,memch1

037C' 78                        ld      a,b             ; new starting value
037D'                   memch2:
037D' 3C                        inc     a               ; new value
037E' BE                        cp      (hl)            ; check a byte
037F' C2 0386'                  jp      nz,memchx       ; nz, bad match quit 0382' 23                        inc     hl              ; next
0383' 10 F8                     djnz    memch2

0385' AF                        xor     a               ; return z good check flag
0386'                   memchx:
0386' E1                        pop     hl
0387' C1                        pop     bc
0388' C9                        ret 0389'                   rawout:
                                global  rawout
```

TABLE I

```
0389' C3 0000#              jp      putchar 0000        1  if cpm endif
038C'                  vectors:
038C' C3 0000#              jp      han30
038F' C3 0000#              jp      hhan30

0000        1  if cpm
                    1    else
                    1
                       endif 0392'                  cpuend:

0392'                  mainsg:
0392' 0D 0A 20 20      defb  cr,lf,'  NMI      System Restart: ',0
                       end 0 Error(s) Detected.   945 Program Bytes.
504 Symbols Detected.

.z80
                        .list

; 11-23-88 Added julian day of the week processing as below.
                ;       drk ; Insert day of the week processing after determining window
                ;       open in updat2:
                ; If 7 day processing is used, check the bit# in opday0.
                ; For 14 day processing, compare the julian day of the week,
                ; (julian.mod.7  jdawk), with the clock day of the week, (tdawk).
                ; Even weeks use opday0 while odd weeks use opday1.
                ;       Opday0 = 1 - 7, opday1 = 8 - 13
                ;       week# = jdawk>tdawk?jweek++:jweek
                ; (Julian uses c = binary tyear, h = binary tmont, l = binary tdamc)

; 11-10-88 Rearranged and tightened up error processing.
                ;       Added display of power off time error.
                ;       drk ; 10-26-88 Added seconds up counter for group timing and
                ;       group seconds down counter.
                ;       drk ; 01-05-87 Added high current sensing to kill the offending
                ;       channel.  The routine first kills the channel listed
                ;       as last on unless that channel is not on. It then looks
                ;       for a channel that is on and kills that one.  If no
                ;       active channel is found, the condition is ignored
                ;       drk ; 12-13-87 Added csiupd to data structure to flag the need for
                ;       updating CSI string.
                ;   -   drk ; 12-08-87 Added llrest to reset the offline error if present
                ;       by setting the oflrbit in the leadout byte.
                ;       Added code to the prt0 interrupt to reset that bit when
                ;       the csi finishes sending it in the set condition.
                ;       drk ; 12-07-87 made shoerr subroutine to allow call from other
                ;       modules
                ;       drk ; 12-02-87 added error display routine to clkups:
                ;       drk
```

TABLE I

```
        global prtini, prt0vc, rstclk, beep, clkupdate, prt1vc
        ; subroutines
        external swread, timdsp, clockdif, colstart, irptsv, chnc01
        external prtbit, hlbcd, hitohx, atchex, julian, clwksl
        external atchex, hltohx, putchar, atobcd ; variables
        external hcrmem, hcrdfl, opsecs, opday0, opday1
        external tdamo, tyear, tdawk, maset, tiermk, tiercn external ratno, puerbt, pumins, llrscn, llrsvl
        external csterm, leadout, holdll, ratbuf, hperrc, hpcnt, meter external nosecs, secnts, active, inahi, acthi, erproc, upsecs
        external florep, colupd, hprate, avgrat, currat, grpdwn
        external lperbt, llorbt, syser1, syser2, syser3, syser4, eper0
        external dopers, syser0, ospdop, hidigit, lodigit, offl
        external towel0, numincntrs, colctr, slotmc, fctimc
        external beepts, chrtim, keytim, timup, outctr, finstm
        external windoc, nourdt, tsecs, tmimc, cminc, cmins
        external clkctx, numibcntrs, chgscc, nowmin
        external colcnt, colcnth, loten, houstm, mstrauto, maxrat, inarat
        page 64
        ; prtini initializes the prt reload counts and loads a zero value
        ;       into the counters for start up and enables interrupts on
        ;       prt0
0000'           prtini:
0000' AF                xor     a                       ; stop both counters
0001' 01 0092           ld      bc,tcr
0004'                   outt    (c),a
0004' ED 79       A1    out     (c),a 0006' 21 0EFF           ld      hl,rload0               ; setup the reload value
0009' 0E 8E             ld      c,rldrel                ; for prt0
000B'                   outt    (c),l
000B' ED 69       A1    out     (c),l
000D' 0C              inc     c
000E'                   outt    (c),h
000E' ED 61       A1    out     (c),h 0010' 21 0044           ld      hl,rload1               ; setup the reload value
0013' 0E 96             ld      c,rldr11                ; for prt1
0015'                   outt    (c),l
0015' ED 69       A1    out     (c),l
0017' 0C                inc     c
0018'                   outt    (c),h
0018' ED 61       A1    out     (c),h
001A' 0E 94             ld      c,tmdr11
001C'                   outt    (c),l
001C' ED 69       A1    out     (c),l
001E' 0C                inc     c
001F'                   outt    (c),h
001F' ED 61       A1    out     (c),h 0021' 3E 11             ld      a,prtmode               ; start the timer
0023' 0E 90             ld      c,tcr
0025'                   outt    (c),a
0025' ED 79       A1    out     (c),a
0027' C9                ret
```

TABLE I

```
        ; prt0vc
        ;    programable reload timer 12.5 milisecond interrupt.
        ;    updates tick up and down counters.
        ;    once every 100 miliseconds, during window open time
        ;      checks clock loop for activity.
        ;    once a minute:
        ;      updates the current minute storage and sets the window
        ;      according to the open/close settings.
        ;    prt must be read tcr then tmdr to clear interrupt flag
0028'              prt0vc:
0028' CD 0000#           call    irptsv          ; save the machine state
002B' AF                 xor     a
002C' 32 0000#           ld      (chgscs),a      ; clear the change seconds flag ;marker
                  ;      ld      a,'.'
                  ;      call    putchar
002F' CD 004B'           call    rstclk          ; call the clock restart
                  ;marker
                  ;      ld      a,','
                  ;      call    putchar
0032' 3A 0000#           ld      a,(tmins)       ; update newmin
0035' 32 0000#           ld      (newmin),a 0038' 3A 0000#           ld      a,(chgscs)      ; seconds change ?
003B' B7                 or      a
003C' C2 0000#           jp      nz,csistart     ; nz, yes, up date the csi 003F' 3A 0000#           ld      a,(csiupd)
0042' B7                 or      a               ; forced csi update ?
0043' C8                 ret     z               ; z, nope 0044' AF                 xor     a
0045' 32 0000#           ld      (csiupd),a      ; clear the update flag
0048' C3 0000#           jp      csistart        ; send the new string 004B'              rstclk:
004B' 01 0090            ld      bc,tcr
004E'                    inn     d,(c)           ; read & save tcr and tmdr0
004E' ED 50      A1      in      d,(c)
0050' 0E 8C              ld      c,tmdr01        ; to clear the interrupt flag
0052'                    inn     a,(c)
0052' ED 78      A1      in      a,(c)
0054' 0C                 inc     c
0055'                    inn     a,(c)
0055' ED 78      A1      in      a,(c)

0057' 3A 0000#           ld      a,(beeptm)
005A' D6 01              sub     1
005C' 38 05              jr      c,stopbp        ; c, count was 0, kill beep 005E' 32 0000#           ld      (beeptm),a
0061' 20 07              jr      nz,beeping      ; nz, let it keep beeping
0063'              stopbp:
0063' 0E 90              ld      c,tcr
0065' 7A                 ld      a,d             ; restore tcr value
0066' E6 F3              and     not (toc0+toc1)
0068'                    outt    (c),a
0068' ED 79      A1      out     (c),a
006A'              beeping:
                   global beeping
```

TABLE I

```
            FFFF           1   if k49
006A'  3A 0000#        1       ld      a,(timup)        ; once per 1 1/2 seconds
006D'  E6 FF           1       and     255
006F'  20 2B           1       jr      nz,skpkbchk
                       1
0071'  3A 0000#        1       ld      a,(outctr)
0074'  4F              1       ld      c,a
0075'  06 02           1       ld      b,2
0077'  2E 07           1       ld      l,kb3id or kb2id
0079'  16 00           1       ld      d,0              ; start with tier one bit
007B'                  1  chkys:
007B'  79              1       ld      a,c              ; get the kb strobe
007C'  E6 FC           1       and     255-keymsk
007E'  F6 03           1       or      kb2id
0080'  B5              1       or      l                ; set the mask
0081'                  1       outt    (keystb),a
0081'  D3 02          A1       out     (keystb),a
0083'  2C              1       inc     l                ; next tier
0084'  DD E3           1       ex      (sp),ix
0086'  DD E3           1       ex      (sp),ix
0088'                  1       inn     a,keysns
0088'  DB 00          A1       in      a,keysns
008A'  0F              1       rrca                     ; push the bit into carry
008B'  CB 1A           1       rr      d                ; add in this tier
008D'  10 EC           1       djnz    chkys
                       1
008F'  06 06           1       ld      b,6
0091'                  1  chkyx:
0091'  CB 0A           1       rrc     d                ; move flags to low bits
0093'  10 FC           1       djnz    chkyx
                       1
0095'  7A              1       ld      a,d
0096'  32 0000#        1       ld      (tiermk),a       ; save the mask
0099'  79              1       ld      a,c              ; restore the strobe
009A'                  1       outt    (keystb),a
009A'  D3 02          A1       out     (keystb),a
                           endif
009C'                      skpkbchk:
009C'  21 0000#              ld      hl,hcurtm        ; point to 1st 1 byter
009F'  06 ??                 ld      b,num1bcntrs     ; get the count
00A1'  3A 0000#              ld      a,(csterm)       ; check for hi current wait
00A4'  CB 6F                 bit     hicursb,a        ; waiting for csi termination ?
00A6'  20 06                 jr      nz,nooner        ; nz, yes, skip hcurtm
00A8'                    oners:
00A8'  7E                    ld      a,(hl)
00A9'  D6 01                 sub     1
00AB'  38 01                 jr      c,nooner         ; c, count was 0
00AD'  77                    ld      (hl),a
00AE'                    nooner:
00AE'  23                    inc     hl               ; next counter
00AF'  10 F7                 djnz    oners 00B1'  AF                    xor     a
00B2'                        inn     a,(instatp)
00B2'  DB 01          A1     in      a,(instatp)
00B4'  E6 20                 and     hicursn          ; mask for hi current sense
00B6'  FE 00                 cp      hicurst          ; is it active ?
00B8'  DD E5                 push    ix
00BA'  20 78                 jr      nz,eptstx        ; nz, nope
```

Data Variables (WATDAT)

WATDAT is a data file arranged with the stack occupying the first 256 bytes of storage. The stack is followed by critical storage such as the check bytes, turn on counters, restart vectors, monitor storage and the like.

Terminal Commands

The "A" command allows stations to be set from the terminal as though keys were pressed on the keyboard. A list of stations and settings up to 32 characters long can be entered.

A 1, 0; 2, 2; 3, 1; 4, 0; 5, 3 would set station 1 to off, 2 to on, 3 to auto, 4 to off and 5 to ASO.

The "A" command displays the updated state of the controller and requires that parameters, if any, be entered in pairs.

The "B" command displays the statistics kept by the controller for the system or for the station number or range of station numbers following the B command in the following format.

Line 1 - Identification Header

00 START STOP AUTT OVRT SYRT AUTF OVRF AT OT FLHI FLMX POM IN POCN

Lines 2-17 Station by station data

XX - Station number
START - Day Hour Minute of last watering start
STOP - Day Hour Minute of last watering stop
AUTT - Six digit minute counter for automatic (AUTO) watering
OVRT - Six digit minute counter for override (ON) watering
SYRT - Four digit seconds counter for syringe water
AUTF - Six digit flow counter for automatic (AUTO) watering
OVRF - Six digit flow counter for manual (ON) watering
AT - Two digit down counter (AUTO) minutes remaining this period
OT - Two digit down counter (ON) minutes remaining this (ON) key
FLHI - Four digit maximum observed flow rate
FLMX - Four digit maximum allowed flow rate
FOMIN - Powder out minutes
POCN - Power out count Line 18 - System data Date and Time
Hour Minute for watering start and stop
Flow rates; maximum allowed - inactive and system, current observed - instantaneous and average.

Line 19 - System flow data

Observed flow rates; inactive & active - high
Ten digit flow counter during automatic operation
Ten digit flow counter during override operation
Ten digit flow counter during off-line operation
Ten digit inactive flow counter
Ten digit total flow counter Lines 21 & 22 Abbreviated explanation of line 18 and 19

The "C" command with no parameters displays the limits for all stations and the system. If followed by a station number or range of station numbers, it displays the limits for the station or range of stations specified.

For example: C1 12 would display the information for stations 1 through 12.

Line 1 - Identification Header

XX - FLHI FLMX FP DW SO SH AV OV GRP GRPT

Line 2-17 Station by station data

XX - Station number
FLHI - Maximum observed flow rate
FLMX - Maximum allowed flow rate
FP - Percent allowed over the maximum flow
DW - Dwell minutes
SO - Soak time, minutes from turn off to next attempt to water
OP - Open timeout seconds
SH - Shut timeout seconds
AV - Maximum allowed automatic watering minutes per window
OV - Maximum allowed override (ON) minutes before reverting to AUTO
GRP - Master station for this group
GRPT - Seconds group master watered in this cycle Line 17 System Flow Data Line 18 System Flow Data Legend

FLMI FLMS INST AVRG IAHI ACHI

Rates: Maximum allowed w/no valves active, Maximum for the system, Observed - Instantaneous, Average, High with no valves active, High with valve(s) active.

"C" followed by "M" displays a menu of secondary command characters which allow limits to be changed. Typing "C" followed by a secondary command and, where appropriate, a station number or range of station numbers and the new value will change the setting as listed below.

Station Limits

D - Dwell time in minutes
S - Soak time in minutes
O - Open time in seconds at turn on
H - Shut time in seconds at turn off
A - Maximum minutes allowed to accumulate in AUTO per window
V - Maximum minutes allowed to water in override from a press of the ON key, station reverts to AUTO after this time
Y - Syringe time in seconds
F - Maximum flow rate for this station
C - Clear the observed maximum flow rate
P - Error percent added to maximum allowed flow rate
G - Station # of group master for this station System Limits I - Maximum allowed inactive flow rate
R - Maximum allowed system flow rate, (adjusted as valves turn on or off)
T - Clear the observed minimum and maximum flow rates
Z - Force a system reset Values are entered and displayed as decimal numbers.

For example entering CG2 5 1 would set the group master for stations 2 through 5 to station 1.

Grouping assigns one sensor to several stations. The number of seconds the group master waters is recorded on each pass through the stations during automatic operation. The slaves in the group are watered for that number of seconds during a pass. If the master does not water during a pass, then 0 is recorded and the slaves do not water. The slaves will ignore their dwell, soak and maximum automatic accumulated times. The slave must have a higher station number than the master or the grouping is ignored.

The "E" (Display/Reset Errors) command will display any errors detected in the system. Following the "E" with a secondary command letter and, where appropriate a station number, will clear that error. Clearing an excessive flow error causes flow error checking to be suspended for one minute.

F - Excessive flow
T - Power off time and counter reset to 0
O - Sensors offline
P - Excessive electrical current
N - No flow while active The "U" (Enter time) command has two formats. Entering "U" with no parameters sends the following menu to the terminal.

Enter exactly 14 digits for the clock setting where Yr - year, Mo - month, Da - data, Wd - week day, Hr - hour (24 Hr 00–23 ), Mi - minute, Se - seconds.

Enter the desired time in twenty four hour format, press return and the clock will be updated to that value. Entering "U" followed immediately by the full time setting will bypass the menu, but, otherwise work as above. If only the hour and minute need be changed or if the start or stop time needs changing, enter "U" followed immediately by "S", "P" or "T" followed by the hour and minute of the desired setting. The start time is changed by "S", the stop time by "P" and the clock time by "T".

UT 2300 sets the clock to 11 P.M.

The UC command sets the days to water or not in a two week calendar.

The display is 1 appears above today. Enter 1 below water days and 0 below no water days.

MTWTFSS MTWTFSS
1111100 1111100

The cursor (underline) appears below the current setting.

The "T" (Time Display) command displays the complete clock read out at the terminal. The format is similar to that of the "U" command except the digits are paired and separated by spaces.

The "D" (Dump Memory) command displays the contents of the memory in both hexadecimal and ASCII format. Each line of the display contains the first address displayed on that line followed by a space and eight space delimited pairs of hexadecimal digits, an extra space, eight pairs of digits, a space and the ascii character represented by the value of each byte. Non displayable characters are indicated by a period character. The default start address is initialized to location 0 on power up. Upon exiting this routine, the last address displayed is saved as the default start address for the next time the routine is called. If no end address is specified ten lines are displayed.

The "F" (Fill Memory) command requires three parameters, the start address, the end address and the data value. Memory in the range specified is filled with the data value.

The "G" (Go) command causes control to transfer to the address specified or the default address which is loaded with 0000 on power up. Specifying an address changes the default address to that value. If a return instruction is encountered, the CPU registers will be displayed as in the "X" command and control will return to the monitor.

The "H" (Hex File Download) command is primarily a development tool for testing new software although it allows downloading predefined data into specific memory locations. The command will fill memory with data from an Intel format hex file at the file specified load address unless the optional offset is included on the command line, in which case, the offset will be added to the load addresses. The load address of the end of file record plus the offset is loaded into the default go address.

The "J" (Moisture Sense) command allows optimization of the scan time by setting the moisture sensing delay in tenths of seconds. J may be followed by the new setting to change it or entered alone to display the current setting.

The "K" (Keypad) command disables the keyboard interrupt and sends the following message to the terminal.

Touch KEYS to light LEDs
Press RETURN to exit!

A loop is then entered which alternately polls the keyboard and the terminal for input. Pressing the RETURN key at the terminal will terminate the process and reenable the keyboard interrupt. Pressing a key on the the keyboard will light its corresponding LED and send the following information to the terminal.

Row - RR Column - CC

"RR" is the decimal row number and "CC" is the decimal column number. A key in the clock row is pressed, "CLOCK" is printed in place of "RR" and "CC" will be replaced by one or two entries from the following list depending on the key combination pressed.

START STOP DWELL TIME FAST SLOW

The "L" (LCD Display) command allows characters typed at the terminal to be displayed on the LCD display. The character set is limited to the digits "0-9", dash, the letters "HELP", and blank. The following prompt is sent to the terminal as part of this command.

Enter characters to display on the LCD

Enter up to four characters and press RETURN to get the following prompt.

Press RETURN to exit!

The characters entered will remain on the display until return is pressed. After return is pressed the LCD will be updated with the current time.

The "M" (Move Memory) command moves a block of memory defined by the first two parameters to the block starting at the third parameter.

The "P" (Port) command allows byte information to be sent to or read from a specific I/O address. Following the command with a single hexadecimal address parameter will cause that port # to be read and the input byte to be displayed at the terminal. Two parameters will send the value of the second parameter to the port specified. This routine uses sixteen bit addressing to accommodate the CPU's internal I/O addressing scheme. The external I/O devices are set up to use only eight bit (LSB) addressing.

The "S" (Substitute Memory) command allows memory to be modified starting at the address specified. If no address is specified the modification continues with the address after the last address modified (the power on default is 0). At the terminal the target memory location and its contents will be displayed. Enter the new value for that location and the next higher memory location will be displayed. Precede the data with a double quote (") to enter ASCII character values. Typing only RE- TURN will move to the next location with no changes. Enter an illegal character to exit.

The "X" (Exhibit CPU Registers) command displays the CPU registers at the terminal in the following format. The CPU has the same register complement as the Zilog 80 processor. The IR pair is composed of the interrupt and refresh registers. The "PC" address is the default go address.

AF=XXXX   BC=XXXX   DE=XXXX
HL=XXXX SP=XXXX PC=XXXX
AF'=XXXX   BC'=XXXX   DE'=XXXX
HL'=XXXX SP'=XXXX PC'=XXXX

The above display also follows the return from a "G" command and is displayed in the event of RST 30 or 38 (execution at location 30h or 38h) with one of the following messages.

RST - 30 Registers
RST - 38 Registers

The "?" and "/" commands display the lists of commands. The "?" displays the monitor commands and the "/" display the debug commands.

The console drive routines provide for character buffering, command line parsing, and command reprint to repeat commands. Command lines are entered into a 32 character buffer as typed. Control characters are displayed with a leading " " character except for tab (09) which is expanded to move the cursor to the next column in the series 1, 9, 17, etc., carriage return which is the command line terminator and exits the buffer routine, and backspace or delete which destructively moves the cursor backwards over the previously typed character(s). Backspacing properly adjusts for tabs and control characters in cursor positioning.

The parsing routines allow the first parameter to follow the command character immediately or with a following delimiter character. The delimiter characters are space, comma, and semicolon. Command lines may also begin with leading delimiters. The parsing routines also perform table lookup to actually execute the routines. If the parsing routine finds an empty command line, the previous command line is retyped and repeated.

SUMMARY

It will now be apparent that what has been disclosed herein comprises an irrigation system controller apparatus having improved water conservation and reliability features for use with a large plurality of irrigation stations. More specifically, the controller apparatus of the present invention comprises a microprocessor-based logic system for control of automatic irrigation parameters such as the watering interval time and soak time for each of a plurality of watering stations. A preferred embodiment of the invention provides a display which allows easy assessment of the flow characteristics of the system as well as of system and station malfunctions which might otherwise result in catastrophic damage to the lawn or other plant life dependent upon the irrigation system. The automatic controller of the present invention is designed to operate with irrigation systems having a plurality of moisture sensors to automatically control irrigation sequences in accordance with a predefined schedule and the needs for moisture in a large plurality of distributed irrigation stations and provides a real-time display of the watering status of all such stations without requiring any form of sequencing of switches or the like to provide such information. The controller apparatus of the present invention is also designed with irrigation systems having at least one flow meter for detecting the occurrence of malfunctions in the system as a whole or in individual watering stations and providing means responsive to such malfunctions to shut down either the system or those individual work stations. A preferred embodiment of the invention disclosed herein, has the capacity to control up to sixteen such watering stations, but in addition is designed to interface in serial arrangement with additional keyboard control units for control of even larger numbers of watering stations. Furthermore, the present invention has the capability for connection, either permanently or for maintenance purposes only to a computer terminal for altering the irrigation timing and sequence parameters.

Those having skill in the art to which the present invention pertains will now as a result of the applicant's teaching herein, perceive various modifications and additions which may be made to the invention. By way of example, the specific keyboard panel control and the specific microprocessor and associated logic architecture disclosed herein may be readily modified by providing other panel designs and other such architecture designs using different computer based components as well as by providing alternative software for accomplishing substantially the same results as disclosed herein. Accordingly, all such modifications and additions are deemed to be within the scope of the invention which is to be limited only by the claims appended hereto.

We claim:

1. In an irrigation system of the type having a plurality of watering stations, apparatus comprising:
   means at said watering stations for selectively enabling and disabling the flow of water at said watering stations;
   a plurality of moisture sensors, each of said sensors being associated with a respective one of said watering stations for determining moisture level;
   a keyboard having a plurality of first keys disposed in groups, the keys in each group defining OFF, ON and AUTO states for an individual one of the stations, the OFF, ON and AUTO keys in each group selecting whether the individual one of the stations is not to be watered, whether the individual station is to be watered for a fixed period of time or whether the station is to be watered in a dwell time constituting the shorter of a fixed time or the time to achieve a particular moisture level in the earth at such individual station;
   means for selecting a start time and a stop time defining a time window for enabling water flow at said watering stations; and
   computer-based means for scanning said keyboard keys on a cyclic basis and sequentially enabling water flow at scanned stations having a corresponding first key in the ON or AUTO states during said time window.

2. The apparatus recited in claim 1, wherein said keyboard comprises a plurality of second keys for manually enabling selected ones of said watering station valves in accordance with the ON and OFF states of said second keys; said apparatus further comprising means for disabling said ON key in each individual station and setting the AUTO key in such individual station to an ON state after a preselected period of time that such individual station has been watered during the watering window.

3. The apparatus recited in claim 1 further comprising means for altering and displaying said start time, said stop time and said fixed times.

4. The apparatus recited in claim 1 further comprising means for storing and incrementing accumulated watering time for each watering station on a real-time basis during said time window in accordance with the water flowing at the watering station.

5. The apparatus recited in claim 4 further comprising means responsive to said storing and incrementing means for closing the valve of each watering station for which the accumulated watering value has exceeded a predetermined time during said time window.

6. The apparatus recited in claim 1 further comprising means for selectively ignoring the determinations of said moisture sensor for at least one watering station whereby said moisture sensor for said at least the one watering station is treated as determining that moisture is required.

7. The apparatus recited in claim 1 further comprising a flow meter providing an indication of water flow through said irrigation system.

8. The apparatus recited in claim 7 further comprising means responsive to said indication of said flow meter for determining whether there are water leaks in said irrigation system.

9. The apparatus recited in claim 7 further comprising means responsive to said indication of said flow meter for determining the maximum and steady-state flow rates of said irrigation system.

10. The apparatus recited in claim 1 comprising a plurality of valves each associated with an individual one of the stations and having open and closed states and operative in the open state to provide for a watering of the associated station and operative in the closed state to prevent a watering at the associated station and a plurality of solenoids each associated with an individual one of the valves for drawing current to open the associated valve, means for sensing the current drawn by each of said solenoids and means responsive to said current sensing means for disabling said irrigation system in the event that the sensed current is greater than a particular value.

11. The apparatus recited in claim 1 further comprising a plurality of lights and wherein each key of said keyboard has associated with it a respective one of said lights for indicating the enable or disable state of said key.

12. The apparatus recited in claim 1 further comprising a first controller included in said computer-based means for providing for the sequential scanning of the groups of keys, a second controller slaved to the first controller for providing a scanning, a second keyboard including a plurality of additional keys corresponding to the keys in the first keyboard and scanned by the second controller, a second plurality of stations, the second plurality of stations being watered sequentially on a cyclic basis in accordance with the setting of the additional keys.

13. The apparatus recited in claim 1 further comprising a master valve having opened and closed states for controlling water flow through said irrigation system to the stations in the plurality and means for opening and closing said master valve in accordance with the quantity of water flowing at the stations.

14. In an irrigation system of the type having a plurality of valve-controlled watering stations, apparatus comprising:

means connected to said valves for selectively enabling and disabling the flow of water at said watering stations;

a keyboard having a plurality of first keys disposed in groups, each of said groups of first keys being associated with an individual one of said watering stations, the keys in each group providing an OFF state, an ON state for a fixed period and an AUTO state providing a dwell state for the shorter of a particular period and a period until a particular moisture level is reached in the earth at the individual station;

means for selecting a start time and a stop time defining a time window for enabling water flow at said watering stations;

computer-based means for scanning said groups of first keys on a cyclic basis and sequentially enabling water flow at each watering station whose keys provide for an ON state or an AUTO state.

15. The apparatus recited in claim 14 including means for obtaining a watering of each station for a preselected period of time during the time window when there has been no watering at the station for a particular cumulative period.

16. The apparatus recited in claim 14 further comprising means for altering and displaying said start time, said stop time, and said particular period.

17. The apparatus recited in claim 14 further comprising means for storing and incrementing accumulated watering time for each watering station on a real-time basis during said time window in accordance with the watering at such station.

18. The apparatus recited in claim 17 further comprising means responsive to said storing and incrementing means for closing the valve of each watering station for which the accumulated watering time has exceeded a particular value during said time window.

19. The apparatus recited in claim 14 further comprising a flow meter providing an indication of water flow through said irrigation system.

20. The apparatus recited in claim 19 further comprising means responsive to said indication of said flow meter for determining and indicating whether there are water leaks in said irrigation system.

21. The apparatus recited in claim 19 further comprising means responsive to said indication of said flow meter for determining the maximum and steady-state flow rates of said irrigation system.

22. The apparatus recited in claim 14 further comprising means for drawing current at each of the stations in accordance with the watering at said station and means for sensing the current drawn at each of said stations and means responsive to said current sensing means for disabling said irrigation system in the event that the sensed current is greater than a particular value.

23. The apparatus recited in claim 14 further comprising a plurality of lights and wherein each said key of said keyboard has activated and disabled states and associated with it an individual one of said lights for indicating the activated and disabled states of said key.

24. The apparatus recited in claim 14 further comprising an additional plurality of watering stations and an additional apparatus as recited in claim 14 and having an additional keyboard corresponding to the keyboard recited in claim 14 and having additional keys corresponding to the first keys for control of the additional plurality of watering stations in said irrigation system in accordance with the setting of the keys in the additional keyboard the additional keyboard being shared to the keyboard recited in claim 14.

25. The controller apparatus recited in claim 14 further comprising a master having enabled and disabled states valve for controlling water flow into said irrigation system and means for enabling and disabling said master valve.

26. The apparatus recited in claim 14 further comprising a plurality of moisture sensors, each of said sensors being associated with an individual one of said watering stations for determining moisture level and for controlling the watering at such individual station in the AUTO state in accordance with such determined moisture level.

27. The apparatus recited in claim 26 wherein said computer-based means is also operative to indicate different types of malfunctions at the individual stations and said keyboard is associated with said computer-based means to indicate the particular type of malfunction and the individual station at which said malfunction occurs.

28. The apparatus recited in claim 27 further comprising means for establishing individual priorities for different types of malfunctions and for individual stations and for displaying the different types of malfunctions and the stations incurring such different types of malfunctions in accordance with such established priorities.

29. In an irrigation system having a main water input, a combination of:
- a plurality of spaced watering stations,
- a plurality of valves at watering stations,
- a master valve disposed at the main water input to the irrigation system and having open and closed states,
- means for sensing the operation of each of said watering station valves for determining the occurrence of a valve malfunction when the master valve is open;
- means responsive to said sensing means for closing said master valve upon the occurrence of particular valve malfunctions,
- an auxiliary irrigation system disposed in a standby relationship and having timer controls for instituting the operation of the auxiliary irrigation system; and
- means responsive to the closing of the master valve for implementing the operation of the timer controls to institute the operation of the auxiliary irrigation system.

30. The combination recited in claim 29 further comprising means for storing and incrementing accumulated watering time for each watering station on a real-time basis.

31. The combination recited in claim 30 further comprising means responsive to said storing and incrementing means for closing the valve of each watering station for which the accumulated watering time has exceeded a particular value.

32. The combination recited in claim 29 further comprising a flow meter providing an indication of water flow through said irrigation system.

33. The combination recited in claim 32 further comprising means responsive to said indication of said flow meter for determining whether there are water leaks in said irrigation system.

34. The combination recited in claim 32 further comprising means responsive to said indication of said flow meter for determining the maximum and steady-state flow rates of said irrigation system.

35. The combination recited in claim 29 further comprising an additional plurality of watering stations and an additional plurality of valves at the additional plurality of watering stations and means for providing for control of the additional plurality of valves at the additional plurality of watering stations in said irrigation system by the combination recited in claim 29.

36. The combination recited in claim 29 further comprising
- means including a keyboard having keys actuatable to provide for a watering of individual stations in the plurality for a fixed period or for the shorter of a particular period or until the existence of a particular moisture level in the earth at the individual stations,
- means for sequentially scanning the stations in the plurality on a cyclic basis to obtain watering at the stations in accordance with the actuation of the keys for the stations, and
- means responsive to the watering at each station for a particular number of fixed periods for thereafter watering the station for the shorter of the particular period or until the existence of the particular moisture level in the earth at such station when such station is being scanned on a cyclic basis.

37. In an irrigation system having a plurality of stations, the combination of:
- a plurality of valves having open and closed states and disposed at the different stations and operative in the open state to provide for a watering at the associated station and operative in the closed state to prevent such watering,
- a plurality of serially interconnected keyboard panels, each such panel having keys selectively activated to control watering at an individual one of the stations,
- means for sequentially selecting on a cyclic basis the activated keys for the different stations controlled by such keys,
- means for providing one of the panels as a master panel to control the sequential selection of the keys in that panel and in the other panels on a cyclic basis, and
- means responsive to the activated keys in the master panel and the other panels upon the selection of such keys on a cyclic basis for obtaining an opening of the valves associated with such keys.

38. The combination recited in claim 37 further comprising
- means in each panel for providing a time window defining a starting time and an ending time for the sequential selection of the keys in such panel on a cyclic basis, and
- means for storing and incrementing accumulated watering time for each watering station on a real-time basis during said time window.

39. The combination recited in claim 38 further comprising means responsive to said storing and incrementing means for preventing the opening of the valve of each watering station for which the accumulated watering time has exceeded a particular value during said time window.

40. The combination recited in claim 37 further comprising a flow meter providing an indication of water flow through said irrigation system.

41. The combination recited in claim 40 further comprising means responsive to said indication of said flow meter for determining whether there are water leaks in said irrigation system and for indicating on said panels flow rates in the irrigation system above a particular value.

42. The combination recited in claim 40 further comprising means responsive to said indication of said flow meter for determining the maximum and steady-state flow rates of said irrigation system.

43. The combination recited in claim 37 further comprising each of said valves including a solenoid drawing a current in the open state of the valve to obtain the flow of water through the valve and means for sensing the current drawn by each of said solenoids and means responsive to said current sensing means for disabling said irrigation system in the event that the sensed current is greater than a particular value.

44. The combination recited in claim 37 further comprising a plurality of lights and wherein each said key of said keyboard has associated with it a respective one of said lights for indicating the activated state of said key.

45. The combination recited in claim 37 further comprising a main water input for the water irrigation system and a master valve disposed at the main water input and having open and closed states and means for opening and closing said master valve dependent upon whether or not the cumulative flow of water through the master valve has reached a particular value.

46. The combination recited in claim 37 further comprising a plurality of moisture sensors, each of said sensors being associated with a respective one of said watering stations for determining moisture level, and means associated with each watering station and responsive to the activation of the keys for the associated watering station for opening the valve at such station for the shorter of a fixed period of time or the time for obtaining a particular moisture level at such station.

47. The combination recited in claim 46 further comprising:

means connected to said valves for selectively enabling and disabling the flow of water at said watering stations;

means for selecting a start time and a stop time defining a time window for enabling water flow at said watering stations;

means for setting a dwell time and a soak time for each watering station, the dwell time being the period of time each watering station valve is turned on and the soak time being the period of time each watering station is turned off between dwell times; and computer-based means for scanning said keyboard keys and sequentially enabling water flow for the dwell time at each watering station where a particular soak time for that watering station has been exceeded.

48. The combination recited in claim 47 further comprising means for altering and displaying on the panels said start time, said stop time, said dwell time and said soak time.

49. In an irrigation system of the type having a plurality of valves at spaced watering stations, a controller apparatus comprising:

means for selectively setting the sequence and timing for activating selected watering station valves for enabling the flow of water through the valves in accordance with such sequence and timing; and means for establishing groups of said watering station valves, each said group having a master valve and at least one slave valve, each of said slave valves being activated and deactivated in synchronism with said master valve; and.

computer-based means for selectively activating the watering station valves sequentially within said groups on a cyclic basis in accordance with the sequence and timing set for such valves to obtain the flow of water through the valves.

50. The controller apparatus recited in claim 49 further comprising:

means for sensing the moisture level adjacent each said watering station valve as a parameter for said sequence and timing;

means for selectively ignoring the moisture levels sensed by said sensing means at particular watering station valves which are slave valves within each of said groups and for obtaining the flow of water through said watering station valves for a fixed period of time when said watering station valves are activated; and means for providing for the flow of water through other watering station valves which are slave valves within each of said groups when the moisture level sensed by the sensing means at such other watering station valves is below a particular value.

51. In combination, a plurality of stations each disposed at an individual position in a particular area to provide for watering of the earth around such individual station, a plurality of valves each disposed at an individual one of the stations and each having an open state to provide for watering at the station and a closed state to prevent watering at the station, a plurality of sensors each disposed at an individual one of the stations and each constructed to sense the amount of moisture at the station, a keyboard having a plurality of keys disposed in groups, each group representing an individual one of the stations and individual keys in each group providing for a closed state of the valve in the associated station, an open state of the valve in the associated station for a selected period of time and an open state, in a dwell mode, of the valve in the associated station for the shorter of a period of time until the sensor in the associated station indicates a particular level of moisture at the station or for a particular period of time if the sensor in the associated station does not indicate the particular level of moisture in the particular period, and means for scanning the keys in the successive groups on the keyboard sequentially on a cyclic basis to obtain an operation of the valves in each successive station in accordance with the operation of the keys in such stations.

52. In a combination as set forth in claim 51, means associated with the keyboard for converting the operation of valves in the plurality of the selected period of time to the operation of the open state of such valves in the dwell mode after such valves have operated for a particular aggregate number of the selected periods of time.

53. In a combination as set forth in claim 51, means in the keyboard for providing for the scanning of the keys on the cyclic basis between a preselected beginning time and a preselected ending time.

54. In a combination as set forth in claim 51,
means associated with each watering station for indicating the time that the valve associated with such station is open, the time between successive openings of the valve associated with such station and the cumulative time during which the valve associated with such station is open.

55. In combination,
a plurality of stations each disposed at an individual position in a particular area to provide for watering of the earth around such station,
a plurality of valves each disposed at an individual one of the stations and each having an open state to provide for watering at the station and a closed state to prevent watering at the station,
a keyboard including a plurality of keys each associated with an individual one of the stations and actuatable to provide for the opening in a dwell state of the valve associated with such individual station, such dwell state providing for the opening of such valve for the lesser of a particular period of time or until the moisture level around such station reaches a particular value,
means for scanning the keys on the keyboard sequentially on a cyclic basis, and
means operative upon the scanning of the keys for providing for the operation of each valve in the dwell state in accordance with the actuation of the key associated with such valve.

56. In a combination as set forth in claim 55,
means in the keyboard for providing for the sequential scanning of the keys on a cyclic basis only between a particular start time and a particular stop time.

57. In a combination as set forth in claim 56,
means at the keyboard for overriding the opening of each valve in the dwell state and for obtaining the operation of such valve for a particular period of time, regardless of the moisture level in the earth at the station with which such valve is associated, when the key associated with such valve is scanned in the cyclic operation.

58. In a combination as set forth in claim 56,
means for converting to a scanning of each key in the dwell state after such key has been scanned for a particular number of times with the valve associated with such key open for the particular period of time.

59. In a combination as set forth in claim 55,
means in the keyboard for indicating any malfunction in the operation of the valves and the particular malfunction of such valves.

60. In combination for use with a plurality of keys each disposed at an individual position in a particular area to provide for watering of the earth around such individual station and a plurality of valves each disposed at an individual one of the stations and each having an open state to provide for a watering at the station and a closed state to prevent a watering at the station,
a keyboard including a plurality of keys disposed in groups, the keys in each group being associated with an individual one of the valves and being actuatable to prevent the opening of the valve or to provide for an opening of the valve in a dwell time constituting the shorter of a particular period and the period for producing a particular moisture level at the individual station,
first means for scanning the keys in each of the successive groups on a cyclic basis, and
second means responsive to the scanning of the keys in each group for obtaining an operation of the associated valve in accordance with the actuation of the keys in such group and with the moisture level of the earth at the associated station.

61. In a combination as set forth in claim 60,
there being an additional key in each group, such key being actuatable to provide for the opening of the associated valve for a pre-selected period of time,
the second means being operative to provide for the opening of each valve for the pre-selected period of time in accordance with the actuation of the additional key in the group associated with such valves.

62. In a combination as set forth in claim 61,
means for overriding the actuation of the additional key in each group to provide for the operation of the associated valve in the dwell state after the associated valve has been opened for the pre-selected period in a particular plurality of successive scans of such additional key.

63. In a combination as set forth in claim 60,
the keyboard including means for indicating any malfunction at each station and for indicating the specific type of malfunction which is occurring at such station.

64. In combination,
a plurality of stations each disposed at a particular position in a particular area to provide for watering of the earth around such particular station,
a plurality of valves each disposed at an individual one of the stations and each having an open state to provide for a watering at the station and a closed state to prevent any watering at the station,
a plurality of sensors each disposed at an individual one of the stations and each constructed to sense the amount of moisture at the station,
a keyboard including a plurality of keys each associated with an individual one of the stations and each providing, when actuated, for a dwell operation of operating the valve in such station for the shorter of a particular period and a time until the moisture level of the earth at the station reaches a particular level,
means for scanning the keys in the keyboard sequentially on a cyclic basis to obtain the dwell operation of the valves in the stations, and
means in the keyboard for indicating malfunctions, including malfunctions of the valves, at the different stations.

65. In a combination as set forth in claim 64,
the malfunction indicating means being operative on a priority basis to indicate the malfunctions at the different stations such that different malfunctions have a higher priority than others.

66. In a combination as set forth in claim 64,
the malfunction indicating means being operative on a priority basis to indicate the malfunctions at the different stations such that different stations have a higher priority for the malfunctions than other stations.

67. In a combination as set forth in claim 66,
a second plurality of keys in the keyboard each associated with an individual one of the stations and each actuatable to override the dwell operation of the valve in such individual station and to obtain the operation of the valve in such station for a fixed period of time, regardless of the moisture level of the earth at such station, when such individual station is scanned on a cyclic basis.

68. In a combination as set forth in claim 67,
means for overriding the keys in the second plurality after the operation of the valves for a particular number of fixed periods to obtain the operation of the valves thereafter in the dwell state.

69. In a combination as set forth in claim 67,
means for accumulating the time that the earth at each station is watered during a particular time period, and
means for preventing any further watering of each station after a particular count of the watering time at such station during such particular time period.

70. In combination,
a plurality of stations disposed at spaced positions,
means at each of the stations for providing a watering of the earth at such station,
a keyboard,
means associated with the keyboard for providing a scanning of the stations on a cyclic basis,
means at the keyboard for providing for the operation of the watering means at individual ones of the stations for a first particular period of time upon each scanning of such individual stations on a cyclic basis, and
means associated with the keyboard for providing for the operation of the watering means at such individual ones of the stations in accordance with the scanning of the stations, for the shorter of a second particular period or the occurrence of a particular moisture level at such individual stations, upon each scanning of such individual stations on a cyclic basis after such individual stations have been watered a particular number of times for the first particular period.

71. In a combination as set forth in claim 70,
means at the keyboard for providing for the inhibition of any further watering at individual ones of the stations during a particular watering period greater than the first and second periods after such individual stations have been watered for a preselected maximum period during such particular watering period.

72. In a combination as set forth in claim 71,
means at the keyboard for providing for the inhibition of any further watering at any of the stations during the particular watering period after a preselected maximum of watering has occurred on a cumulative basis at all of the stations.

73. In a combination as set forth in claim 70,
means at the keyboard for indicating individual types of malfunctions and the individual stations incurring such malfunctions, and
means associated with the keyboard for providing for the indication by the indicating means at the keyboard of the individual types of malfunctions and the individual stations incurring such individual types of malfunctions.

74. In a combination as set forth in claim 73,
means for establishing a priority at the keyboard for the indication of the individual types of malfunctions and a priority of the individual stations incurring such individual types of malfunctions, and
means associated with the keyboard for providing for the indication by the indicating means at the keyboard, in accordance with such established priorities, of the individual types of malfunctions and the individual stations incurring such individual types of malfunctions.

75. In combination,
a plurality of stations disposed at spaced positions,
means at each of the stations for providing a watering of the earth at such station,
a first keyboard having a plurality of keys disposed in first groups, the keys in each of the first groups being actuatable to control the watering of the earth at an individual one of the stations,
first controller means associated with the first keyboard for scanning the individual groups of keys sequentially on a cyclic basis to obtain the watering of the earth at the individual stations in accordance with the actuation of the keys in the individual groups,
a second keyboard having a plurality of keys disposed in second groups, the keys in each of the second groups being actuatable to control the watering of the earth at an individual one of the stations other than the stations controlled by the operation of the first controller means,
second controller means associated with the second keyboard for scanning the individual ones of the second groups of keys sequentially on a cyclic basis to obtain the watering of the earth at the individual stations associated with the keys in the second groups in accordance with the actuation of the keys in the individual ones of the second groups, and
means for slaving the operation of the second controller means with the operation of the first controller means.

76. In a combination as set forth in claim 75,
the keys in each of the first and second groups providing, when actuated, for the watering of the earth at the associated station for a fixed period of time or for the shorter of a particular period or until the earth at the station has a particular moisture level.

77. In a combination as set forth in claim 76,
means associated with the keys in each of the first and second groups for converting the watering at the stations from watering of the earth at the associated station for the fixed period to the shorter of the particular period or the occurrence of the particular moisture level in the earth at the associated station after the earth at the associated station has been watered for the fixed period for a particular number of times.

78. In a combination as set forth in claim 75,
means for adjusting the fixed period, the particular period and the particular moisture level for each of the stations.

79. In a combination as set forth in claim 76,
means for providing for the watering of the stations sequentially on a cyclic basis from a pre-selected starting time to a pre-selected ending time, and
means for preventing any further watering of each of the stations after such station has been watered for a particular accumulated time between the pre-selected starting time and the pre-selected ending time.

80. In a combination as set forth in claim 79, means for preventing any further watering of the stations after such stations have cumulatively received a particular amount of watering between the pre-selected starting time and the pre-selected ending time.

81. In combination, a plurality of stations disposed at spaced positions, means at each of the stations for providing a watering of the earth at such stations, a keyboard having keys associated with individual ones of the stations and actuatable to provide for a controlled watering of the earth at such individual stations, means associated with the keyboard for providing for a scanning of the stations on a cyclic basis, means associated with the keyboard and the stations for providing a controlled watering of the earth at the stations upon the scanning of the stations and in accordance with the actuation of the keys associated with the stations, means for sensing different types of malfunctions at the individual stations, and means at the keyboard for providing a visual indication of the different types of malfunctions sensed at the different stations, and the stations at which such malfunctions occur, in accordance with a priority established for the different types of malfunctions and a priority established for the individual stations.

82. In a combination as set forth in claim 81, means at the keyboard for providing for the watering at each individual station, upon the scanning of the station, only when the moisture level of the earth at such individual station is below a particular value and only for the shorter of the time until the moisture level of the earth reaches the particular value or a particular period has elapsed after the initiation of such watering.

83. In a combination as set forth in claim 82, means for initially providing a watering at individual stations for fixed periods of time upon the scanning of such stations and for providing for the watering at such individual stations, upon the scanning of such individual stations after the watering at such individual stations a particular number of the fixed periods of time, only when the moisture level of the earth at such individual stations is below the particular value and only for the shorter of the time until the moisture level of the earth reaches the particular value or a particular period has elapsed after the initiation of such watering.

84. In a combination as set forth in claim 83, means for establishing for the watering a starting time and an ending time defining a time window, and means for preventing stations from being watered during the time window after a particular amount of watering has been provided at such stations during the time window.

85. In a combination as set forth in claim 81, means for providing for a watering of each individual station, regardless of the moisture level of the earth at such station, after there has been no watering of the earth at such station for at least a particular period of time during the scanning of the stations.

86. In a combination as set forth in claim 81, an auxiliary timer control system at the stations, means responsive to particular malfunctions in the stations for preventing the actuation of the keys in the keyboard from controlling the watering at the stations and for providing for the operation of the auxiliary timer control system at the stations.

* * * * *